US012009539B2

(12) United States Patent
Hennesy et al.

(10) Patent No.: US 12,009,539 B2
(45) Date of Patent: Jun. 11, 2024

(54) ELECTRIC TOOL SYSTEM WITH REMOVABLE BATTERY PACK

(71) Applicant: Black & Decker Inc., New Britian, CT (US)

(72) Inventors: Timothy J. Hennesy, Baltimore, MD (US); Michael Varipatis, Fallston, MD (US); Mark Cherry, White Marsh, MD (US); Nathan J. Osborne, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/305,495

(22) Filed: Jul. 8, 2021

(65) Prior Publication Data

US 2022/0013842 A1 Jan. 13, 2022

Related U.S. Application Data

(60) Provisional application No. 62/705,634, filed on Jul. 8, 2020.

(51) Int. Cl.

| | |
|---|---|
| ***H01M 50/247*** | (2021.01) |
| ***B25F 5/02*** | (2006.01) |
| ***H01M 50/204*** | (2021.01) |
| ***H01M 50/296*** | (2021.01) |

(52) U.S. Cl.

CPC ....... *H01M 50/247* (2021.01); *H01M 50/204* (2021.01); *H01M 50/296* (2021.01); *B25F 5/021* (2013.01); *H01M 2220/30* (2013.01)

(58) Field of Classification Search

CPC .................................................. H01M 50/247

See application file for complete search history.

(56) References Cited

U.S. PATENT DOCUMENTS

2015/0228943 A1 8/2015 Umemura et al.
2015/0243945 A1 8/2015 Milbourne et al.

FOREIGN PATENT DOCUMENTS

CN 109192895 A 1/2019
EP 1833137 A2 * 9/2007 ................ B25F 5/00

OTHER PUBLICATIONS

International Search Report and Written Opinion for PCT Application No. PCT/US2021/070852, dated Oct. 26, 2021, 12 pages.

* cited by examiner

*Primary Examiner* — Maria Laios
*Assistant Examiner* — Jordan E Berresford
(74) *Attorney, Agent, or Firm* — Michael Aronoff

(57) ABSTRACT

The present disclosure is directed to an electric power tool system with cordless power tools and removable, rechargeable battery packs that mate with the power tools to provide stored energy to the power tools. The battery packs may include a first battery pack having a basic interface and a second battery pack having an advanced interface. The power tools may include a first power tool having a basic interface and a second power tool having an advanced interface. The basic interface battery pack may mate with both the basic interface power tool and the advanced interface power tool. The advanced interface battery pack may mate with both the basic interface power tool and the advanced interface power tool.

25 Claims, 137 Drawing Sheets

200b3

200b2

200b2

300b3

200b3

300b3

200b3

200b4

200b4

200b5

200b5

200b6

200b6

300a1

200a7

300a1

200a7

300a1

200b7

300a1

200b7

200b8

200b8

300b8

300b8

300b8

200a7

300b8

200a7

200a9

200a9

300a9

300a9

200b9

200b9

200b9

200b9

300b9

300b9 back side elevation view

700a1 left side elevation view

700a1 top plan view

700a1

¾ top, front, left perspective view

700a1

¾ top, back, right perspective view

700a1

¾ top, front, right perspective view

700a1

¾ top, back, left perspective view

700a1 front side elevation view

700a2 right side elevation view

700a2 back side elevation view

700a2 top plan view

700a2 left side elevation view

700a2

¾ top, front, left perspective view

700a2

¾ top, front, right perspective view

700a2

¾ top, back, right perspective view front side elevation view right side elevation view back side elevation view ¾ top, front, right perspective view 700b2

¾ top, front, left perspective view

700b2

¾ top, back, left perspective view

700b2

¾ top, back, right perspective view

700b2

800b2

ELECTRIC TOOL SYSTEM WITH REMOVABLE BATTERY PACK

CROSS-REFERENCE TO RELATED APPLICATION

This application claims priority under 35 U.S.C. § 119(e) to U.S. Provisional Patent Application No. 62/705,634, filed Jul. 8, 2020, titled "Electric Tool System with Removable Battery Pack", the disclosure of which is incorporated by reference herein in its entirety.

TECHNICAL FIELD

This application relates to a cordless power tool system including a set of cordless power tools, a set of rechargeable and removable battery packs, and a set of battery pack chargers.

BACKGROUND

Electric tools include an electric load and require a source of electricity to power the load. Electric tools may be broken down into two groups: (1) corded electric tools that source electricity through a cord plugged into a source of alternating current and (2) cordless electric tools that source electricity from a battery. Cordless electric tools may be broken down into two groups: (1) tools that use an internal, integrated battery and (2) tools that use a removable battery pack.

The cordless electric tools that use a removable battery pack and the removable battery packs that provide electricity (energy/power) to a cordless electric tool require an interface between the tools and the packs. The tool includes a tool portion/aspect/element of the combination interface and the pack includes a pack portion/aspect/element of the combination interface. The interface allows the tool and the pack to couple/mate and decouple/unmate with each other such that when the tool and the pack are coupled/mated the pack will provide power to the tool and will stay affixed to the tool during operation of the combination.

The interface is configured and defined such that only tools and packs that are intended to work with each will be able to fully couple/mate. Particularly, different tool and pack manufacturers configure and define the interface between their tools and packs such that a tool of one manufacturer will not fully couple/mate with a battery pack of another manufacture.

A cordless power tool and a removable battery pack mate together in order to enable the battery pack to provide stored energy to the power tool in order to operate the power tool. Mating the power tool and the battery pack requires an interface. The power tool includes a power tool portion of the interface and the battery pack includes a battery pack portion of the interface. Together the power tool portion of the interface and the battery pack portion of the interface form the combination interface. The combination interface may also be referred to as the tool-pack interface or simply as the interface.

A latching mechanism is typically provided to lock the removable battery pack to the power tool. The latching mechanism may include male/female components provided on the battery pack, the tool, or a combination of the two. In some configurations, the latching mechanism is provided in the form of an actuatable stop that locks the battery pack relative to the terminal block of the tool along an insertion axis of the battery pack.

A battery pack typically includes a series of battery cells connected in a series, a parallel, or a series/parallel configuration. The battery cells may be electrically connected in a series configuration to increase the voltage rating of the battery pack, in a parallel configuration to increase the current and/or charge capacity of the battery pack, or a series-parallel combination configuration. For example, a battery pack marketed as a 20V Max battery pack in the power tool industry with a nominal voltage of approximately 18V may include a single string of five battery cells (5S1P), or multiple such strings of five battery cells connected in parallel (5SxP, where x>1). The battery pack current capacity, and consequently its runtime, may be increased by increasing the number of parallel strings of battery cells. In this example, the parallel connections are made at the ends of the strings, though it should be understood that parallel connections may be made between a node of adjacent cells of one string and a corresponding node of adjacent cells of a second string. In an embodiment, the battery pack may be a convertible battery pack where the strings of cells may be switchably configured in series or parallel depending on the voltage requirement of the power tool. U.S. Pat. No. 9,406,915, which is incorporated herein by reference in its entirety, describes examples of such a convertible battery pack.

SUMMARY

In one general aspect, a removable battery pack for providing electrical energy to a cordless electric tool includes a housing including a plurality of terminal slots and an interface including a first set of rails and a second set of rails.

Implementations may include one or more of the following features. For example, in some implementations, the housing includes a rear wall, the first set of rails terminates forward of the rear wall, and the second set of rails terminates at the rear wall.

For example, in some implementations, the housing includes a rear wall and the second set of rails are positioned closer to the rear wall than the first set of rails.

For example, in some implementations, the housing includes a rear wall and the first set of rails are positioned closer to the rear wall than the second set of rails.

For example, in some implementations, the first set of rails are generally in a same plane as the second set of rails.

For example, in some implementations, the first set of rails are not in a same plane as the second set of rails.

For example, in some implementations, the battery housing includes a datum plane and the first set of rails are offset from the datum plane by a first distance and the second set of rails are offset from the datum plane by a second distance.

For example, in some implementations, the first set of rails includes two rails in a first plane and the second set of rails includes two rails in a second plane, each of the two rails of the first set of rails includes a side wall, the side walls of the two rails of the first set of rails being generally parallel to each other and separated by a first distance and each of the two rails of the second set of rails includes a side wall, the side walls of the two rails of the second set of rails being generally parallel to each other and separated by a second distance. For example, in some implementations, the first distance is generally less than the second distance.

For example, in some implementations, the battery pack housing is configured to mate with the cordless electric tool in a mating direction and wherein the datum plane is generally parallel to the mating direction and wherein the first distance is offset from the datum plane in a direction generally perpendicular to the datum plane and wherein the second distance is offset from the datum plane in a direction generally perpendicular to the datum plane.

For example, in some implementations, the battery pack further includes a first set of grooves associated with the first set of rails and a second set of grooves associated with the second set of rails.

Implementations may include one or more of the following features. For example, in some implementations, the housing having a forward side and a rearward side, the forward side including the plurality of terminal slots, the first set of rails positioned closer to the forward side than the second set of rails.

In some implementations, the second set of rails are positioned closer to the forward side than the first set of rails.

In another general aspect, an interface of a removable battery pack for mating with an interface of a cordless electric tool includes a first set of rails and a first set of grooves associated with the first set of rails and a second set of rails and a second set of grooves associated with the second set of rails.

Implementations may include one or more of the following features. For example, in some implementations, the interface includes the first set of rails and the first set of grooves are positioned closer to a forward side of the battery pack than the second set of rails and the second set of grooves.

Implementations may include one or more of the following features. For example, in some implementations, the first set of rails terminates forward of a rear wall of a battery pack housing, and the second set of rails terminates at the rear wall.

For example, in some implementations, the second set of rails are positioned closer to a rear wall of a battery pack housing than the first set of rails.

For example, in some implementations, the first set of rails are positioned closer to a rear wall of a battery pack housing than the second set of rails.

For example, in some implementations, the first set of rails are generally in a same plane as the second set of rails.

For example, in some implementations, the first set of rails are not in a same plane as the second set of rails.

For example, in some implementations, the interface further includes a datum plane and wherein the first set of rails are offset from the datum plane by a first distance and the second set of rails are offset from the datum plane by a second distance.

For example, in some implementations, the first set of rails includes two rails in a first plane and the second set of rails includes two rails in a second plane, each of the two rails of the first set of rails includes a side wall, the side walls of the two rails of the first set of rails being generally parallel to each other and separated by a first distance and each of the two rails of the second set of rails includes a side wall, the side walls of the two rails of the second set of rails being generally parallel to each other and separated by a second distance. For example, in some implementations, the first distance is generally less than the second distance.

For example, in some implementations, the interface is configured to mate with an interface of a cordless electric tool in a mating direction and wherein the datum plane is generally parallel to the mating direction and wherein the first distance is offset from the datum plane in a direction generally perpendicular to the datum plane and wherein the second distance is offset from the datum plane in a direction generally perpendicular to the datum plane.

In another general aspect, a cordless electric power tool for receiving electrical energy from a removable battery pack, the power tool includes a housing including a plurality of terminal and an interface including a first set of rails and a second set of rails.

In some implementations, the housing includes a forward side and a rearward side, the forward side including the plurality of terminals, the first set of rails being positioned closer to the forward side than the second set of rails.

Implementations may include one or more of the following features. For example, in some implementations, the housing includes a front wall, the first set of rails terminates prior to the front wall, and the second set of rails terminates at the front wall.

For example, in some implementations, the housing includes a front wall and the second set of rails are positioned closer to the front wall than the first set of rails.

For example, in some implementations, the housing includes a front wall and the first set of rails are positioned closer to the front wall than the second set of rails.

For example, in some implementations, the first set of rails are generally in a same plane as the second set of rails.

For example, in some implementations, the first set of rails are not in a same plane as the second set of rails.

For example, in some implementations, the power tool housing includes a datum plane and the first set of rails are offset from the datum plane by a first distance and the second set of rails are offset from the datum plane by a second distance. In some implementations, the first distance is generally less than the second distance. In some implementations, the first distance is generally greater than the second distance.

For example, in some implementations, the first set of rails includes two rails in a first plane and the second set of rails includes two rails in a second plane, each of the two rails of the first set of rails includes a side wall, the side walls of the two rails of the first set of rails being generally parallel to each other and separated by a first distance and each of the two rails of the second set of rails includes a side wall, the side walls of the two rails of the second set of rails being generally parallel to each other and separated by a second distance. For example, in some implementations, the first distance is generally less than the second distance. In some implementations, the first distance is generally greater than the second distance.

For example, in some implementations, the power tool housing is configured to mate with the battery pack in a mating direction and wherein the datum plane is generally parallel to the mating direction and wherein the first distance is offset from the datum plane in a direction generally perpendicular to the datum plane and wherein the second distance is offset from the datum plane in a direction generally perpendicular to the datum plane.

For example, in some implementations, the power tool further includes a first set of grooves associated with the first set of rails and a second set of grooves associated with the second set of rails.

In another general aspect, a cordless power tool system includes a removable battery pack configured to mate with a cordless power tool and to provide electrical energy to the cordless power tool. The battery pack includes a housing including forward side and a rearward side, the forward side including a plurality of terminal slots that provide access to a plurality of battery terminals and an interface including a first set of battery pack rails and a first set of battery pack grooves associated with the first set of battery pack rails and a second set of battery pack rails and a second set of battery pack grooves associated with the second set of battery pack rails, the first set of battery pack rails and the first set of battery pack grooves positioned closer to the forward side of the battery pack housing than the second set of battery pack rails and the second set of battery pack grooves. The cordless power tool system includes a cordless power tool configured to mate with the removable battery pack and to receive electrical energy from the removable battery pack. The cordless power tool includes a housing having a forward side and a rearward side, the rearward side including a plurality of tool terminals configured to mate with the plurality of battery terminals upon mating with the removable battery pack and an interface including a first set of power tool rails and a first set of power tool grooves associated with the first set of power tool rails and a second set of power tool rails and second set of power tool grooves associated with the second set of power tool rails, the first set of power tool rails and the first set of power tool grooves positioned closer to the rearward side of the power tool housing than the second set of power tool rails and the second set of power tool grooves. The first set of battery pack rails and the first set of battery pack grooves and the second set of battery pack rails and the second set of battery pack grooves and the first set of power tool rails and the first set of power tool grooves and the second set of power tool rails and the second set of power tool grooves are shaped, dimensioned and configured such that when the battery pack is mated with the power tool the first set of battery pack rails is received in the first set of power tool grooves and the second set of battery pack rails is received in the second set of power tool grooves and the first set of power tool rails is received in the first set of battery pack grooves and the second set of power tool rails is received in the second set of battery pack grooves.

These and other advantages and features will be apparent from the description and the drawings.

DETAILED DESCRIPTION

Figure 1:
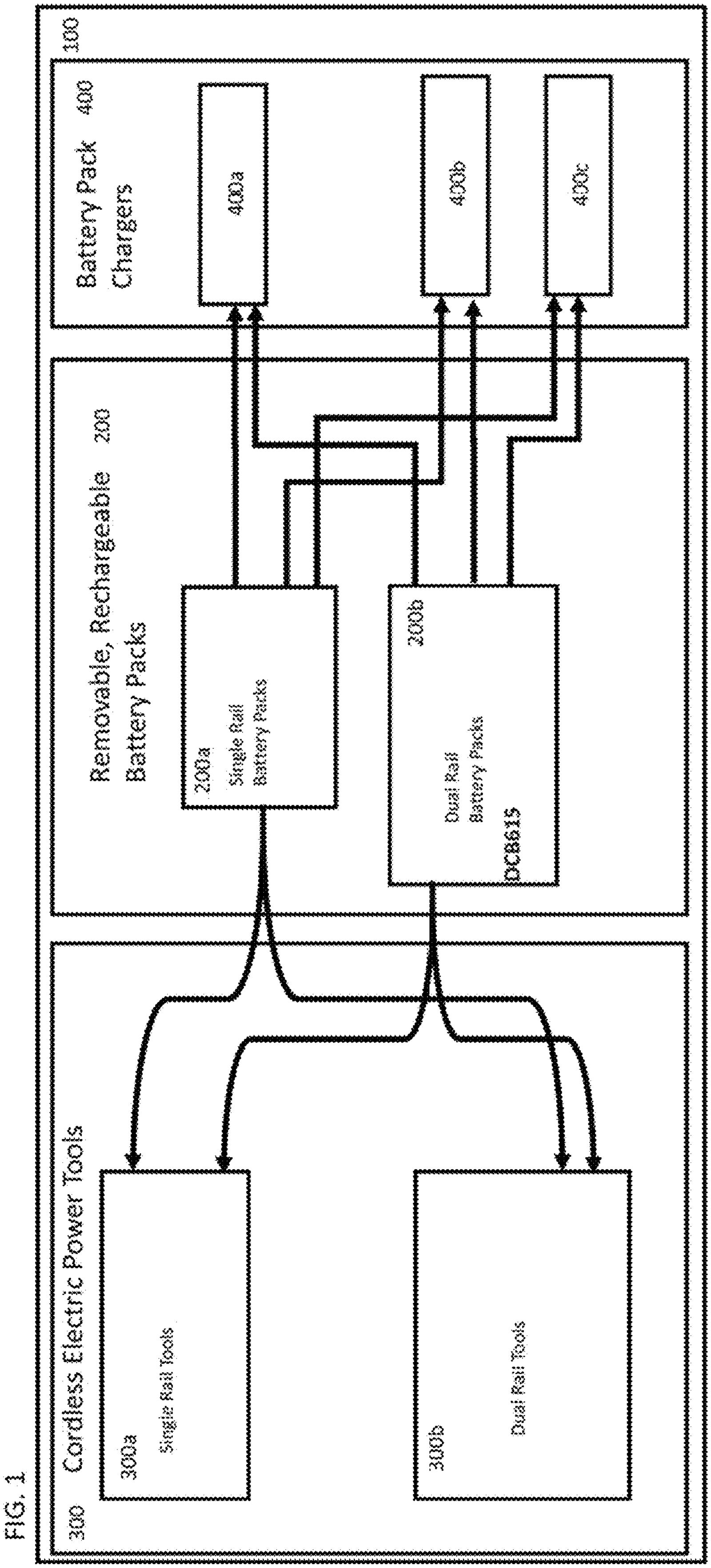
FIG. 1 is diagram of example embodiment of a power tool system.

This document describes battery packs having a basic interface—sometimes also referred to as a single rail interface. These battery packs may be referred to as basic interface battery packs and their interface may be referred to as a battery pack basic interface. This document also describes battery packs having an advanced interface—sometimes also referred to as a dual rail interface. These battery packs may be referred to as advanced interface battery packs and their interface may be referred to as a battery pack advanced interface.

This document also describes power tools having a basic interface—sometimes also referred to as a single rail interface. These power tools may be referred to as basic interface power tools and their interface may be referred to as a power tool basic interface. This document also describes power tools having an advanced interface—sometimes also referred to as a dual rail interface. These power tools may be referred to as advanced interface power tools and their interface may be referred to as a power tool advanced interface.

The basic interface may include only a single pair of rails and/or a single pair of grooves. The advanced interface may include both a first or primary pair of rails and/or an associated first or primary pair of grooves (essentially equivalent to the single pair of rails and grooves of the basic interface, in geometrical configuration, e.g., the positioning and size of the rails and grooves relative to a datum plane) and a second or secondary pair of rails and/or an associated second or secondary pair of grooves having a distinct geometrical configuration as compared to the first or primary set of rails and/or the first or primary set of grooves.

The basic interface battery packs and secondary (or supplemental) interface battery packs are compatible with both single rail interface cordless electric tools and dual rail interface cordless electric tools. The dual rail interface battery packs provide a technical solution to technical problems encountered with battery packs that are larger (e.g., longer, wider, taller, and/or heavier) than battery packs having a single rail interface. The secondary rail support assembly portion of the interface provides additional structural support for securing and retaining the larger battery packs. The secondary rail support assembly portion of the interface provides an additional set of rails for structurally supporting the larger battery packs. Improved single rail interface battery packs also achieve additional structural support benefits for securing and retaining the improved battery packs to the power tools. As described in additional details below, the dual rail interface may include two rail elements and different implementations may include different arrangements and placement of the two rail elements with respect to one another for different battery pack types. As mentioned above, one benefit of the secondary rail support assembly portion of the interface of the dual rail battery packs is that they are compatible not only with power tools having a dual rail interface, but also with tools having a single rail interface. Similarly, improved single rail interface battery packs are compatible with both single rail interface tools and dual rail interface tools.

This document also describes tools having only a single set of rails and tools having both a primary and a secondary set of rails—also referred to as dual rail tools. The dual rail interface includes two rail elements, which provide additional structural support for receiving, mating with, and structurally supporting battery packs that include the dual rail interface. One benefit of the dual rail support assembly interface tools is that they are compatible with both single rail interface battery packs and dual rail interface battery packs. The compatibility of the dual rail interface tools with multiple different types of battery pack interfaces allows flexibility for users. Improved single rail interface tools also achieve additional structural support benefits for securing and retaining the improved single rail interface power tools to the battery pack.

A first example battery pack may include only a primary rail support assembly and a second example battery pack may include a primary (first) rail support assembly and a second (second) rail support assembly.

A single rail interface system may include a primary rail support assembly element, where the primary rail support assembly element may include two rails. A single rail interface system on a battery pack or on a power tool also may be referred to as a basic interface system. As used herein, "dual" means double, or having two elements. For example, a dual rail interface system includes a first rail element and a second rail element. The first rail element may include two rails and the second rail element may include two rails. The first rail element of the dual rail interface system may be generally the same as a single rail element of a single rail interface system and the second rail element of the dual rail interface system is supplemental to the first rail element. A dual rail interface system on a battery pack or on a power tool may include what is referred to as a primary interface element and a secondary interface element.

FIG. 1 illustrates an example embodiment of a cordless, electric power tool system 100. The tool system 100 includes a set of removable, rechargeable battery packs 200, a set of cordless electric power tools 300 and a set of battery pack chargers 400. FIG. 1 illustrates the compatibility of the set of battery packs 200 with the set of cordless electric power tools 300 and the set of battery pack chargers 400.

The set of removable, rechargeable battery packs 200 may include a subset of single rail (also referred to as primary rail only) interface battery packs 200*a* and a subset of dual rail (also referred to as primary rail and secondary rail) interface battery packs 200*b*. The single rail interface battery packs 200*a* may include single voltage battery packs (e.g., 12V, 14.4V, 18V, 20V, etc.) and multiple voltage (also referred to as multi-voltage) battery packs (e.g., 18V/36V, 20V/40V, 20V/60V, etc.). The dual rail interface battery packs 200*b* may include single voltage battery packs (e.g., 12V, 14.4V, 18V, 20V, etc.) and multi-voltage battery packs (e.g., 18V/36V, 20V/40V, 20V/60V, etc.).

The set of cordless electric tools 300 may include a subset of single rail interface tools 300*a* and a subset of dual rail interface tools 300*b*. The primary rail interface tools 300*a* may include tools that have different operating voltages such as, for example, low voltage tools, medium voltage tools, high voltage tools, etc. The dual rail interface tools 300*b* also may include tools that have different operating voltages such as, for example, low voltage tools, medium voltage tools, high voltage tools, etc.

As mentioned above, FIG. 1 illustrates that the single rail interface battery packs 200*a* are compatible with both the single rail interface tools 300*a* and the dual rail interface tools 300*b*. Similarly, the dual rail interface battery packs 200*b* are compatible with both the single rail interface tools 300*a* and the dual rail interface tools 300*b*.

The set of battery pack chargers 400 may include a subset of first voltage chargers 400*a* (e.g., low voltage chargers), a subset of second voltage chargers 400*b* (e.g., medium voltage chargers), and a subset of third voltage chargers 400*c* (e.g., high voltage chargers). FIG. 1 illustrates that the single rail interface battery packs 200*a* are compatible with both the first voltage chargers 400*a*, the second voltage chargers 400*b*, and the third voltage chargers 400*c*. Similarly, the dual rail interface battery packs 200*b* are compatible with both the first voltage chargers 400*a*, the second voltage chargers 400*b*, and the third voltage chargers 400*c*.

In the figures and example embodiments below for FIGS. 2-56, a single rail interface battery pack and a single rail interface tool are designated by the letter "a". More specifically, the single rail interface battery packs are designated using the numeral "200" and the letter "a" followed by a number (e.g., 1, 2, 3, etc.) indicating the particular example embodiment. The dual rail interface battery packs are designated using the numeral "200" and the letter "b" followed by a number (e.g., 1, 2, 3, etc.) indicating the particular example embodiment. Similarly, the single rail interface tools are designated using the numeral "300" and the letter "a" followed by a number (e.g., 1, 2, 3, etc.) indicating the particular example embodiment. The dual rail interface tools are designated using the numeral "300" and the letter "b" followed by a number (e.g., 1, 2, 3, etc.) indicating the particular example embodiment. Any particular exceptions to this convention are described with respect to particular example embodiments.

Figure 2B:
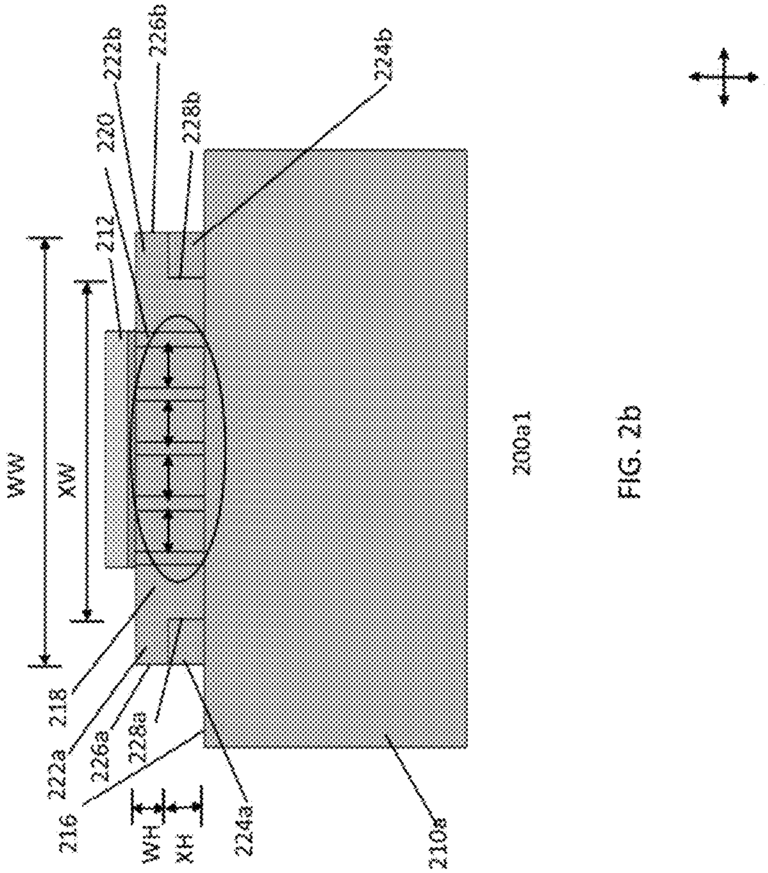
FIGS. 2*a*-2*d* illustrate a first example embodiment of a battery pack of the power tool system of FIG. 1 including only a primary interface element.
Figure 2A:
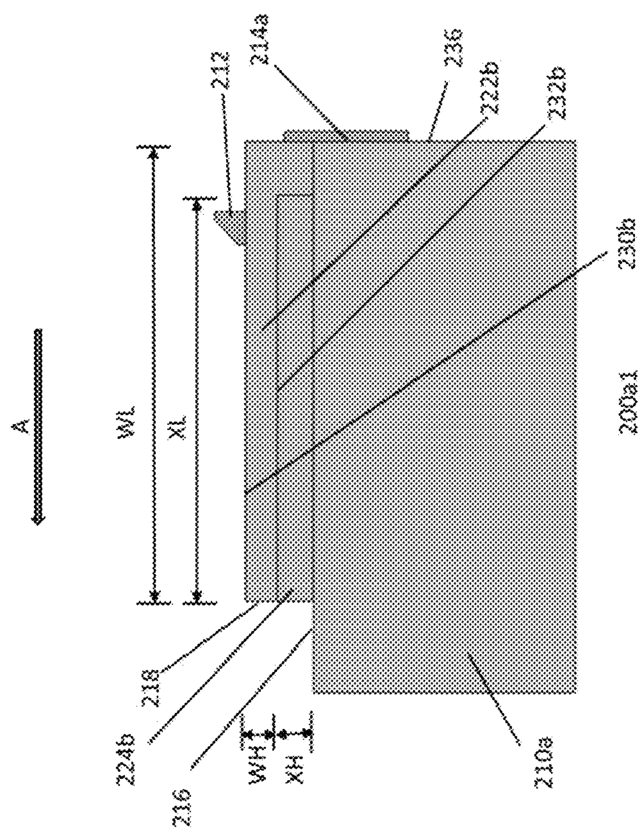
Figure 2C:
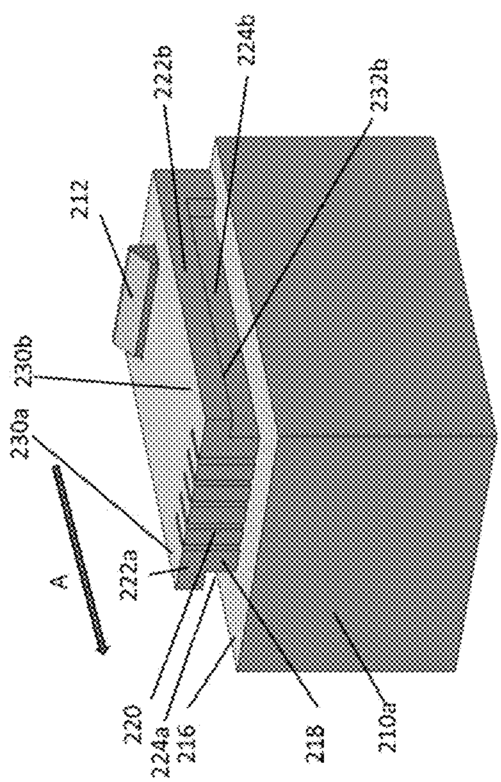
Figure 2D:
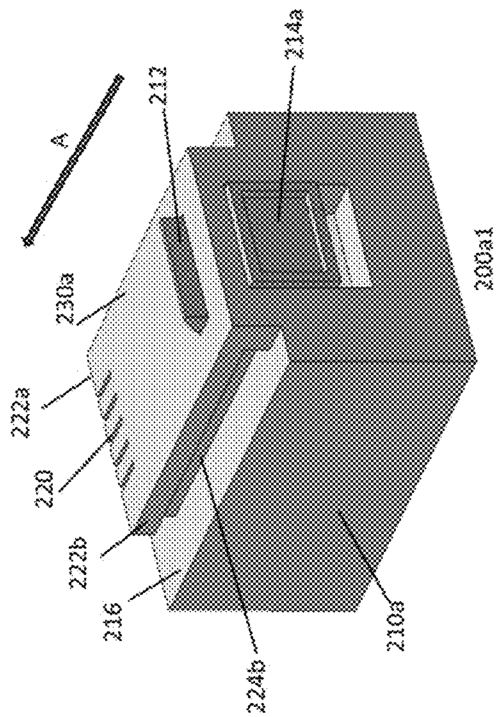

FIGS. 2*a*-2*d* illustrate a first example embodiment of a battery pack 200*a*1 of the power tool system of FIG. 1. The battery pack 200*a*1 includes an example of a basic battery pack rail interface. FIG. 2*a* illustrates a right side view, FIG. 2*b* illustrates a front view, FIG. 2*c* illustrates a front isometric view, and FIG. 2*d* illustrates a rear isometric view of the single rail interface battery pack 200*a*1. The basic rail interface is equivalent to a primary rail interface, as described in more detail below. The battery pack 200*a*1 includes a housing 210*a*. The housing may have a forward side and a rearward side. The battery pack 200*a*1 includes an interface for mating with a corresponding interface of an electric tool 300*a*1 (described in more detail below) with respect to FIGS. 3*a*-3*d* and FIGS. 4*a*-4*d* or with an interface of an electric tool 300*b*1 (described in more detail below with respect to FIGS. 7*a*-7*d* and 8*a*-8*d*. When mating (coupling) a battery pack 200*a*1 with an electric tool, the battery pack 200*a*1 will be inserted into (coupled with) the electric tool 300*a*1 and the electric tool 300*a*1 will receive the battery pack 200*a*1 in a mating direction, indicated by the arrow labeled A.

The interface of the battery pack 200*a*1 may be referred to as a basic interface or a first interface or a single rail interface. The interface includes a latch 212 and a latch actuation button 214*a*. The interface also includes a base surface or plane (also referred to as a horizontal datum plane) 216. The base surface 216 is approximately, generally parallel to the insertion direction A. The base surface 216 serves to define the relative position and orientation of various elements of the interface. The interface also includes a mating surface 218 (also referred to as a vertical datum plane). The mating surface 218 faces forward and is generally perpendicular to the base surface 216 and the mating direction A. The mating surface 218 includes a plurality of terminal slots 220. Each of the plurality of terminal slots 220 is positioned within the mating surface 218 in a position to correspond to one of a plurality of battery pack terminals (not shown). The single rail support assembly battery pack interface includes a set of rails (referred to as a set of primary rails) 222 and a set of grooves (referred to as a set of primary grooves) 224.

The set of rails 222 includes at least one and preferably two rails 222*a*, 222*b*. Each of the rails 222*a*, 222*b* extends laterally (generally perpendicular to the mating direction A and generally parallel to the base surface 216). As illustrated in FIG. 2*b*, one of the rails 222*a* is on one side of the battery pack housing 210*a* and the other rail 222*b* is on the opposite side of the battery pack housing 210*a*.

The set of grooves 224 includes at least one and preferably two grooves 224*a*, 224*b*. Each of the grooves 224*a*, 224*b* is defined by a space between a corresponding rail 222*a*, 222*b* and the base surface 216. As illustrated in FIG. 2*b*, one of the grooves 224*a* is on one side of the battery pack housing 210*a* and the other groove 224*b* is one the opposite side of the battery pack housing 210*a*. The rails 222*a*, 222*b* and the corresponding grooves 224*a*, 224*b* define, in part, the single rail interface that is compatible to mate (couple) with either a single rail support assembly electric tool or a dual rail support assembly electric tool.

The set of rails 222*a*, 222*b* are further defined by primary rail side walls 226*a*, 226*b*, rail top walls 230*a*, 230*b*, and rail bottom walls 232*a*, 232*b*, which are the top walls 232*a*, 232*b* of the grooves 224*a*, 224*b*. The set of grooves 224*a*, 224*b* are further defined by groove side walls 228*a*, 228*b*, groove top walls 232*a*, 232*b*, which are the bottom walls 232*a*, 232*b* of the rails 222*a*, 222*b*, and the groove rear walls 234*a*, 234*b*. The battery pack housing 210*a* is also further defined by a housing rear wall 236.

As illustrated in FIG. 2*a*, a length dimension WL defines a length distance from the battery pack housing rear wall 236 to the mating surface 218. A length dimension XL defines a length distance from the rear wall 234*a*, 234*b* of the grooves 224*a*, 224*b* to the mating surface 218. Referring also to FIG. 2*b*, a height dimension XH defines a height distance from the base surface 216 to the rail bottom wall/groove top wall 232*a*, 232*b*. A height dimension WH defines a height distance from the rail bottom wall 232*a*, 232*b* to the rail top wall 230*a*, 230*b*. As illustrated in FIG. 2*b*, a width dimension WW defines a width distance from the rail side wall 226*a* to the rail side wall 226*b*. A width dimension XW defines a width distance from the groove side wall 228*a* to the groove side wall 228*b*.

Figure 3B:
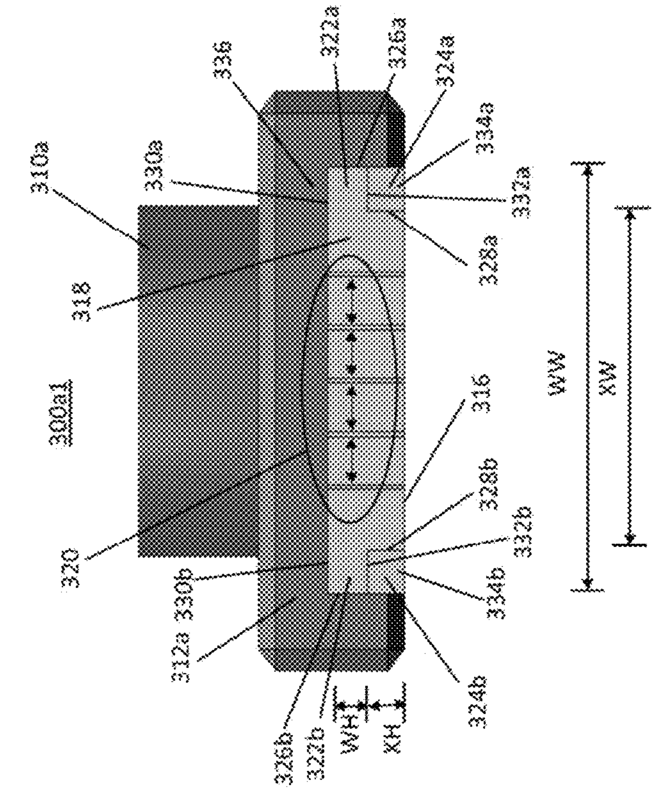
FIGS. 3*a*-3*d* illustrate a first example embodiment of a power tool of the power tool system of FIG. 1 including only a primary interface element.
Figure 3A:
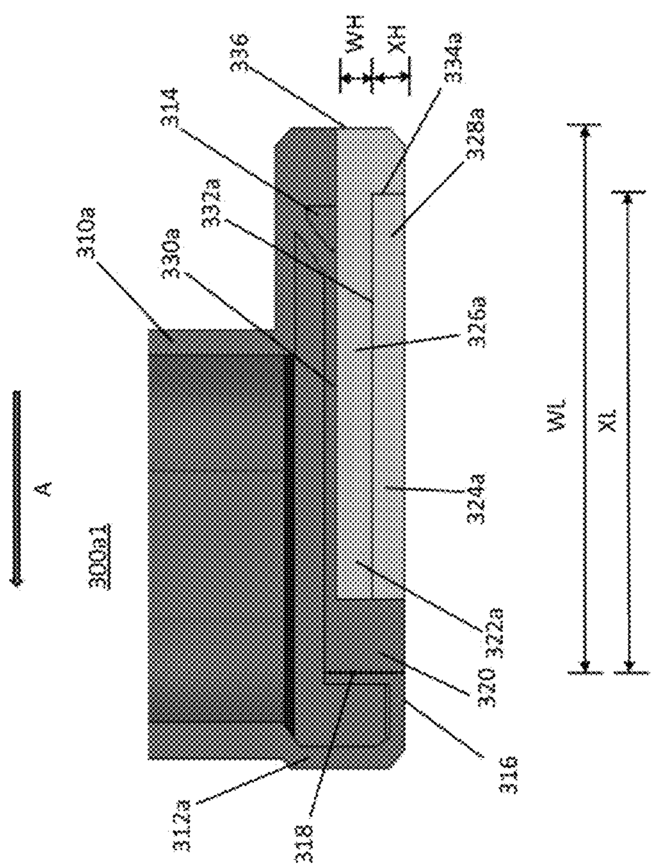
Figure 3D:
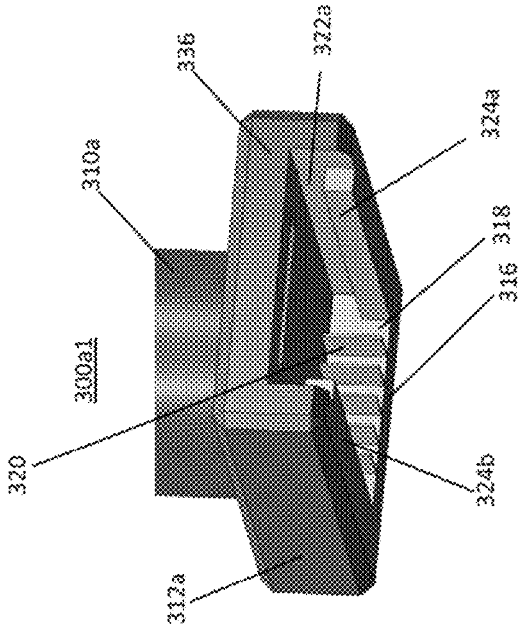
Figure 3C:
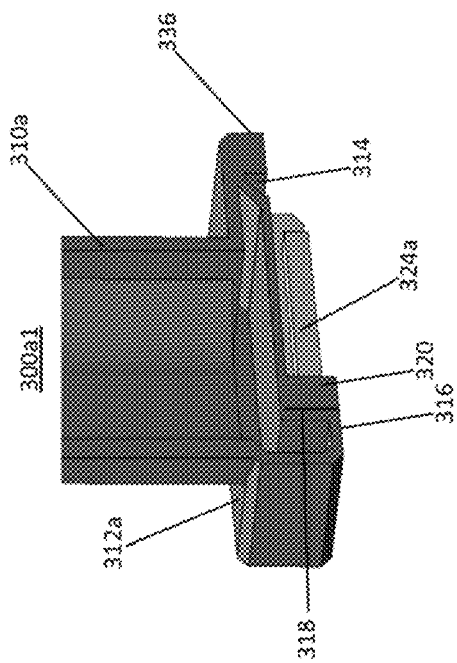
Figure 4B:
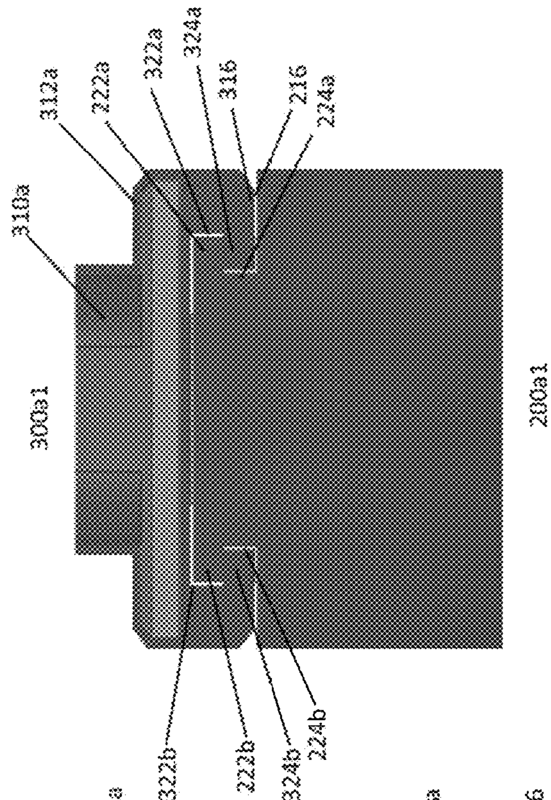
FIGS. 4*a*-4*d* illustrate a combination of the battery pack of FIGS. 2*a*-2*d* and the power tool of FIGS. 3*a*-3*d*.
Figure 4A:
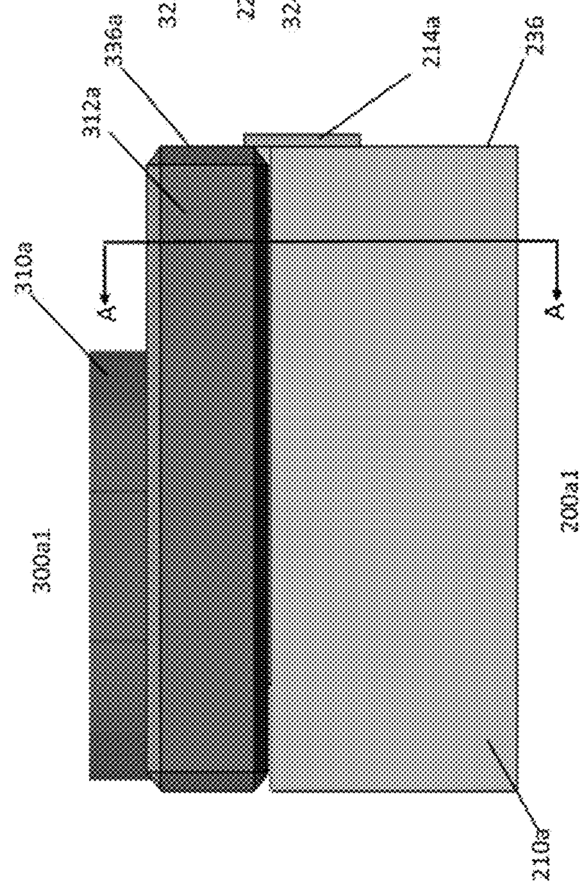
Figure 4D:
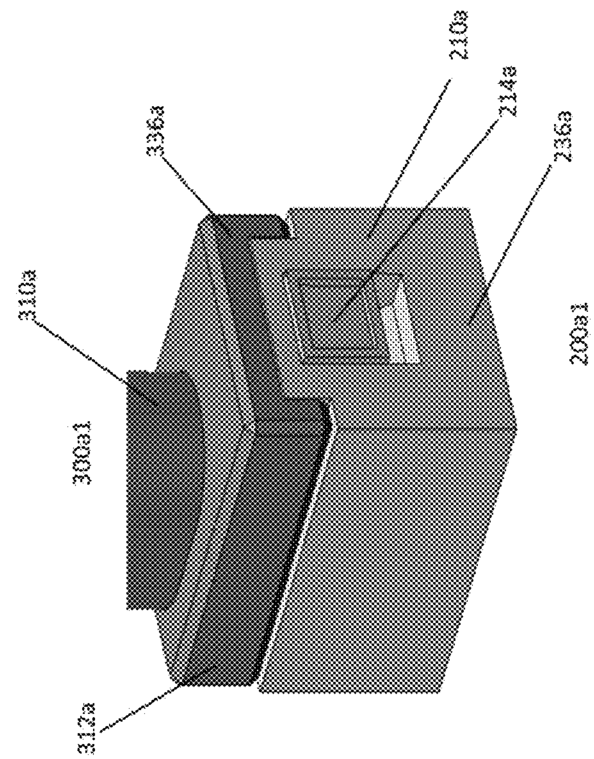
Figure 4C:
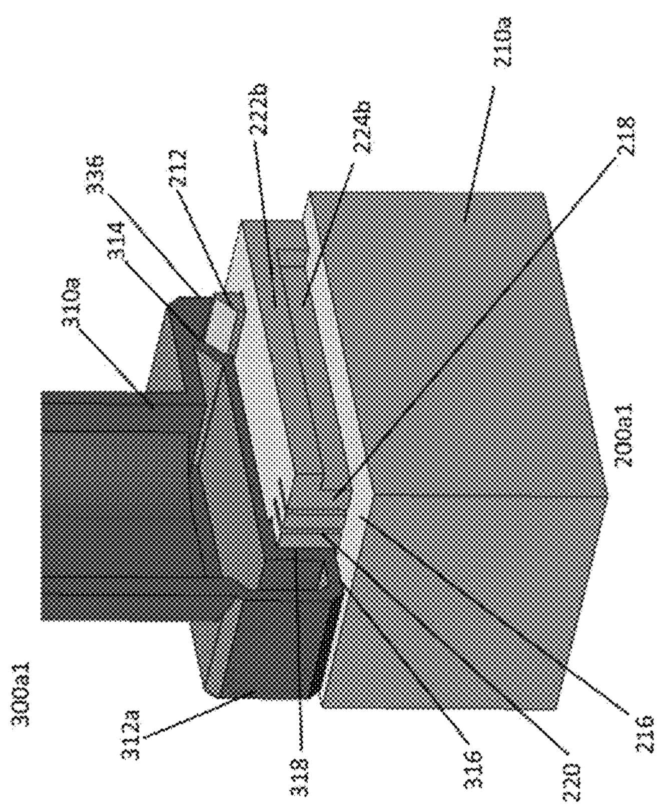

FIGS. 3*a*-3*d* illustrate a first example embodiment of a power tool 300*a*1 of the power tool system of FIG. 1. The power tool 300*a*1 includes an example of a basic power tool rail interface. FIG. 3*a* illustrates a section, right side view, FIG. 3*b* illustrates a front view, FIG. 3*c* illustrates a section, rear isometric view, and FIG. 3*d* illustrates an isometric, bottom front view of the basic power tool rail interface. The power tool 300*a*1 includes a housing 310*a*. The power tool 300*a*1 includes an interface for mating (coupling) with a corresponding interface of a battery pack 200*a*1, as described above with respect to FIGS. 2*a*-2*d* and described below with respect to FIGS. 4*a*-4*d*. When mating (coupling) the power tool 300*a*1 with a battery pack, the power tool

300_a_1 will receive the battery pack in a mating direction indicated by the arrow labeled A.

The interface of the power tool 300_a_1 will be referred to as a basic interface or a primary rail support assembly interface. The tool interface includes a tool shroud (foot) 312_a_ and a tool catch 314. The tool catch 314 engages with the latch 212 on the battery pack 200_a_1 to maintain the engagement of the battery pack 200_a_1 within the tool shroud 312_a_. The tool interface also includes tool horizontal datum plane 316 (or horizontal datum plane), which is approximately parallel to the mating direction A, and a tool vertical datum plane 318 (or vertical datum plane), which is approximately perpendicular to the mating direction A. The horizontal datum plane 316 and the vertical datum plane 318 serve to define the relative position and orientation of various elements of the interface. The tool shroud 312_a_ includes a set of power tool terminals 320. Each of the plurality of terminals 320 extends from and are generally perpendicular to the vertical datum plane 318 and are approximately perpendicular to the horizontal datum plane 316. The single rail support assembly tool interface includes a set of tool grooves 322 (referred to as a set of primary grooves), and a set of tool rails 324 (referred to as a set of primary rails).

The set of tool rails 324 includes at least one rail and preferably two tool rails 324_a_, 324_b_. Each of the tool rails 324_a_, 324_b_ extends laterally (generally perpendicular to the mating direction A and generally parallel to the horizontal datum plane 316). As illustrated in FIG. 3_b_, one of the tool rails 324_a_ is on one side of the tool shroud 312 and the other tool rail 324_b_ is on the opposite side of the tool shroud 312.

The tool shroud 312 defines tool groove side walls 326_a_, 326_b_ and tool rail side walls 328_a_, 328_b_. The tool shroud 312 defines tool groove top walls 330_a_, 330_b_. The tool shroud 312 also defines tool rail top walls 332_a_, 332_b_, which also define and may be referred to as tool groove bottom walls 332_a_, 332_b_. The tool rails 324_a_, 324_b_ each include a tool rail front wall 334_a_, 334_b_. The tool housing 310_a_ also defines a tool housing front wall 336.

The set of grooves 322 includes at least one and preferably two grooves 322_a_, 322_b_. Each of the grooves 322_a_, 322_b_ is defined by a space between a corresponding rail 324_a_, 324_b_ and the tool groove top walls 330_a_, 330_b_. As illustrated in FIG. 3_b_, one of the grooves 322_a_ is on one side of the tool shroud 312 and the other groove 322_b_ is on the opposite side of the tool shroud 312. The tool rails 324_a_, 324_b_ and the tool grooves 322_a_, 322_b_ define the single rail interface that is compatible to mate (couple) with either a single rail support assembly battery pack interface or a dual rail support assembly battery pack interface.

As illustrated in FIG. 3_a_, a length dimension WL defines a length distance from the tool housing front wall 336 to the vertical datum plane 318. A length dimension XL defines a length distance from the tool rail front walls 334_a_, 334_b_ to the vertical datum plane 318. Referring also to FIG. 3_b_, a height dimension XH defines a height distance from the horizontal datum plane 316 to the tool rail top walls 332_a_, 332_b_. A height dimension WH defines a height distance from the tool rail top walls 332_a_, 332_b_ to the tool groove top walls 330_a_, 330_b_. In FIG. 3_b_, a width dimension WW defines a width distance between the tool groove side walls 326_a_, 326_b_. A width dimension XW defines a width distance between the tool rail side walls 328_a_, 328_b_.

The dimensions WL, XL, WW, XW, WH, and XH in FIGS. 2_a_ and 2_b_ match and are approximately equal to the same corresponding dimensions WL, XL, WW, XW, WH, and XH in FIGS. 3_a_ and 3_b_. The matching dimensions enable the battery pack 200_a_1 to mate with the power tool 300_a_1. With additional details regarding the dimensions, each rail 222_a_, 222_b_ ends at a rail lateral wall 226. There is a distance (dimension) WW between the lateral wall 226_a_ of the rail 222_a_ and the lateral wall 226_b_ of the rail 222_b_. The height dimension WH of the rails 222_a_, 222_b_ is in a direction generally perpendicular to the base surface 216. Also, each groove 224_a_, 224_b_ ends at a lateral wall 228_a_, 228_b_, respectively. The groove lateral walls 228_a_, 228_b_ connect the rails 224_a_, 224_b_ and the base surface 216. There is a distance (dimension) XW between the lateral wall 228_a_ of the groove 224_a_ and the lateral wall 228_b_ of the groove 224_b_. There is also a height dimension XH of the grooves 224_a_, 224_b_ in a direction generally perpendicular to the base surface 216.

Referring also to FIGS. 4_a_-4_d_, FIG. 4_a_ illustrates a combination of the battery pack 200_a_1 of FIGS. 2_a_-2_d_ and the power tool 300_a_1 of FIGS. 3_a_-3_d_ in a mated or coupled state. FIG. 4_a_ illustrates a side view and FIG. 4_b_ illustrates a cross-section front view taken along the line A-A of FIG. 4_a_ of the combination. FIG. 4_c_ illustrates a partial cut-away isometric view and FIG. 4_d_ illustrates an isometric view of the combination.

As illustrated in more detail in FIGS. 4_a_-4_d_, the battery pack rails 222_a_, 222_b_ are sized to fit in the power tool grooves 322_a_, 322_b_. The battery pack rails 222_a_, 222_b_ slide within and along the power tool grooves 322_a_, 322_b_ until the battery pack vertical datum plane 218 stops at the power tool vertical datum plane 318, and vice versa. Similarly, the power tool rails 324_a_, 324_b_ are sized to fit within the battery pack grooves 224_a_, 224_b_. The power tool rails 324_a_, 324_b_ slide within and along the battery pack grooves 224_a_, 224_b_ until the battery pack vertical datum plane 218 stops at the power tool vertical datum plane 318, and vice versa. The battery pack latch 212 engages with the power tool catch 314 to hold the battery pack 200_a_1 within the tool shroud 312.

The tool horizontal datum plane 316 mates with and rests on the battery pack base surface 216. The power tool housing front wall 336_a_ is approximately flush with and forms an approximate vertical plane with the battery pack housing rear wall 236_a_.

FIGS. 5_a_-5_d_ illustrate a first example embodiment of a dual rail battery pack 200_b_1 of the power tool system of FIG. 1 including a primary and a secondary interface element. Referring to FIGS. 5_a_-5_d_, an example embodiment of a dual (double) rail battery pack interface is illustrated. The battery pack 200_b_1 has two sets of rails including a first set of rails 222_a_, 222_b_ and a second set of rails 238_a_, 238_b_. The battery pack 200_b_1 includes two corresponding sets of grooves including a first set of grooves 224_a_, 224_b_ and a second set of grooves 240_a_, 240_b_. The dual rail support assembly battery pack interface is compatible with both a single rail interface power tool, such as power tool 300_a_1 of FIGS. 3_a_-3_d_, and a dual rail interface power tool (described below in detail). The dual rail support assembly battery pack interface provides additional structural support to hold the battery pack and keep the battery pack mated within the power tool. The battery pack 200_b_1 includes the same features of the single rail interface battery pack 200_a_1 of FIGS. 2_a_-2_d_—in the form of a first or a primary rail support assembly—plus additional features that relate to the second set of rails 238_a_, 238_b_ and the corresponding second set of grooves 240_a_, 240_b_—the second or secondary rail support assembly. The reference numbers to the single rail interface features are common to both the single rail interface battery pack 200_a_1 and the dual rail interface battery pack 200_b_1. The description of those common features may be found above with respect to FIGS. 2*a*-2*d*. In this example embodiment, the battery pack housing is reference 210*b*.

The second set of rails 238*a*, 238*b* and second set of grooves 240*a*, 240*b* include rail side walls 242*a*, 242*b*, groove side walls 244*a*, 244*b*, rail top walls 246*a*, 246*b*, rail bottom walls/groove top walls 248*a*, 248*b*, groove rear walls/plane 250*a*, 250*b*, and rail front walls 252*a*, 252*b*. The battery pack 200*b*1 includes a length dimension YL that defines a length distance from the second rail front walls 252*a*, 252*b* to the second groove rear walls/planes 250*a*, 250*b*. In this example embodiment, the second set of rails 238*a*, 238*b* and the first set of rails 222*a*, 222*b* are generally in a single (or same) plane As illustrated in FIG. 5*b*, as width dimension YW, with respect to the second set of rails, defines a width distance from the second rail side wall 242*a* to the second rail side wall 242*b*. The additional surface area provided by the addition of the second set of rails 238*a*, 238*b* to the battery pack 200*b*1 is one feature to enable the structural support for holding the battery pack within the power tool. A second rail height dimension YH defines a height distance from the rail top walls 246*a*, 246*b* to the rail bottom walls/groove top walls 248*a*, 248*b*. A second groove height dimension ZH defines a height distance from the rail bottom walls/groove top walls 248*a*, 248*b* to the base surface 216. In this example embodiment, the second rail height dimension YH and the second groove height dimension ZH are the same as the WH and XH height dimensions, respectively.

The second set of rails 238*a*, 238*b* and the second set of grooves 240*a*, 240*b* may start (originate, emanate) at the housing rear wall 236*b*, which is further back by a distance YL than the housing rear wall 236*a* of the single rail support assembly battery pack 200*a*1 of FIGS. 2*a*-2*d*. The first set of rails 222*a*, 222*b* and the first set of grooves 224*a*, 224*b* may start (originate, emanate) forward of the housing rear wall 236*b* and forward of the second rail front walls 252*a*, 252*b*. In this example, the first set of rails 222*a*, 222*b* and the first set of grooves 224*a*, 224*b* do not overlap, in the length dimension, with the second set of rails 238*a*, 238*b* and the second set of grooves 240*a*, 240*b*.

Figure 5A:
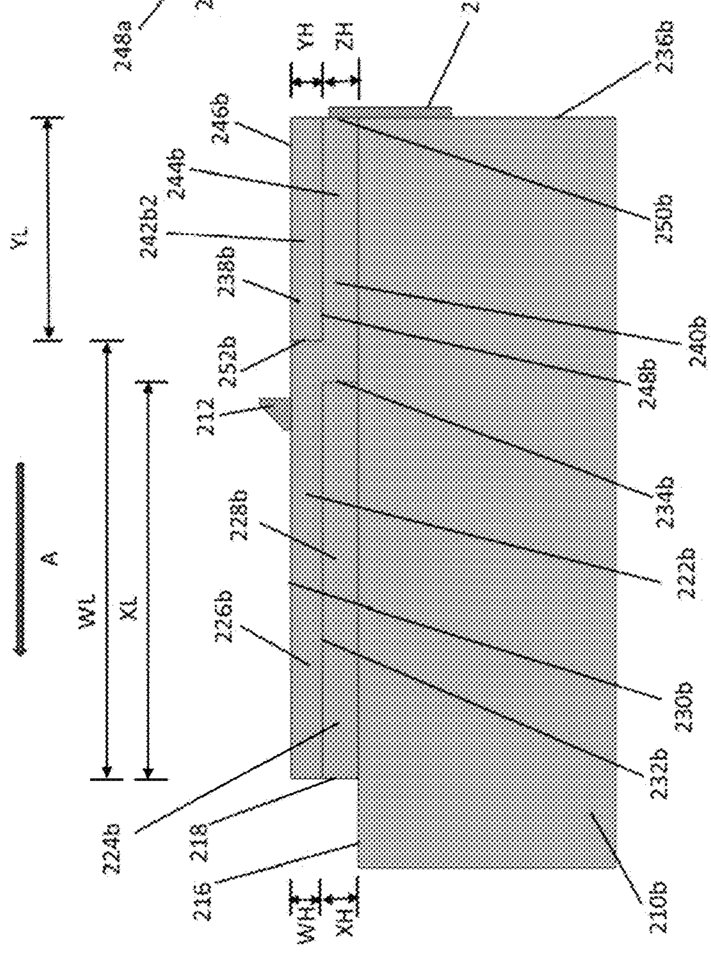
FIGS. 5*a*-5*d* illustrate a first example embodiment of a battery pack of the power tool system of FIG. 1 including a primary and a secondary interface element.
Figure 5B:
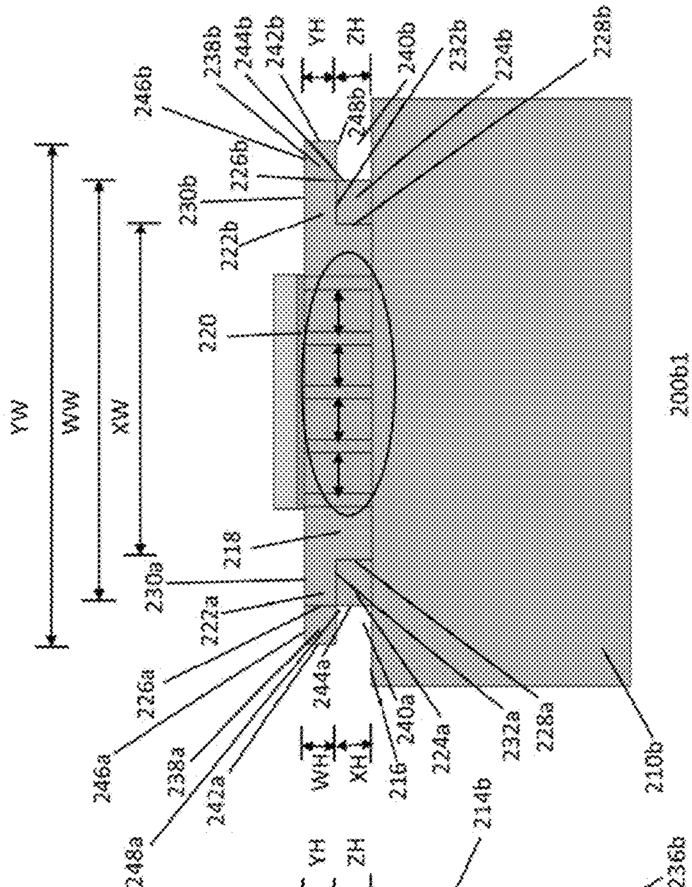
Figure 5D:
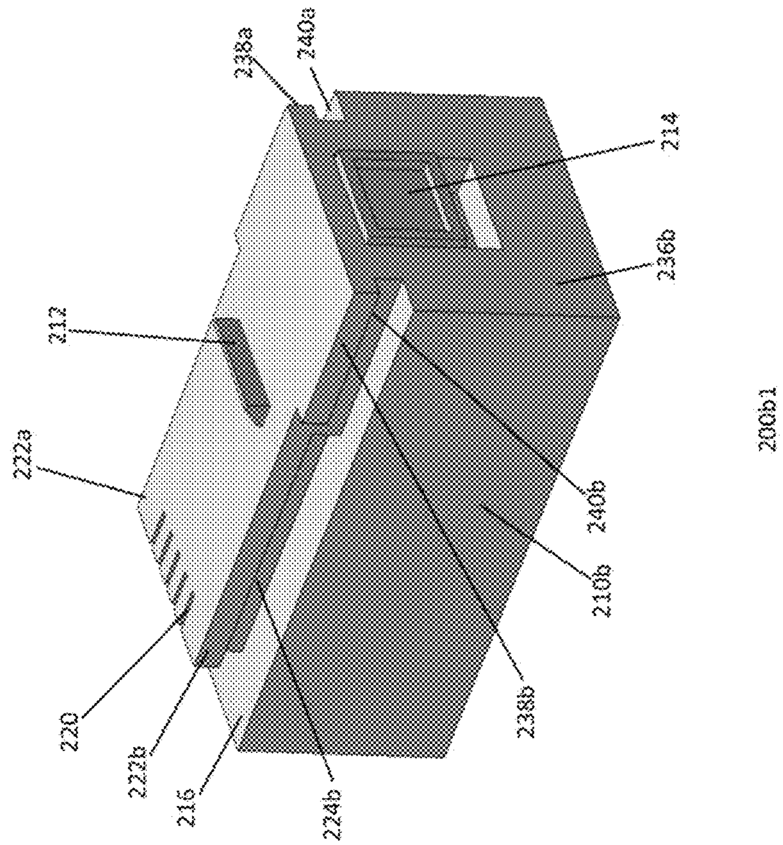
Figure 5C:
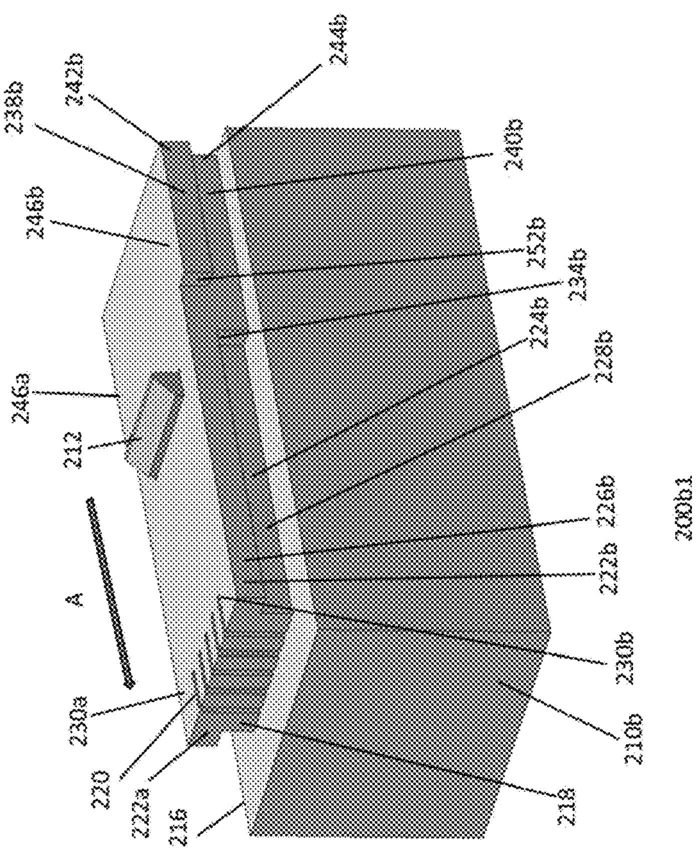
Figure 6B:
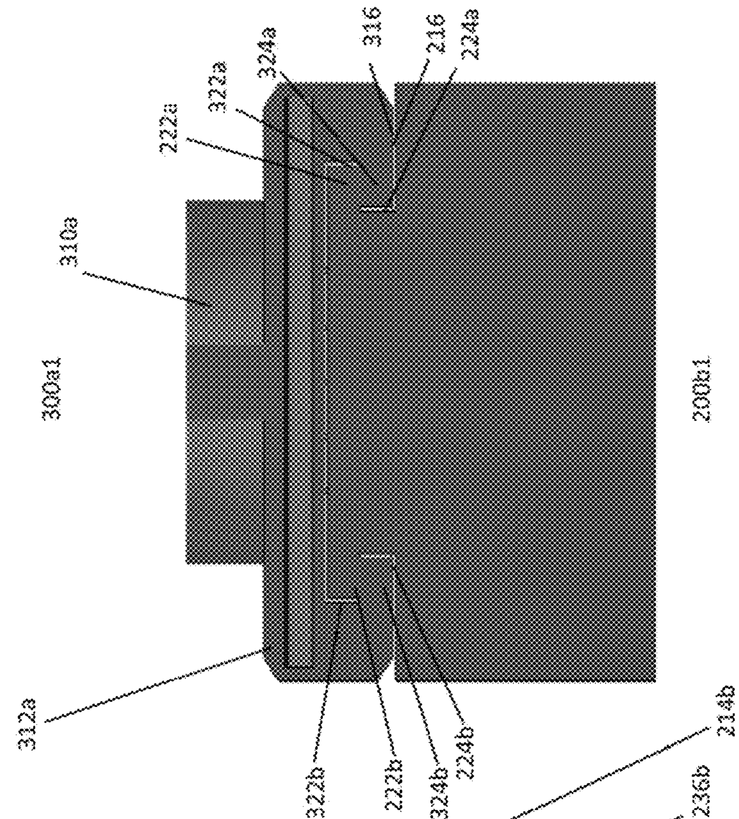
FIGS. 6*a*-6*d* illustrate a combination of the battery pack of FIGS. 5*a*-5*d* and the power tool of FIGS. 3*a*-3*d*.
Figure 6A:
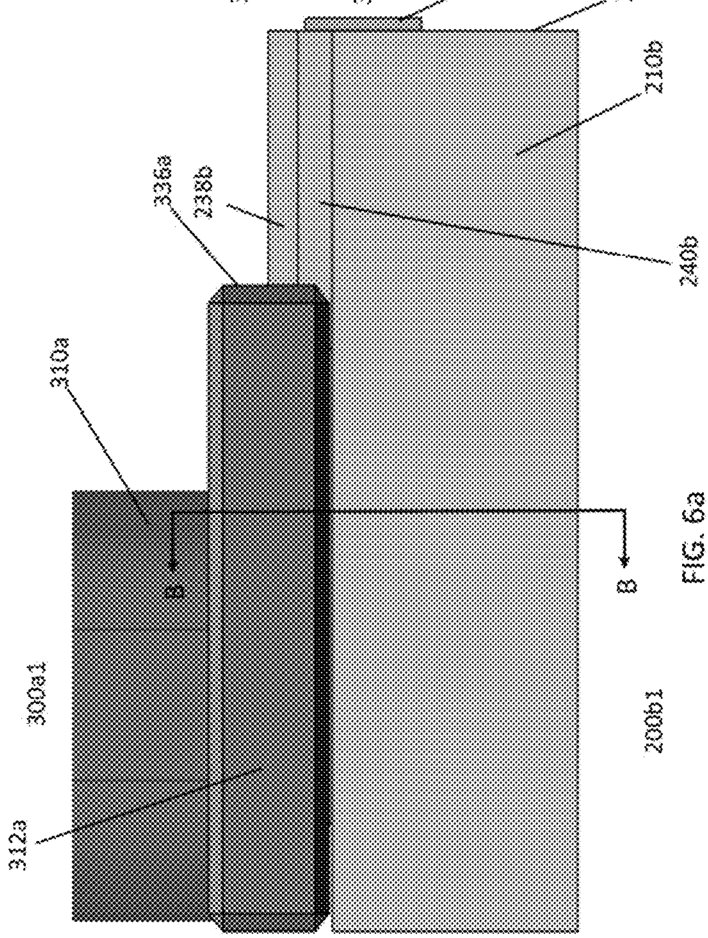
Figure 6D:
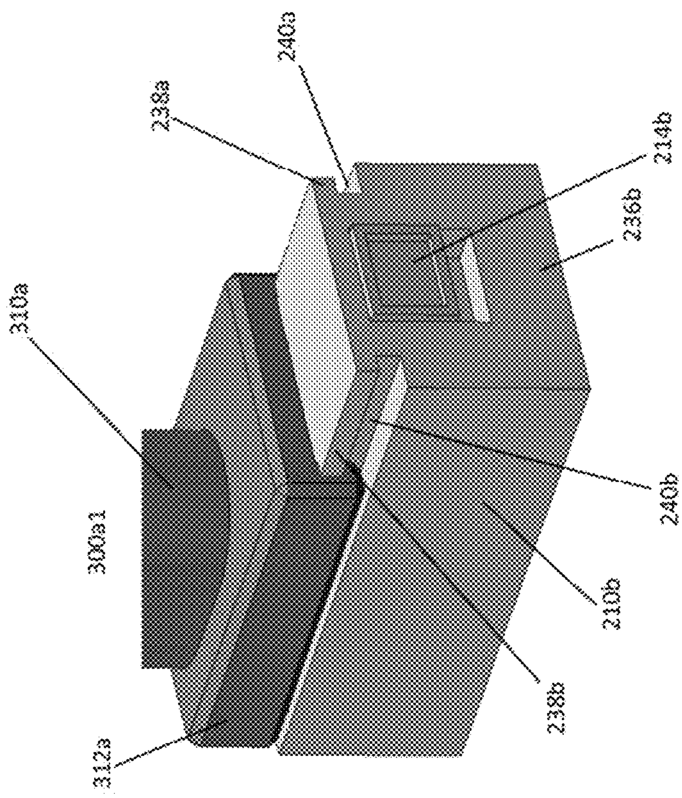
Figure 6C:
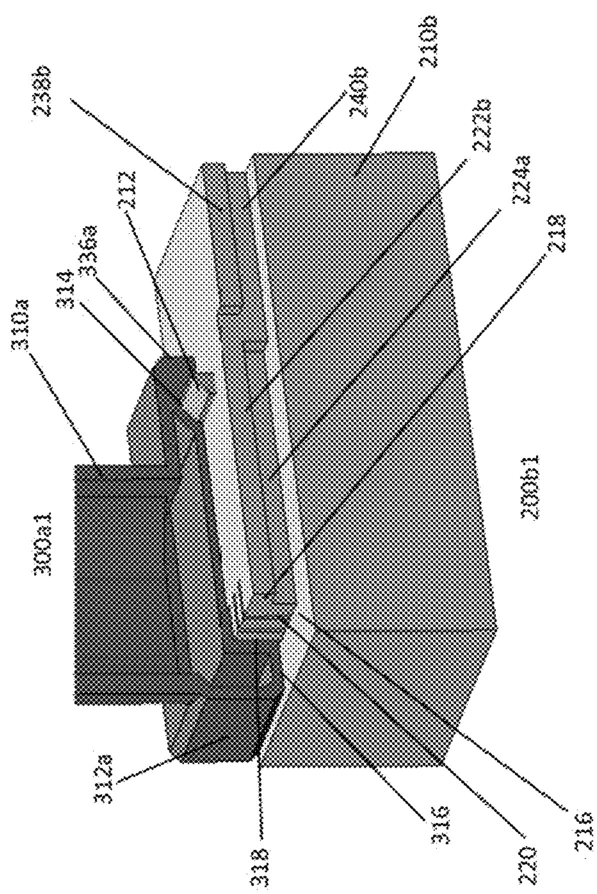

Referring to FIGS. 6*a*-6*d*, an example embodiment illustrates a combination of the dual rail support assembly battery pack 200*b*1 of FIGS. 5*a*-5*d* with the single rail support assembly power tool 300*a*1 of FIGS. 3*a*-3*d*. FIG. 6*a* illustrates a side view and FIG. 6*b* illustrates a cross-section front view taken along the line B-B of FIG. 6*a* of the combination. FIG. 6*c* illustrates a partial, cut-away isometric view and FIG. 6*d* illustrates an isometric view of the combination. In this example, the tool shroud 312*a* does not cover or engage with the second set of rails 238*a*, 238*b* and the second set of grooves 240*a*, 240*b*. The latch 212 engages with the tool catch 314, both of which are in a same relative location to each other.

As illustrated in FIGS. 6*a*-6*d*, and similarly to FIGS. 4*a*-4*d*, the primary battery pack rails 222*a*, 222*b* are sized to fit in the power tool grooves 322*a*, 322*b*. The primary battery pack rails 222*a*, 222*b* slide within and along the power tool grooves 322*a*, 322*b* until the battery pack vertical datum plane 218 stops at the power tool vertical datum plane 318, and vice versa. Similarly, the power tool rails 324*a*, 324*b* are sized to fit within the primary battery pack grooves 224*a*, 224*b*. The power tool rails 324*a*, 324*b* slide within and along the primary battery pack grooves 224*a*, 224*b* until the battery pack vertical datum plane 218 stops at the power tool vertical datum plane 318, and vice versa. The battery pack latch 212 engages with the power tool catch 314 to hold the battery pack 200*a*1 within the tool shroud 312.

FIGS. 7*a*-7*d* illustrate a first example embodiment of a dual rail power tool of the power tool system of FIG. 1 including a primary interface element and a secondary interface element. Referring to FIGS. 7*a*-7*d*, an example embodiment of a dual rail support assembly power tool interface is illustrated. The power tool 300*b*1 has two sets of rails including a first (primary) set of rails 324*a*, 324*b* and a second (secondary) set of rails 340*a*, 340*b*. The power tool 300*b*1 includes two corresponding sets of grooves including a first (primary) set of grooves 322*a*, 322*b* and a second (secondary) set of grooves 338*a*, 338*b*. The power tool 300*b*1 includes the same features of the single rail interface power tool 300*a*1 of FIGS. 3*a*-3*d*—in the form of a first (primary) rail support assembly—plus additional features that relate to the second set of rails 340*a*, 340*b* and the second set of grooves 338*a*, 338*b*—the second (secondary) rail support assembly. The reference numbers to the primary rail support assembly interface features are common to both the single rail interface power tool 300*a*1 and the dual rail interface power tool 300*b*1. The description of those common features may be found above with respect to FIGS. 3*a*-3*d*. The tool housing is referenced as reference number 310*b* and the tool shroud is referenced as reference number 312*b*.

The second set of rails 340*a*, 340*b* and the second set of grooves 338*a*, 338*b* include tool groove side walls 342*a*, 342*b*, tool rail side walls 344*a*, 344*b*, tool groove top walls/rails bottom walls 346*a*, 346*b*, tool rail top walls/tool groove bottom walls 348*a*, 348*b*, tool groove rear walls 350*a*, 350*b*, and tool rail front walls 352*a*, 352*b*. In this example embodiment, the second set of tool rails 340*a*, 340*b* are in a same horizontal plane as the first set of tool rails 324*a*, 324*b*. The tool shroud 312*b* of FIGS. 7*a*-7*d* is longer than the tool shroud 312*a* of FIGS. 300*a*-300*d*. As illustrated in FIG. 7*a*, the tool 300*b*1 includes a length dimension YL that is defines a distance from the tool groove rear wall plane 350*a*, 350*b* to the tool rail front wall 352*a*, 352*b*. The additional length distance is the same length distance for the secondary rail 238*a*, 238*b* of the battery pack 200*b*1 of FIGS. 5*a*-5*d*. A tool groove height dimension YH for the second set of tool grooves 338*a*, 338*b* may be the same as the groove height dimension WH for the first set of tool grooves 322*a*, 322*b*. A tool rail height dimension ZH for the second set of tool rails 340*a*, 340*b* may be the same as the tool height XH for the first set of tool rails 324*a*, 324*b*. A width dimension ZW defines a width distance of the second set of tool grooves 338*a*, 338*b* across the tool shroud 312*b* from the tool groove side wall 342*a* to the tool groove side wall 342*b*.

Figure 7B:
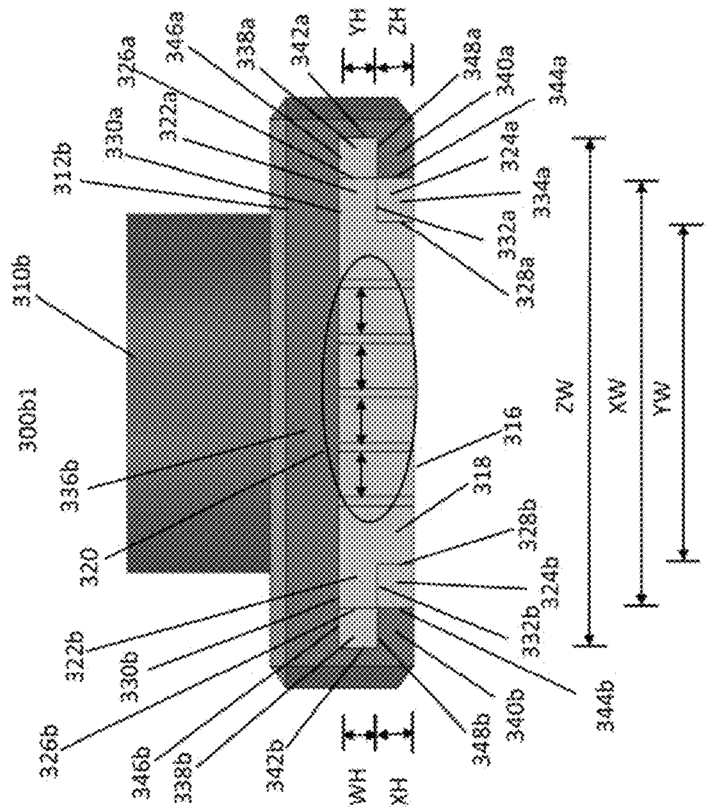
FIGS. 7*a*-7*d* illustrate a first example embodiment of a power tool of the power tool system of FIG. 1 including a primary interface element and a secondary interface element.
Figure 7A:
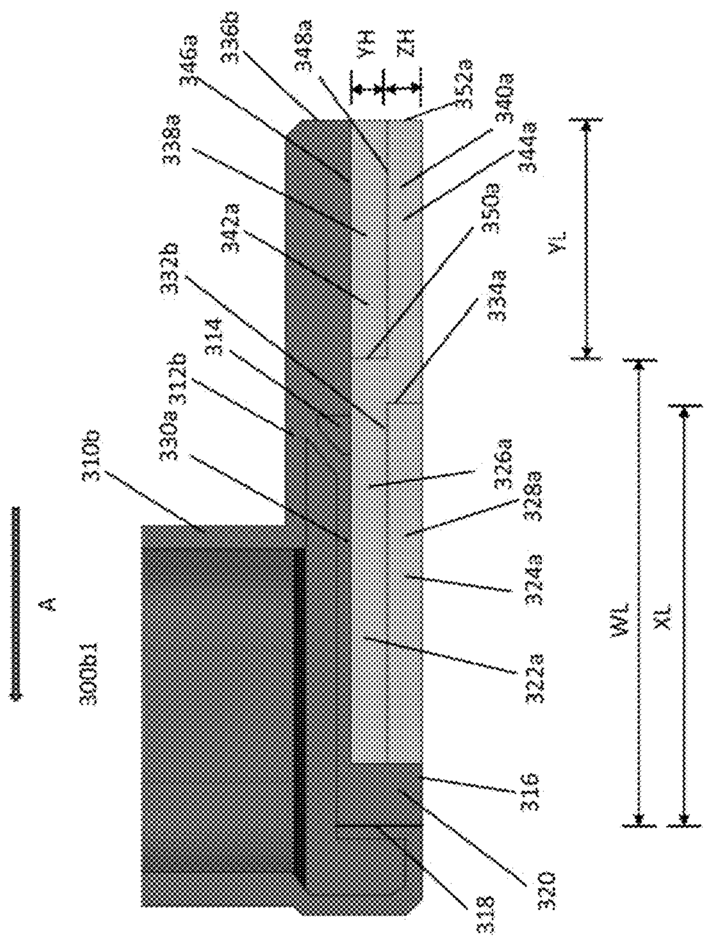
Figure 7D:
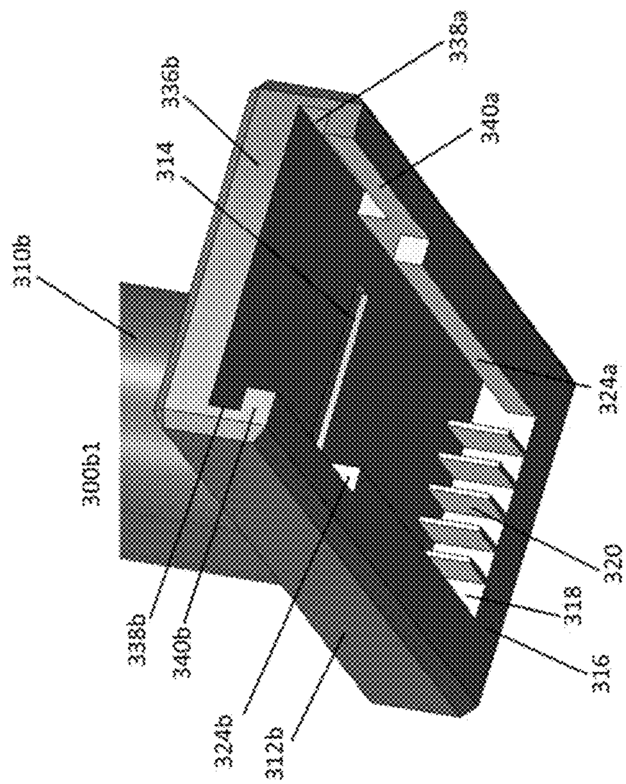
Figure 7C:
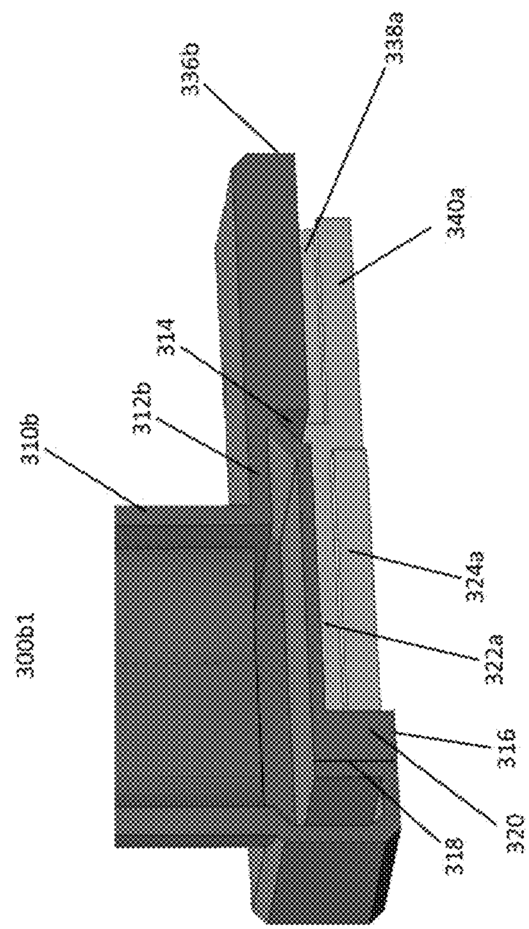
Figure 8B:
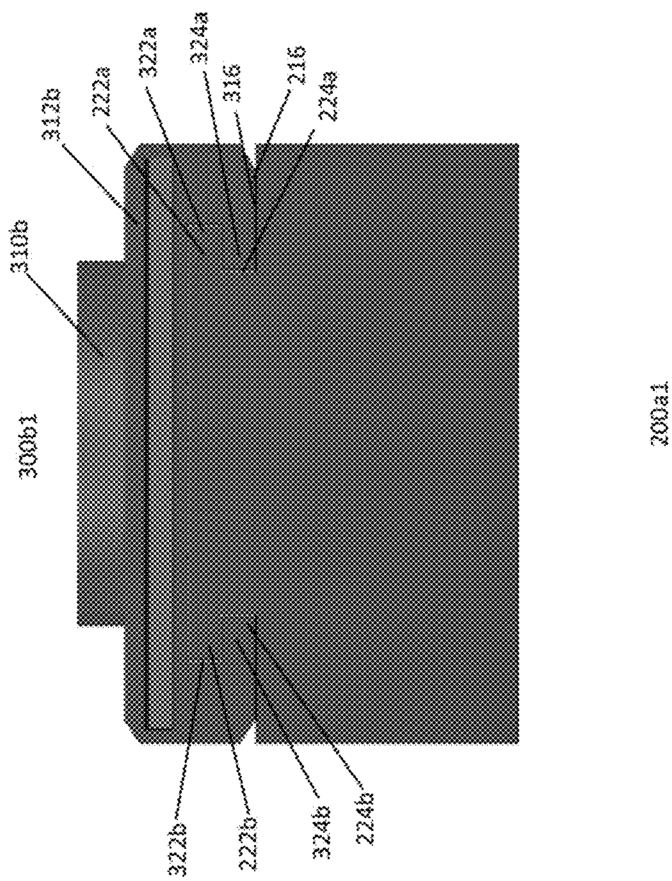
FIGS. 8*a*-8*d* illustrate a combination of the battery pack of FIGS. 2*a*-2*d* and the power tool of FIGS. 7*a*-7*d*.
Figure 8A:
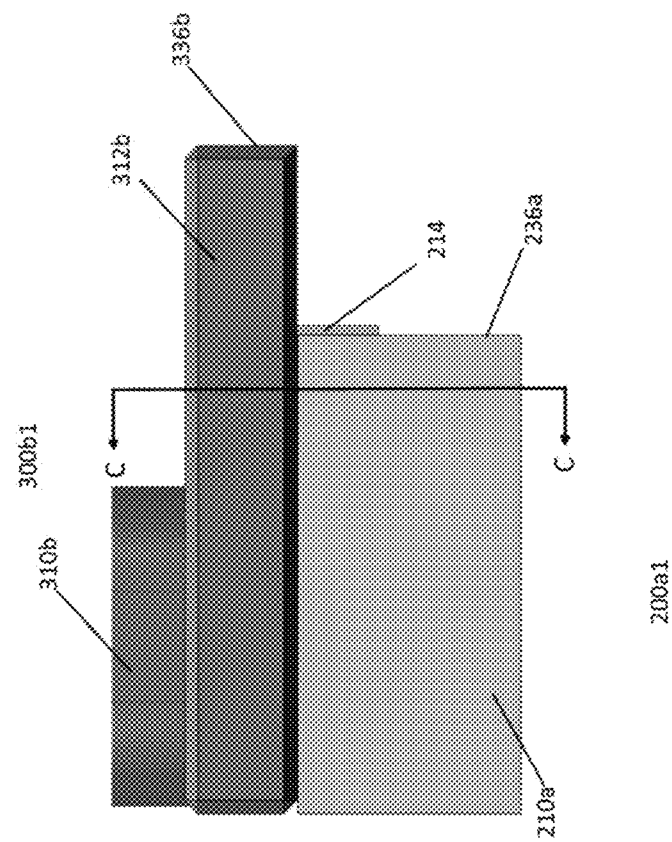
Figure 8D:
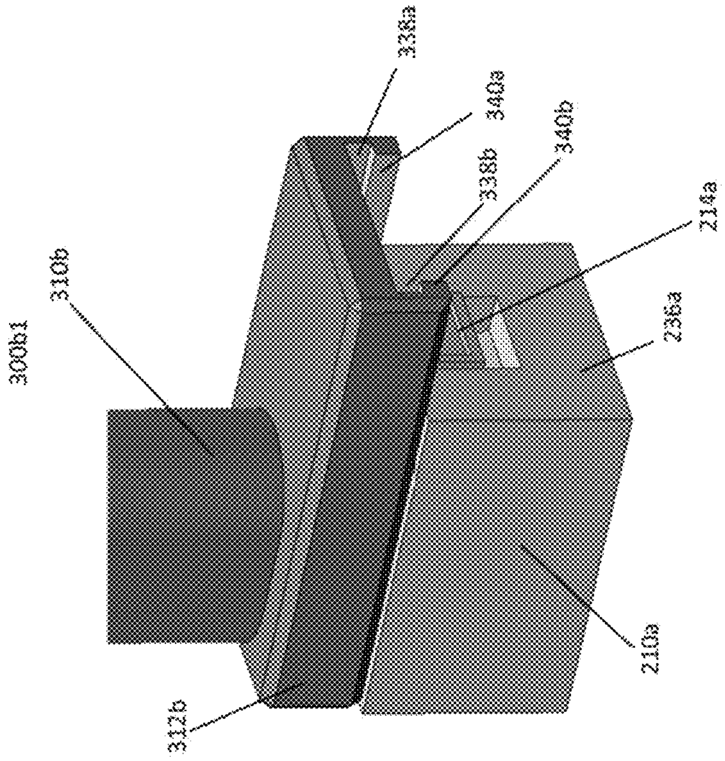
Figure 8C:
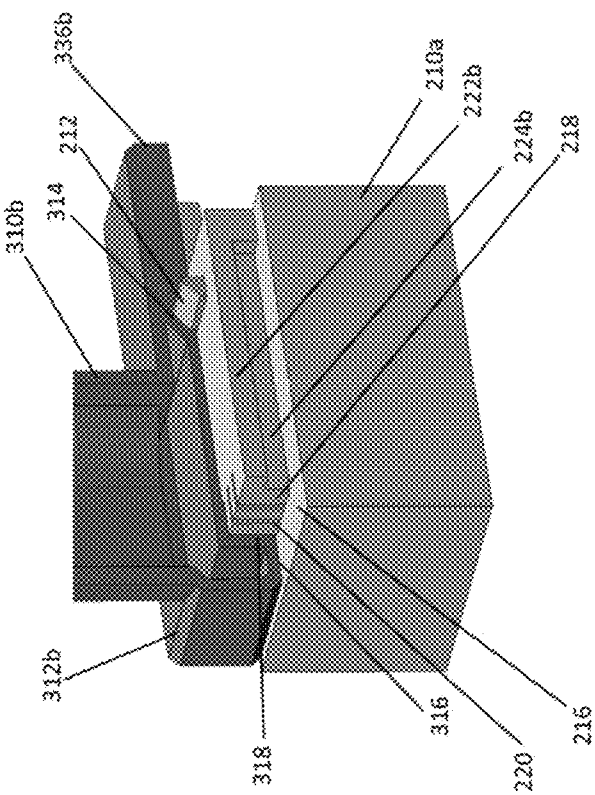

Referring to FIGS. 8*a*-8*d*, there is illustrated a combination of the example single rail interface battery pack 200*a*1 of FIGS. 2*a*-2*d* and the example dual rail support assembly power tool 300*b*1 of FIGS. 7*a*-7*d*. FIG. 8*a* illustrates a side view and FIG. 8*b* illustrates a cross-section front view taken along the line C-C of FIG. 8*a* of the combination. FIG. 8*c* illustrates a partial cut-away isometric view and FIG. 8*d* illustrates an isometric view of the combination. In this example, the tool shroud 312*b* extends beyond the battery pack 200*a*1. The latch 212 engages with the tool catch 314, both of which are in a same relative location to each other.

As illustrated in FIGS. 8*a*-8*d*, the (basic) battery pack rails 222*a*, 222*b* are sized to fit in the primary power tool grooves 322*a*, 322*b*. The basic battery pack rails 222*a*, 222*b* slide within and along the primary power tool grooves 322*a*, 322*b* until the battery pack vertical datum plane 218 stops at the power tool vertical datum plane 318, and vice versa. Similarly, the primary power tool rails 324*a*, 324*b* are sized to fit within the basic battery pack grooves 224*a*, 224*b*. The primary power tool rails 324*a*, 324*b* slide within and along the basic battery pack grooves 224*a*, 224*b* until the battery pack vertical datum plane 218 stops at the power tool vertical datum plane 318, and vice versa. The battery pack latch 212 engages with the power tool catch 314 to hold the battery pack 200*a*1 within the tool shroud 312.

In FIGS. 8*a*-8*d*, the second set of tool rails 340*a*, 340*b* and the second set of tool grooves 338*a*, 338*b* are not utilized to hold the battery pack 200*a*1.

Figure 9B:
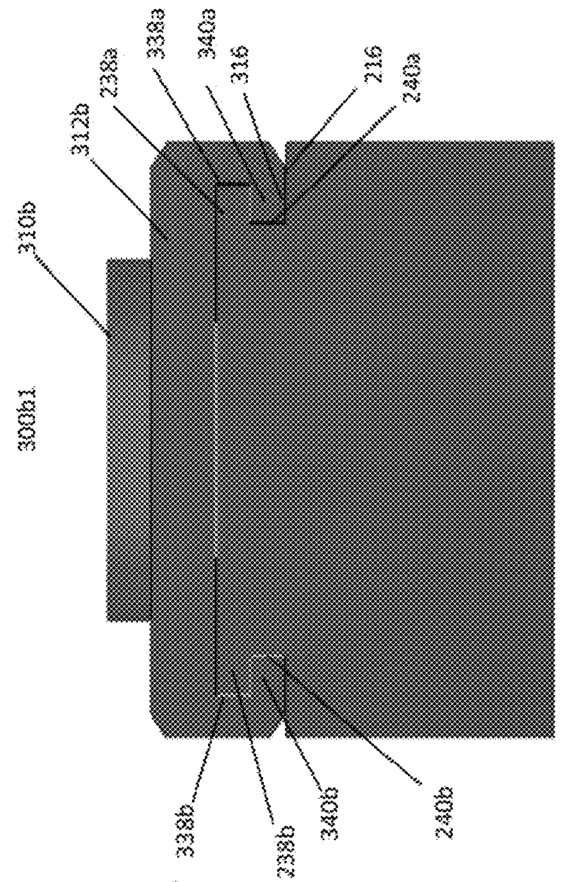
FIGS. 9*a*-9*d* illustrate a combination of the battery pack of FIGS. 5*a*-5*d* and the power tool of FIGS. 7*a*-7*d*.
Figure 9A:
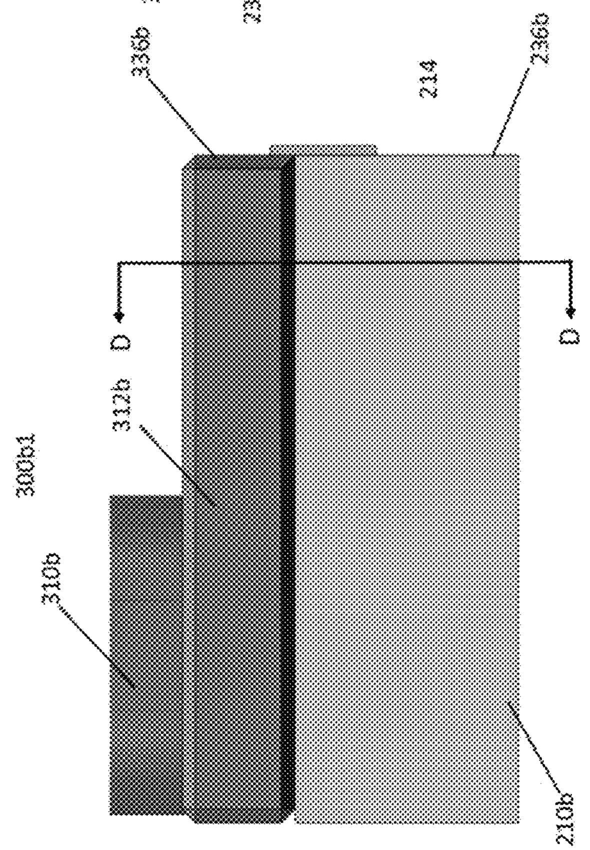
Figure 9D:
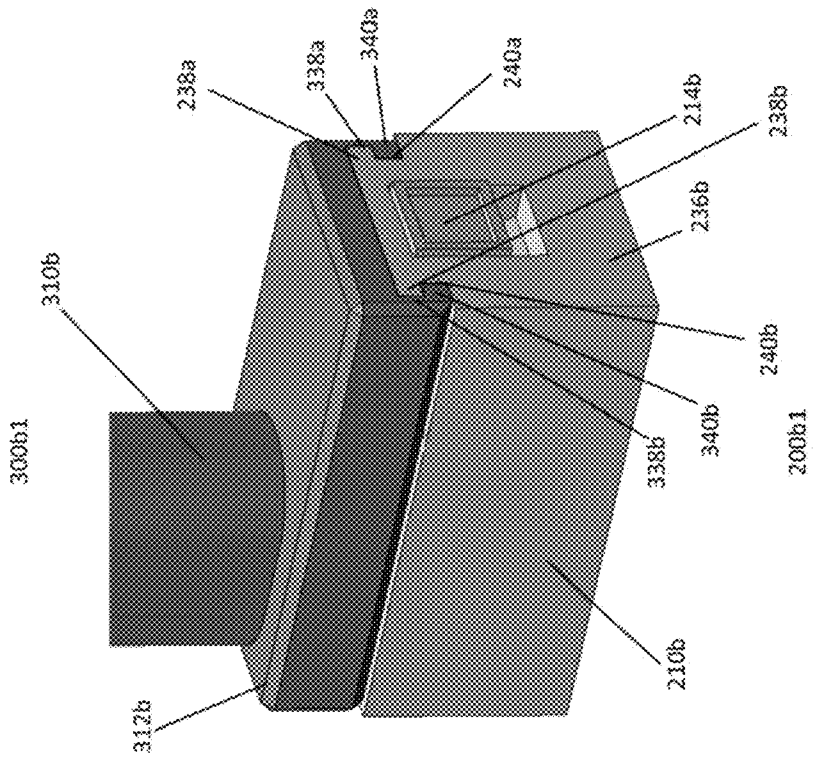
Figure 9C:
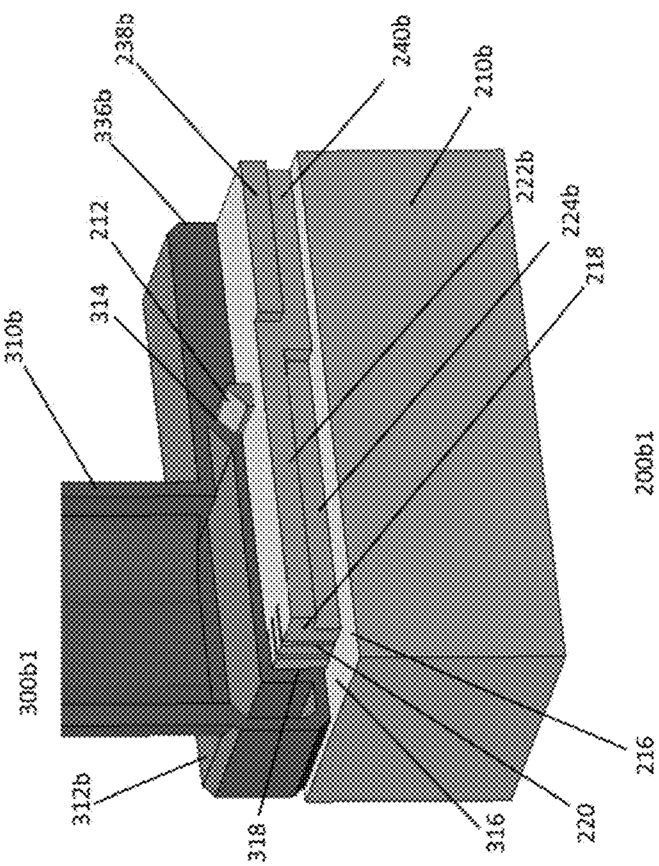
Figure 10B:
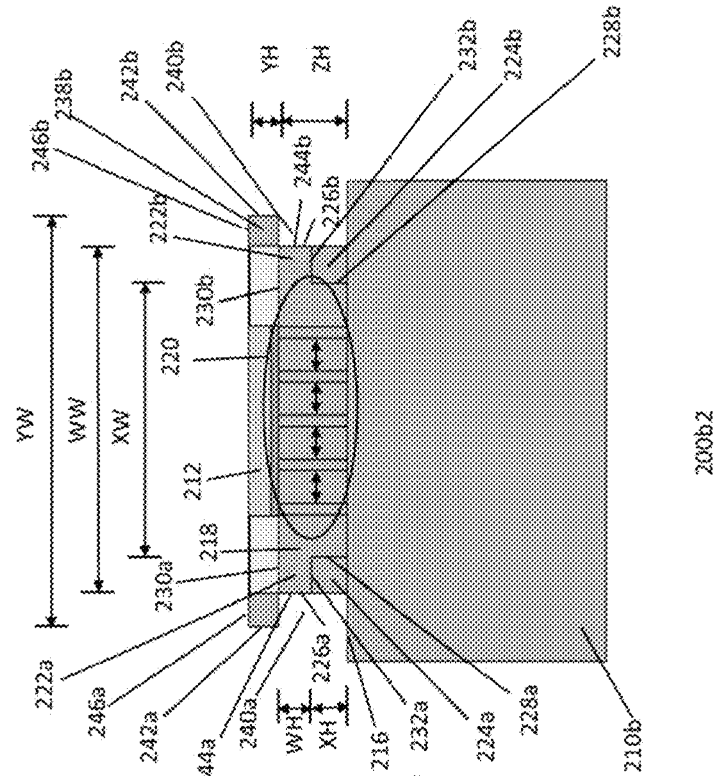
FIGS. 10*a*-10*d* illustrate a second example embodiment of a battery pack of the power tool system of FIG. 1 including a primary interface element and a secondary interface element.
Figure 10A:
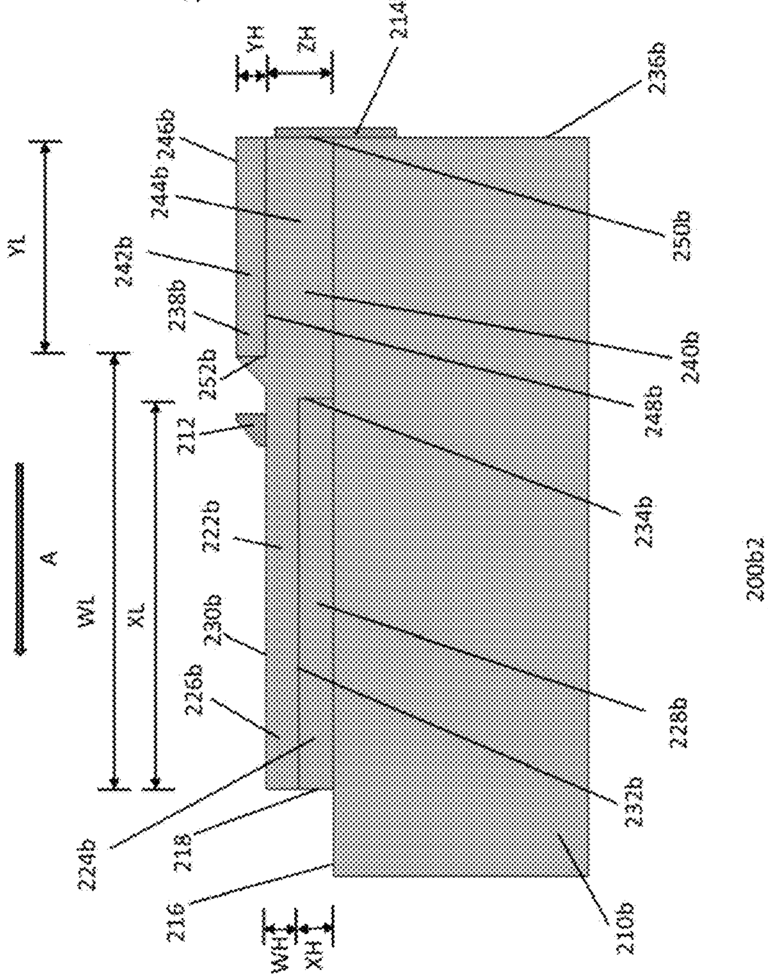
Figure 10D:
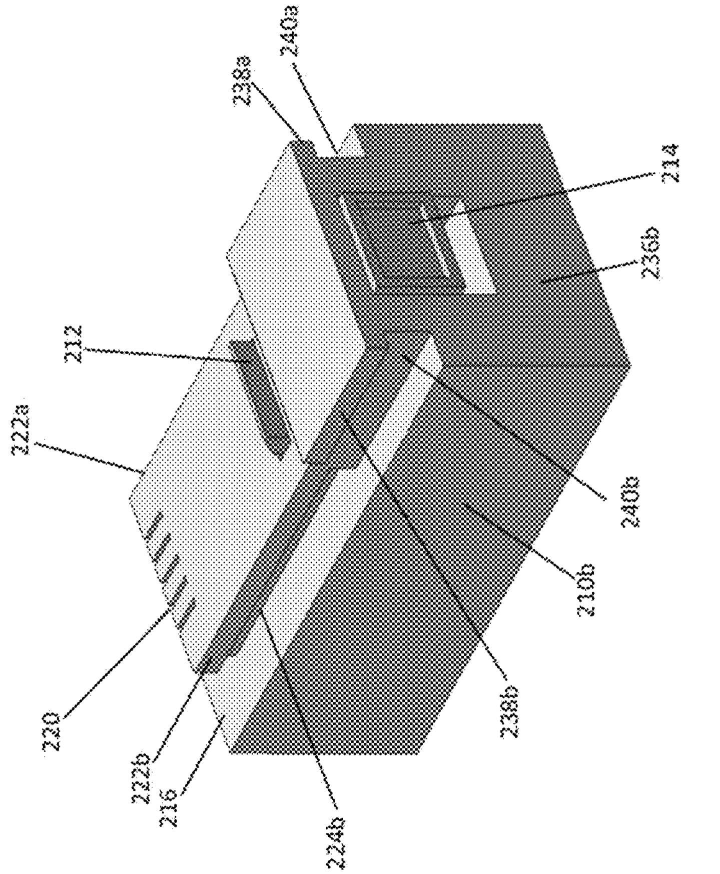
Figure 10C:
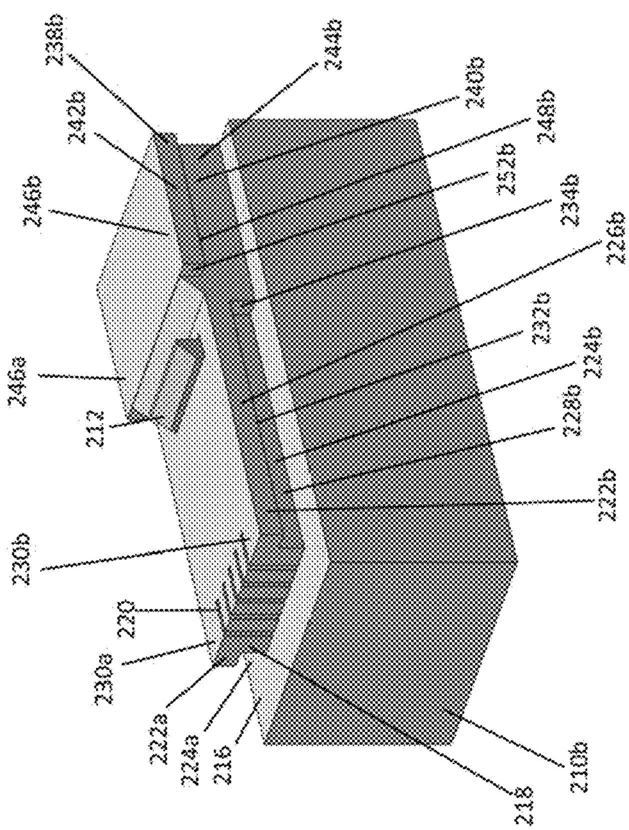

Referring to FIGS. 9*a*-9*d*, there is illustrated a combination of the example dual rail interface battery pack 200*b*1 of FIGS. 5*a*-5*d* with the example dual rail support assembly power tool 300*b*1 of FIGS. 7*a*-7*d*. FIG. 9*a* illustrates a side view and FIG. 9*b* illustrates a cross-section front view taken along the line D-D of FIG. 9*a* of the combination. FIG. 9*c* illustrates a partial, cut-away isometric view and FIG. 9*d* illustrates an isometric view of the combination. In this example, the tool shroud 312*b* covers and receive the entire battery pack 200*b*1. The latch 212 engages with the tool catch 314, both of which are in a same relative location to each other.

As illustrated in FIGS. 9*a*-9*d*, the primary battery pack rails 222*a*, 222*b* and the secondary battery pack rails 238*a*, 238*b* are sized to fit and be received in the primary power tool grooves 322*a*, 322*b* and the secondary power tool grooves 338*a*, 338*b*, respectively. The primary battery pack rails 222*a*, 222*b* and the secondary battery pack rails 238*a*, 238*b* slide within and along the primary power tool grooves 322*a*, 322*b* and the secondary power tool grooves 338*a*, 338*b*, respectively until the battery pack vertical datum plane 218 stops at the power tool vertical datum plane 318, and vice versa. Similarly, both the primary power tool rails 324*a*, 324*b* and the secondary power tool rails 340*a*, 340*b* are sized to fit and be received in the primary battery pack grooves 224*a*, 224*b* and the secondary battery pack grooves 240*a*, 240*b*, respectively. The primary power tool rails 324*a*, 324*b* and the secondary power tool rails 340*a*, 340*b* slide within and along the primary battery pack grooves 224*a*, 224*b* and the secondary battery pack grooves 240*a*, 240*b*, respectively until the battery pack vertical datum plane 218 stops at the power tool vertical datum plane 318, and vice versa. The battery pack latch 212 engages with the power tool catch 314 to hold the battery pack 200*a*1 within the tool shroud 312.

The dimensions WL, XL, YL, WW, XW, YW, WH, XH, and ZH in FIGS. 5*a* and 5*b* match and are approximately equal to the same corresponding dimensions WL, XL, YL, WW, XW YW, WH, XH, and ZH in FIGS. 7*a* and 7*b*. The matching dimensions enable the battery pack 200*b*1 to mate with the power tool 300*b*1.

FIGS. 10*a*-10*d* illustrate a second example embodiment of a dual rail battery pack of the power tool system of FIG. 1 including a primary interface element and a secondary interface element. Referring to FIGS. 10*a*-10*d*, a second embodiment of a dual rail interface battery pack 200*b*2 is illustrated. In this example, the dual rail interface battery pack 200*b*2 is similar to the dual rail interface battery pack 200*b*1 with at least one difference being that in the battery pack 200*b*2 the second set of rails 238*a*, 238*b* are in a different horizontal plane that the first set of rails 222*a*, 222*b*. In this example, the second set of rails 238*a*, 238*b* are on a higher plane relative to the base surface 216 than the first set of rails 222*a*, 222*b*. In other words, the second set of rails 238*a*, 238*b* are further from the base surface 216 than the first set of rails 222*a*, 222*b*. Additionally, the groove height dimension ZH for the second set of grooves 240*a*, 240*b* is greater than the groove height dimension XH for the first set of grooves 224*a*, 224*b*. The dual rail interface battery pack 200*b*2 with the sets of rails on different planes and with one set of grooves having a dimension that is greater than the dimension of another set of grooves so that the battery pack may accommodate power tools of different sizes including tools that have a larger tool shroud.

Figure 11B:
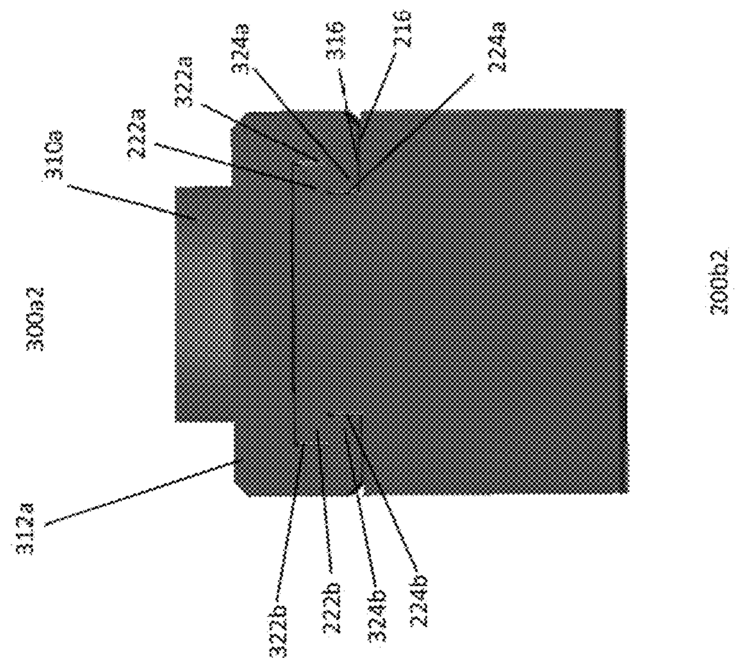
FIGS. 11*a*-11*d* illustrate a combination of the battery pack of FIGS. 10*a*-10*d* and the power tool of FIGS. 3*a*-3*d*.
Figure 11A:
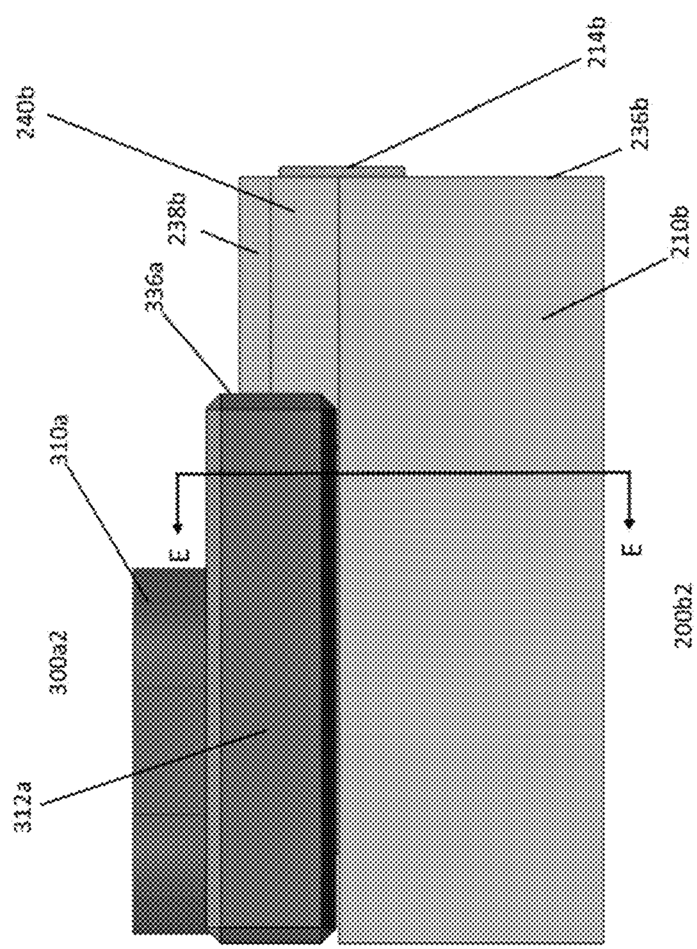
Figure 11D:
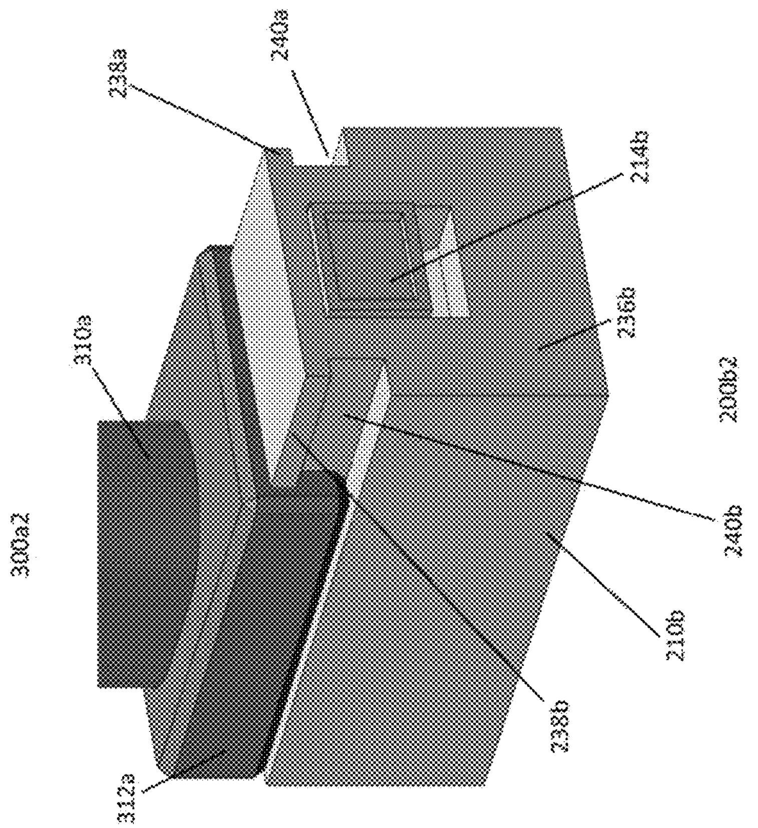
Figure 11C:
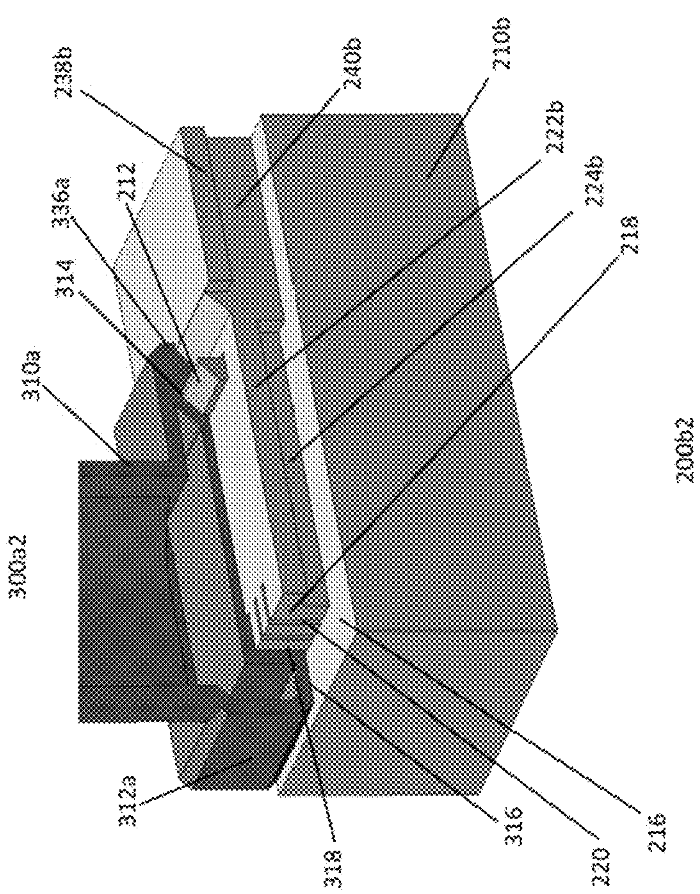
Figure 12B:
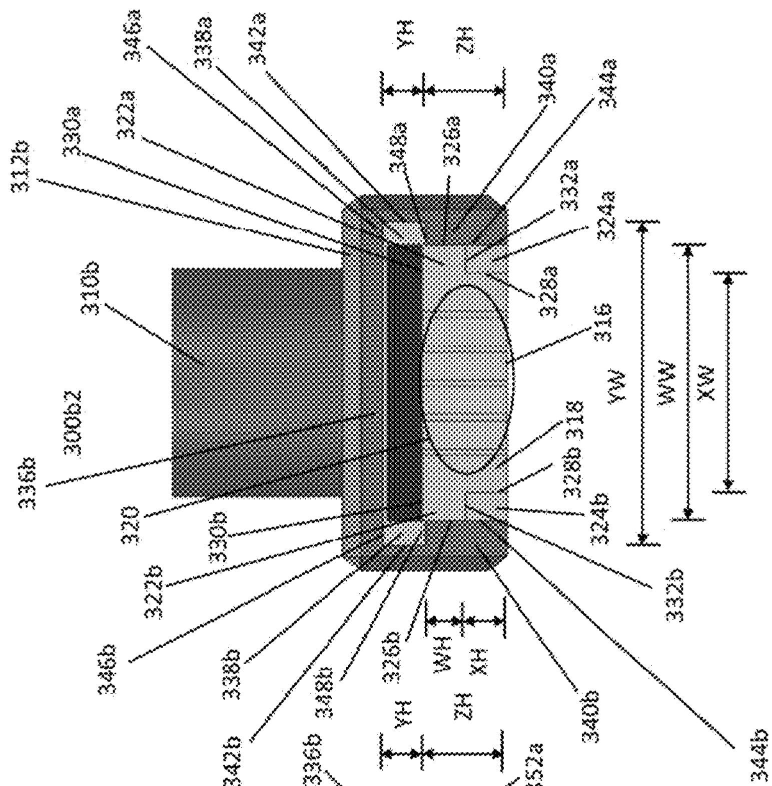
FIGS. 12*a*-12*d* illustrate a second example embodiment of a power tool of the power tool system of FIG. 1 including a primary interface element and a secondary interface element.
Figure 12A:
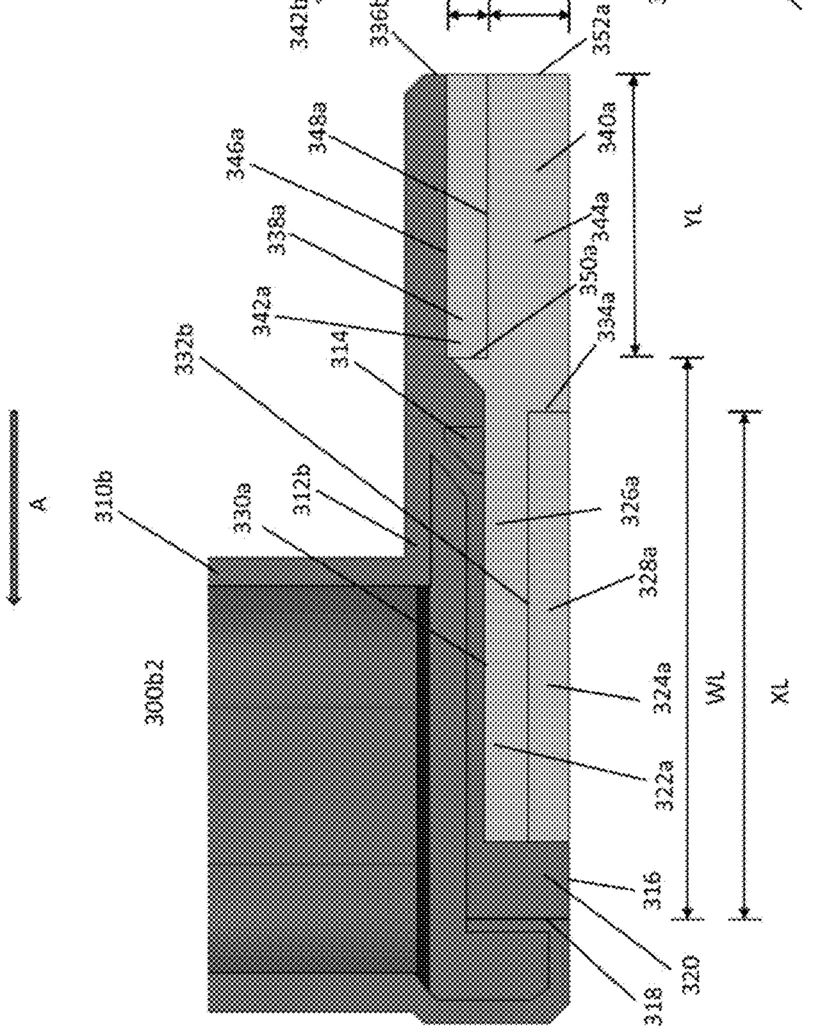
Figure 12D:
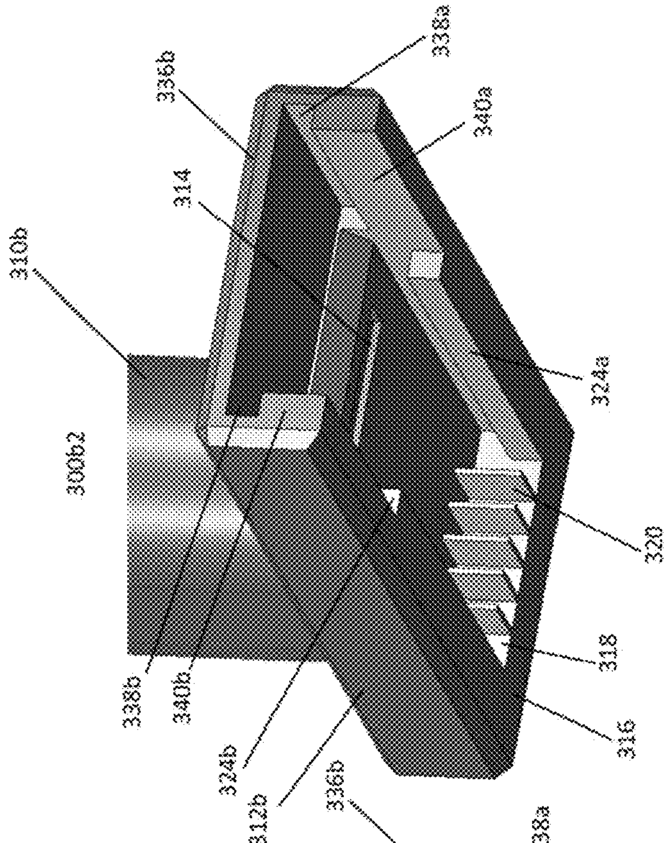
Figure 12C:
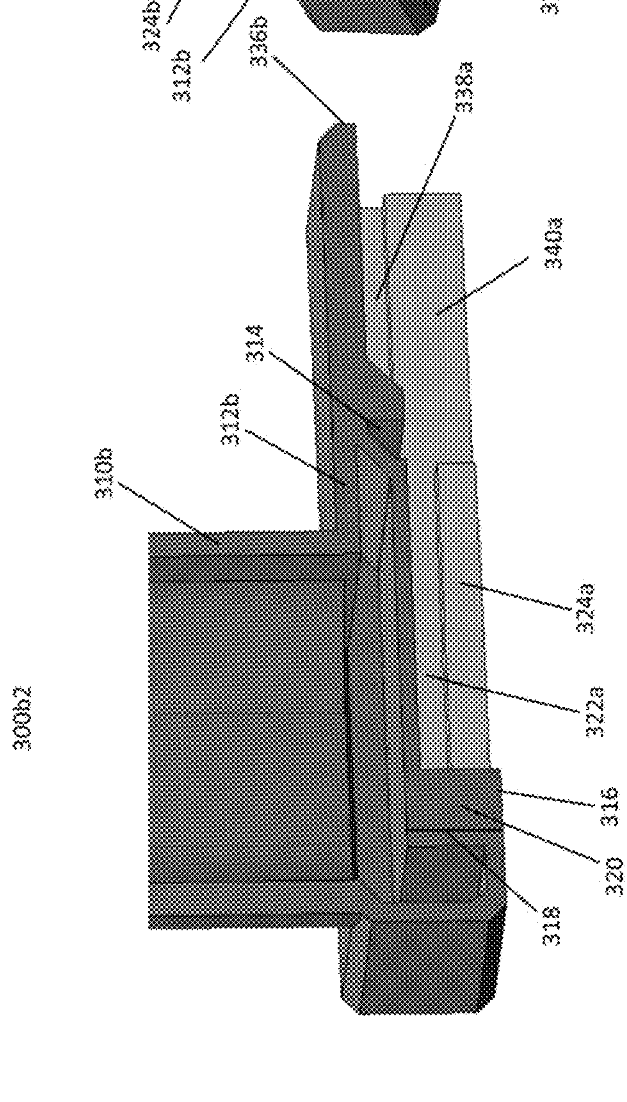

FIGS. 11*a*-11*d* illustrate a combination of the dual rail battery pack of FIGS. 10*a*-10*d* and the power tool of FIGS. 3*a*-3*d*. The dual rail interface battery pack 200*b*2 is compatible with a single rail interface power tool such as the single rail interface power tool 300*a*2 as illustrated in FIGS. 11*a*-11*d*. FIG. 11*a* illustrates a side view and FIG. 11*b* illustrates a cross-section front view taken along the line E-E of FIG. 11*a* of the combination. FIG. 11*c* illustrates a partial, cut-away isometric view and FIG. 11*d* illustrates an isometric view of the combination. The single rail interface power tool 300*a*2 includes the same features as described above with respect to the single rail interface power tool 300*a*1. The power tool 300*a*2 engages with the dual rail interface battery pack 200*b*2 using the first set of rails 222*a*, 222*b* and the first set of grooves 224*a*, 224*b* on the battery pack and not the second set of rails 238*a*, 238*b* and grooves 240*a*, 240*b*.

FIGS. 12*a*-12*d* illustrate a second example embodiment of a dual rail interface power tool 300*b*2 that is compatible with both a single rail interface battery pack and a dual rail interface battery pack. In the example of FIGS. 12*a*-12*d*, the top walls 348*a*, 348*b* of the second set of rails 340*a*, 340*b* are on a different plane than the top walls 332*a*, 332*b* of the first set of rails 324*a*, 324*b*. Additionally, the rail height dimension ZH for the second set of rails 340*a*, 340*b* is greater than the rail height dimension XH of the first set of rails 324*a*, 324*b*. The first set of rails 324*a*, 324*b* and the first set of grooves 322*a*, 322*b* may remain unchanged from the previous embodiments of the single rail interface power tools 300*a*1, 300*a*2 and the dual rail interface power tool 300*b*1.

Figure 13B:
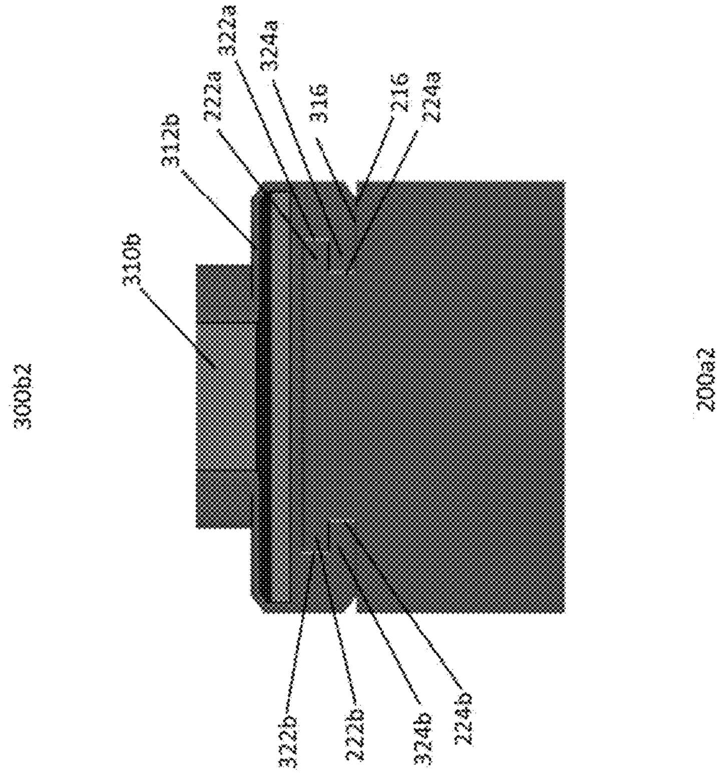
FIGS. 13*a*-13*d* illustrate a combination of the battery pack of FIGS. 2*a*-2*d* and the power tool of FIGS. 12*a*-12*d*.
Figure 13A:
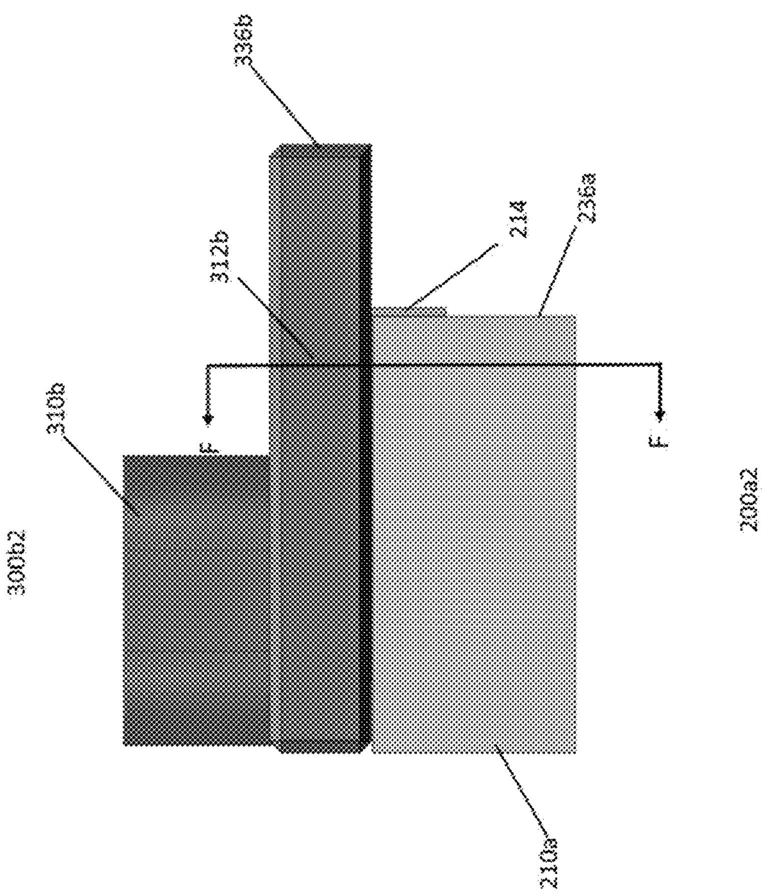
Figure 13D:
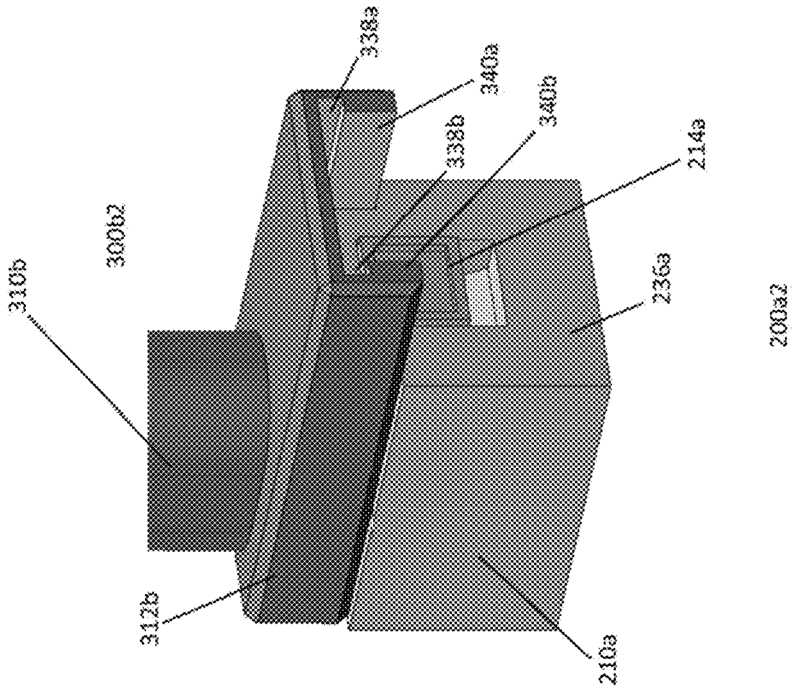
Figure 13C:
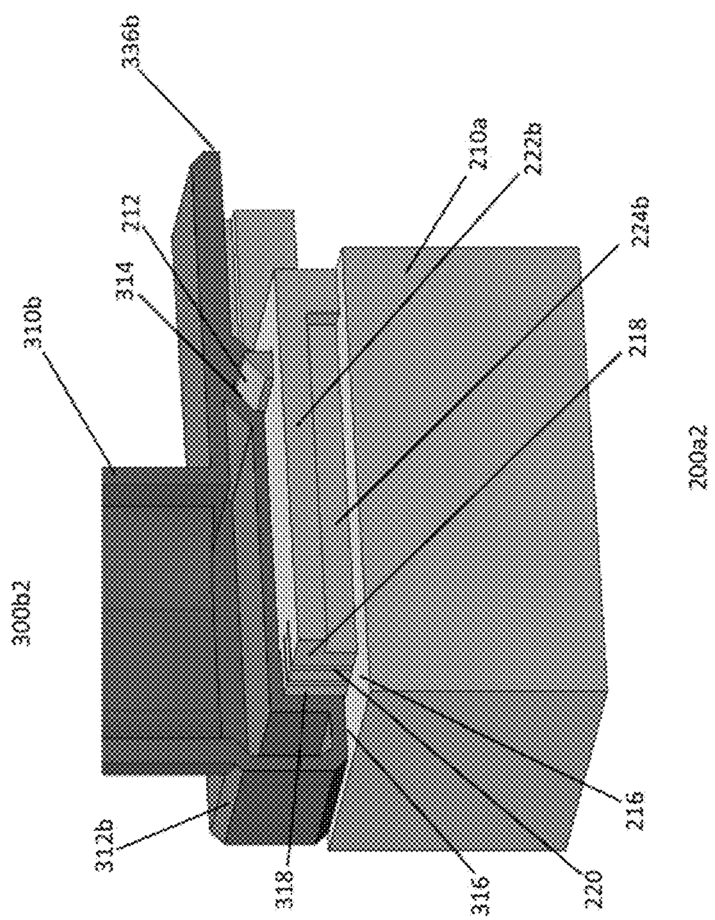

FIGS. 13*a*-13*d* illustrate a combination of the single rail battery pack of FIGS. 2*a*-2*d* and the dual rail power tool of FIGS. 12*a*-12*d*. Referring also to FIGS. 13*a*-13*d*, the dual rail interface power tool 300*b*2 is compatible with the single rail interface battery pack 200*a*2. FIG. 13*a* illustrates a side view and FIG. 13*b* illustrates a cross-section front view taken along the line F-F of FIG. 13*a* of the combination. FIG. 13*c* illustrates a partial, cut-away isometric view and FIG. 13*d* illustrates an isometric view of the combination. In this example, the tool shroud 312*b* extends beyond the battery pack 200*a*2. The latch 212 engages with the tool catch 314, both of which are in a same relative location to each other.

Figure 14B:
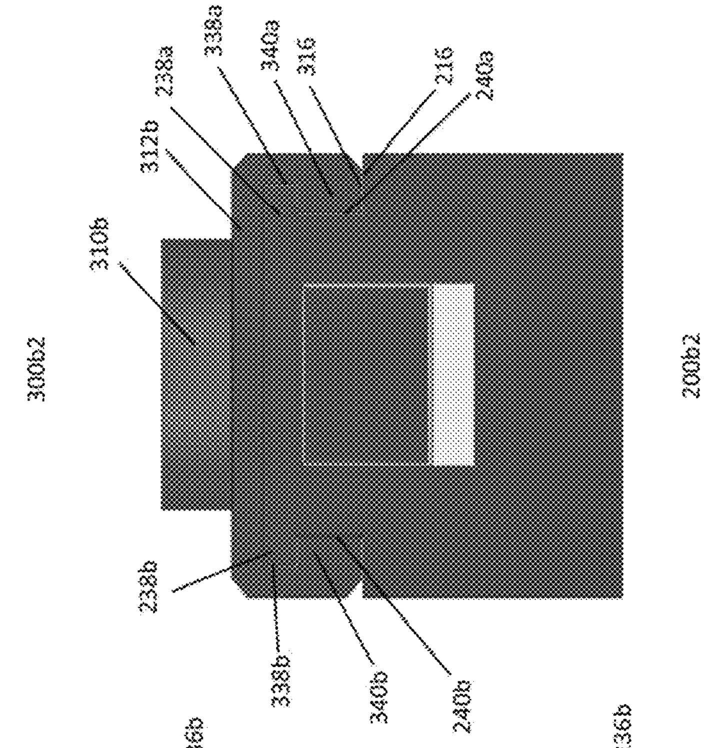
FIGS. 14*a*-14*d* illustrate a combination of the battery pack of FIGS. 10*a*-10*d* and the power tool of FIGS. 12*a*-12*d*.
Figure 14A:
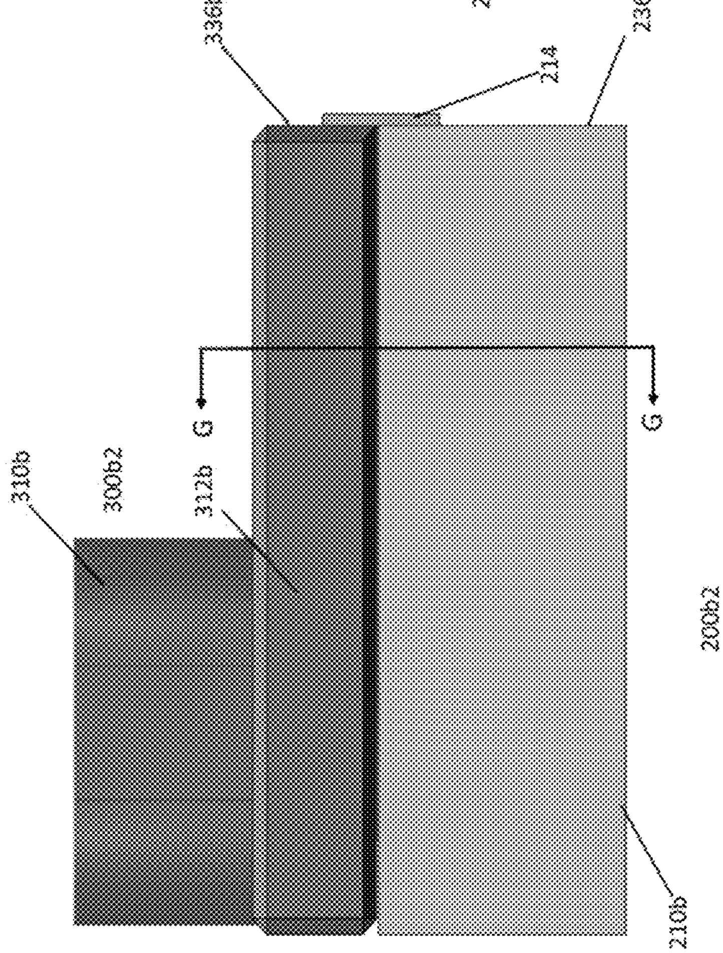
Figure 14D:
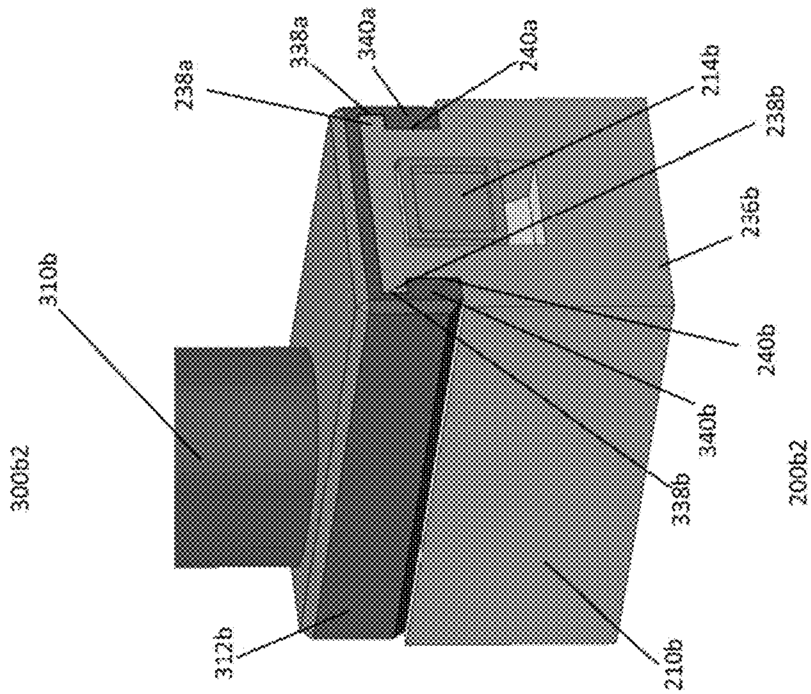
Figure 14C:
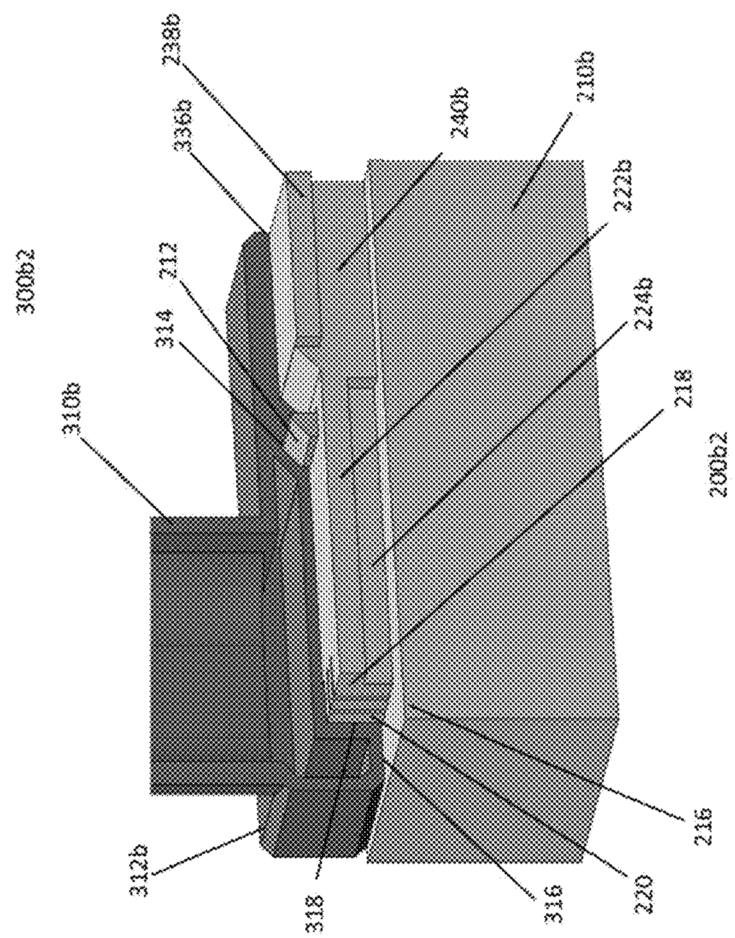
Figure 15B:
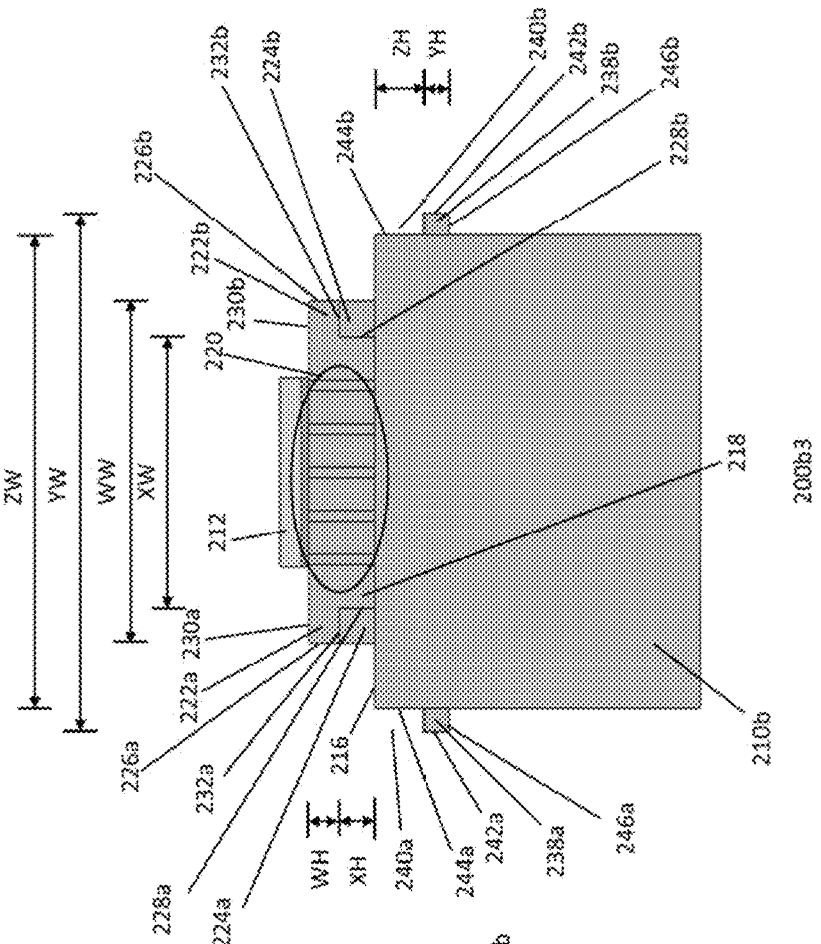
FIGS. 15*a*-15*d* illustrate a third example embodiment of a battery pack of the power tool system of FIG. 1 including a primary interface element and a secondary interface element.
Figure 15A:
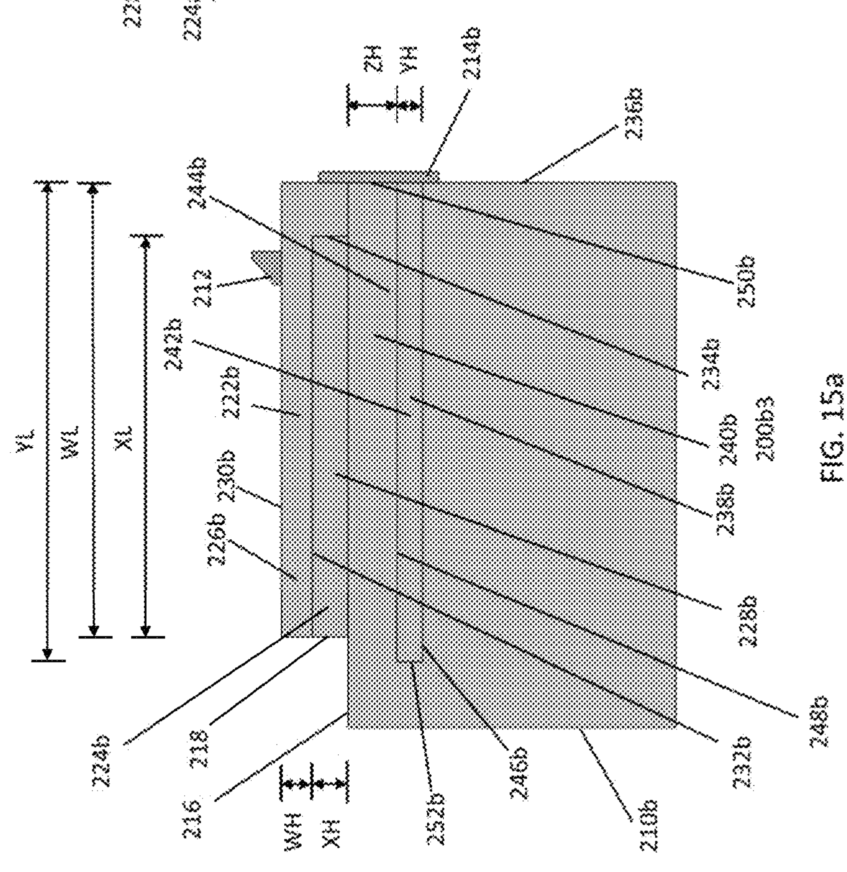
Figure 15D:
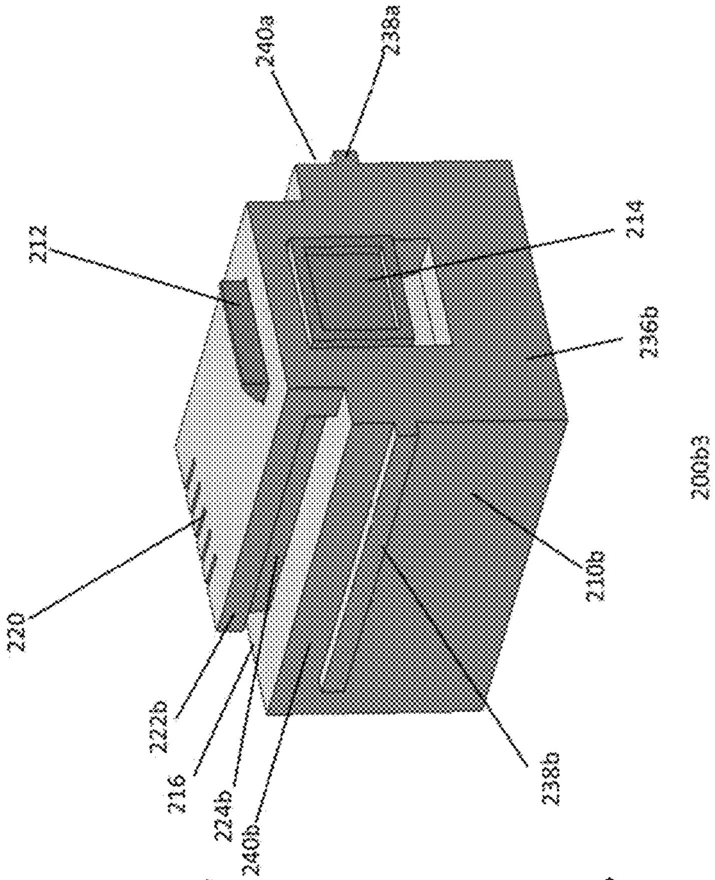
Figure 15C:
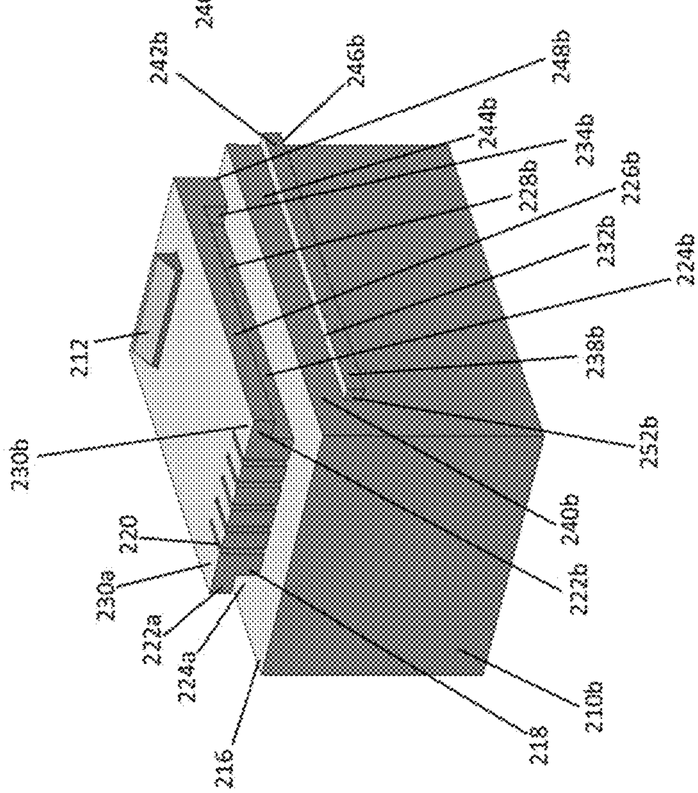

FIGS. 14*a*-14*d* illustrate a combination of the dual rail battery pack of FIGS. 10*a*-10*d* and the dual rail power tool of FIGS. 12*a*-12*d*. Referring to FIGS. 14*a*-14*d*, the dual rail interface power tool 300*b*2 is compatible with the dual rail interface battery pack 200*b*2. FIG. 14*a* illustrates a side view and FIG. 14*b* illustrates a cross-section front view taken along the line G-G of FIG. 14*a* of the combination. FIG. 14*c* illustrates a partial, cut-away isometric view and FIG. 14*d* illustrates an isometric view of the combination. In this example, the tool shroud 312*b* covers and receive the entire battery pack 200*b*2. The latch 212 engages with the tool catch 314, both of which are in a same relative location to each other.

As illustrated in FIGS. 14*a*-14*d*, both the primary battery pack rails 222*a*, 222*b* and the secondary battery pack rails 238*a*, 238*b* are sized to fit and be received in the primary power tool grooves 322*a*, 322*b* and secondary power tool grooves 338*a*, 338*b*, respectively. The primary battery pack rails 222*a*, 222*b* and the secondary battery pack rails 238*a*, 238*b* slide within and along the primary power tool grooves 322*a*, 322*b* and the secondary power tool grooves 338*a*, 338*b*, respectively until the battery pack vertical datum plane 218 stops at the power tool vertical datum plane 318, and vice versa. Similarly, both the primary power tool rails 324*a*, 324*b* and secondary power tool rails 340*a*, 340*b* are sized to fit and be received in the primary battery pack grooves 224*a*, 224*b* and secondary battery pack grooves 240*a*, 240*b*, respectively. The primary power tool rails 324*a*, 324*b* and secondary power tool rails 340*a*, 340*b* slide within and along the primary battery pack grooves 224*a*, 224*b* and the secondary battery pack grooves 240*a*, 240*b*, respectively until the battery pack vertical datum plane 218 stops at the power tool vertical datum plane 318, and vice versa. The battery pack latch 212 engages with the power tool catch 314 to hold the battery pack 200*a*1 within the tool shroud 312.

Referring to FIGS. 15*a*-15*d*, a third embodiment of a dual rail interface battery pack 200*b*3 is illustrated. In this example, the dual rail interface battery pack 200*b*3 includes the second set of rails 238*a*, 238*b* on each side of the battery pack housing 210*b*. Similarly, the second set of grooves 240*a*, 240*b* is above the second set of rails having a height ZH. In this example, the first set of rails 222*a*, 222*b* and the first set of grooves remain the same as in previous embodiments. In this example, the second set of rails 238*a*, 238*b* is on a lower plane relative to the base surface 216 and on a lower plane relative to the first set of rails 222*a*, 222*b*. Additionally, the second set of grooves 240*a*, 240*b* are on a different horizontal plane than the first set of grooves 224*a*, 224*b*. The second set of grooves 240*a*, 240*b* is on a lower plane relative to the base surface 216 and on a lower plane relative to the first set of grooves 224*a*, 224*b*. The dual rail interface battery pack 200*b*3 with the sets of rails on different planes and on each side of the housing 210*b* may accommodate power tools of different sizes including tools that have a larger tool shroud.

Figure 16B:
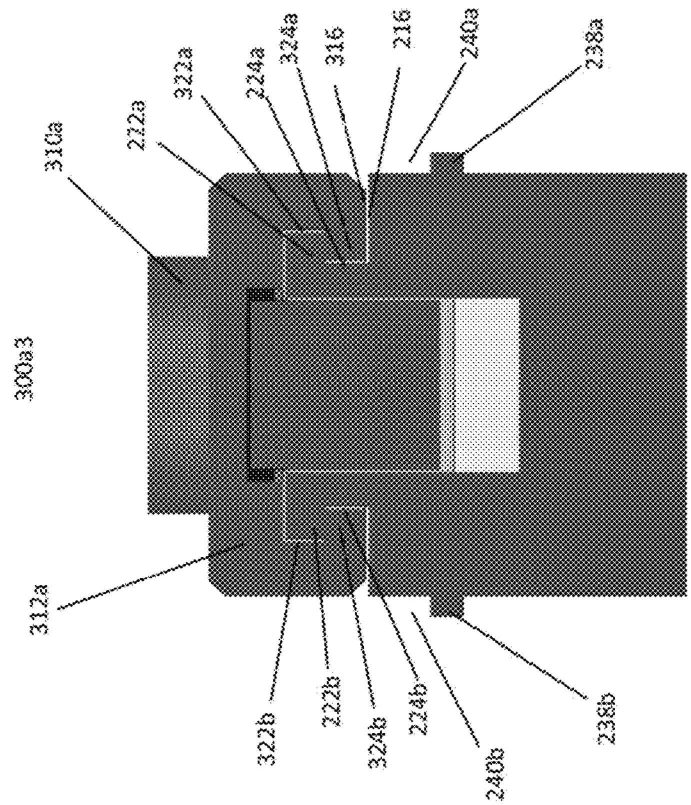
FIGS. 16*a*-16*d* illustrate a combination of the battery pack of FIGS. 15*a*-15*d* and the power tool of FIGS. 3*a*-3*d*.
Figure 16A:
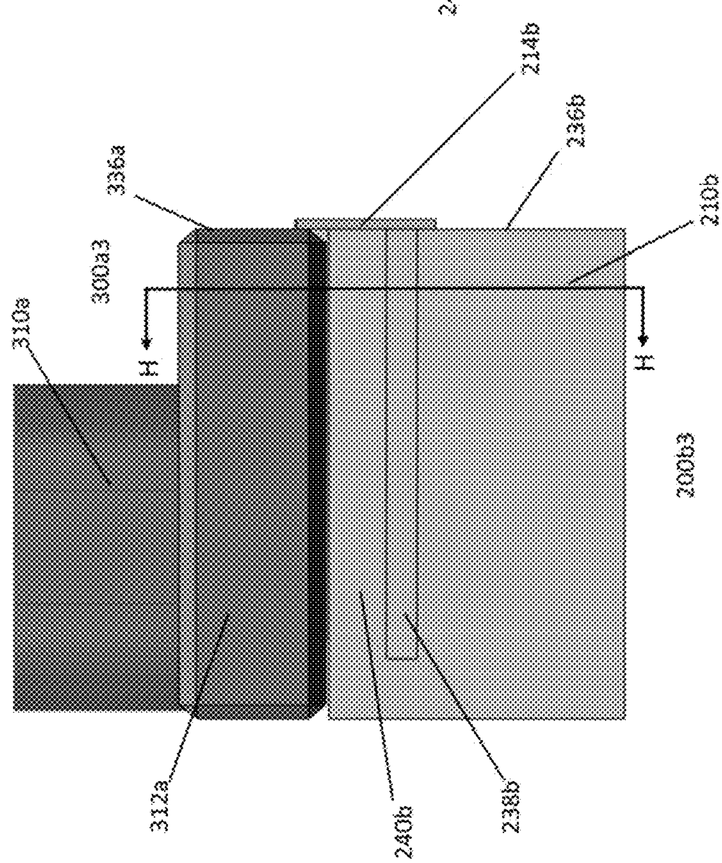
Figure 16D:
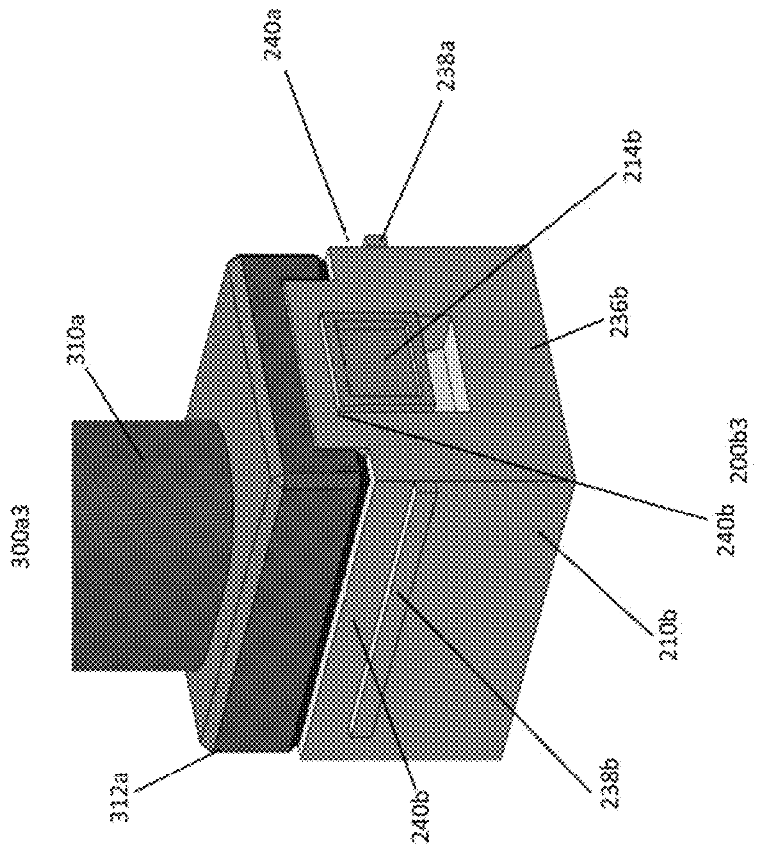
Figure 16C:
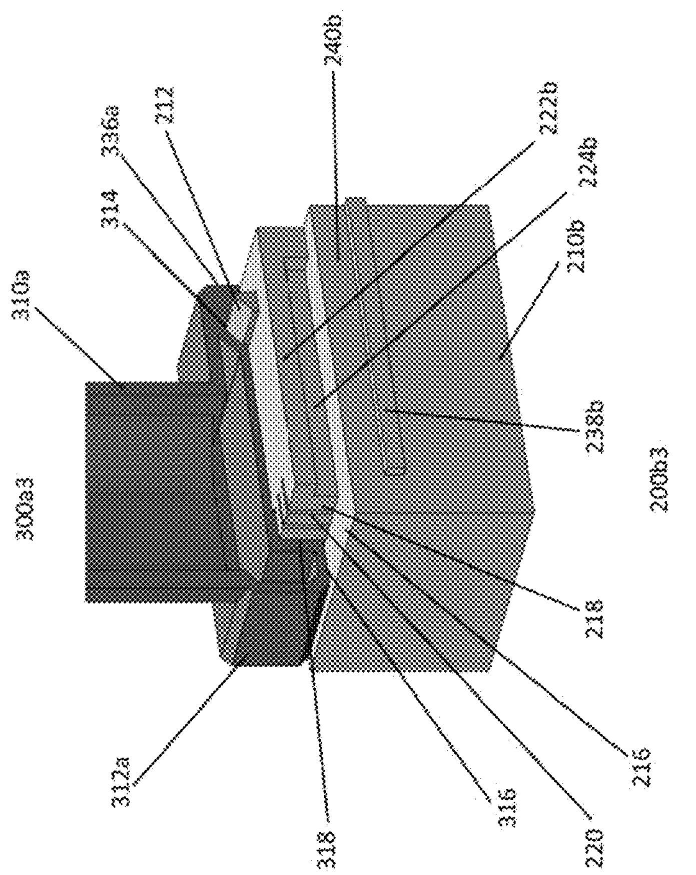
Figure 17B:
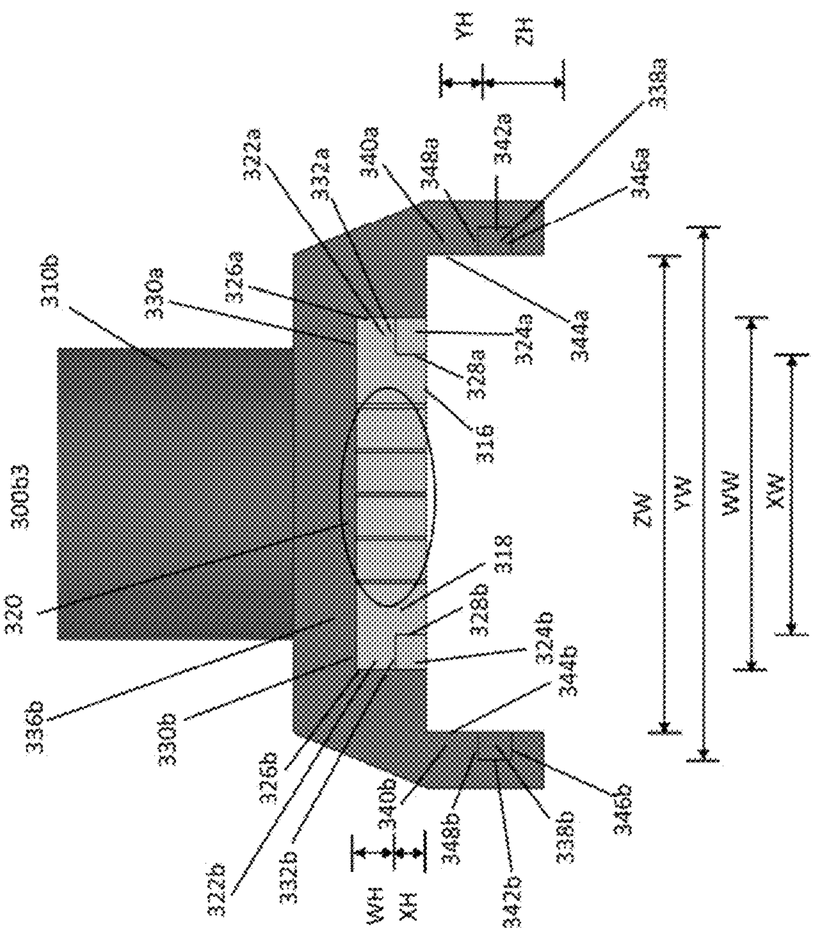
FIGS. 17*a*-17*d* illustrate a third example embodiment of a power tool of the power tool system of FIG. 1 including a primary interface element and a secondary interface element.
Figure 17A:
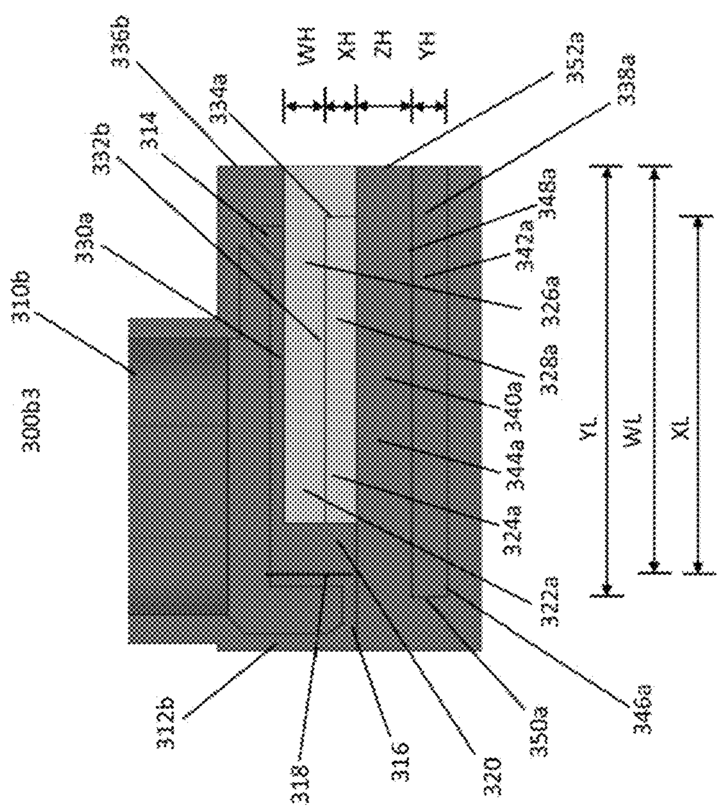
Figure 17D:
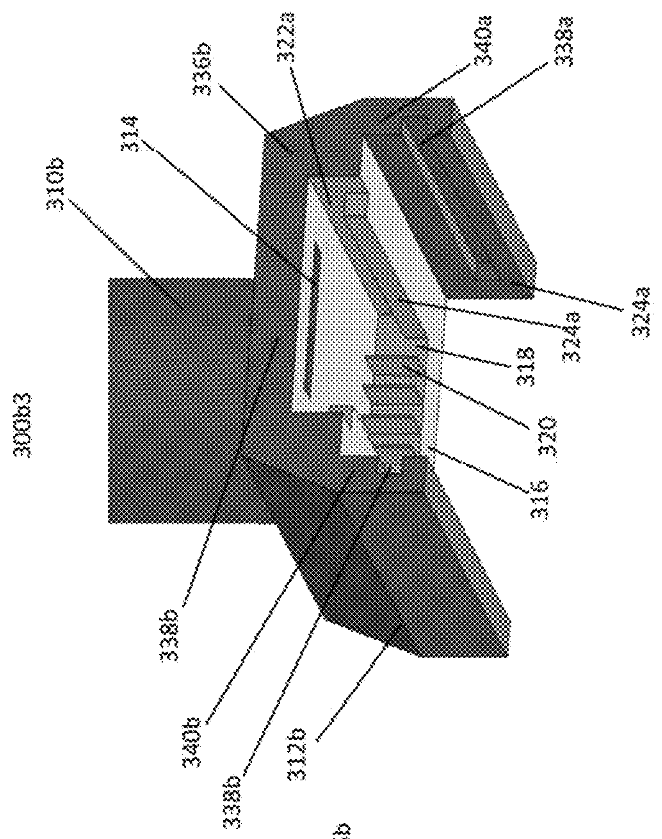
Figure 17C:
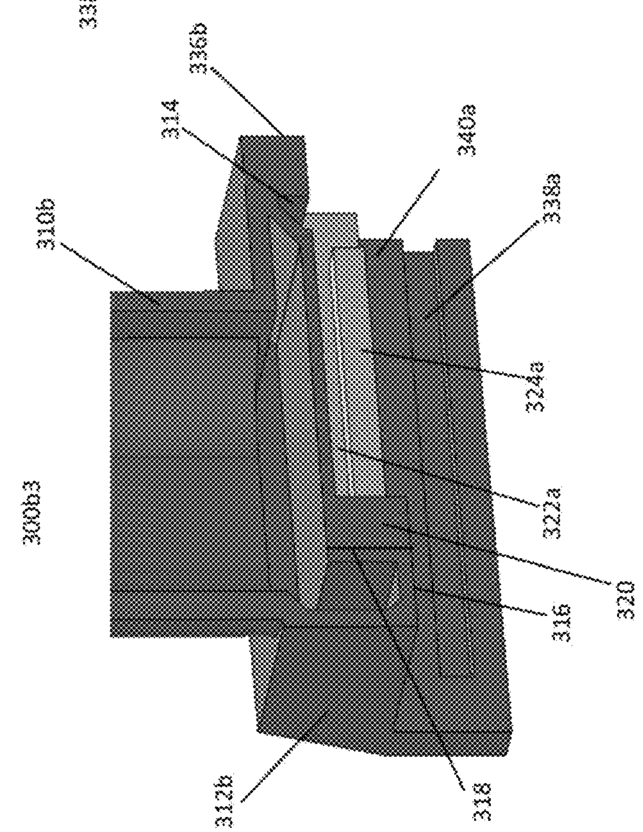

The dual rail interface battery pack 200*b*3 is compatible with a single rail interface power tool such as the single rail interface power tool 300*a*3, as illustrated in FIGS. 16*a*-16*d*. FIG. 16*a* illustrates a side view and FIG. 16*b* illustrates a cross-section front view taken along the line H-H of FIG. 16*a* of the combination. FIG. 16*c* illustrates a partial, cut-away isometric view and FIG. 16*d* illustrates an isometric view of the combination. The single rail interface power tool 300*a*3 includes the same features as described above with respect to the single rail interface power tool 300*a*1. The power tool 300*a*3 engages with the dual rail interface battery pack 200*b*3 using the first set of rails 222*a*, 222*b* and the first set of grooves 224*a*, 224*b* on the battery pack and not the second set of rails 238*a*, 238*b* and grooves 240*a*, 240*b*.

FIGS. 17*a*-17*d* illustrate a third example embodiment of a dual rail interface power tool 300*b*3 that is compatible with both a single rail interface battery pack and a dual rail interface battery pack. In the example of FIGS. 17*a*-17*d*, the top walls 348*a*, 348*b* of the second set of rails 340*a*, 340*b* are on a different plane than the first set of rails 324*a*, 324*b*. Additionally, the second set of rails 340*a*, 340*b* have a larger height ZH than the height XH of the first set of rails 324*a*, 324*b*. The second set of rails 340*a*, 340*b* and the second set of grooves 338*a*, 338*b* are positioned out wider in the tool shroud 312*b* than the first set of rails 324*a*, 324*b* and the first set of grooves 322*a*, 322*b*. The first set of rails 324*a*, 324*b* and the first set of grooves 322*a*, 322*b* remain unchanged from the previous embodiments of the single rail interface power tools 300*a*1, 300*a*2 and the dual rail interface power tools 300*b*1, 300*b*2.

Figure 18B:
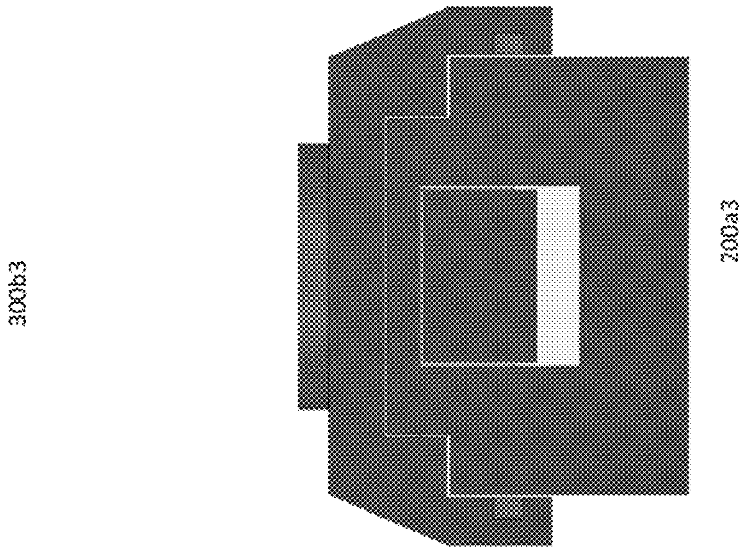
FIGS. 18*a*-18*d* illustrate a combination of the battery pack of FIGS. 2*a*-2*d* and the power tool of FIGS. 17*a*-17*d*.
Figure 18A:
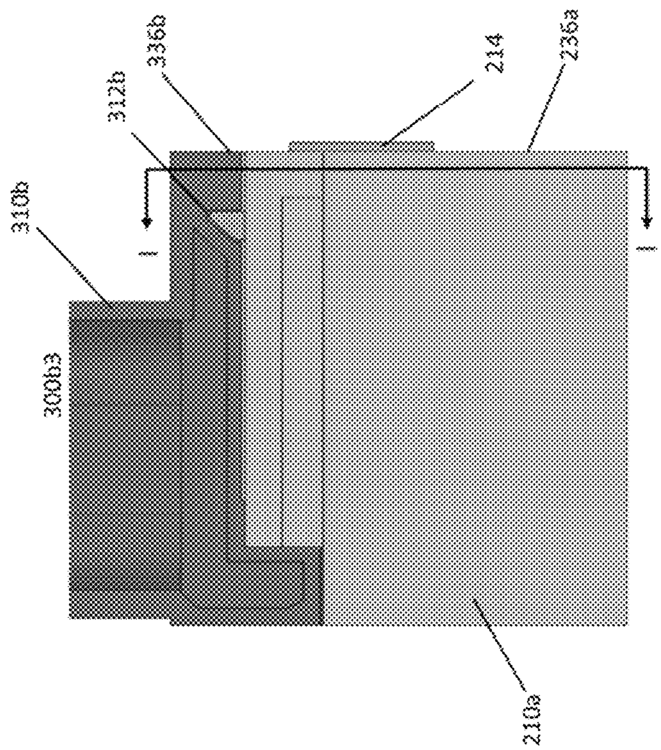
Figure 18D:
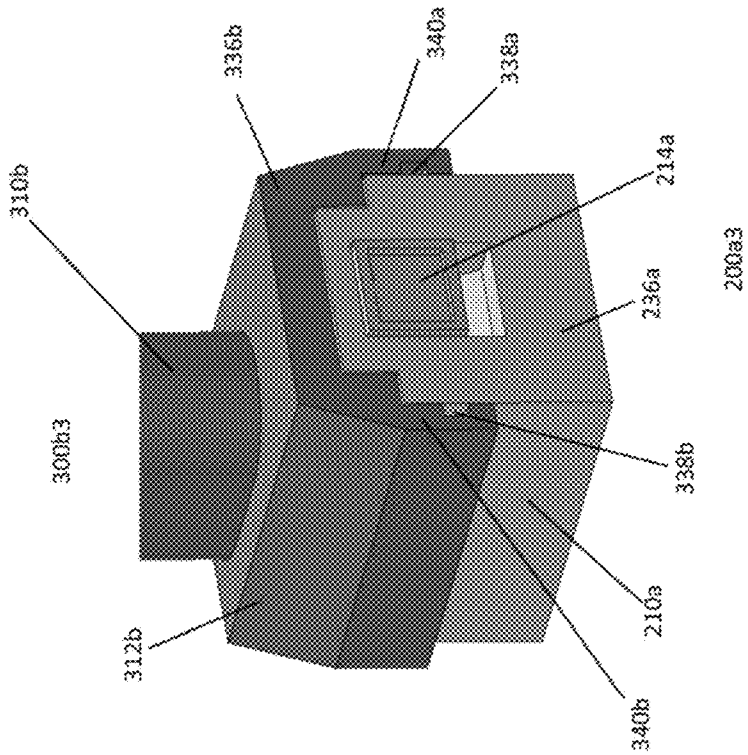
Figure 18C:
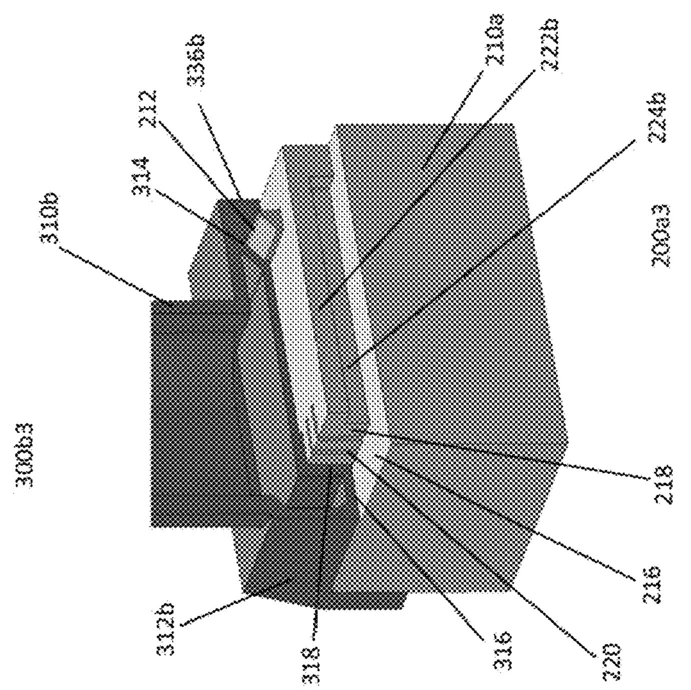

Referring also to FIGS. 18*a*-18*d*, the dual rail interface power tool 300*b*3 is compatible with the single rail interface battery pack 200*a*3. FIGS. 18*a*-18*d* illustrate a combination of the single rail battery pack of FIGS. 2*a*-2*d* and the dual rail power tool of FIGS. 17*a*-17*d*. Referring also to FIGS. 18*a*-18*d*, the dual rail interface power tool 300*b*3 is compatible with the single rail interface battery pack 200*a*3. FIG. 18*a* illustrates a side view and FIG. 18*b* illustrates a cross-section front view taken along the line I-I of FIG. 18*a* of the combination. FIG. 18*c* illustrates a partial, cut-away isometric view and FIG. 18*d* illustrates an isometric view of the combination. In this example, the tool shroud 312*b* covers and receives the entire battery pack 200*a*3. The latch 212 engages with the tool catch 314, both of which are in a same relative location to each other.

Figure 19B:
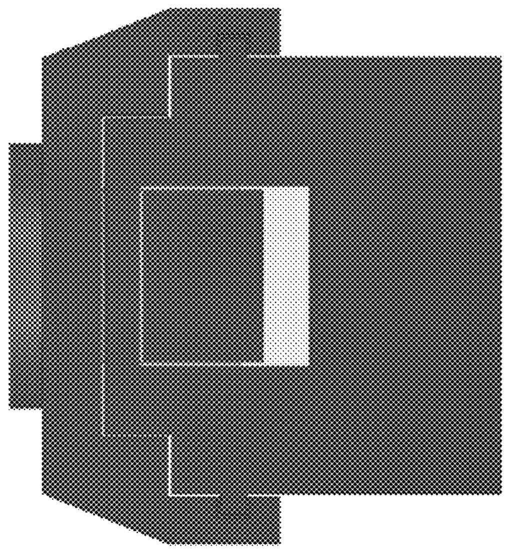
FIGS. 19*a*-19*d* illustrate a combination of the battery pack of FIGS. 15*a*-15*d* and the power tool of FIGS. 17*a*-17*d*.
Figure 19A:
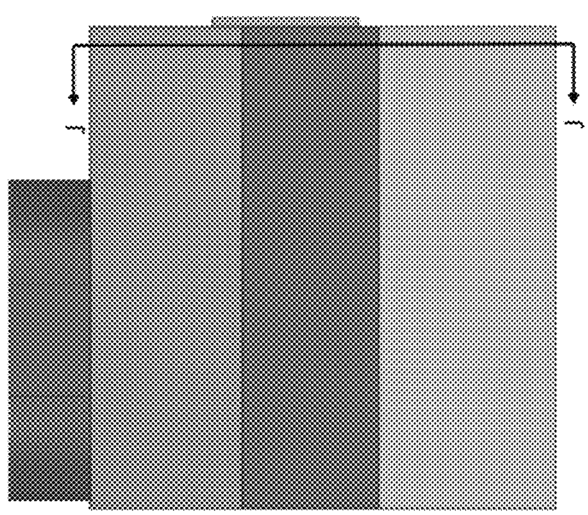
Figure 19D:
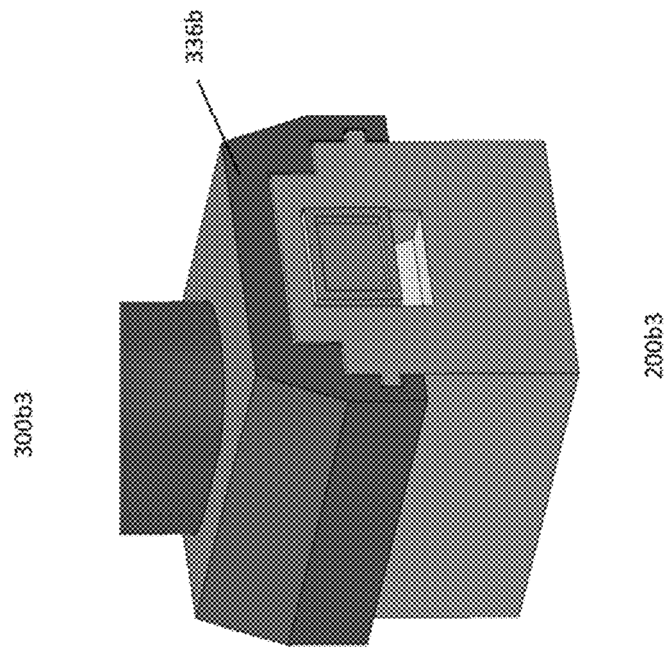
Figure 19C:
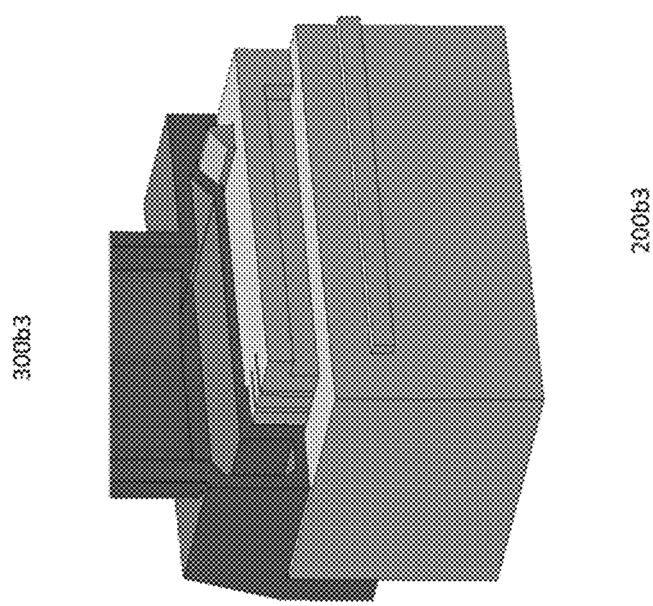
Figure 20B:
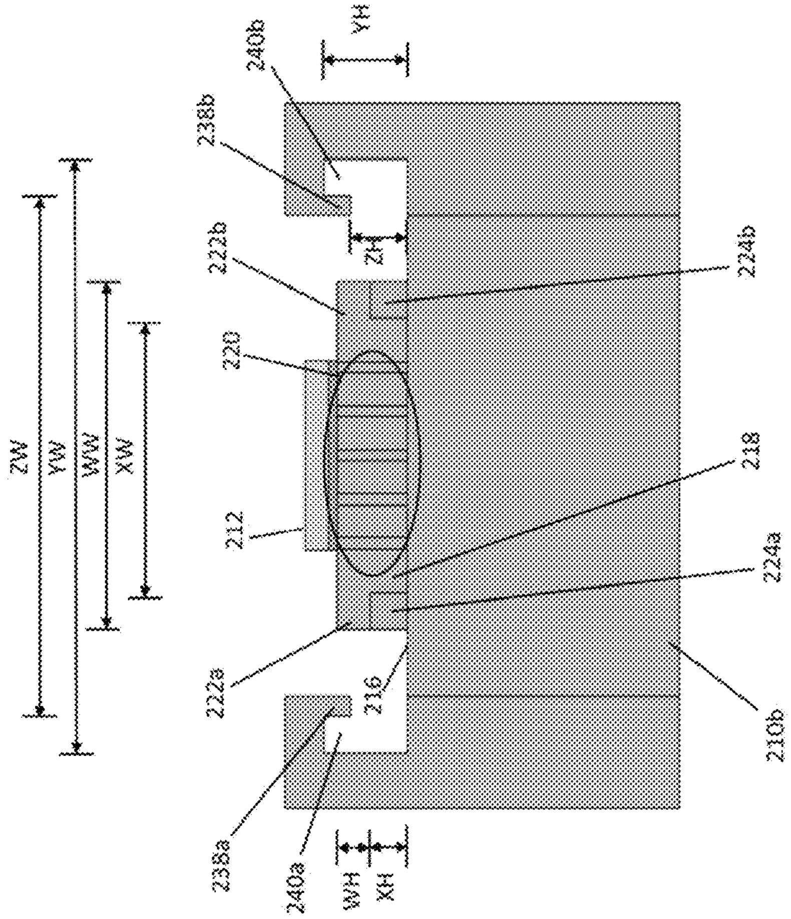
FIGS. 20*a*-20*d* illustrate a fourth example embodiment of a battery pack of the power tool system of FIG. 1 including a primary interface element and a secondary interface element.
Figure 20A:
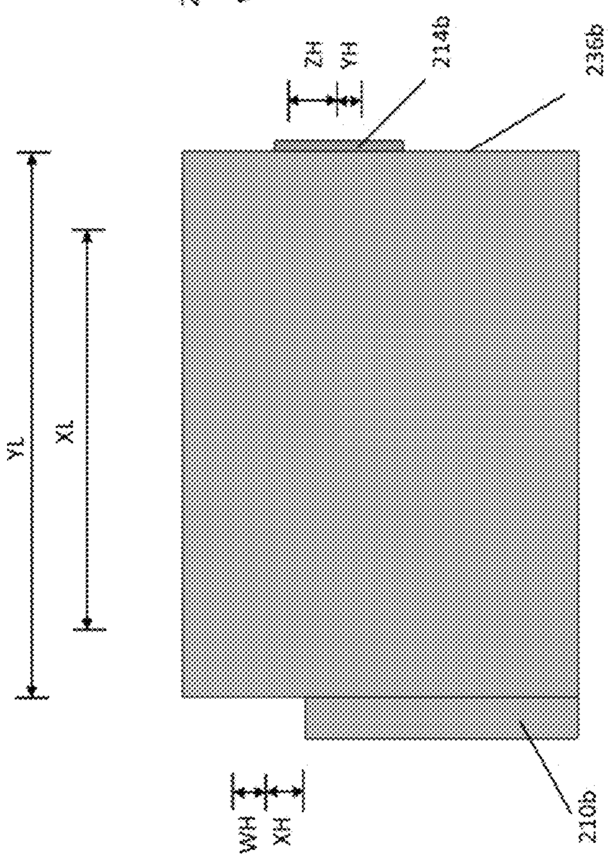
Figure 20C:
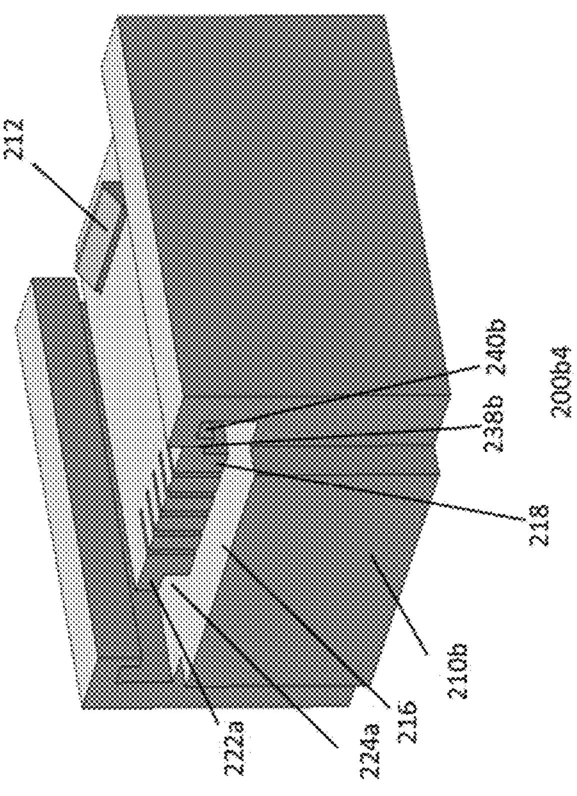
Figure 20D:
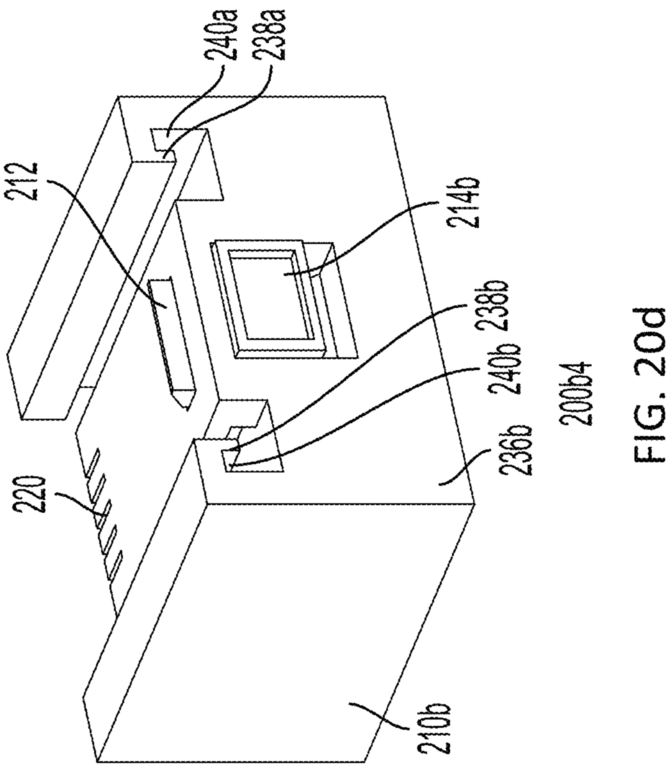

FIGS. 19*a*-19*d* illustrate a combination of the dual rail battery pack of FIGS. 15*a*-15*d* and the dual rail power tool of FIGS. 17*a*-17*d*. Referring to FIGS. 19*a*-19*d*, the dual rail interface power tool 300*b*3 is compatible with the dual rail interface battery pack 200*b*3. FIG. 19*a* illustrates a side view and FIG. 19*b* illustrates a cross-section front view taken along the line J-J of FIG. 19*a* of the combination. FIG. 19*c* illustrates a partial, cut-away isometric view and FIG. 19*d* illustrates an isometric view of the combination. In this example, the tool shroud 312*b* covers and receives the entire battery pack 200*b*3. The latch 212 engages with the tool catch 314, both of which are in a same relative location to each other.

As illustrated in FIGS. 19*a*-19*d*, the primary battery pack rails 222*a*, 222*b* and secondary battery pack rails 238*a*, 238*b* are sized to fit in the primary power tool grooves 322*a*, 322*b* and secondary power tool grooves 338*a*, 338*b*, respectively. The primary battery pack rails 222*a*, 222*b* and the secondary battery pack rails 238*a*, 238*b* slide within and along the primary power tool grooves 322*a*, 322*b* and secondary power tool grooves 338*a*, 338*b*, respectively until the battery pack vertical datum plane 218 stops at the power tool vertical datum plane 318, and vice versa. Similarly, the primary power tool rails 324*a*, 324*b* and the secondary power tool rails 340*a*, 340*b* are sized to fit and be received in the primary battery pack grooves 224*a*, 224*b* and secondary battery pack grooves 240*a*, 240*b*, respectively. The primary power tool rails 324*a*, 324*b* and secondary power tool rails 340*a*, 340*b* slide within and along the primary battery pack grooves 224*a*, 224*b* and the secondary battery pack grooves 240*a*, 240*b*, respectively until the battery pack vertical datum plane 218 stops at the power tool vertical datum plane 318, and vice versa. The battery pack latch 212 engages with the power tool catch 314 to hold the battery pack 200*a*1 within the tool shroud 312. In this example, the opening width of the tool shroud 312 accommodates the width of the battery pack 200*b*3 with the second set of grooves 240*a*, 240*b* on the side of the battery pack housing 210*b*.

Referring to FIGS. 20*a*-20*d*, a fourth example embodiment of a dual rail interface battery pack 200*b*4 is illustrated. In this example, the dual rail interface battery pack 200*b*4 includes the second set of rails 238*a*, 238*b* on each side of the battery pack housing 210*b* and a second set of grooves 240*a*, 240*b*, which form an L-shaped hook. In contrast to the previous embodiments, in this embodiment, the rails 238*a*, 238*b* and the grooves 240*a*, 240*b* are side-by-side and adjacent to each other instead of the rails on top of the grooves. The bottom walls of the grooves 240*a*, 240*b* are in a same plane as the base surface 216 and the bottom walls of the grooves 224*a*, 224*b*. The bottom wall of the rails 238*a*, 238*b* are a height distance ZH above the base surface 216. In this example, the first set of rails 222*a*, 222*b* and the first set of grooves 224*a*, 224*b* remain the same as in previous embodiments. In this example, the second set of rails 238*a*, 238*b* are perpendicular with respect to the base surface 216, as seen by the formed L-shape. The second set of rails 238*a*, 238*b* are also perpendicular with respect to the first set of rails 222*a*, 222*b*.

Figure 21B:
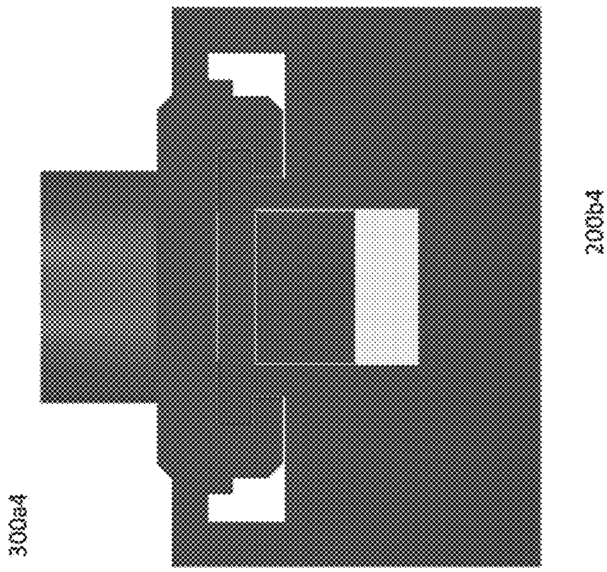
FIGS. 21*a*-21*d* illustrate a combination of the battery pack of FIGS. 20*a*-20*d* and the power tool of FIGS. 3*a*-3*d*.
Figure 21A:
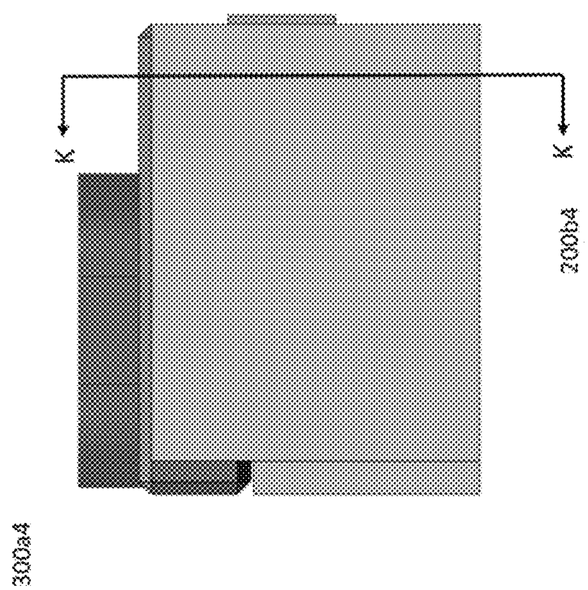
Figure 21D:
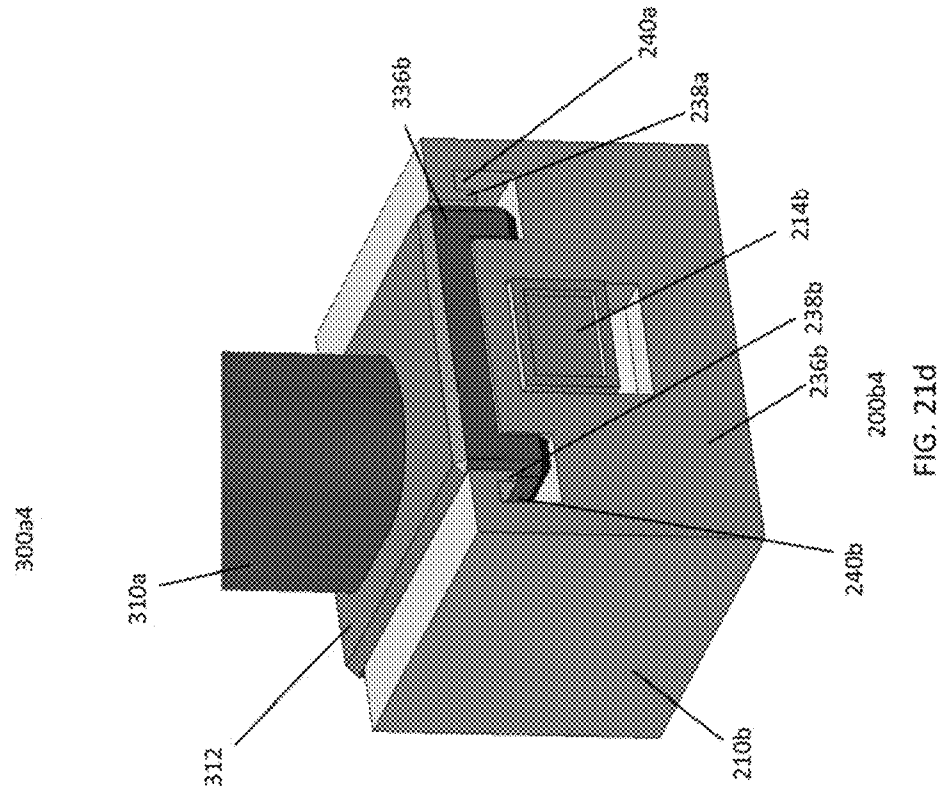
Figure 21C:
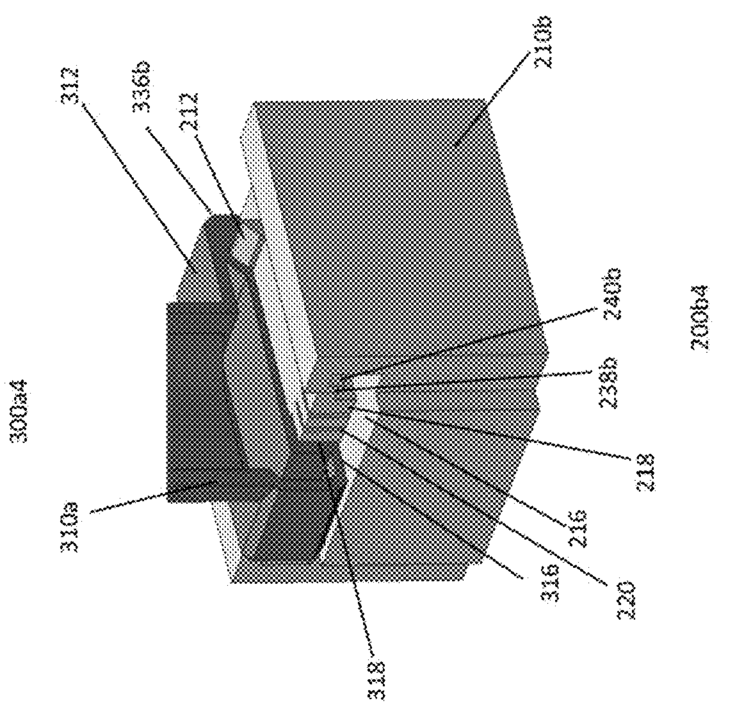
Figure 22B:
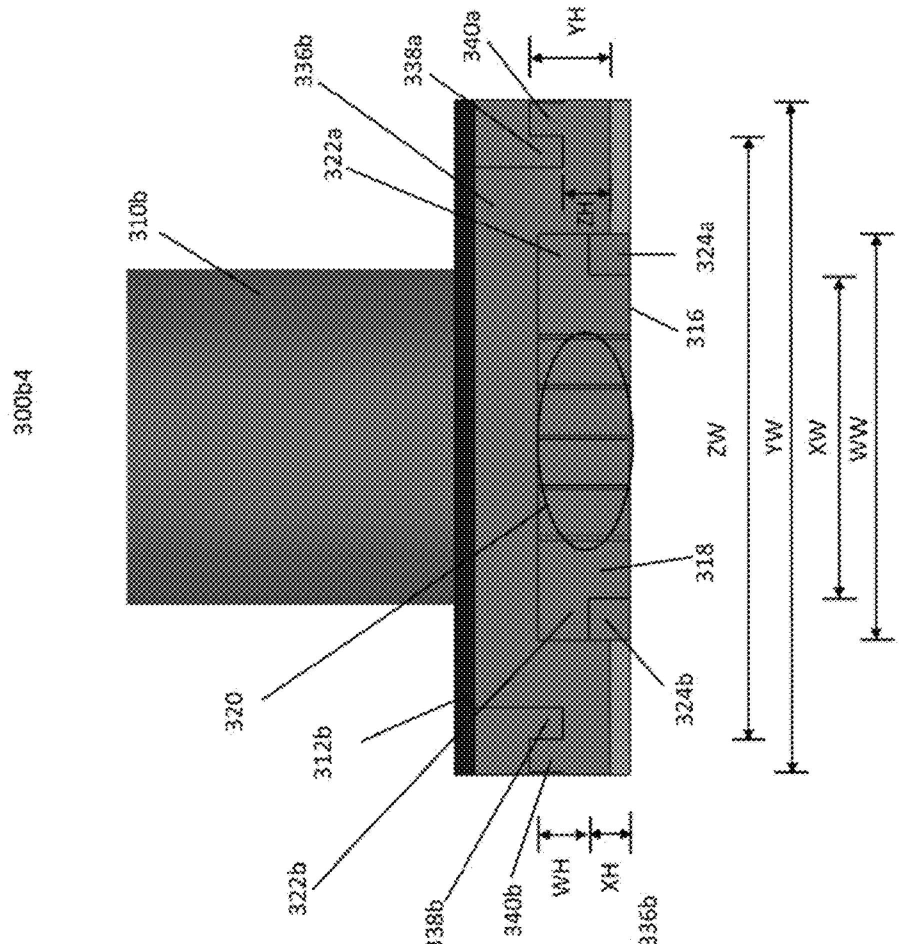
FIGS. 22*a*-22*d* illustrate a fourth example embodiment of a power tool of the power tool system of FIG. 1 including a primary interface element and a secondary interface element.
Figure 22A:
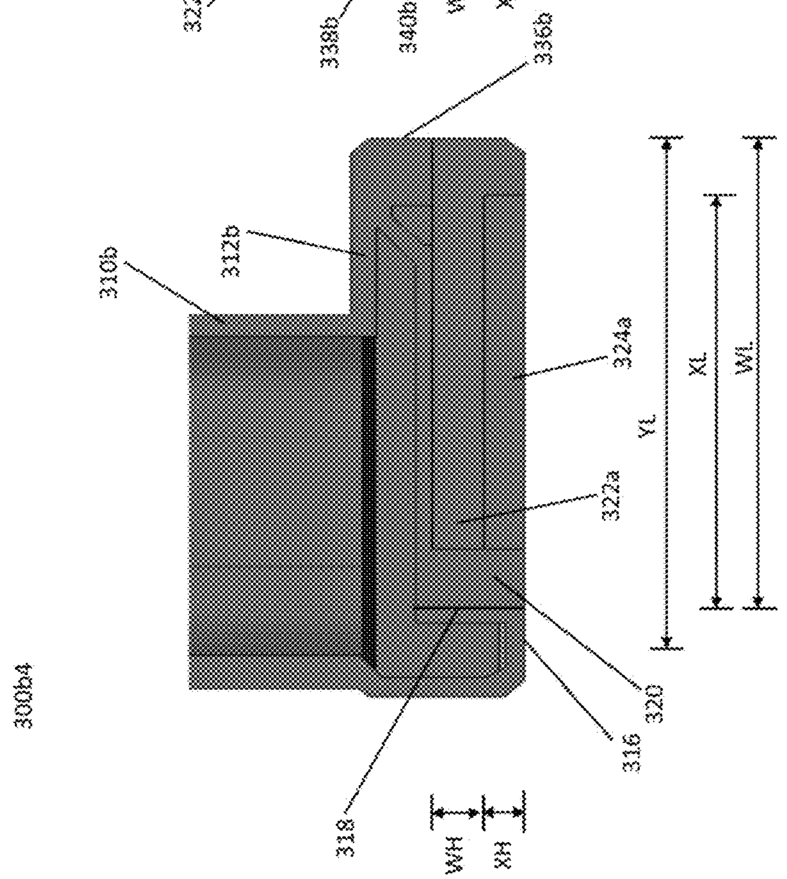
Figure 22D:
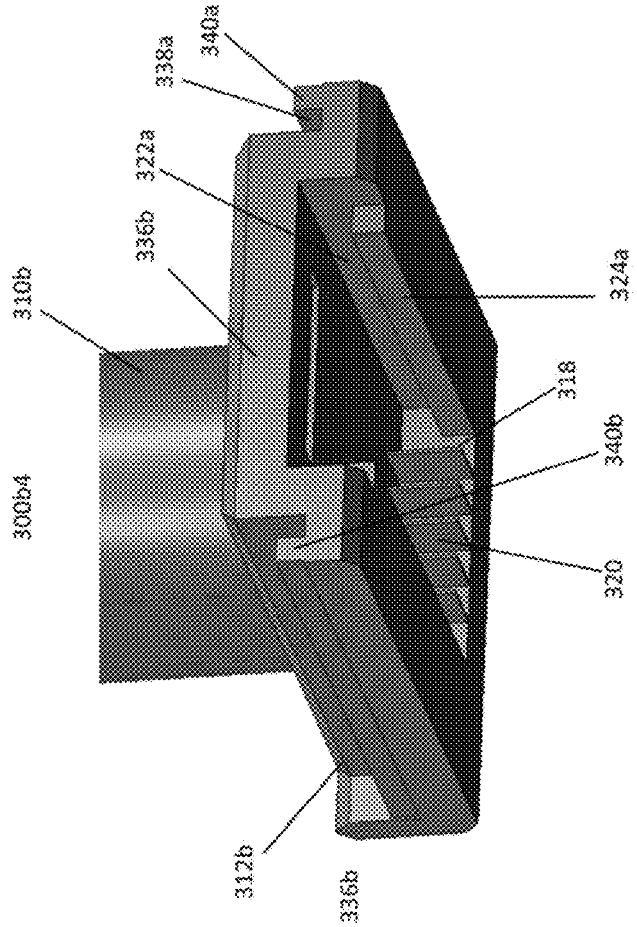
Figure 22C:
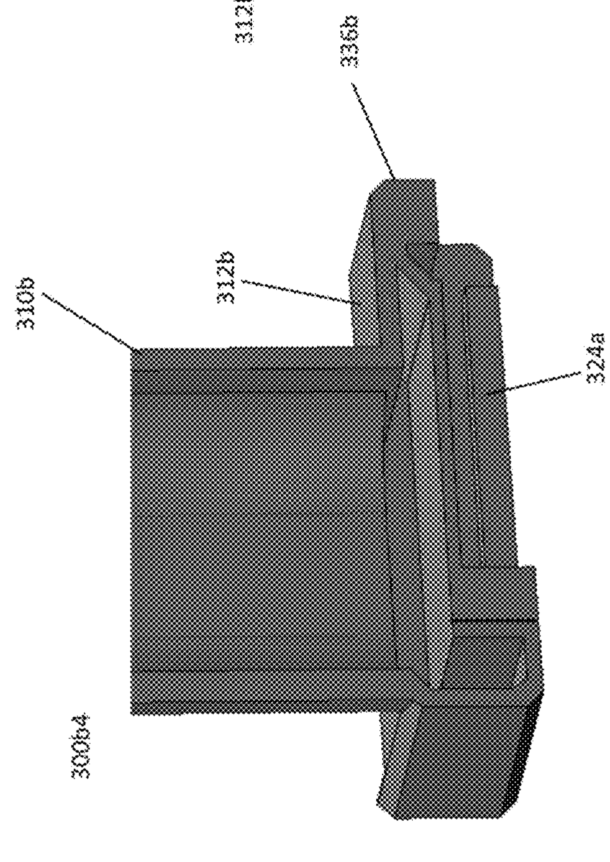

FIGS. 21*a*-21*d* illustrate a combination of the dual rail battery pack of FIGS. 20*a*-20*d* and the single rail power tool of FIGS. 3*a*-3*d*. The dual rail interface battery pack 200*b*4 is compatible with a single rail interface power tool such as the single rail interface power tool 300*a*4 as illustrated in FIGS. 21*a*-21*d*. FIG. 21*a* illustrates a side view and FIG. 22*b* illustrates a cross-section front view taken along the line K-K of FIG. 21*a* of the combination. FIG. 21*c* illustrates a partial, cut-away isometric view and FIG. 21*d* illustrates an isometric view of the combination. The single rail interface power tool 300*a*4 includes the same features as described above with respect to the single rail interface power tool 300*a*1. The power tool 300*a*4 engages with the dual rail interface battery pack 200*b*3 using the first set of rails 222*a*, 222*b* and the first set of grooves 224*a*, 224*b* on the battery pack and not the second set of rails and grooves.

FIGS. 22*a*-22*d* illustrate a fourth example embodiment of a dual rail interface power tool 300*b*4 that is compatible with both a single rail interface battery pack and a dual rail interface battery pack. In the example of FIGS. 22*a*-22*d*, the second set of rails 340*a*, 340*b* and the second set of grooves 338*a*, 338*b* are located exterior to the tool shroud 312*b*, whereas the first set of rails 324*a*, 324*b* and the first set of grooves 322*a*, 322*b* are located in the interior of the tool shroud 312*b*. The second set of rails 340*a*, 340*b* are on a different plane than the first set of rails 324*a*, 324*b* and in a different orientation than the first set of rails 324*a*, 324*b*, with the sets of rails 340*a*, 340*b* and 324*a*, 324*b* being oriented perpendicular to each other. The second set of rails 340*a*, 340*b* and the second set of grooves 338*a*, 338*b* are adjacent (side-by-side) to each other in contrast to the first set of rails 324*a*, 324*b* and the first set of grooves 322*a*, 322*b*, which have the grooves 322*a*, 322*b* on top of the rails 324*a*, 324*b*.

Figure 23B:
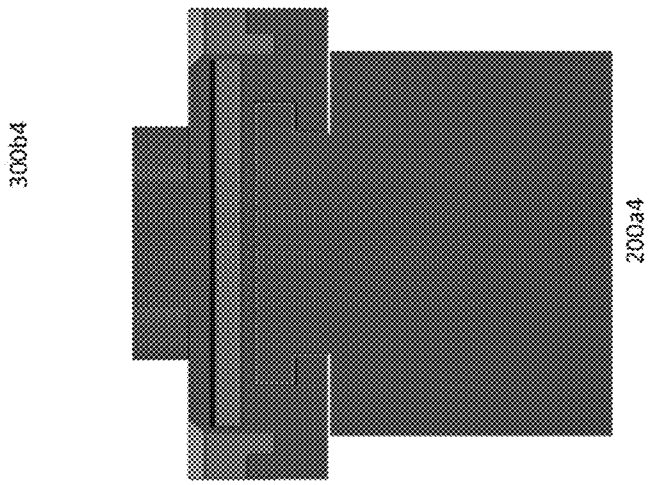
FIGS. 23*a*-23*d* illustrate a combination of the battery pack of FIGS. 2*a*-2*d* and the power tool of FIGS. 22*a*-22*d*.
Figure 23A:
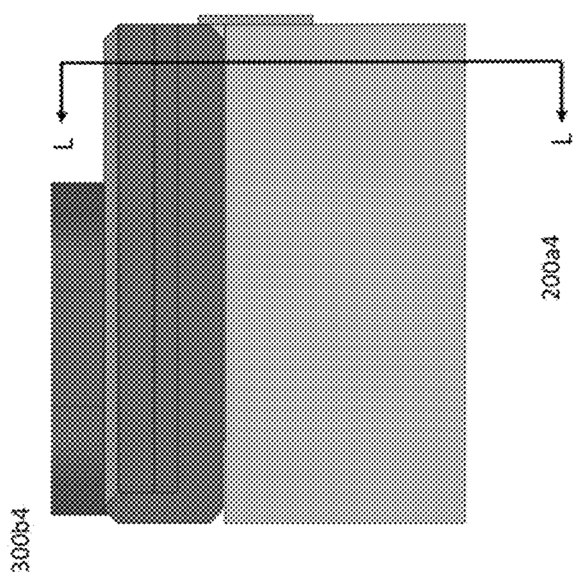
Figure 23D:
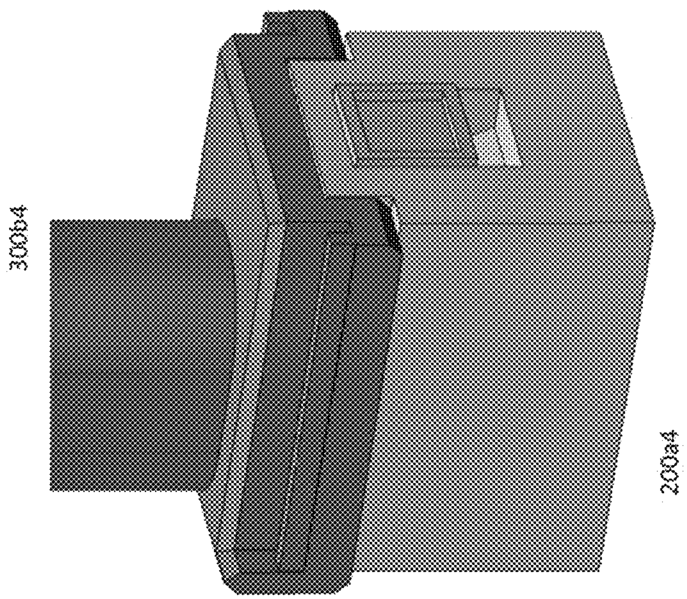
Figure 23C:
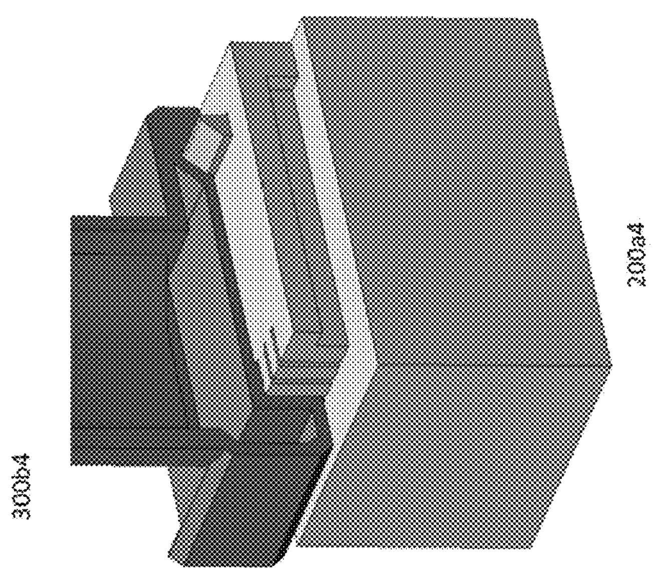

Referring also to FIGS. 23*a*-23*d*, the dual rail interface power tool 300*b*4 is compatible with the single rail interface battery pack 200*a*4. FIG. 23*a* illustrates a side view and FIG. 23*b* illustrates a cross-section front view taken along the line L-L of FIG. 23*a* of the combination. FIG. 23*c* illustrates a partial, cut-away isometric view and FIG. 23*d* illustrates an isometric view of the combination. The latch 212 engages with the tool catch 314, both of which are in a same relative location to each other.

Figure 24B:
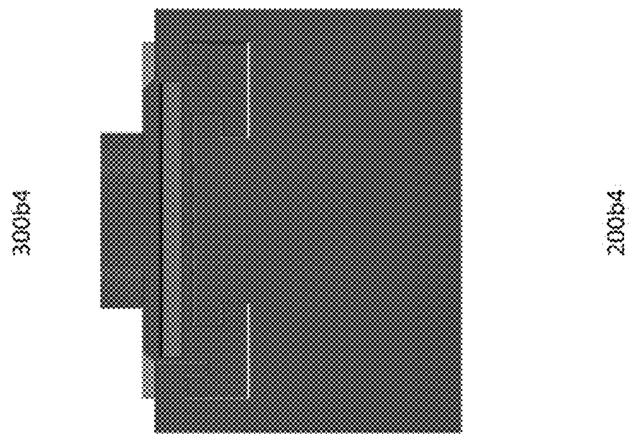
FIGS. 24*a*-24*d* illustrate a combination of the battery pack of FIGS. 20*a*-20*d* and the power tool of FIGS. 22*a*-22*d*.
Figure 24A:
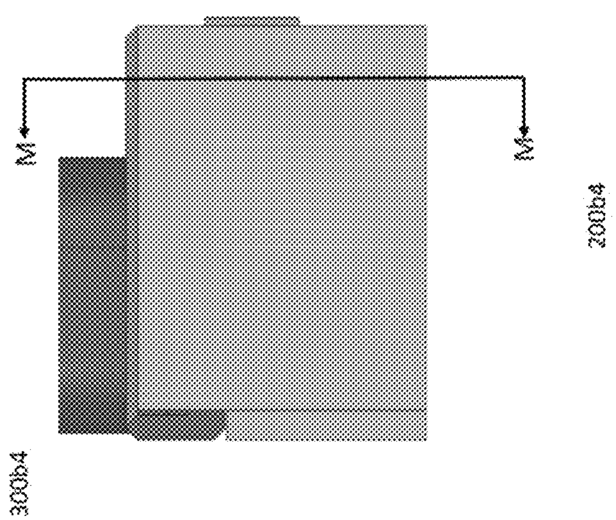
Figure 24D:
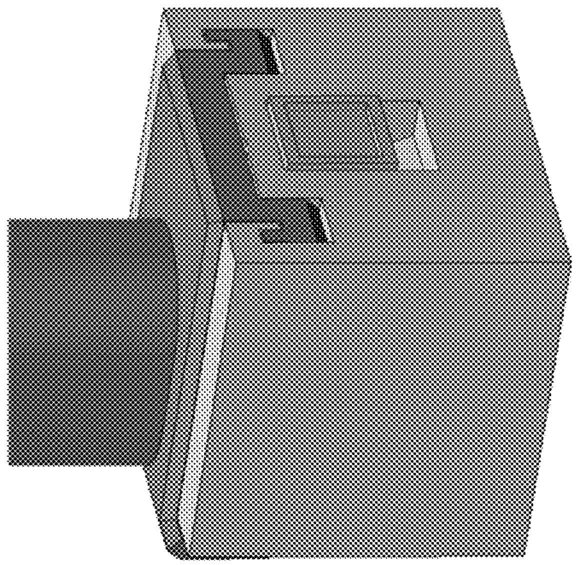
Figure 24C:
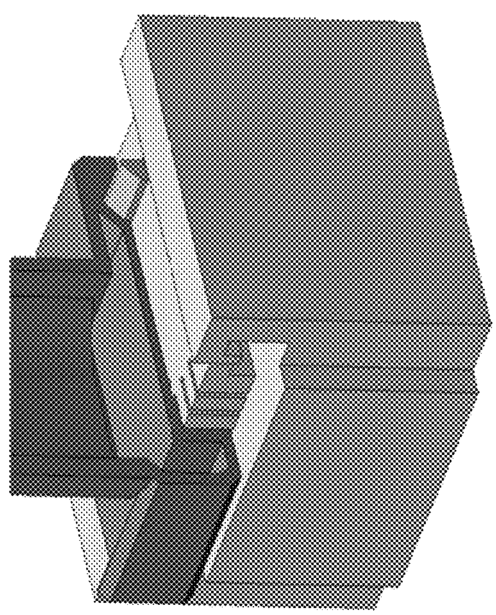
Figure 25B:
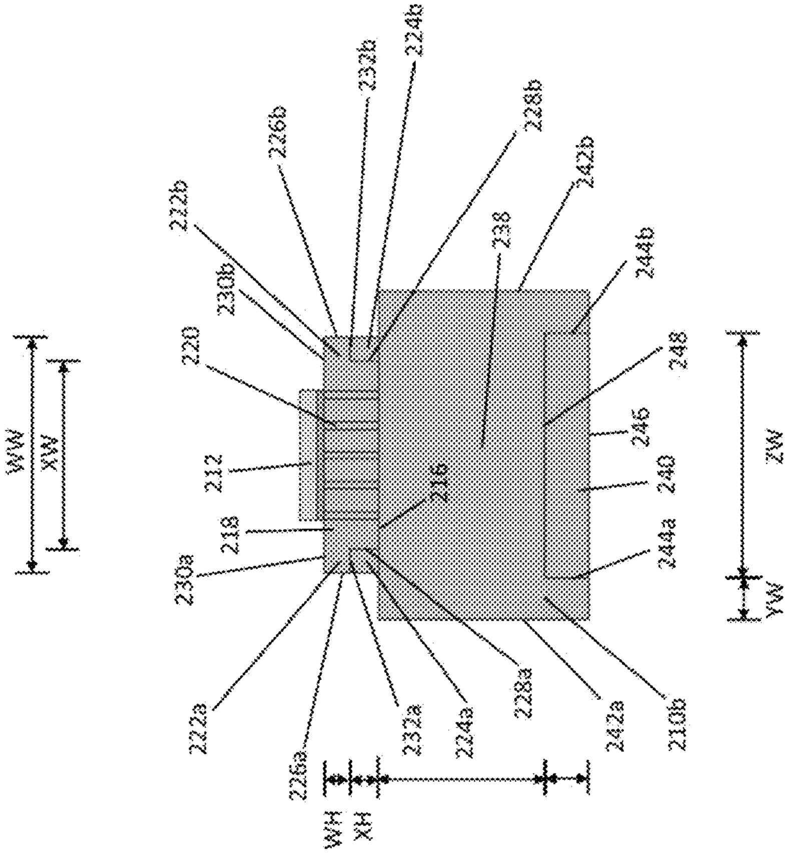
FIGS. 25*a*-25*d* illustrate a fifth example embodiment of a battery pack of the power tool system of FIG. 1 including a primary interface element and a secondary interface element.
Figure 25A:
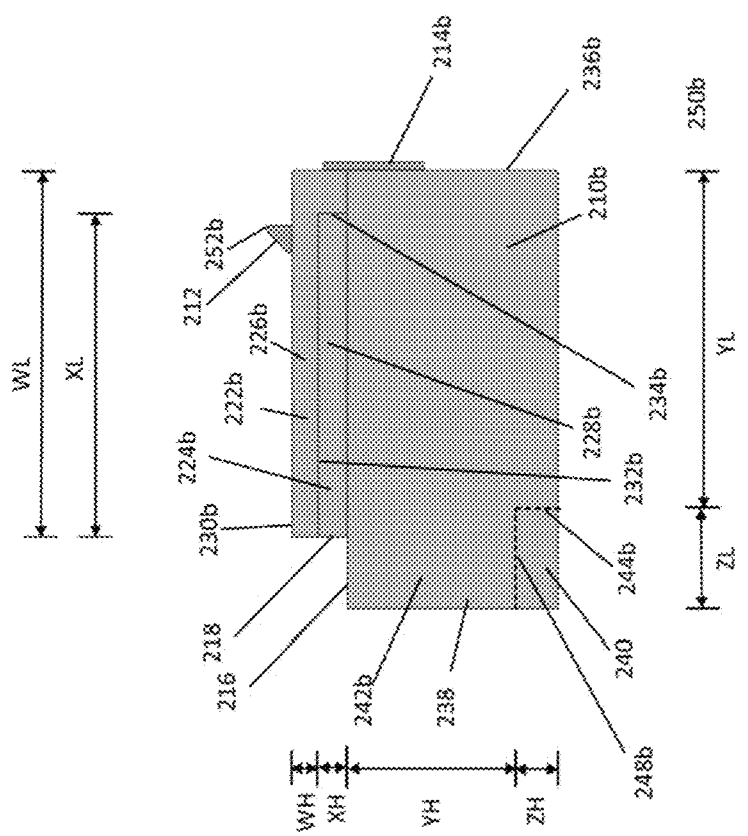
Figure 25D:
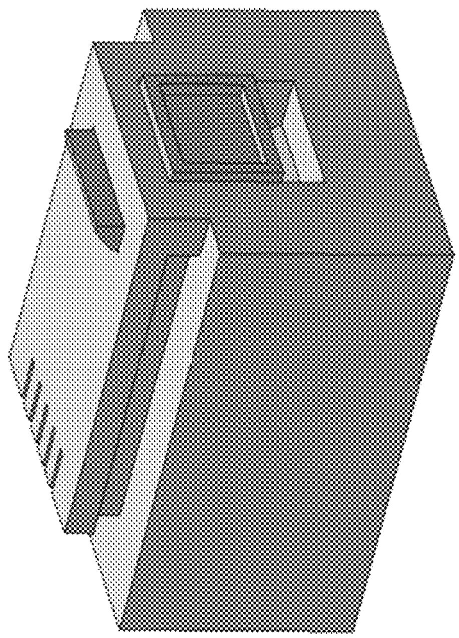
Figure 25C:
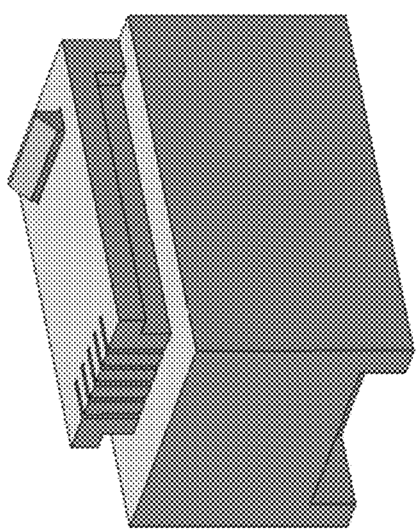

FIGS. 24*a*-24*d* illustrate a combination of the dual rail battery pack of FIGS. 20*a*-20*d* and the dual rail power tool of FIGS. 22*a*-22*d*. Referring to FIGS. 24*a*-24*d*, the dual rail interface power tool 300*b*4 is compatible with the dual rail interface battery pack 200*b*4. FIG. 24*a* illustrates a side view and FIG. 24*b* illustrates a cross-section front view taken along the line M-M of FIG. 24*a* of the combination. FIG. 24*c* illustrates a partial, cut-away isometric view and FIG. 24*d* illustrates an isometric view of the combination. In this example, the tool shroud 312*b* does not cover the entire battery pack 200*b*4 because the pack second rails 238*a*, 238*b* overlap the outside of the tool second rails 340*a*, 340*b*. The latch 212 engages with the tool catch 314, both of which are in a same relative location to each other.

As illustrated in FIGS. 24*a*-24*d*, the primary battery pack rails 222*a*, 222*b* and the secondary battery pack rails 238*a*, 238*b* are sized to fit and be received in the primary power tool grooves 322*a*, 322*b* and secondary power tool grooves 338*a*, 338*b*, respectively. The primary battery pack rails 222*a*, 222*b* and the secondary battery pack rails 238*a*, 238*b* slide within and along the primary power tool grooves 322*a*, 322*b* and the secondary power tool grooves 338*a*, 338*b*, respectively until the battery pack vertical datum plane 218 stops at the power tool vertical datum plane 318, and vice versa. Similarly, the primary power tool rails 324*a*, 324*b* and the secondary power tool rails 340*a*, 340*b* are sized to fit and be received in the primary battery pack grooves 224*a*, 224*b* and the secondary battery pack grooves 240*a*, 240*b*, respectively. The primary power tool rails 324*a*, 324*b*, 340*a* and the secondary power tool rails 340*a*, 340*b* slide within and along the primary battery pack grooves 224*a*, 224*b* and the secondary battery pack grooves 240*a*, 240*b*, respectively until the battery pack vertical datum plane 218 stops at the power tool vertical datum plane 318, and vice versa. The battery pack latch 212 engages with the power tool catch 314 to hold the battery pack 200*a*1 within the tool shroud 312. In this example, the L-shaped formed by the secondary battery pack rails 238*a*, 238*b* and the secondary battery pack grooves 240*a*, 240*b* engage the L-shaped formed by the secondary power tool rails 340*a*, 340*b* and the secondary power tool grooves 338*a*, 338*b* to interlock and secure the dual rail interface battery pack 200*b*4 to the dual rail interface power tool 300*b*4.

Referring to FIGS. 25*a*-25*d*, a fifth example embodiment of a dual rail interface battery pack 200*b*5 is illustrated. In this example, the dual rail interface battery pack 200*b*4 includes the second set of rails 238 at the front side of the battery pack housing 210*b* and a second set of grooves 240, which is formed as a notch or cut-out in the bottom, front side of the battery pack housing 210*b*. In this example, the second set of rails includes a single rail support assembly element 238 instead of a two rail elements, as in other embodiments. Similarly, the second set of grooves includes a single groove element 240. The primary rail support assembly element 238 is formed by cutting out the groove 240 in the bottom of the battery pack housing 210*b* to a depth distance indicated by the dimension ZL. The width of the second groove 240 is indicated by the dimension ZW.

Figure 26B:
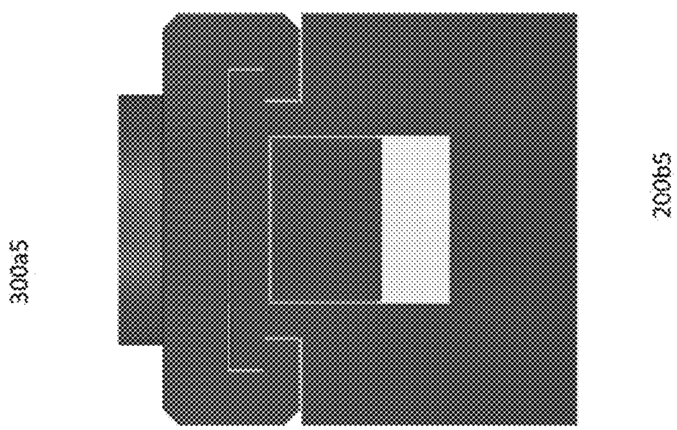
FIGS. 26*a*-26*d* illustrate a combination of the battery pack of FIGS. 25*a*-25*d* and the power tool of FIGS. 3*a*-3*d*.
Figure 26A:
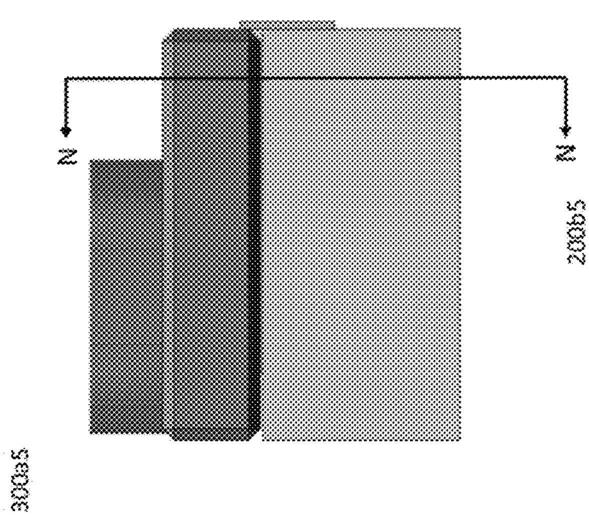
Figure 26D:
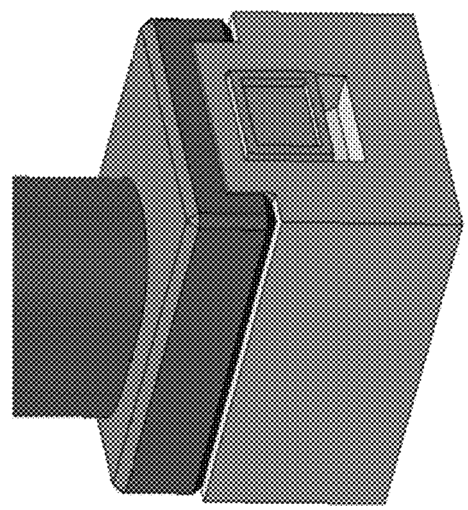
Figure 26C:
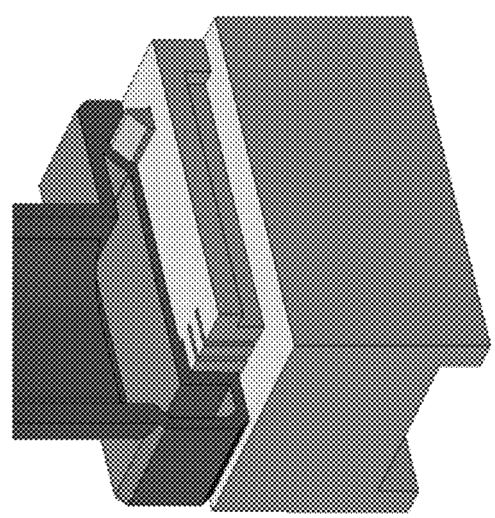
Figure 27B:
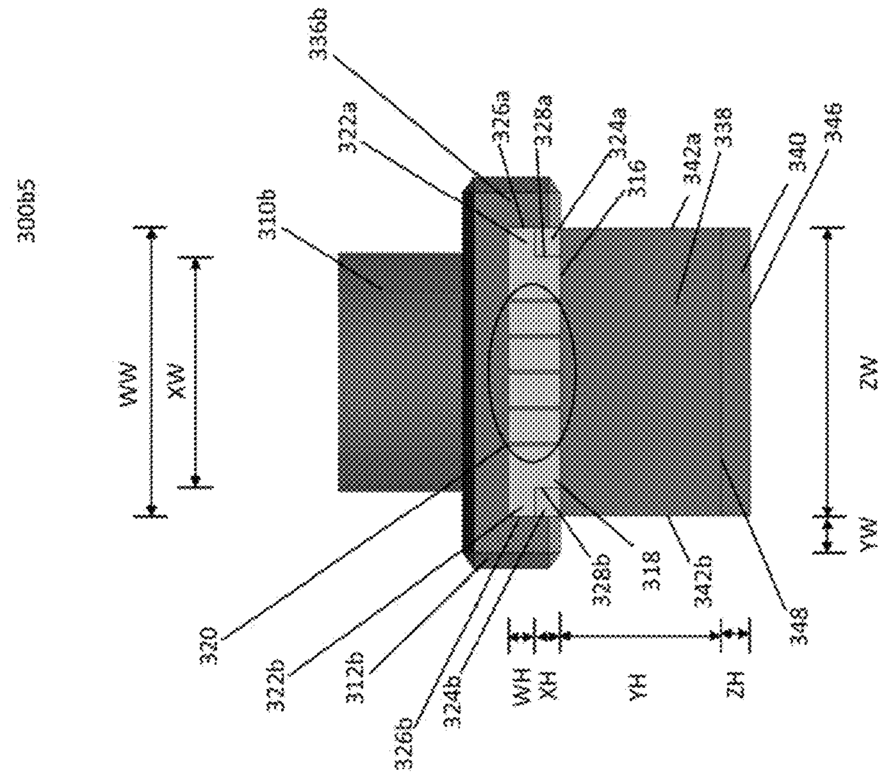
FIGS. 27*a*-27*d* illustrate a fifth example embodiment of a power tool of the power tool system of FIG. 1 including a primary interface element and a secondary interface element.
Figure 27A:
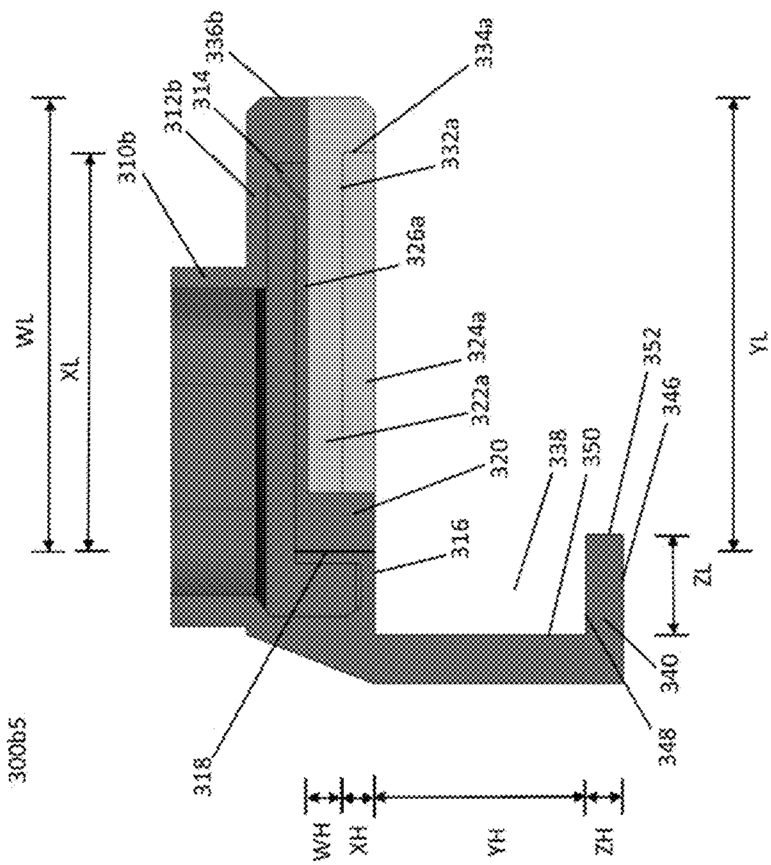
Figure 27D:
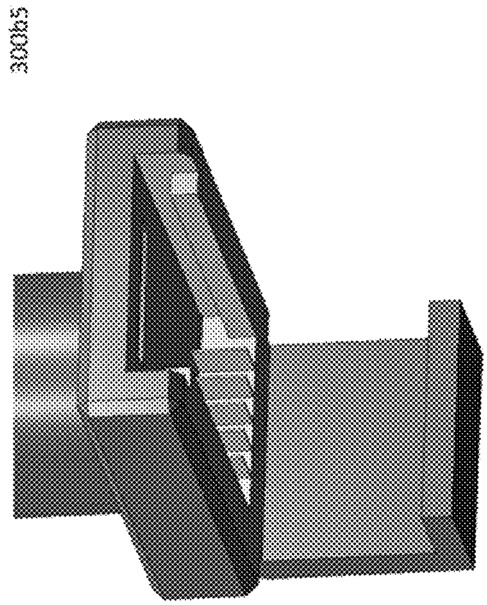
Figure 27C:
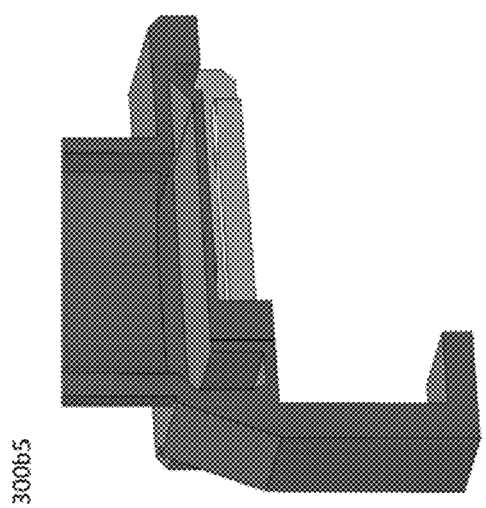

The dual rail interface battery pack 200*b*5 is compatible with a single rail interface power tool such as the single rail interface power tool 300*a*5 as illustrated in FIGS. 26*a*-26*d*. FIG. 26*a* illustrates a side view and FIG. 26*b* illustrates a cross-section front view taken along the line N-N of FIG. 26*a* of the combination. FIG. 26*c* illustrates a partial, cut-away isometric view and FIG. 26*d* illustrates an isometric view of the combination. The single rail interface power tool 300*a*5 includes the same features as described above with respect to the single rail interface power tool 300*a*1. The power tool 300*a*5 engages with the dual rail interface battery pack 200*b*5 using the first set of rails 222*a*, 222*b* and the first set of grooves 224*a*, 224*b* on the battery pack and not the second set of rails 238 and grooves 240.

FIGS. 27*a*-27*d* illustrate a fifth example embodiment of a dual rail interface power tool 300*b*5 that is compatible with both a single rail interface battery pack and a dual rail interface battery pack 200*b*5. In the example of FIGS. 27*a*-27*d*, the second set of rails 340 and the second set of grooves 338 are located exterior to and below the tool shroud 312*b*, whereas the first set of rails 324*a*, 324*b* and the first set of grooves 322*a*, 322*b* are located in the interior of the tool shroud 312*b*. The second set of rails 340 includes a single rail support assembly element 340 instead of two rail elements as in previous embodiments. Similarly, the second set of grooves includes a single groove element 338 instead of two groove elements as in the previous embodiments. The second rail element 340 is on a different plane than the first set of rails 324*a*, 324*b* and in a different orientation than the first set of rails 324*a*, 324*b*. The primary rail support assembly element 340 and the single groove element 338 forms a long L-shaped structure.

Figure 28B:
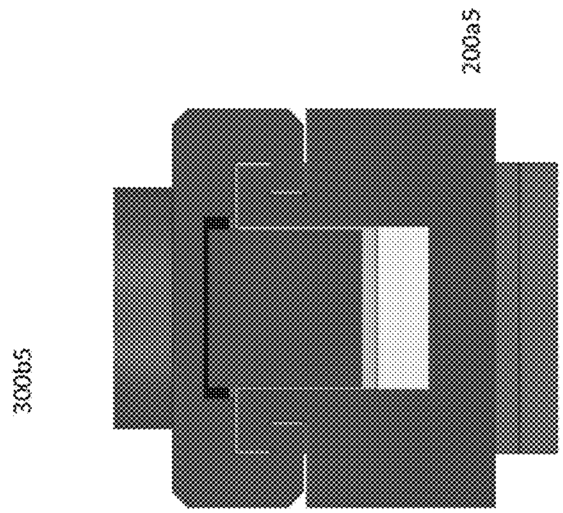
FIGS. 28*a*-28*d* illustrate a combination of the battery pack of FIGS. 2*a*-2*d* and the power tool of FIGS. 27*a*-27*d*.
Figure 28A:
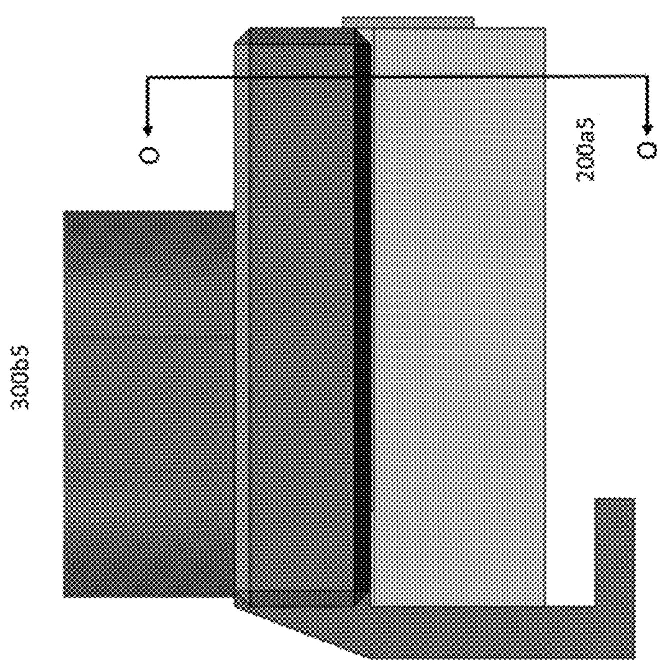
Figure 28D:
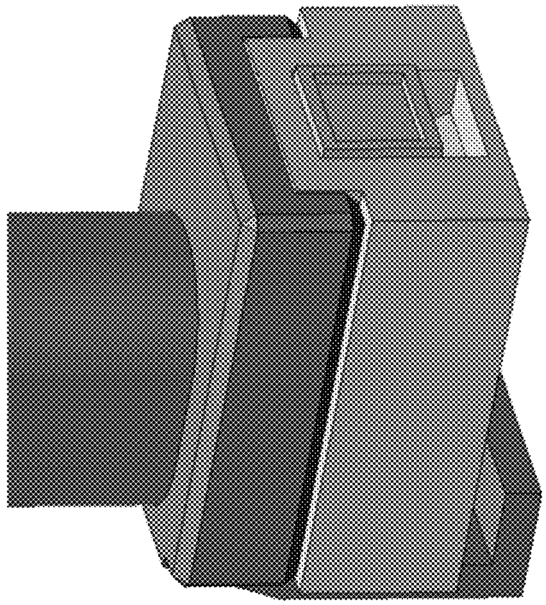
Figure 28C:
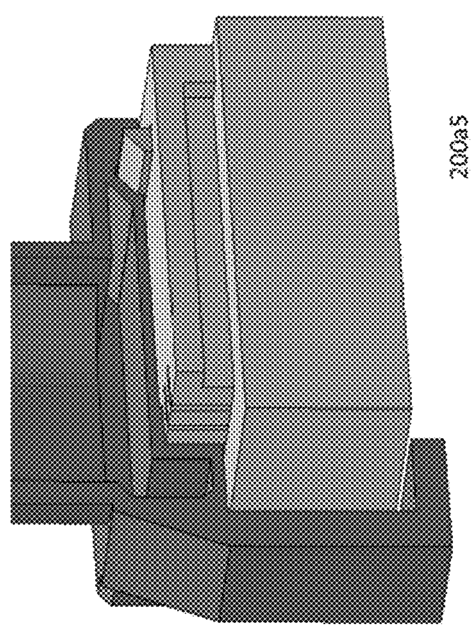

FIGS. 28*a*-28*d* illustrate a combination of the single rail battery pack of FIGS. 2*a*-2*d* and the dual rail power tool of FIGS. 27*a*-27*d*. Referring also to FIGS. 28*a*-28*d*, the dual rail interface power tool 300*b*5 is compatible with the single rail interface battery pack 200*a*5. FIG. 28*a* illustrates a side view and FIG. 28*b* illustrates a cross-section front view taken along the line O-O of FIG. 28*a* of the combination. FIG. 28*c* illustrates a partial, cut-away isometric view and FIG. 28*d* illustrates an isometric view of the combination. The latch 212 engages with the tool catch 314, both of which are in a same relative location to each other.

Figure 29B:
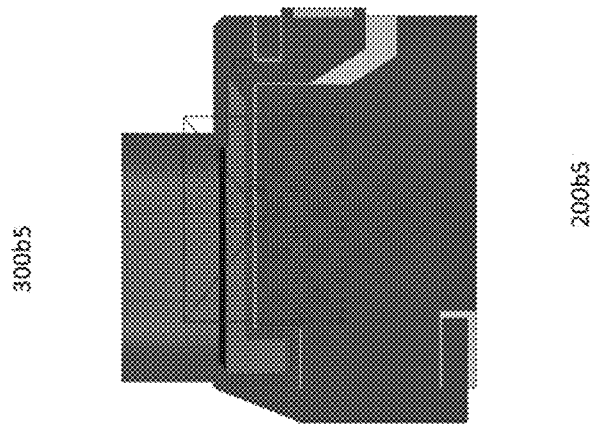
FIGS. 29*a*-29*d* illustrate a combination of the battery pack of FIGS. 25*a*-25*d* and the power tool of FIGS. 27*a*-27*d*.
Figure 29A:
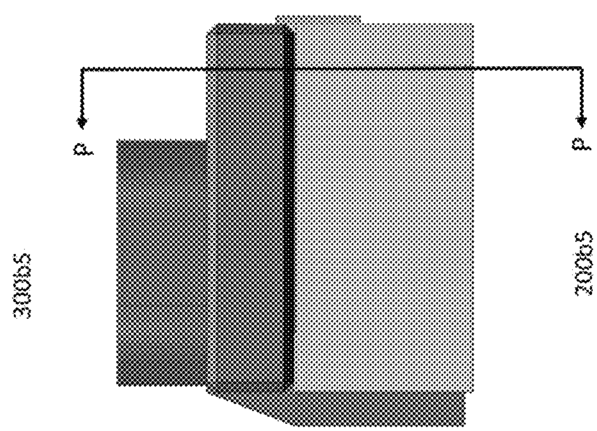
Figure 29D:
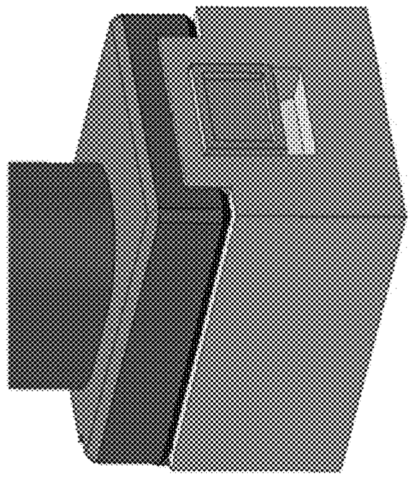
Figure 29C:
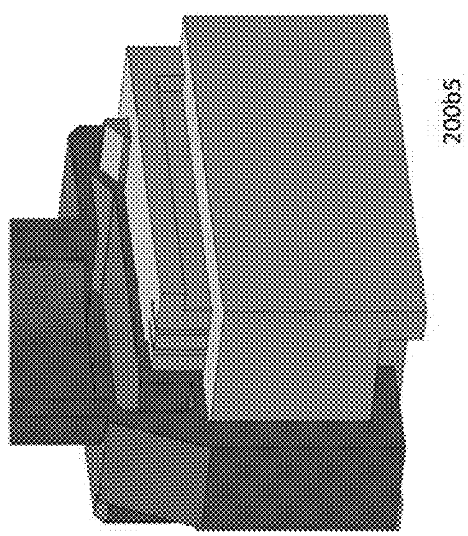
Figure 30B:
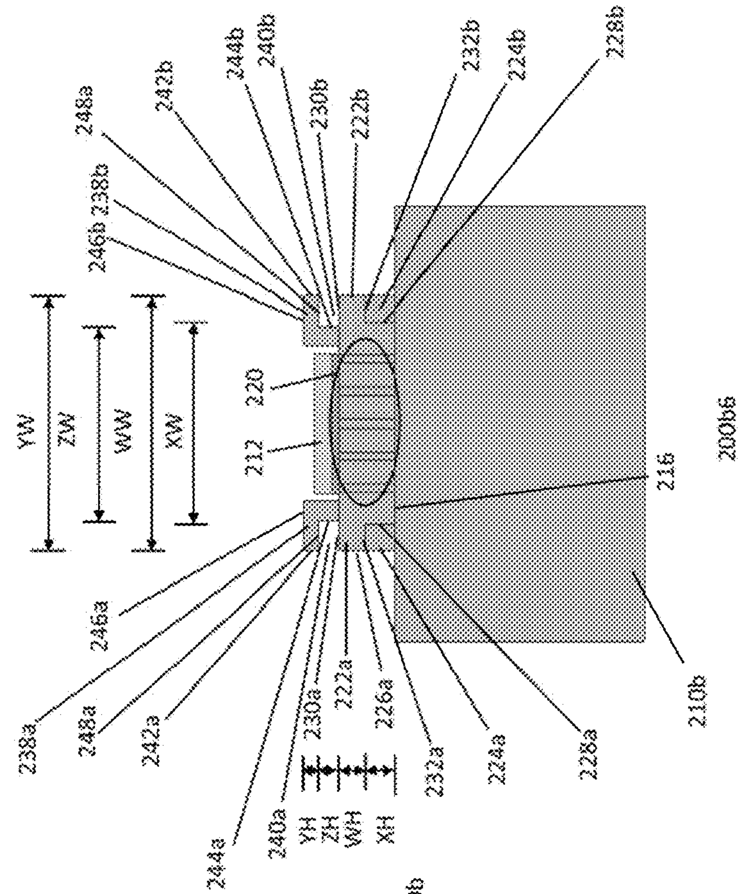
FIGS. 30*a*-30*d* illustrate a sixth example embodiment of a battery pack of the power tool system of FIG. 1 including a primary interface element and a secondary interface element.
Figure 30A:
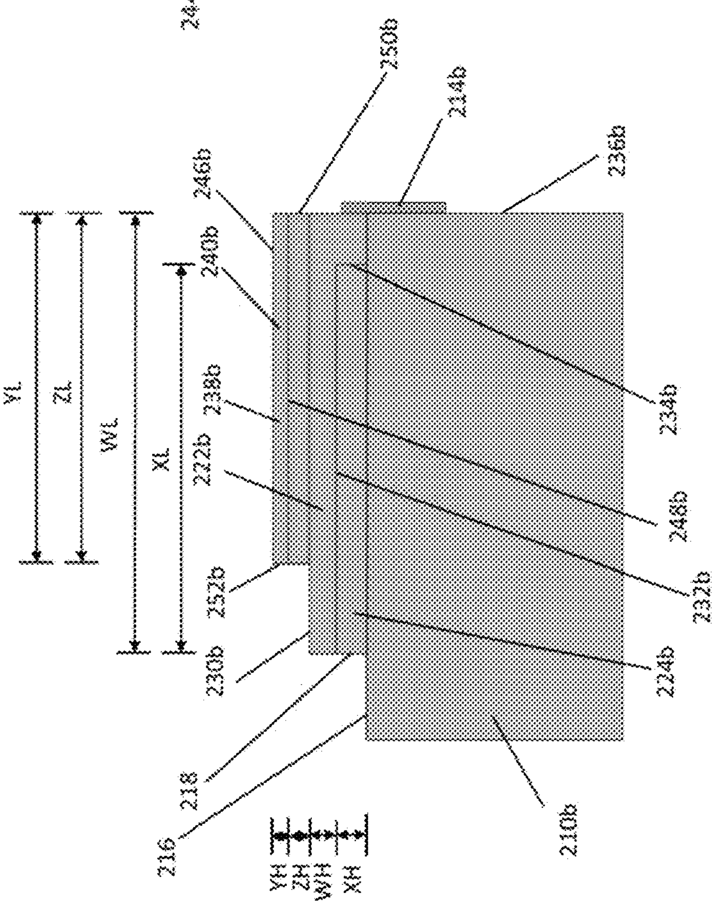
Figure 30D:
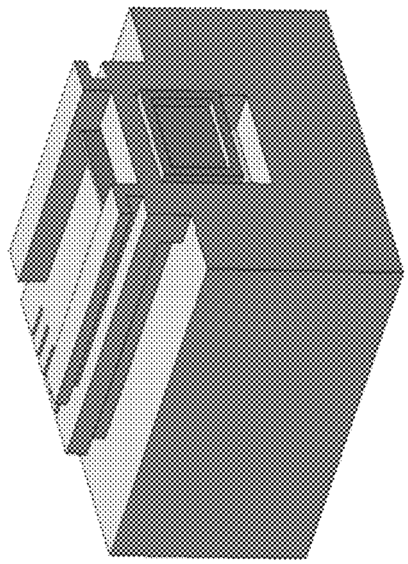
Figure 30C:
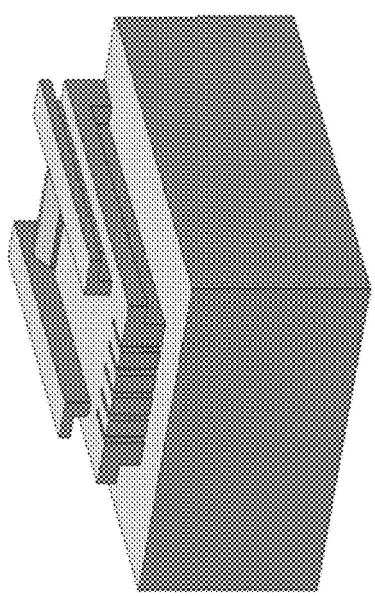
Figure 31B:
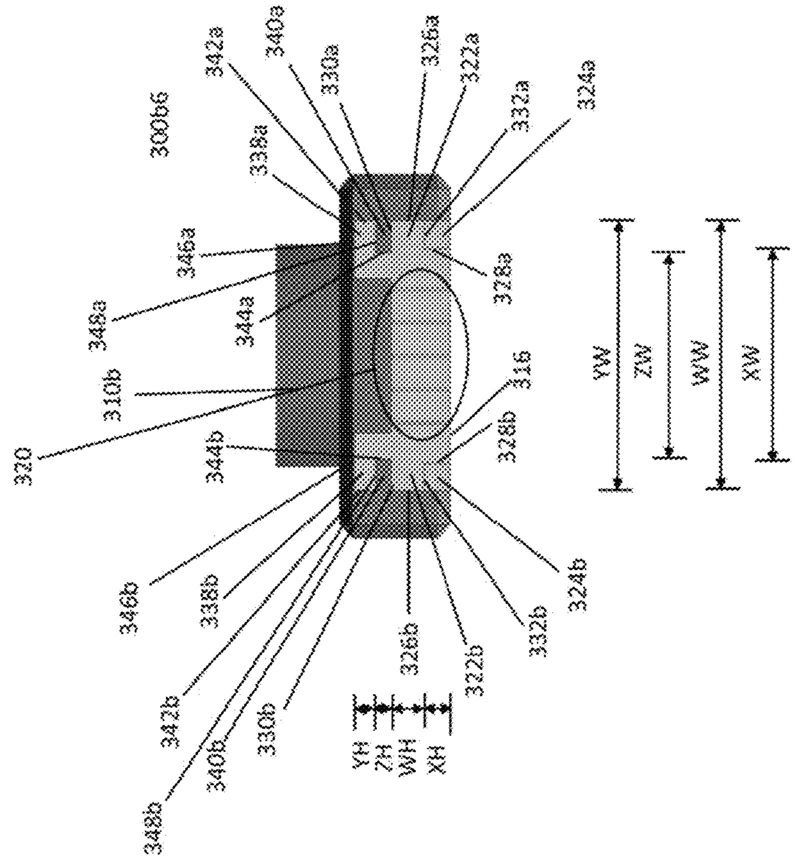
FIGS. 31*a*-31*d* illustrate a sixth example embodiment of a power tool of the power tool system of FIG. 1 including a primary interface element and a secondary interface element.
Figure 31A:
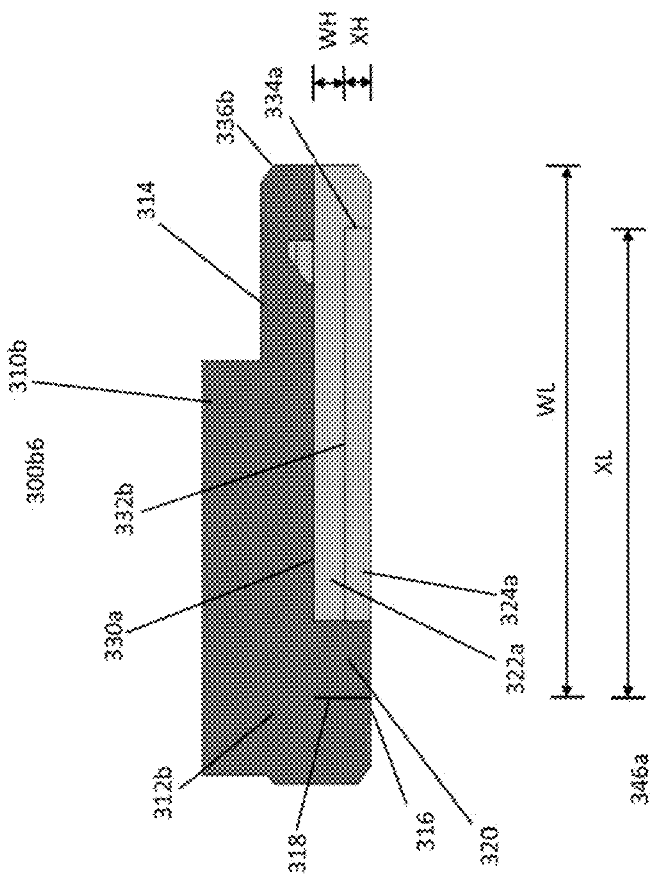
Figure 31D:
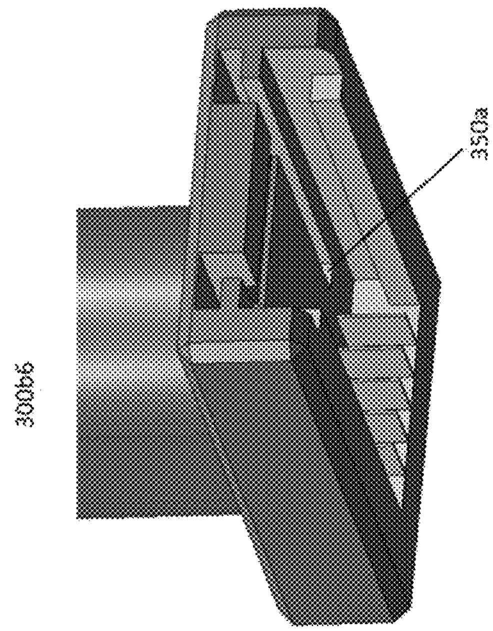
Figure 31C:
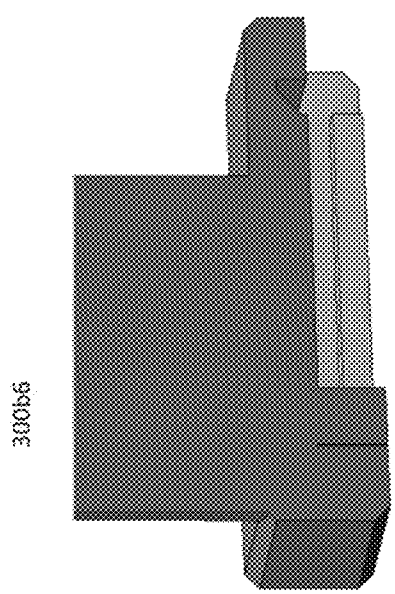

FIGS. 29*a*-29*d* illustrate a combination of the dual rail battery pack of FIGS. 25*a*-25*d* and the dual rail power tool of FIGS. 27*a*-27*d*. Referring to FIGS. 29*a*-29*d*, the dual rail interface power tool 300*b*5 is compatible with the dual rail interface battery pack 200*b*5. FIG. 29*a* illustrates a side view and FIG. 29*b* illustrates a cross-section front view taken along the line P-P of FIG. 29*a* of the combination. FIG. 29*c* illustrates a partial, cut-away isometric view and FIG. 29*d* illustrates an isometric view of the combination. In this example, the tool shroud 312*b* covers and receives the entire battery pack 200*b*5. The latch 212 engages with the tool catch 314, both of which are in a same relative location to each other.

As illustrated in FIGS. 29*a*-29*d*, the primary battery pack rails 222*a*, 222*b* and the secondary battery pack rail 238 are sized to fit in the primary power tool grooves 322*a*, 322*b* and secondary power tool groove 338, respectively. The primary battery pack rails 222*a*, 222*b* and the secondary battery pack rail 238 slide within and along the primary power tool grooves 322*a*, 322*b* and the secondary power tool groove 338, respectively until the battery pack vertical datum plane 218 stops at the power tool vertical datum plane 318, and vice versa. Similarly, the primary power tool rails 324*a*, 324*b* and the secondary power tool rail 340 are sized to fit and be received in the primary battery pack grooves 224*a*, 224*b* and the secondary battery pack groove 240, respectively. The primary power tool rails 324*a*, 324*b* and the secondary power tool rail 340 slide within and along the primary battery pack grooves 224*a*, 224*b*, and the secondary battery pack groove 240, respectively until the battery pack vertical datum plane 218 stops at the power tool vertical datum plane 318, and vice versa. The battery pack latch 212 engages with the power tool catch 314 to hold the battery pack 200*a*1 within the tool shroud 312. In this example, the L-shaped formed by the secondary tool rail 340 and the secondary tool groove 338 slides into the notch formed by the secondary battery pack rail 238 and the secondary battery pack groove 240 such that the secondary tool rail 340 provides a supporting structure in the notch of the bottom of the battery pack housing to hold and secure the battery pack 200*b*5 and the tool 300*b*5 together specifically in keeping the terminal area held tight to the tool.

Referring to FIGS. 30*a*-30*d*, a sixth embodiment of a dual rail interface battery pack 200*b*6 is illustrated. In this example, the dual rail interface battery pack 200*b*6 includes a second set of rails 238*a*, 238*b* and a second set of grooves 240*a*, 240*b* approximately directly above the first set of rails 222*a*, 222*b* and the first set of grooves 224*a*, 224*b*, on a higher plane. In other words, the second set of rails 238*a*, 238*b* and the second set of grooves 240*a*, 240*b* are farther from the datum plane 216 than the first set of rails 222*a*, 222*b* and the first set of grooves 224*a*, 224*b*, respectively. Each of the second set of rails 238*a*, 238*b* and corresponding second set of grooves 240*a*, 240*b* form an L-shape similar to the first of rails 222*a*, 222*b* and the first set of grooves 224*a*, 224*b*. The second set of rails 238*a*, 238*b* are above and define the grooves 240*a*, 240*b*, which are below the rails 238*a*, 238*b* in relation to the base surface 216. The height dimension ZH for the second set of grooves 240*a*, 240*b* is defined by the first rails top walls 230*a*, 230*b* and the second rails bottom walls 248*a*, 248*b*. In this example, the first set of rails 222*a*, 222*b* and the first set of grooves 224*a*, 224*b* remain the same as in previous embodiments. It is noted that while this example embodiment may not be compatible with the single rail interface power tool, this geometry can be useful in that this rail geometry would not allow the dual rail pack into a single rail tool of perhaps lower power or voltage that should not accept the dual rail pack, while still having a dual rail structure advantage in a dual rail tool also while allowing single rail convertible voltage packs into the dual rail tool.

FIGS. 31*a*-31*d* illustrate a sixth example embodiment of a dual rail interface power tool 300*b*6 that is compatible with both a single rail interface battery pack and a dual rail interface battery pack. In the example of FIGS. 31*a*-31*d*, the second set of rails 340*a*, 340*b* and the second set of grooves 338*a*, 338*b* are located interior to the tool shroud 312*b* along with the first set of tool rails 324*a*, 324*b* and the first set of tool grooves 322*a*, 322*b*. The second set of rails 340*a*, 340*b* are on a different plane than the first set of rails 324*a*, 324*b* located above and parallel to the first set of rails 324*a*, 324*b*. The second set of rails 340*a*, 340*b* and the second set of grooves 338*a*, 338*b* have the grooves 338*a*, 338*b* on top of the rails 340*a*, 340*b*.

Figure 32B:
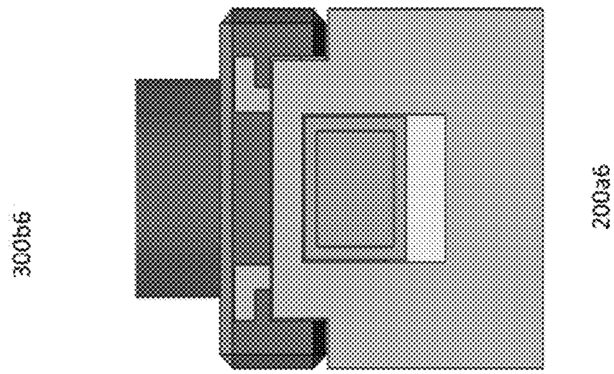
FIGS. 32*a*-32*d* illustrate a combination of the battery pack of FIGS. 2*a*-2*d* and the power tool of FIGS. 31*a*-31*d*.
Figure 32A:
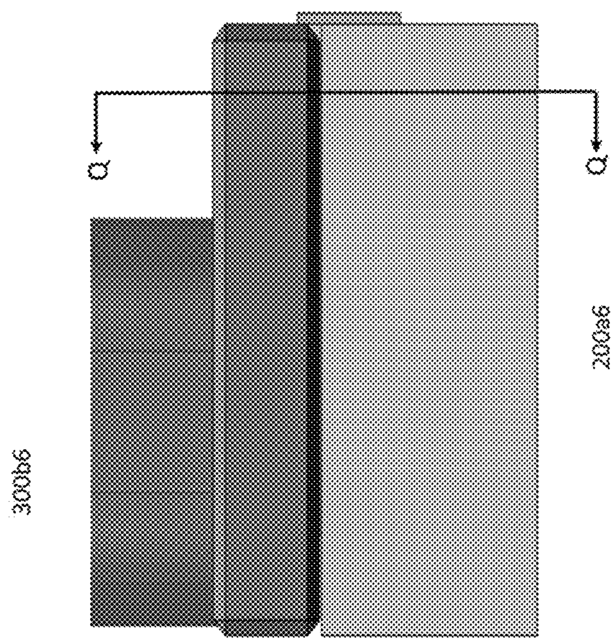
Figure 32D:
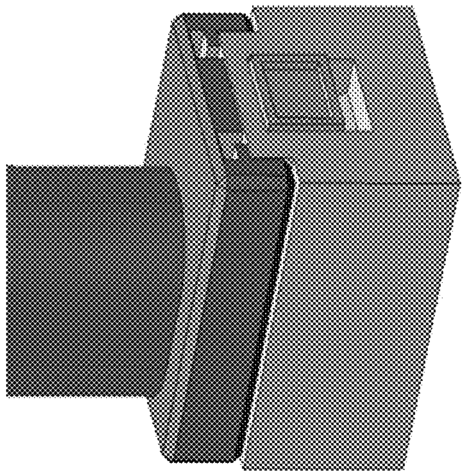
Figure 32C:
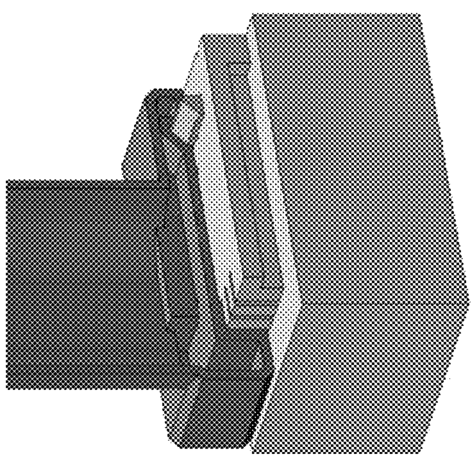

Referring also to FIGS. 32*a*-32*d*, the dual rail interface power tool 300*b*6 is compatible with the single rail interface battery pack 200*a*6. FIG. 32*a* illustrates a side view and FIG. 32*b* illustrates a cross-section front view taken along the line Q-Q of FIG. 32*a* of the combination. FIG. 32*c* illustrates a partial, cut-away isometric view and FIG. 32*d* illustrates an isometric view of the combination.

Figure 33A:
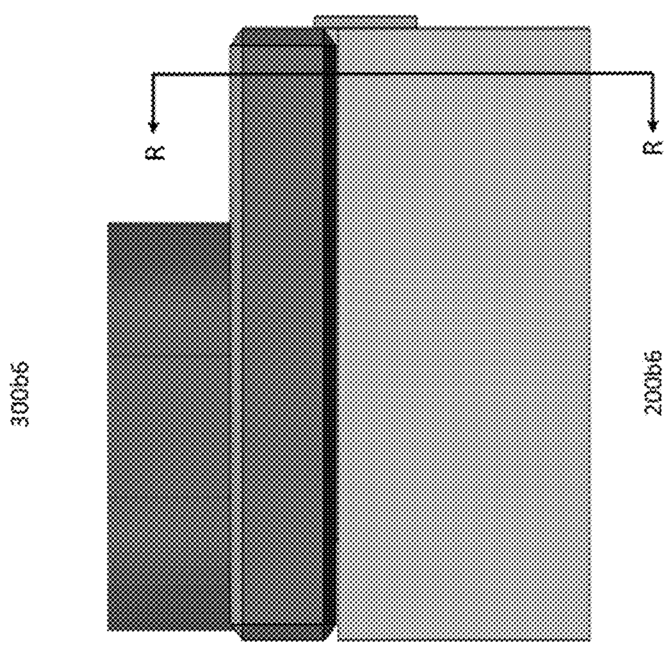
FIGS. 33*a*-33*d* illustrate a combination of the battery pack of FIGS. 30*a*-30*d* and the power tool of FIGS. 31*a*-31*d*.
Figure 33B:
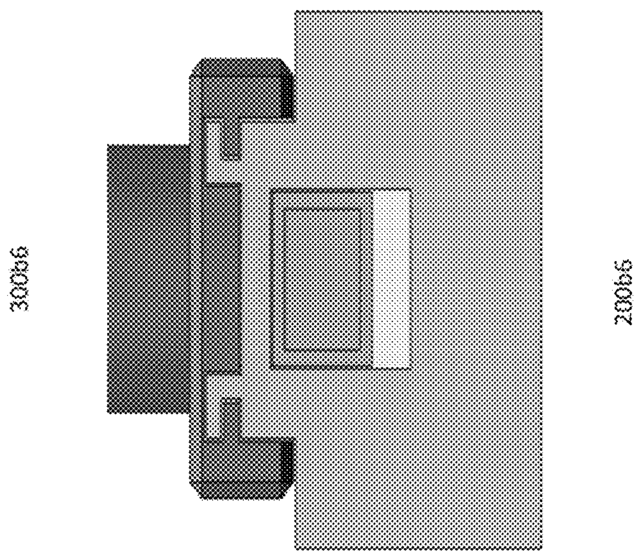
Figure 33D:
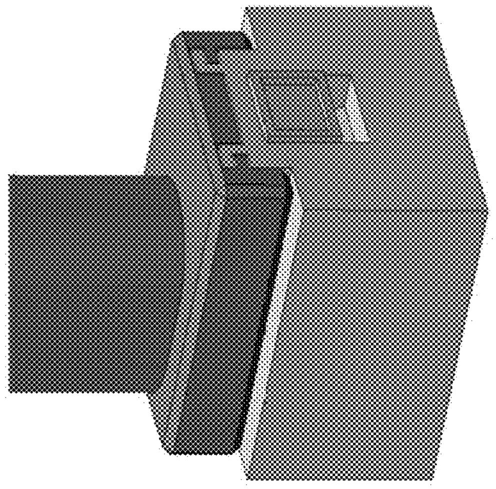
Figure 33C:
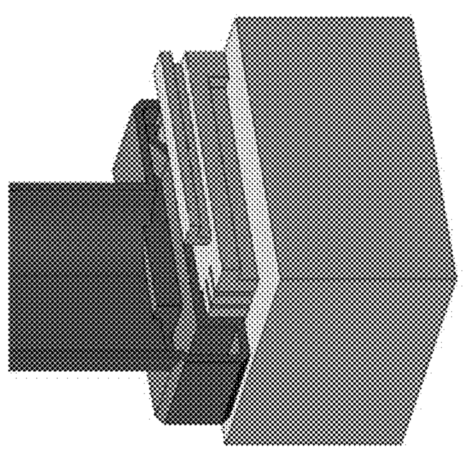

Referring to FIGS. 33*a*-33*d*, the dual rail interface power tool 300*b*6 is compatible with the dual rail interface battery pack 200*b*6. FIG. 33*a* illustrates a side view and FIG. 33*b* illustrates a cross-section front view taken along the line R-R of FIG. 33*a* of the combination. FIG. 33*c* illustrates a partial, cut-away isometric view and FIG. 33*d* illustrates an isometric view of the combination. In this example, the tool shroud 312*b* does not cover the entire battery pack 200*b*6 because the battery pack 200*b*6 may be wider than the tool shroud 312*b*. The latch 212 engages with the tool catch 314, both of which are in a same relative location to each other.

As illustrated in FIGS. 33*a*-33*d*, the primary battery pack rails 222*a*, 222*b* and the secondary battery pack rails 238*a*, 238*b* are sized to fit and be received in the primary power tool grooves 322*a*, 322*b* and the secondary power tool grooves 338*a*, 338*b*, respectively. The primary battery pack rails 222*a*, 222*b* and the secondary battery pack rails 238*a*, 238*b* slide within and along the primary power tool grooves 322*a*, 322*b* and the secondary power tool grooves 338*a*, 338*b*, respectively until the battery pack vertical datum plane 218 stops at the power tool vertical datum plane 318, and vice versa. Similarly, the primary power tool rails 324*a*, 324*b* and the secondary power tool rails 340*a*, 340*b* are sized to fit and be received in the primary battery pack grooves 224_a_, 224_b_ and the secondary battery pack grooves 240_a_, 240_b_, respectively. The primary power tool rails 324_a_, 324_b_ and the secondary power tool rails 340_a_, 340_b_ slide within and along the primary battery pack grooves 224_a_, 224_b_ and the secondary battery pack grooves 240_a_, 240_b_, respectively until the battery pack vertical datum plane 218 stops at the power tool vertical datum plane 318, and vice versa. The battery pack latch 212 engages with the power tool catch 314 to hold the battery pack 200_a_1 within the tool shroud 312. In this example, the elevated battery pack second rails 238_a_, 238_b_ and battery pack second grooves 240_a_, 240_b_ engage the elevated tool second rails 340_a_, 340_b_ and the tool second grooves 338_a_, 338_b_ to interlock and secure the dual rail interface battery pack 200_b_6 to the dual rail interface power tool 300_b_6.

Figure 34A:
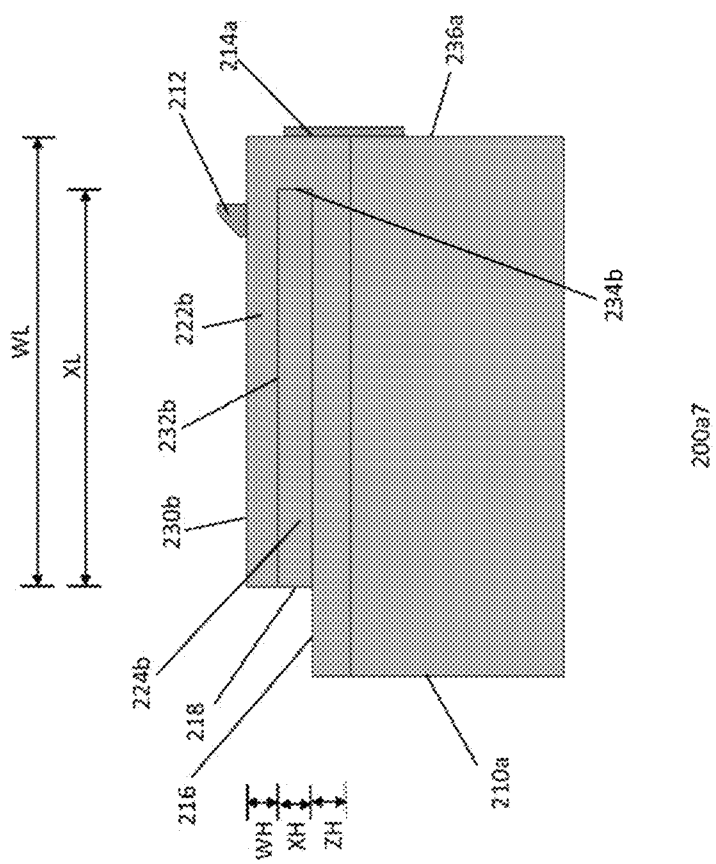
FIGS. 34*a*-34*b* and FIGS. 35*a*-35*b* illustrate a second example embodiment of a battery pack of the power tool system of FIG. 1 including only a primary interface element.
Figure 34B:
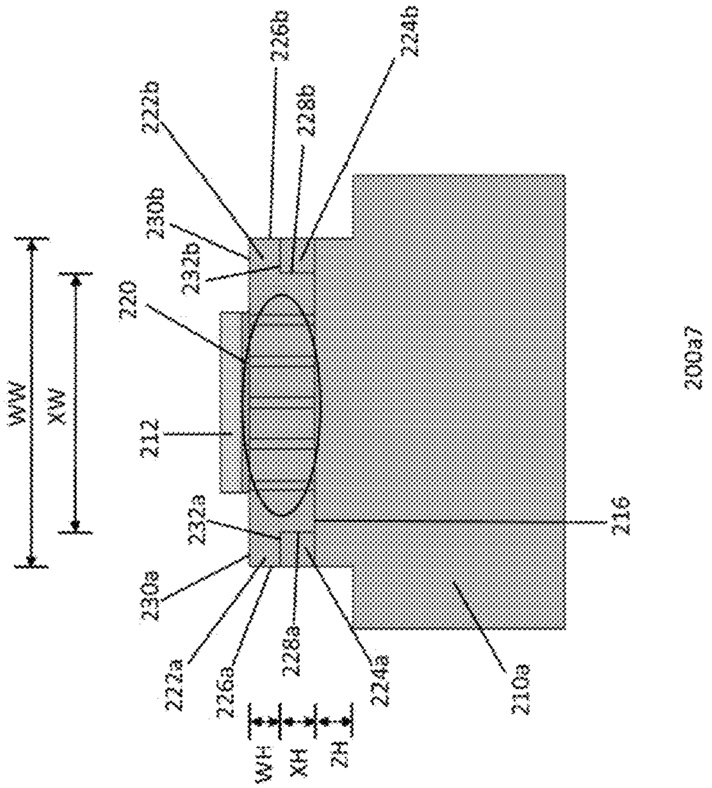
Figure 35B:
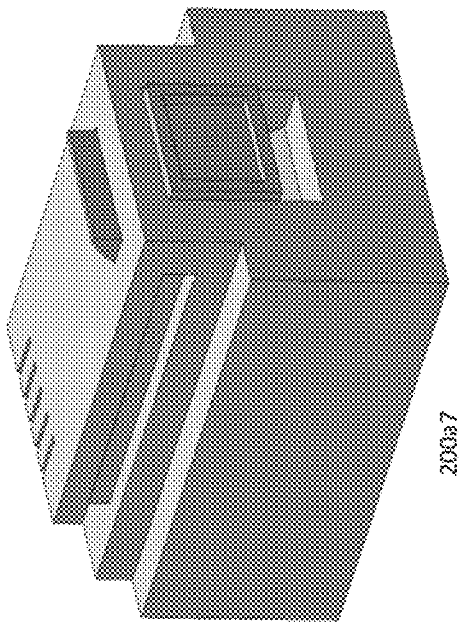
Figure 35A:
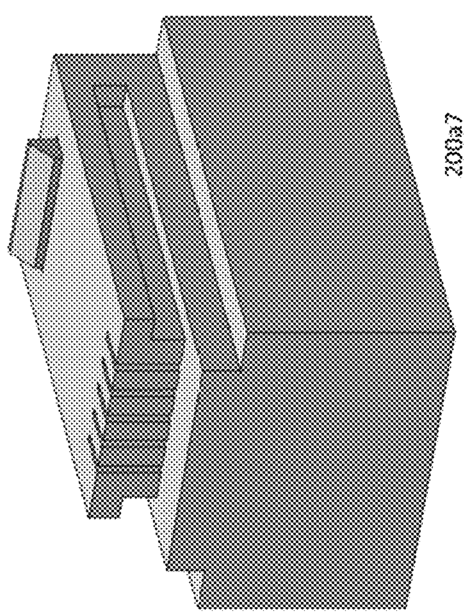
Figure 36B:
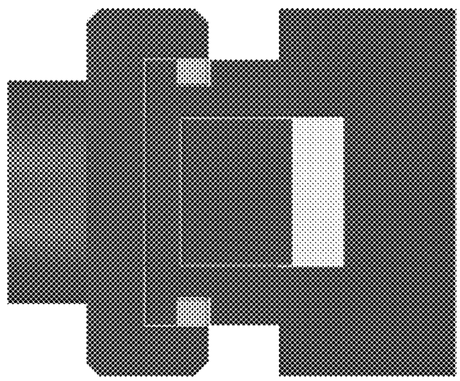
FIGS. 36*a*-36*d* illustrate a combination of the battery pack of FIGS. 34*a*-34*b* and FIGS. 35*a*-35*b* and the power tool of FIGS. 3*a*-3*d*.
Figure 36A:
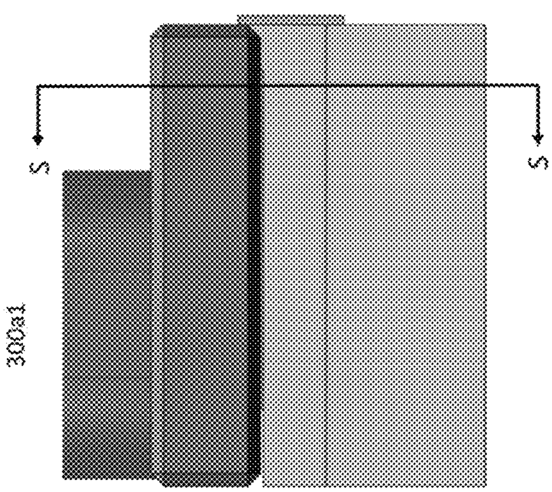
Figure 36D:
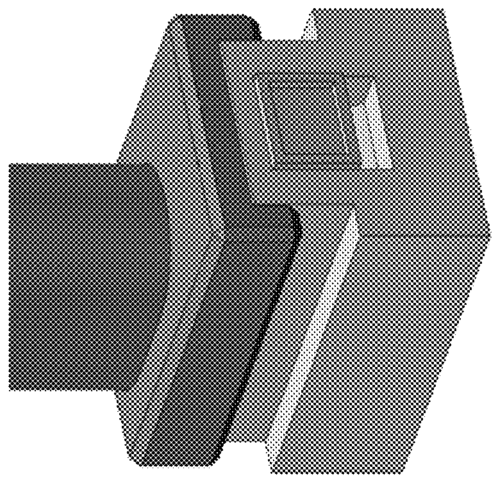
Figure 36C:
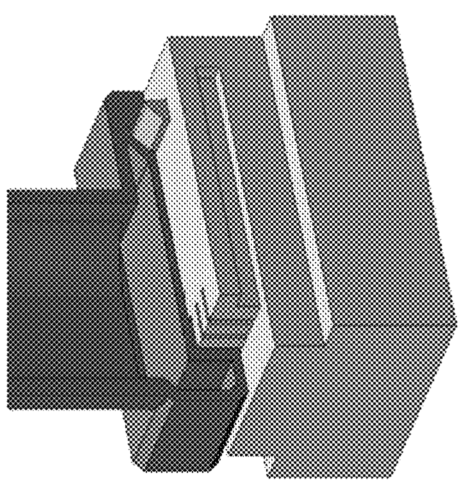
Figure 37B:
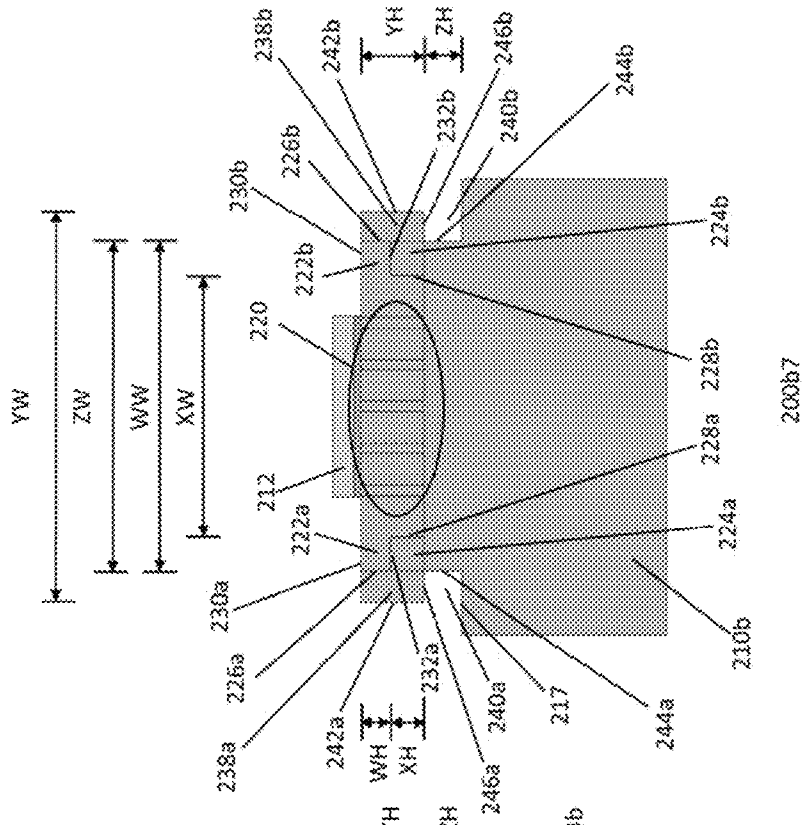
FIGS. 37*a*-37*d* illustrate a seventh example embodiment of a battery pack of the power tool system of FIG. 1 including a primary and a secondary interface.
Figure 37A:
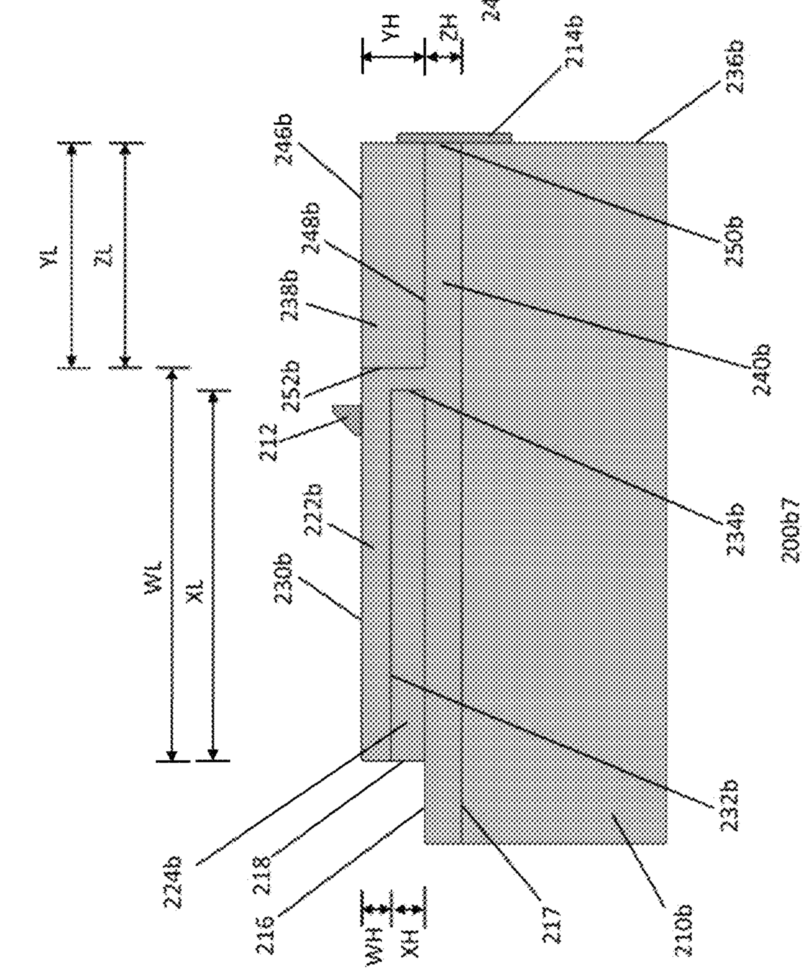
Figure 37D:
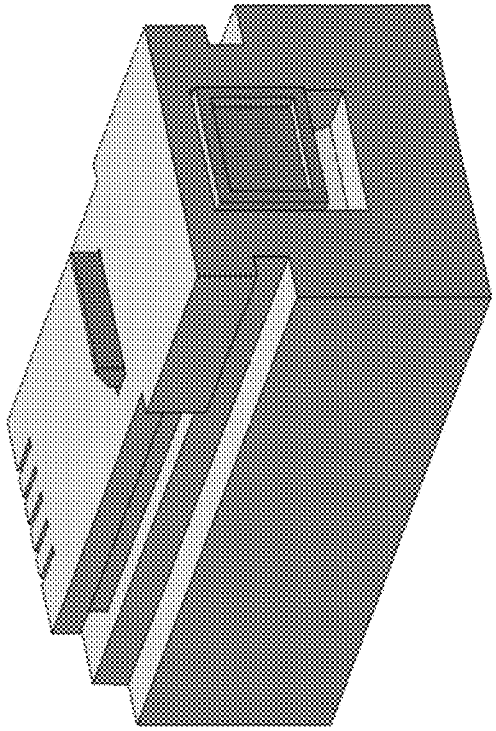
Figure 37C:
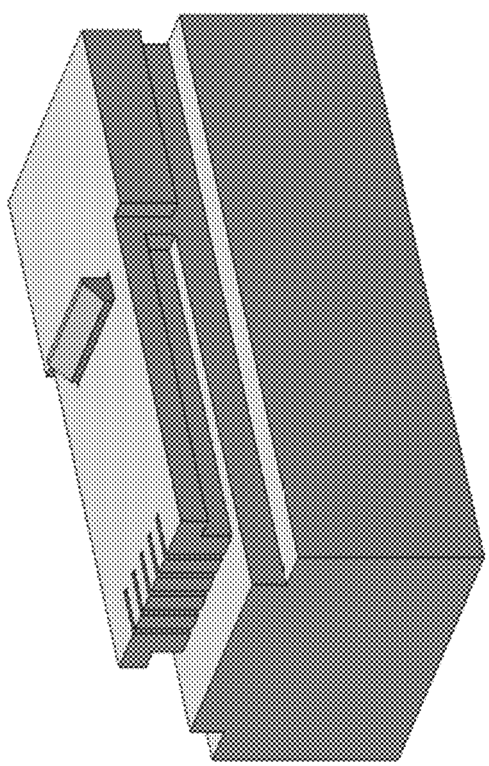
Figure 38B:
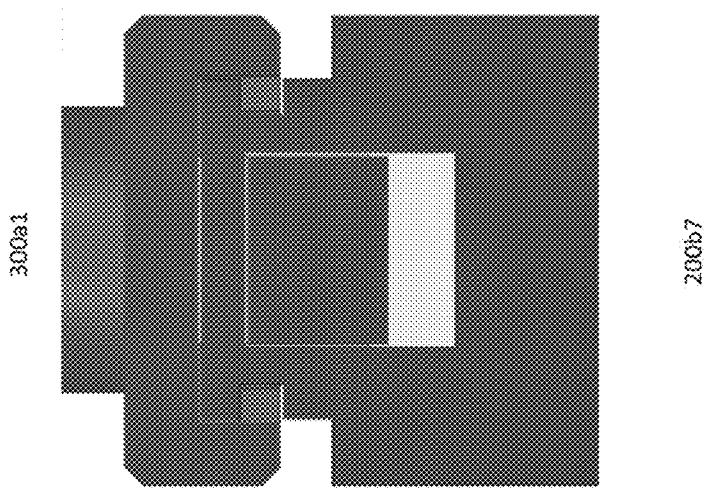
FIGS. 38*a*-38*d* illustrate a combination of the battery pack of FIGS. 37*a*-37*d* and the power tool of FIGS. 3*a*-3*d*.
Figure 38A:
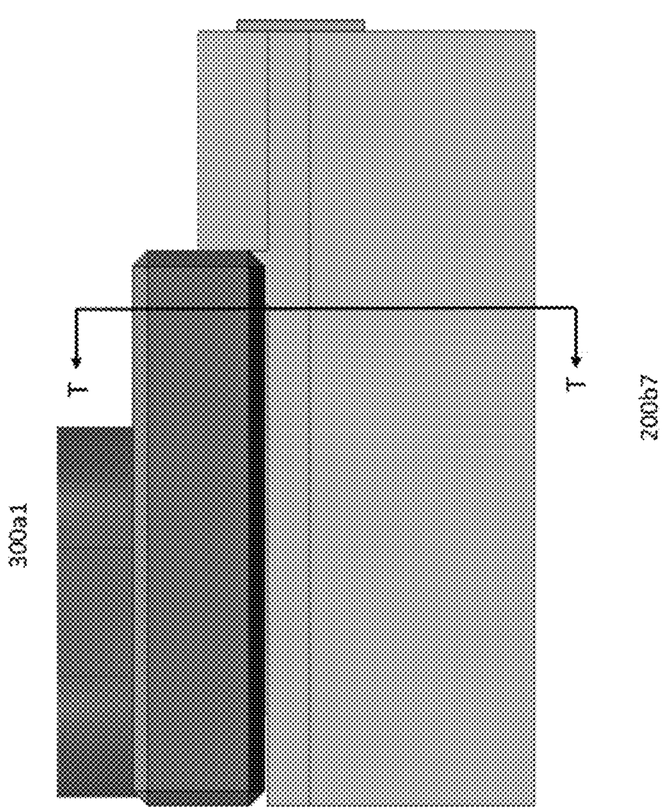
Figure 38D:
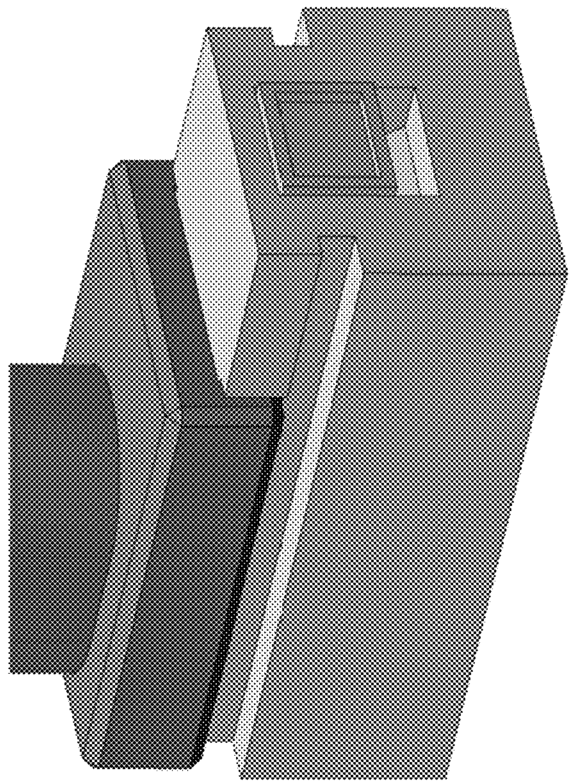
Figure 38C:
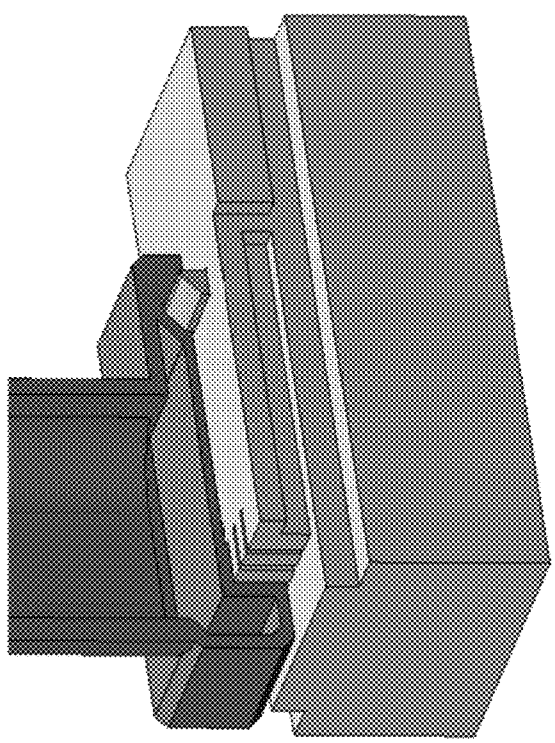
Figure 39B:
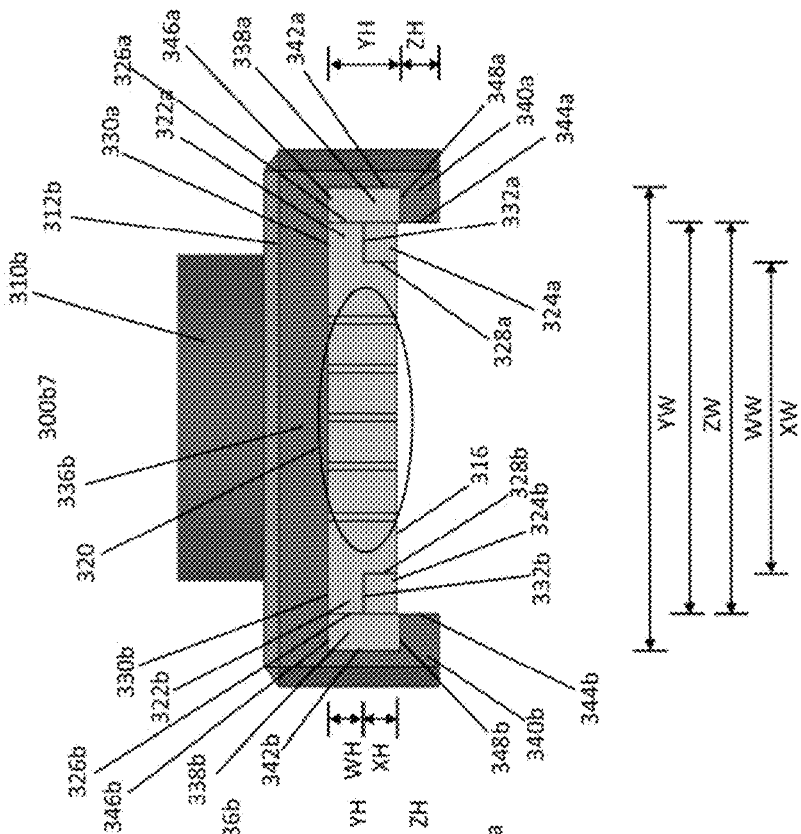
FIGS. 39*a*-39*d* illustrate a seventh example embodiment of a power tool of the power tool system of FIG. 1 including a primary interface element and a secondary interface element.
Figure 39A:
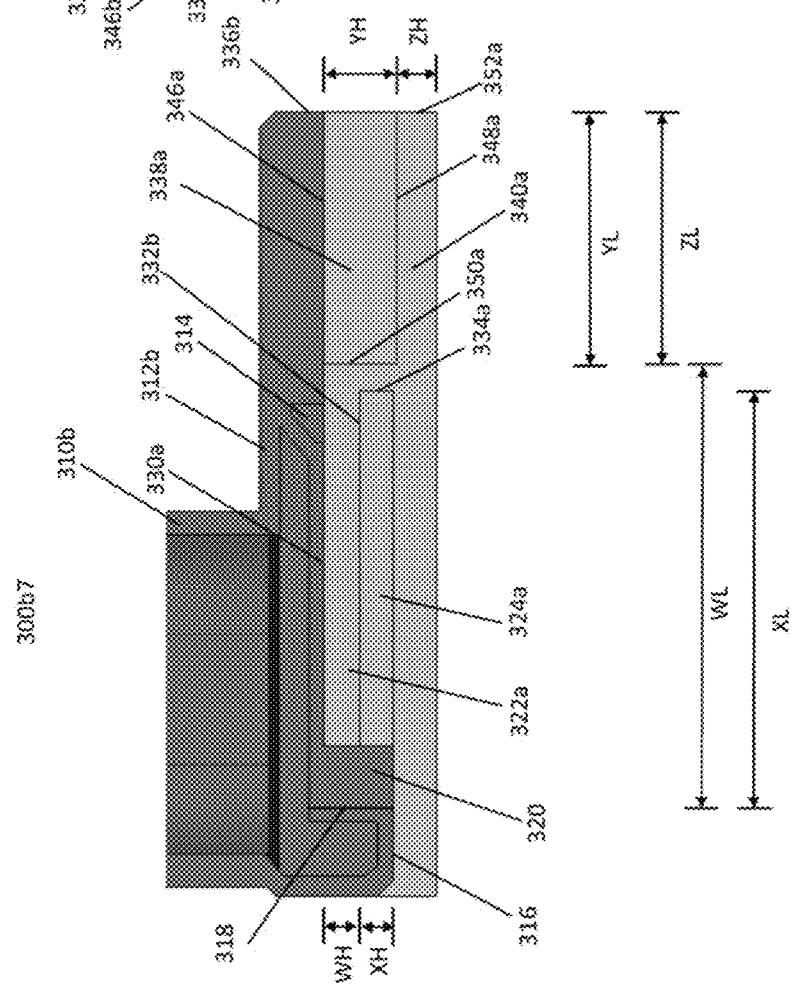
Figure 39D:
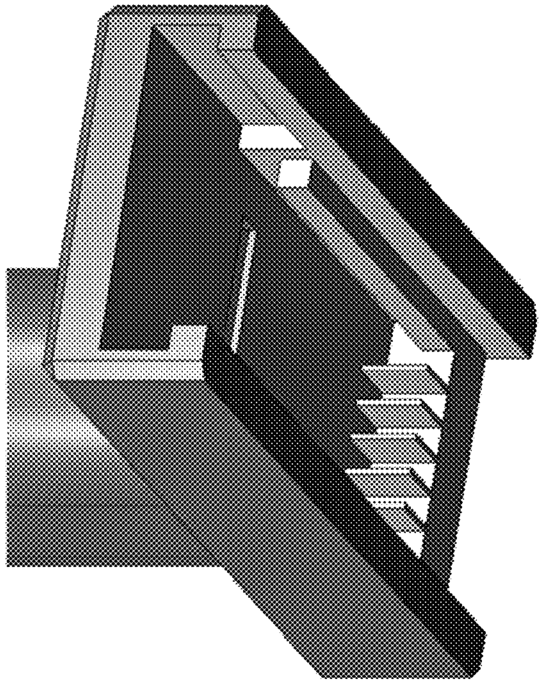
Figure 39C:
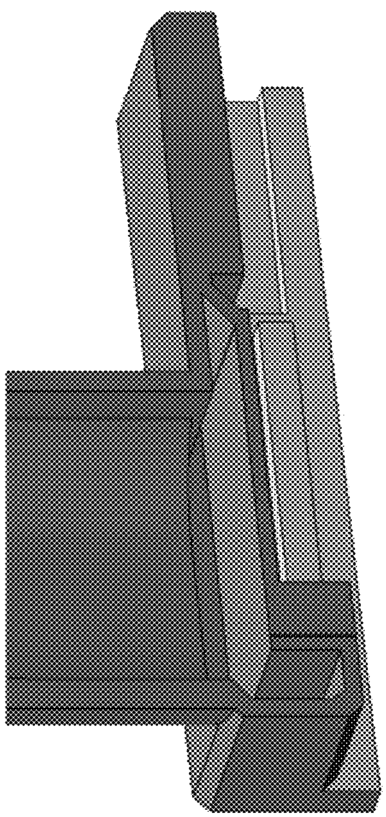
Figure 40B:
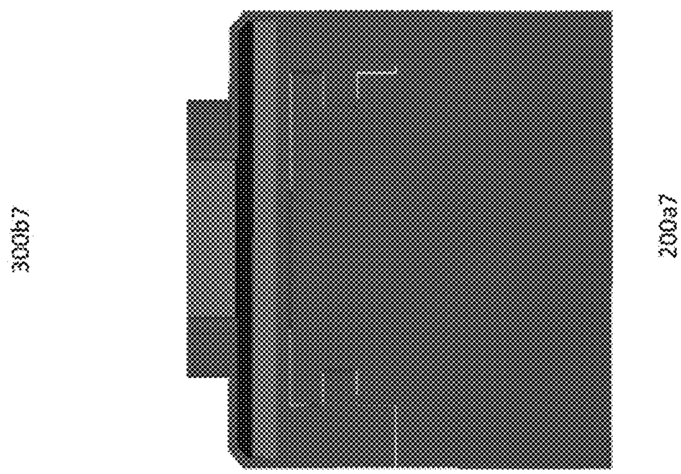
FIGS. 40*a*-40*d* illustrate a combination of the battery pack of FIGS. 34*a*-34*b* and FIGS. 35*a*-35*b* and the power tool of FIGS. 39*a*-39*d*.
Figure 40A:
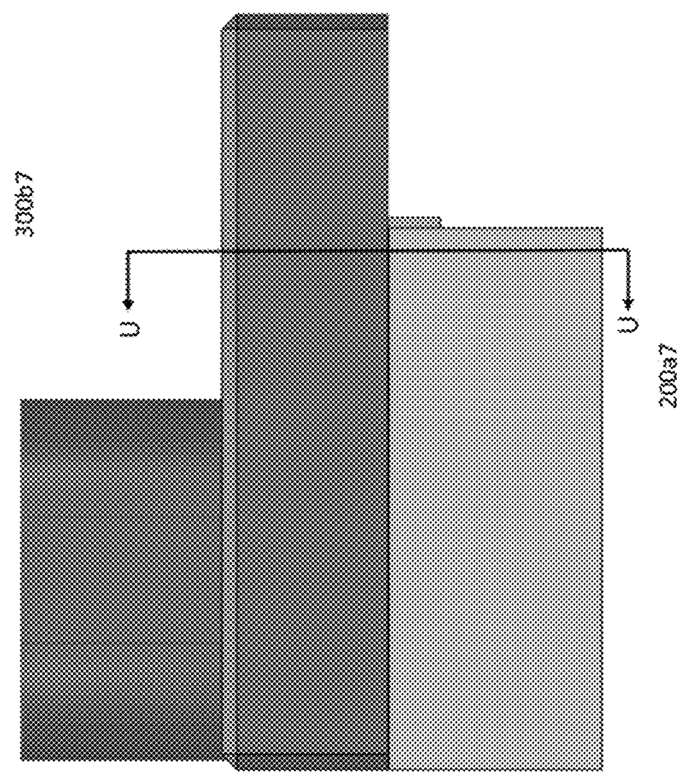
Figure 40D:
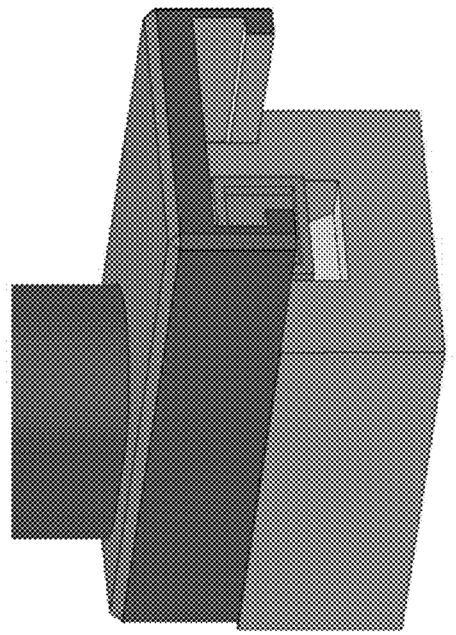
Figure 40C:
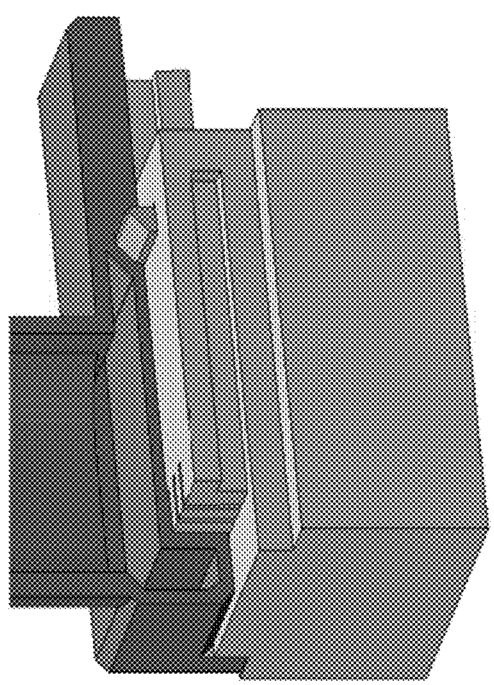

Referring to FIGS. 34_a_-34_b_ and FIGS. 35_a_-35_b_, a seventh embodiment illustrates a single rail interface battery pack 200_a_7. In this example, the single rail interface battery pack 200_a_7 differs from the first embodiment single rail interface battery pack 200_a_1 in that the base surface 216 is raised in the battery pack 200_a_7 providing for a taller, single rail interface when compared to the battery pack 200_a_1. The pack rails 222_a_, 222_b_ and pack grooves 224_a_, 224_b_ are offset from the base surface 216 by a distance XH.

Referring to FIGS. 36_a_-36_d_, the single rail interface battery pack 200_a_7 is coupled with the single rail interface power tool 300_a_1 of FIGS. 3_a_-3_d_. FIG. 36_a_ illustrates a side view and FIG. 36_b_ illustrates a cross-section front view taken along the line S-S of FIG. 36_a_ of the combination. FIG. 36_c_ illustrates a partial, cut-away isometric view and FIG. 36_d_ illustrates an isometric view of the combination. The pack rails 222_a_, 222_b_ and pack grooves 224_a_, 224_b_ align with, slide along and engage the tool rails 324_a_, 324_b_ and tool grooves 322_a_, 322_b_ because the single rail interface on the battery pack 200_a_7 and the single rail interface on the power tool 300_a_1 are both offset by the same distance ZH.

Referring to FIGS. 37_a_-37_d_, a seventh embodiment of a dual rail interface battery pack 200_b_7 is illustrated. In this example, the dual rail interface battery pack 200_b_7 is the same as the dual rail interface battery pack 200_b_1 of FIGS. 5_a_-5_d_, except that the first rails 222_a_, 222_b_ are a distance XH from the base surface 216 equal to a height dimension of the first grooves 224_a_, 224_b_ and the second rails 238_a_, 238_b_ are a distance ZH from a second base surface 217 equal to a height dimension of the second grooves 240_a_, 240_b_. Furthermore, the first set of rails 222_a_, 222_b_ have a height dimension WH and the second set of rails 238_a_, 238_b_ have a height dimension YH, wherein YH is greater than WH. Still further, the second set of grooves 240_a_, 240_b_ extend below the base surface 216, while the first set of grooves 224_a_, 224_b_ extend above the base surface 216. The primary battery pack rails 222_a_, 222_b_ have a first height WH. The secondary battery pack rails 238_a_, 238_b_ have a second height YH. The first height WH is less than the second height YH. The primary battery pack rails 222_a_, 222_b_ have exterior sidewalls 226_a_, 226_b_, respectively. The primary battery pack rail sidewall 226_a_, 226_b_ are approximately, generally parallel to each other. The primary battery pack rail sidewalls 226_a_, 226_b_ have a first width of WW. The secondary battery pack rails 238_a_, 238_b_ have exterior sidewalls 242_a_, 242_b_, respectively. The secondary battery pack rail sidewalls 242_a_, 242_b_ are approximately parallel to each other and to the primary battery pack rail sidewalls 226_a_, 226_b_. The secondary battery pack rail sidewalls 242_a_, 242_b_ have a second width YW. The first width WW is less than the second width YW. The primary battery pack rails 222_a_, 222_b_ are positioned above the datum plane 216 approximately by a distance equal to the primary battery pack grooves 224_a_, 224_b_ at a distance XH. The secondary battery pack rails 238_a_, 238_b_ are positioned above the datum plane 216 by a distance less than the distance XH. The primary battery pack rails 222_a_, 222_b_ are positioned closer to a front (forward) side of the battery pack housing 210_b_ than the secondary battery pack rails 238_a_, 238_b_. The secondary battery pack rails 238_a_, 238_b_ are positioned closed to a rear (rearward) side of the battery pack housing 210_b_ than the primary battery pack rails 222_a_, 222_b_.

The dual rail interface battery pack 200_b_7 is compatible with a single rail interface power tool such as the single rail interface power tool 300_a_1 as illustrated in FIGS. 38_a_-38_d_. FIG. 38_a_ illustrates a side view and FIG. 38_b_ illustrates a cross-section front view taken along the line T-T of FIG. 38_a_ of the combination. FIG. 38_c_ illustrates a partial, cut-away isometric view and FIG. 38_d_ illustrates an isometric view of the combination. The single rail interface power tool 300_a_1 includes the same features as described above with respect to the single rail interface power tool 300_a_1. The power tool 300_a_1 engages with the dual rail interface battery pack 200_b_7 using the first set of rails 222_a_, 222_b_ and the first set of grooves 224_a_, 224_b_ on the battery pack and not the second set of rails and grooves.

FIGS. 39_a_-39_d_ illustrate a seventh example embodiment of a dual rail interface power tool 300_b_7 that is compatible with both a single rail interface battery pack and a dual rail interface battery pack. In the example of FIGS. 39_a_-39_d_, the second set of rails 340_a_, 340_b_ and the second set of grooves 338_a_, 338_b_ are located the same as the dual rail interface power tool 300_b_1 of FIGS. 7_a_-7_d_ except with the additional height offset ZH for the tool shroud 312_b_.

Referring also to FIGS. 40_a_-40_d_, the dual rail interface power tool 300_b_7 is compatible with the single rail interface battery pack 200_a_7 of FIGS. 34_a_-34_b_ and FIGS. 35_a_-35_b_. FIG. 40_a_ illustrates a side view and FIG. 40_b_ illustrates a cross-section front view taken along the line U-U of FIG. 40_a_ of the combination. FIG. 40_c_ illustrates a partial, cut-away isometric view and FIG. 40_d_ illustrates an isometric view of the combination.

Figure 41B:
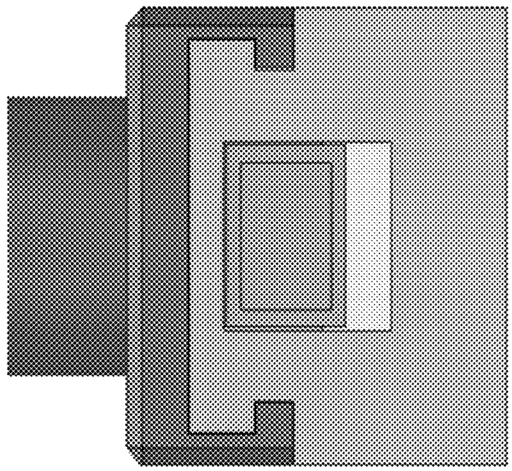
FIGS. 41*a*-41*b* and FIGS. 42*a*-42*b* illustrate a combination of the battery pack of FIGS. 37*a*-37*d* and the power tool of FIGS. 39*a*-39*d*.
Figure 41A:
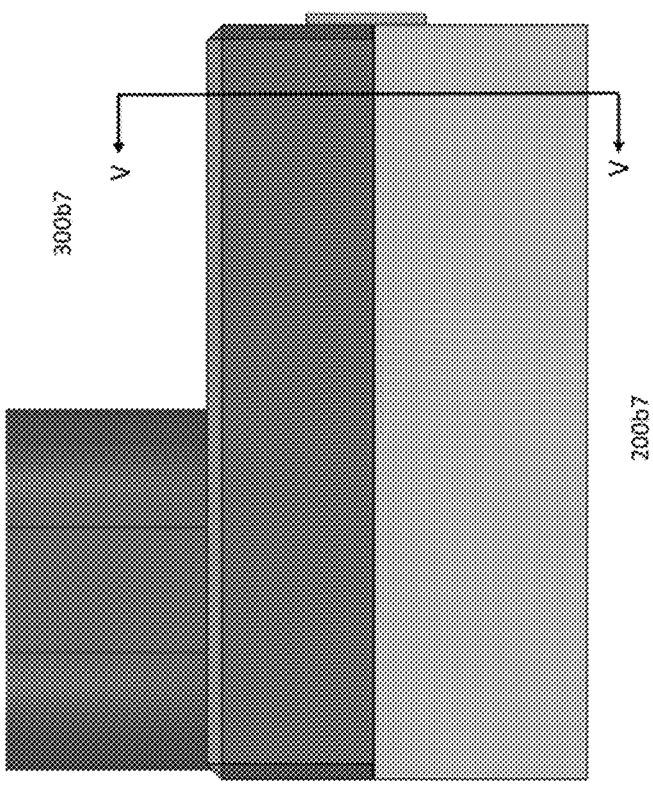
Figure 42B:
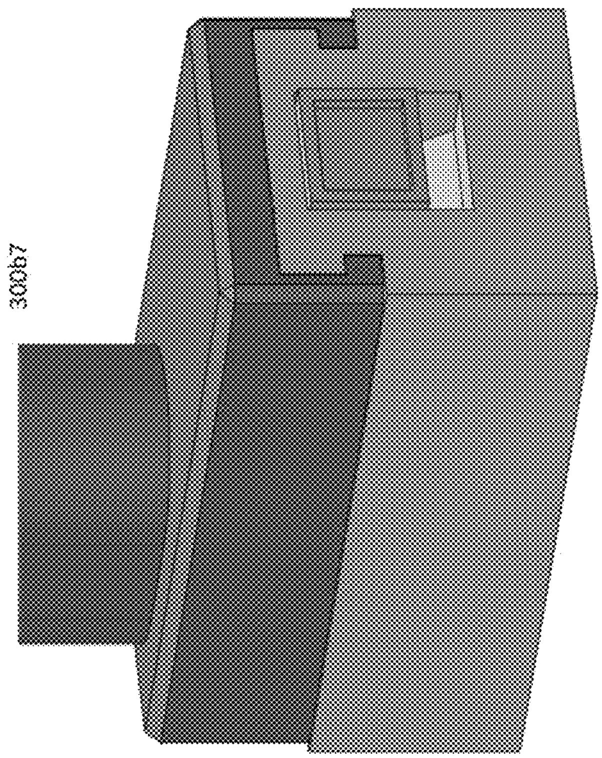
Figure 42A:
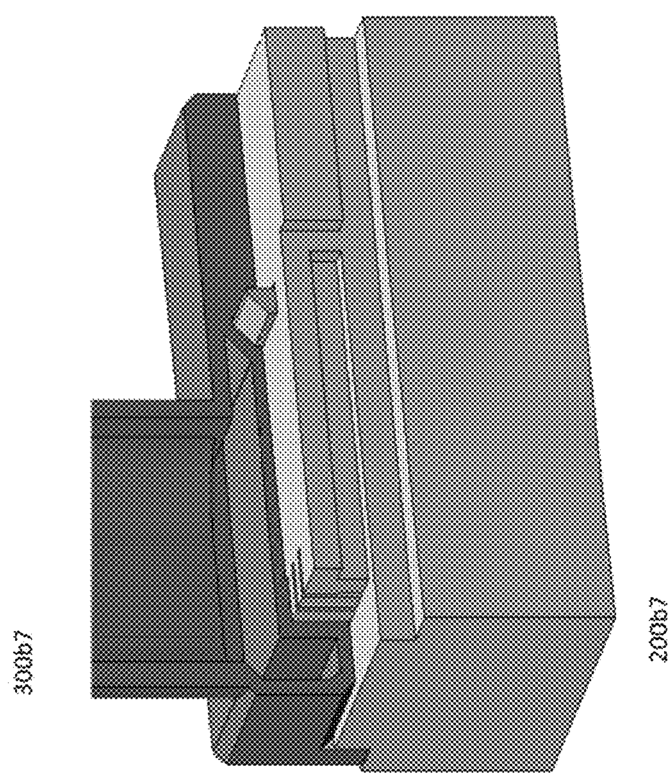
Figure 43B:
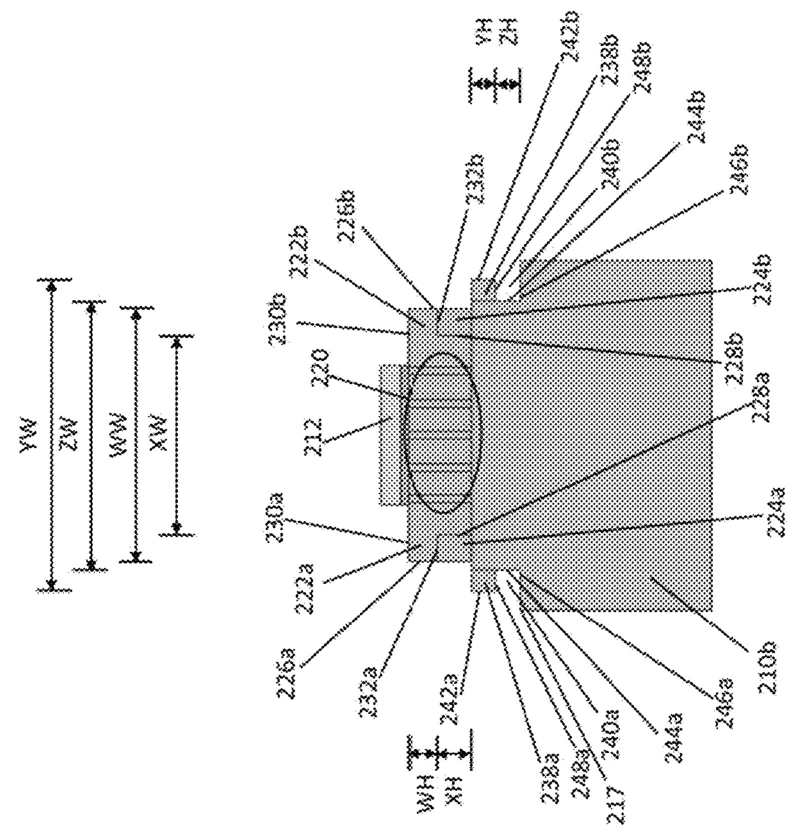
FIGS. 43*a*-43*b* and FIGS. 44*a*-44*b* illustrate an eighth example embodiment of a battery pack of the power tool system of FIG. 1 including a primary interface element and a secondary interface element.
Figure 43A:
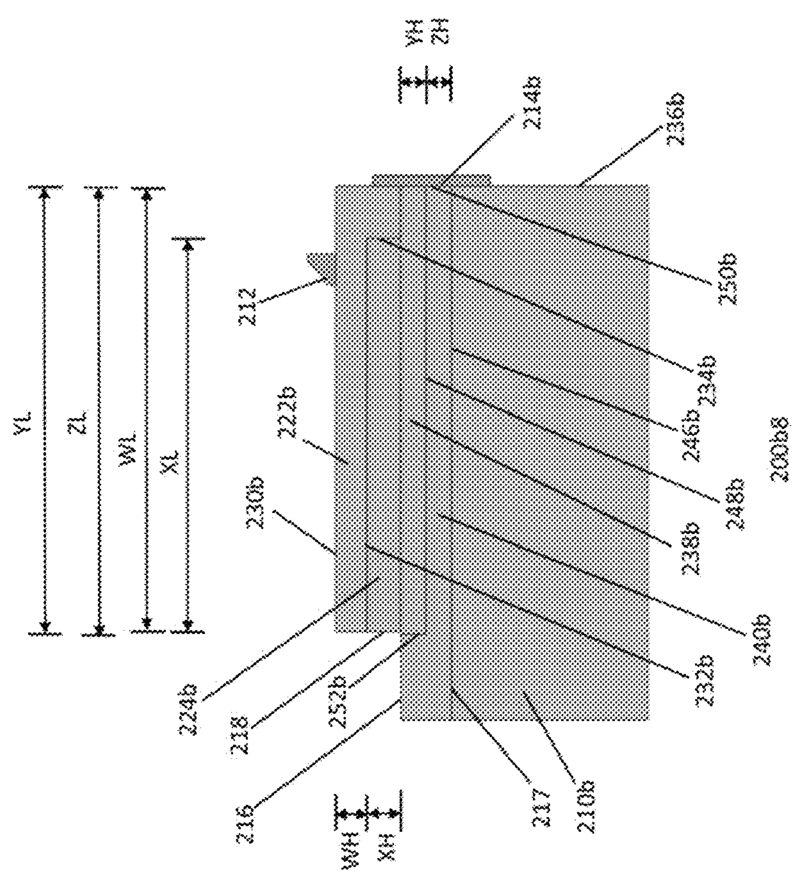
Figure 44B:
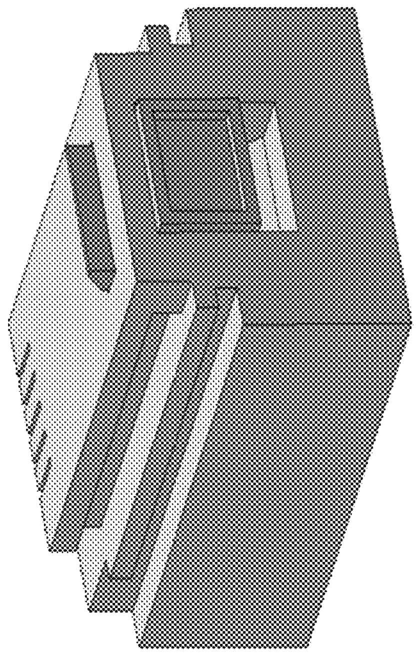
Figure 44A:
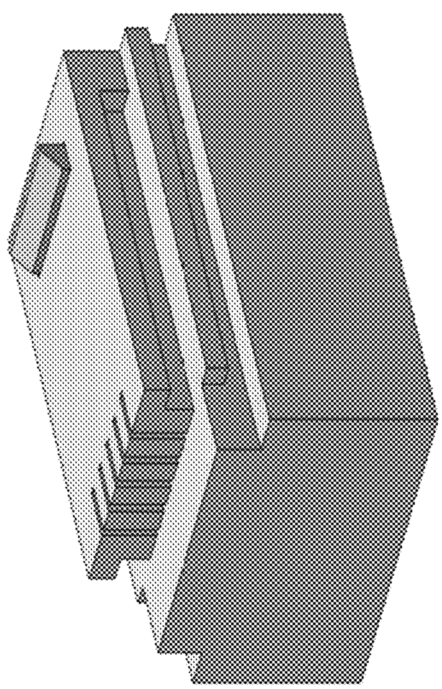

Referring to FIGS. 41_a_-41_b_ and FIGS. 42_a_-42_b_, the dual rail interface power tool 300_b_7 is compatible with the dual rail interface battery pack 200_b_7. FIG. 41_a_ illustrates a side view and FIG. 41_b_ illustrates a cross-section front view taken along the line V-V of FIG. 41_a_ of the combination. FIG. 42_a_ illustrates a partial, cut-away isometric view and FIG. 42_b_ illustrates an isometric view of the combination. In this example, the tool shroud 312_b_ receives and covers the entire battery pack 200_b_7. The latch 212 engages with the tool catch 314, both of which are in a same relative location to each other.

As illustrated in FIGS. 41_a_-41_b_ and FIGS. 42_a_-42_b_, the primary battery pack rails 222_a_, 222_b_ and the secondary battery pack rails 238_a_, 238_b_ are sized to fit and be received in the primary power tool grooves 322_a_, 322_b_ and the secondary power tool grooves 338_a_, 338_b_, respectively. The primary battery pack rails 222_a_, 222_b_ and the secondary battery pack rails 238_a_, 238_b_ slide within and along the primary power tool grooves 322_a_, 322_b_ and the secondary power tool grooves 338_a_, 338_b_, respectively until the battery pack vertical datum plane 218 stops at the power tool vertical datum plane 318, and vice versa. Similarly, the primary power tool rails 324_a_, 324_b_ and the secondary power tool rails 340_a_, 340_b_ are sized to fit and be received in the primary battery pack grooves 224_a_, 224_b_ and the secondary battery pack grooves 240_a_, 240_b_, respectively.

The primary power tool rails 324*a*, 324*b* and the secondary power tool rails 340*a*, 340*b* slide within and along the primary battery pack grooves 224*a*, 224*b* and the secondary battery pack grooves 240*a*, 240*b*, respectively until the battery pack vertical datum plane 218 stops at the power tool vertical datum plane 318, and vice versa. The battery pack latch 212 engages with the power tool catch 314 to hold the battery pack 200*a*1 within the tool shroud 312. In this example, both the secondary battery pack rails 238*a*, 238*b* and the secondary battery pack grooves 240*a*, 240*b* align with and engage the secondary power tool rails 340*a*, 340*b* and the secondary power tool grooves 338*a*, 338*b*, respectively.

Referring to FIGS. 43*a*-43*b* and FIGS. 44*a*-44*b*, an eighth embodiment of a dual rail interface battery pack 200*b*8 is illustrated. In this example, the dual rail interface battery pack 200*b*8 includes a secondary set of rails 238*a*, 238*b* and a secondary set of grooves 240*a*, 240*b*. The secondary battery pack rails 238*a*, 238*b* and the secondary set of grooves 240*a*, 240*b* are below the primary set of rails 222*a*, 222*b* and the primary set of grooves 224*a*, 224*b*. The secondary battery pack rails 238*a*, 238*b* and the secondary set of grooves 240*a*, 240*b* are below a first datum plane 216 and the primary set of rails 222*a*, 222*b* and the primary set of grooves 224*a*, 224*b* are above the first datum plane 216. In other words, the combination of the primary set of battery pack rails 222*a*, 222*b* and the primary set of battery pack grooves 224*a*, 224*b* and the combination of the secondary set of battery pack rails 238*a*, 238*b* and the secondary set of battery pack grooves 240*a*, 240*b* are on opposite sides of the first datum plane 216. The secondary set of rails 238*a*, 238*b* are above and define the secondary set of grooves 240*a*, 240*b*. The secondary set of grooves 240*a*, 240*b* are below the secondary set of rails 238*a*, 238*b* relative to the base surface 216. The height distance ZH for the second set of grooves 240*a*, 240*b* is defined by the first rails top walls 230*a*, 230*b* and the second rails bottom walls 248*a*, 248*b*. In this example, the first set of rails 222*a*, 222*b* and the first set of grooves 224*a*, 224*b* remain the same as in the previous embodiment of 200*b*7.

Figure 45B:
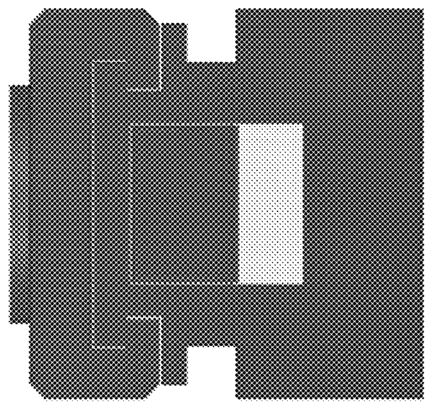
FIGS. 45*a*-45*d* illustrate a combination of the battery pack of FIGS. 43*a*-43*b* and FIGS. 44*a*-44*b* and the power tool of FIGS. 3*a*-3*d*.
Figure 45A:
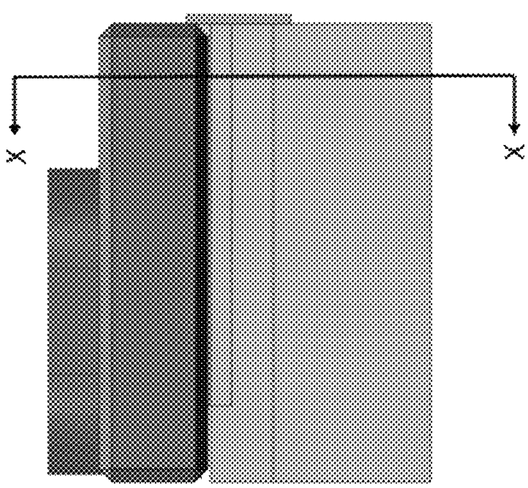
Figure 45D:
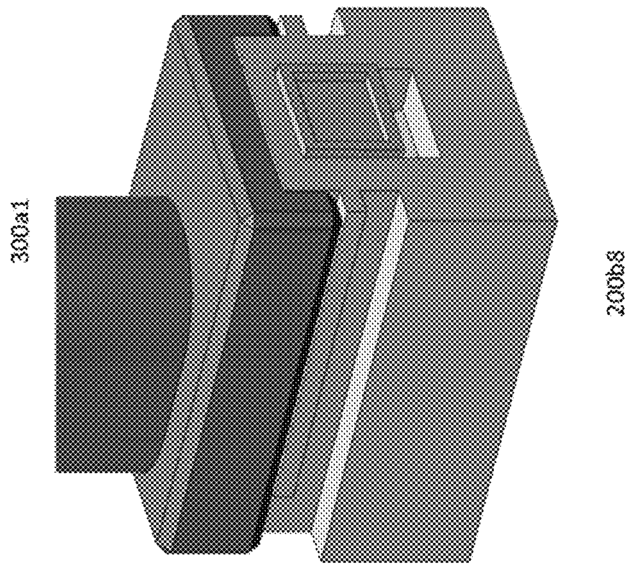
Figure 45C:
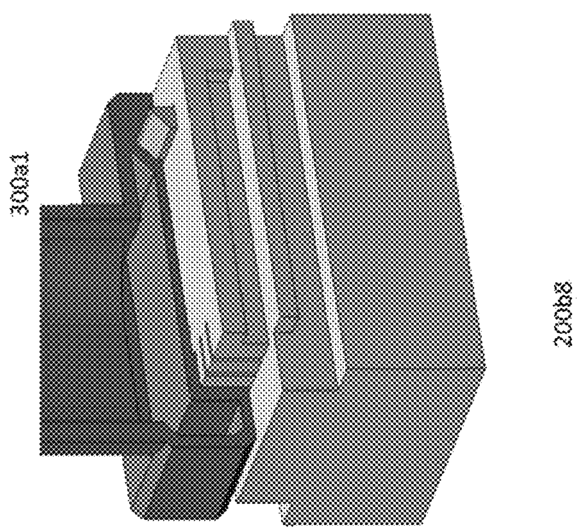
Figure 46B:
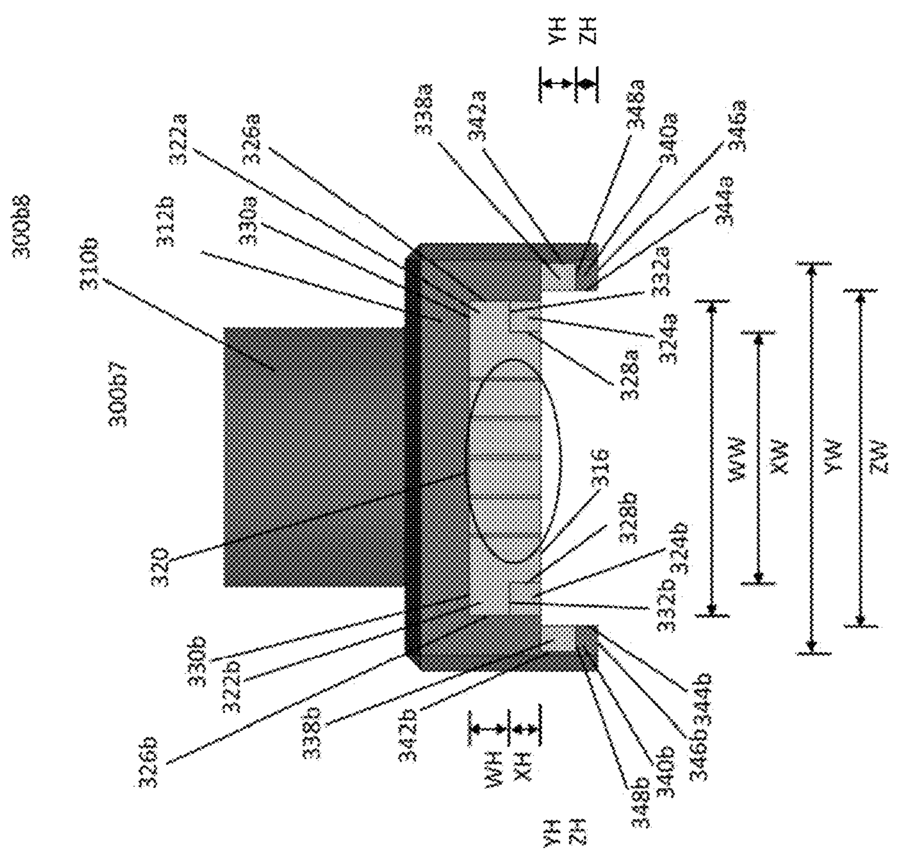
FIGS. 46*a*-46*d* illustrate an eighth example embodiment of a power tool of the power tool system of FIG. 1 including a primary interface element and a secondary interface element.
Figure 46A:
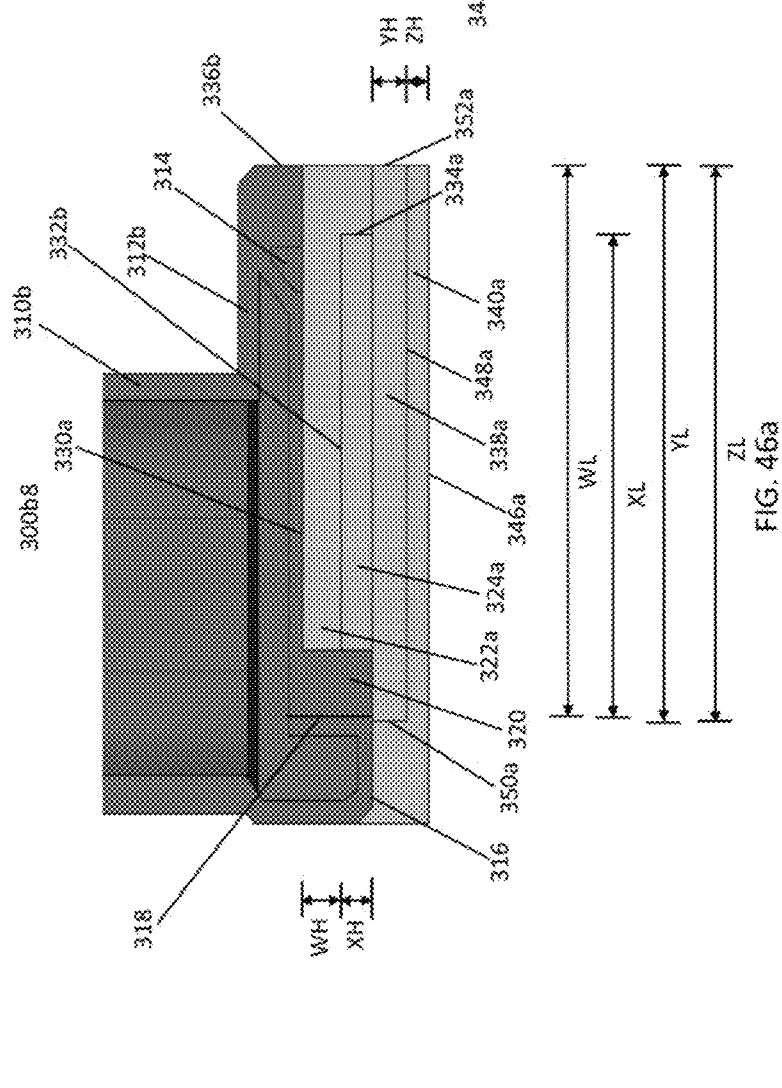
Figure 46D:
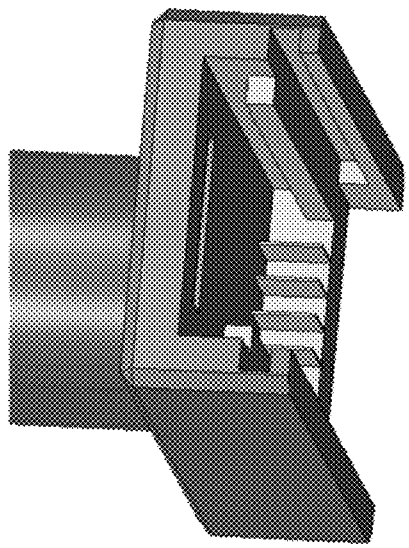
Figure 46C:
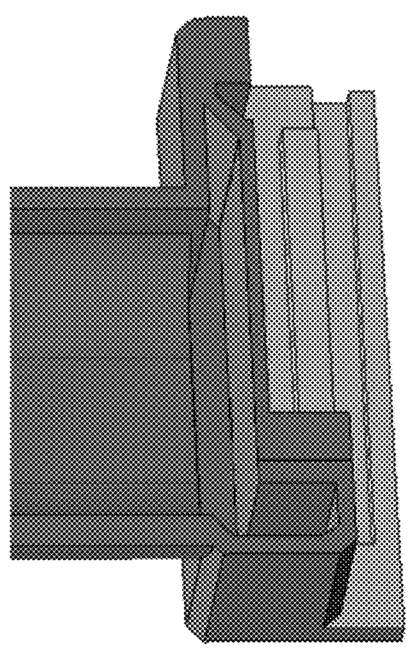

The dual rail interface battery pack 200*b*8 is compatible with a single rail interface power tool such as the single rail interface power tool 300*a*1 as illustrated in FIGS. 45*a*-45*d*. FIG. 45*a* illustrates a side view and FIG. 45*b* illustrates a cross-section front view taken along the line X-X of FIG. 45*a* of the combination. FIG. 45*c* illustrates a partial, cut-away isometric view and FIG. 45*d* illustrates an isometric view of the combination. The single rail interface power tool 300*a*1 includes the same features as described above with respect to the single rail interface power tool 300*a*1 of FIGS. 3*a*-3*d*. The power tool 300*a*1 engages with the dual rail interface battery pack 200*b*8 using the first set of rails 222*a*, 222*b* and the first set of grooves 224*a*, 224*b* on the battery pack and not the second set of rails and grooves.

FIGS. 46*a*-46*d* illustrate an eighth example embodiment of a dual rail interface power tool 300*b*8 that is compatible with both a single rail interface battery pack and a dual rail interface battery pack. In the example of FIGS. 46*a*-46*d*, the second set of rails 340*a*, 340*b* and the second set of grooves 338*a*, 338*b* are located below and on a different plane than the first set of rails 324*a*, 324 and the first set of grooves 322*a*, 322*b*. Additionally, the second set of rails 340*a*, 340*b* and the second set of grooves 338*a*, 338*b* are offset wider than the first set of rails 324*a*, 324 and the first set of grooves 322*a*, 322*b*.

Figure 47B:
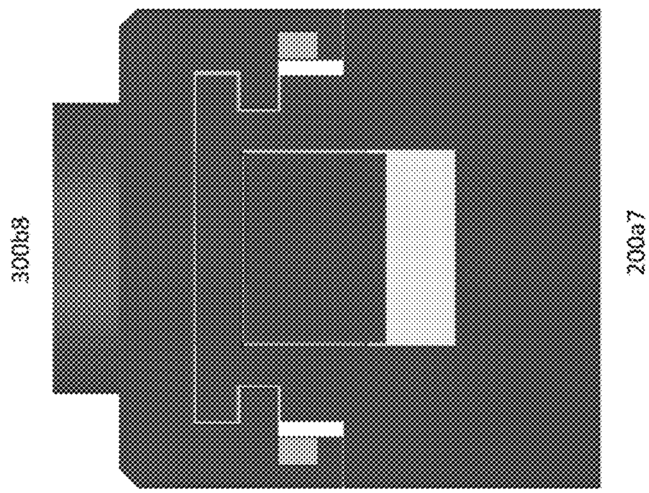
FIGS. 47*a*-47*d* illustrate a combination of the battery pack of FIGS. 34*a*-34*b* and FIGS. 35*a*-35*b* and the power tool of FIGS. 46*a*-46*d*.
Figure 47A:
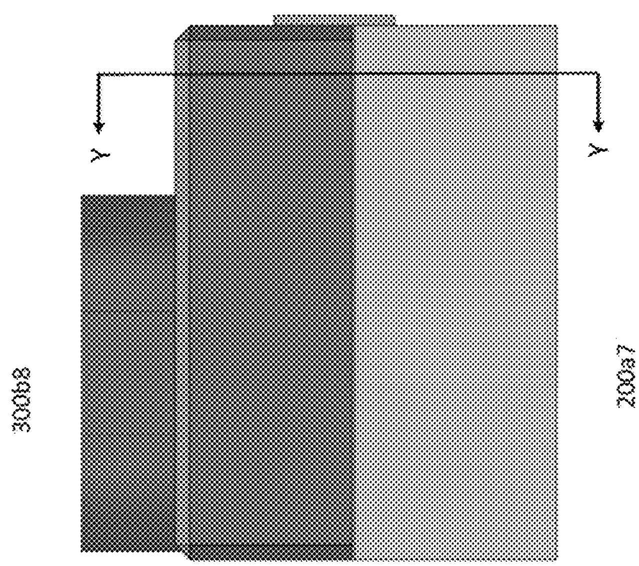
Figure 47D:
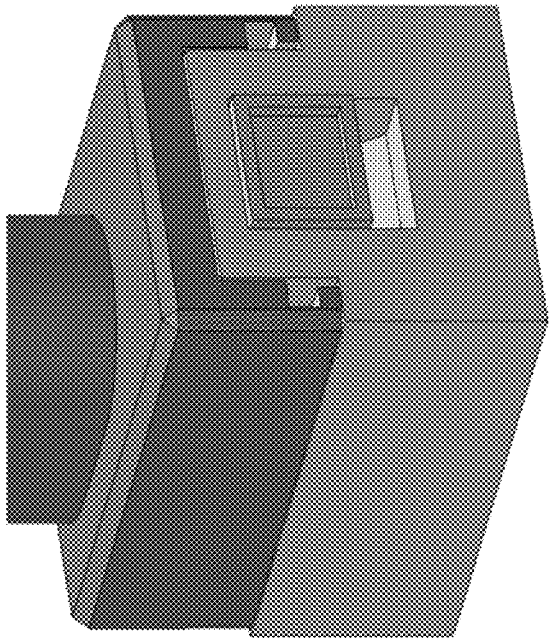
Figure 47C:
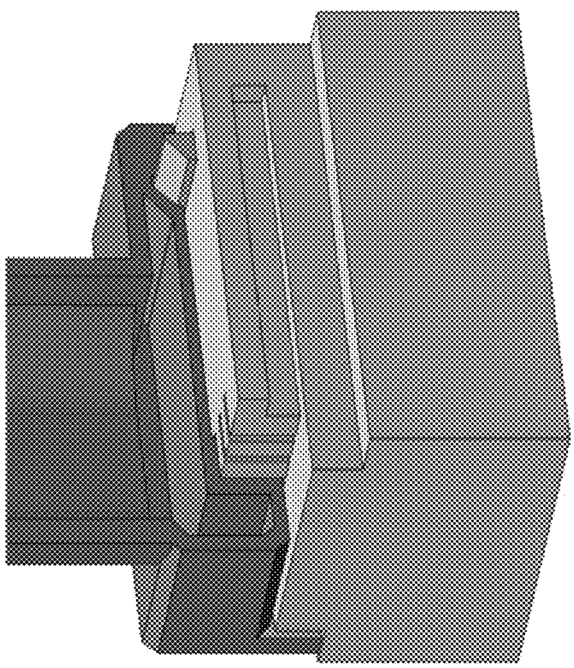

Referring also to FIGS. 47*a*-47*d*, the dual rail interface power tool 300*b*8 is compatible with the single rail interface battery pack 200*a*7. FIG. 47*a* illustrates a side view and FIG. 47*b* illustrates a cross-section front view taken along the line Y-Y of FIG. 47*a* of the combination. FIG. 47*c* illustrates a partial, cut-away isometric view and FIG. 47*d* illustrates an isometric view of the combination.

Figure 48B:
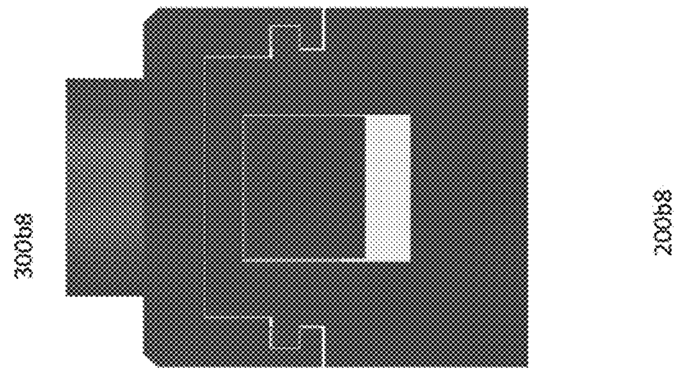
FIGS. 48*a*-48*d* illustrate a combination of the battery pack of FIGS. 43*a*-43*b* and FIGS. 44*a*-44*b* and the power tool of FIGS. 46*a*-46*d*.
Figure 48A:
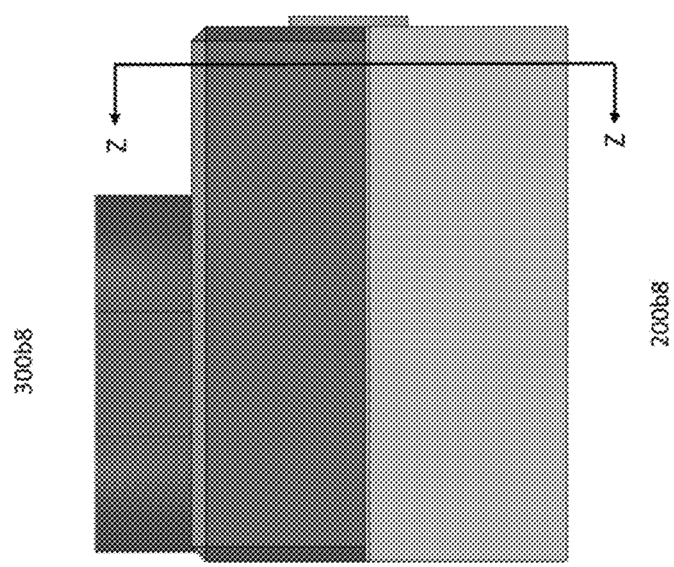
Figure 48D:
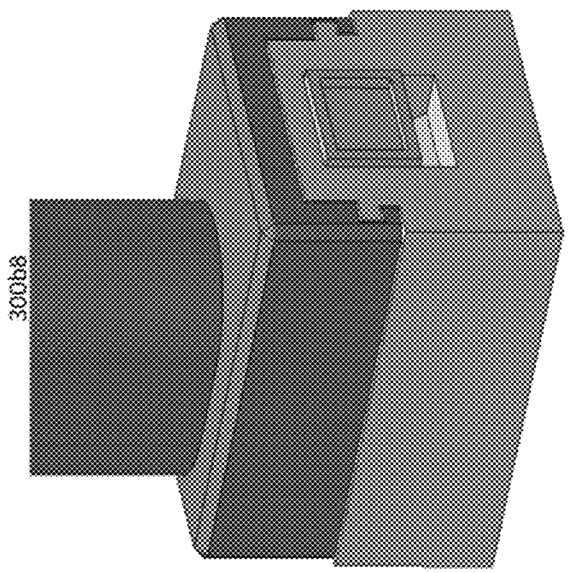
Figure 48C:
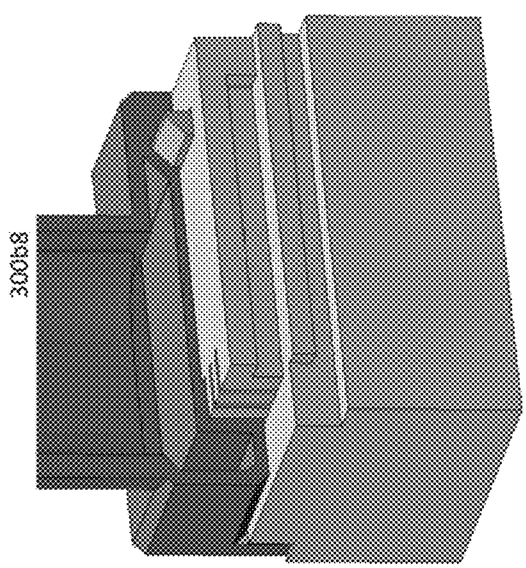
Figure 49B:
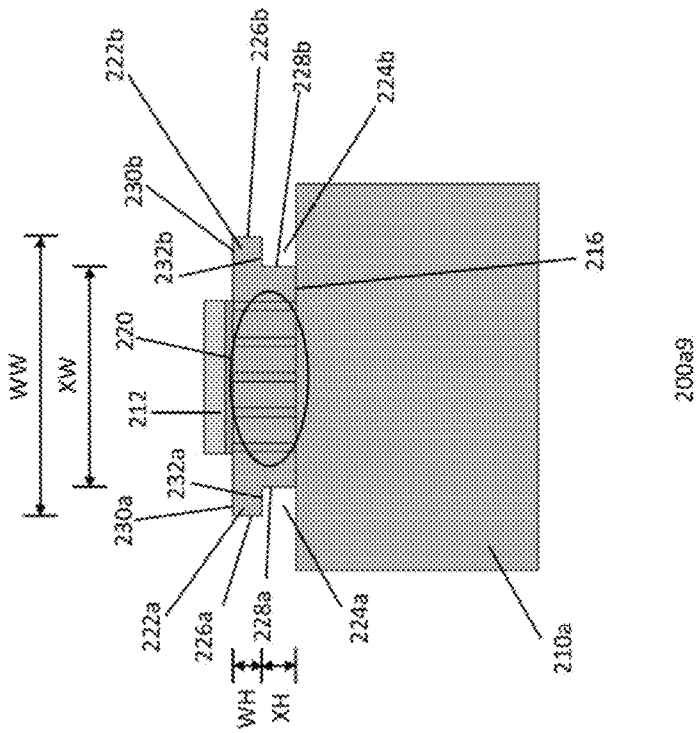
FIGS. 49*a*-49*d* illustrate a fourth example embodiment of a battery pack of the power tool system of FIG. 1 including only a primary interface element.
Figure 49A:
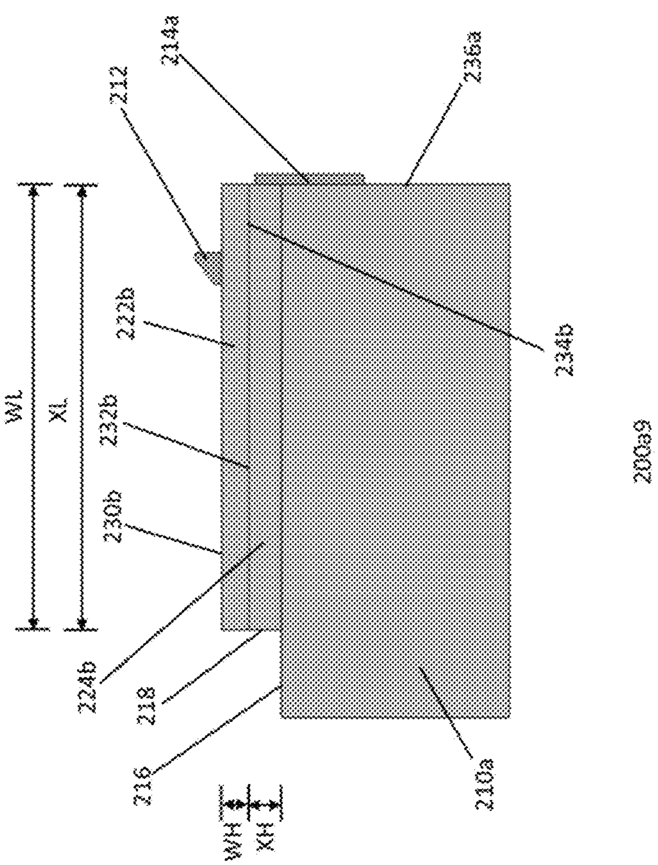
Figure 49D:
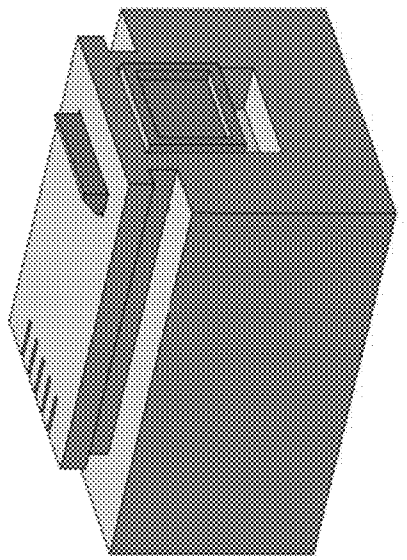
Figure 49C:
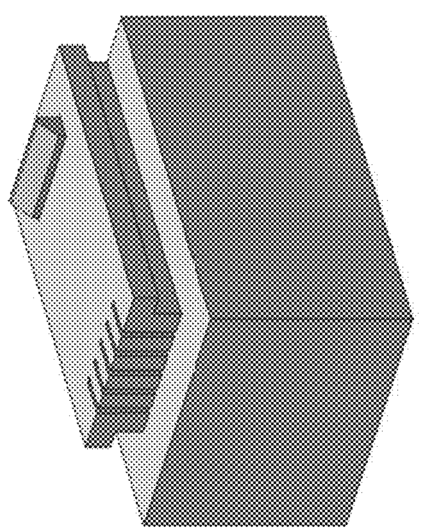
Figure 50B:
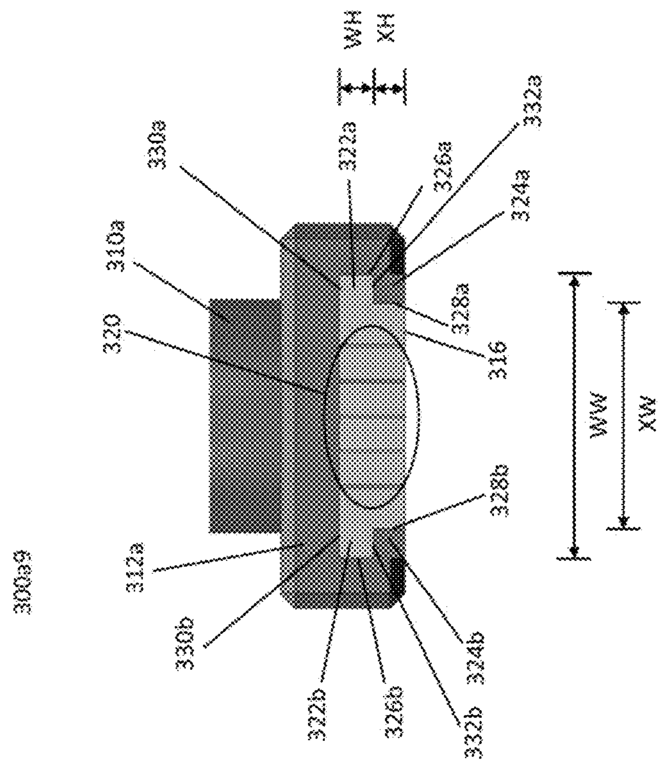
FIGS. 50*a*-50*d* illustrate a third example embodiment of a power tool of the power tool system of FIG. 1 including only a primary interface element.
Figure 50A:
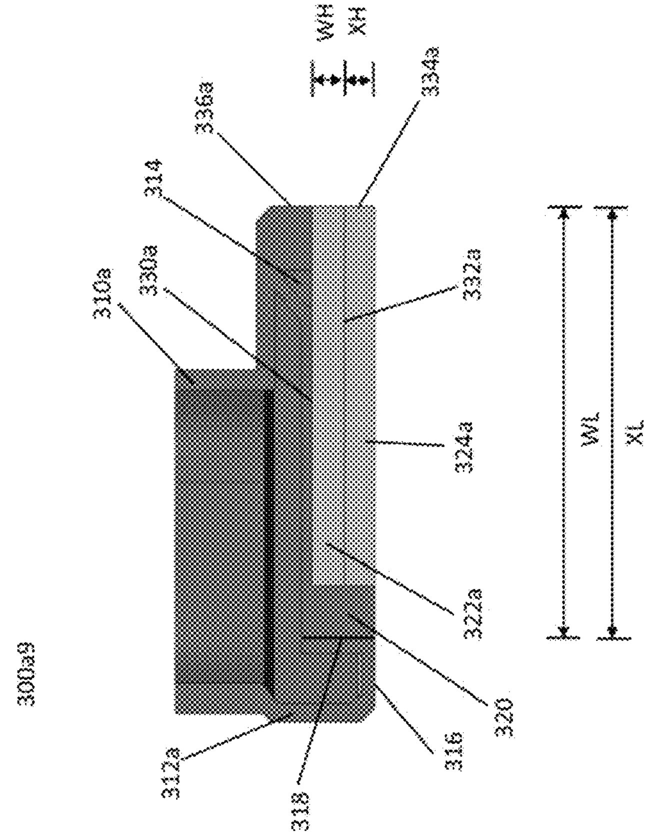
Figure 50D:
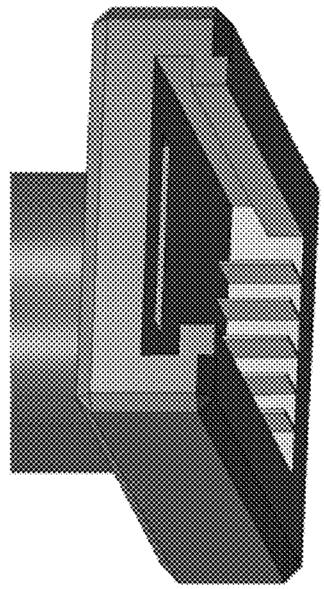
Figure 50C:
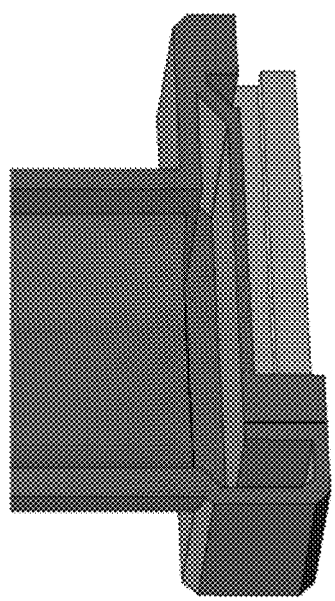

Referring to FIGS. 48*a*-48*d*, the dual rail interface power tool 300*b*8 is compatible with the dual rail interface battery pack 200*b*8. FIG. 48*a* illustrates a side view and FIG. 48*b* illustrates a cross-section front view taken along the line Z-Z of FIG. 48*a* of the combination. FIG. 48*c* illustrates a partial, cut-away isometric view and FIG. 48*d* illustrates an isometric view of the combination. In this example, the tool shroud 312*b* receives and covers the entire battery pack 200*b*7. The latch 212 engages with the tool catch 314, both of which are in a same relative location to each other.

As illustrated in FIGS. 48*a*-48*d*, the primary battery pack rails 222*a*, 222*b* and the secondary battery pack rails 238*a*, 238*b* are sized to fit and be received in the primary power tool grooves 322*a*, 322*b* and the secondary power tool grooves 338*a*, 338*b*, respectively. The primary battery pack rails 222*a*, 222*b* and the secondary battery pack 238*a*, 238*b* slide within and along the primary power tool grooves 322*a*, 322*b* and the secondary power tool grooves 338*a*, 338*b*, respectively until the battery pack vertical datum plane 218 stops at the power tool vertical datum plane 318, and vice versa. Similarly, the primary power tool rails 324*a*, 324*b* and secondary power tool rails 340*a*, 340*b* are sized to fit and be received in the primary battery pack grooves 224*a*, 224*b* and the secondary battery pack grooves 240*a*, 240*b*, respectively. The primary power tool rails 324*a*, 324*b* and the secondary power tool rails 340*a*, 340*b* slide within and along the primary battery pack grooves 224*a*, 224*b* and the secondary battery pack grooves 240*a*, 240*b*, respectively until the battery pack vertical datum plane 218 stops at the power tool vertical datum plane 318, and vice versa. The battery pack latch 212 engages with the power tool catch 314 to hold the battery pack 200*a*1 within the tool shroud 312.

Referring to FIGS. 49*a*-49*d*, there is illustrated a ninth example embodiment of a battery pack 200*a*9 having a basic rail interface. In this example battery pack 200*a*9, the basic rail interface differs from the basic rail interface of the first example embodiment battery pack 200*a*1 in that the battery pack rear housing wall 236*a* is open and there is no rear groove wall such that the length WL of the battery pack rails 222*a*, 222*b* is the same length XL as the battery pack grooves 224*a*, 224*b*. This basic battery pack interface may be referred to as a single length battery pack interface and a battery pack including this basic battery pack interface may be referred to as a single length interface battery pack.

Referring to FIGS. 50*a*-50*d*, there is illustrated a ninth example embodiment of a power tool 300*a*9 having a basic rail interface. In this example power tool 300*a*9, the basic rail interface differs from the basic rail interface of the first example embodiment power tool 300*a*1 in that the length XL of the rails 324*a*, 324*b* and the length WL of the grooves 322*a*, 322*b* are the same. This basic power tool interface may be referred to as a single length power tool interface and a power tool including this basic power tool interface may be referred to as a single length interface power tool.

Figure 51B:
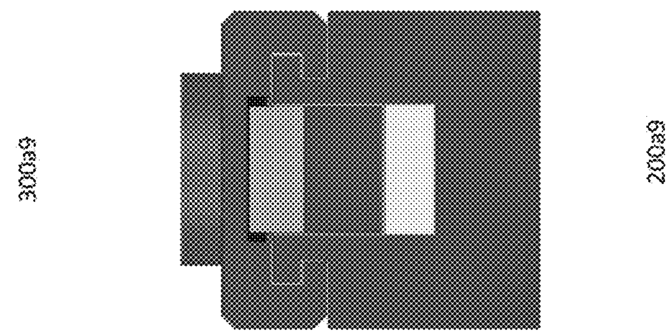
FIGS. 51*a*-51*d* illustrate a combination of the battery pack of FIGS. 49*a*-49*d* and the power tool of FIGS. 50*a*-50*d*.
Figure 51A:
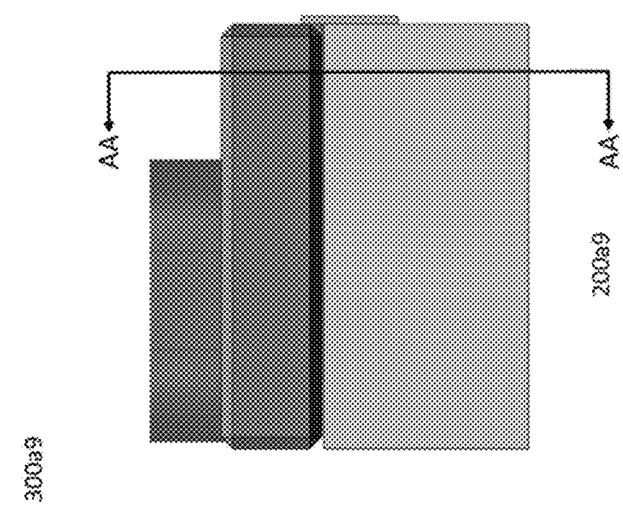
Figure 51D:
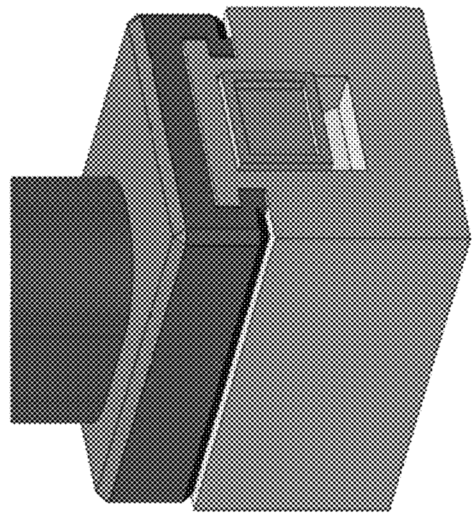
Figure 51C:
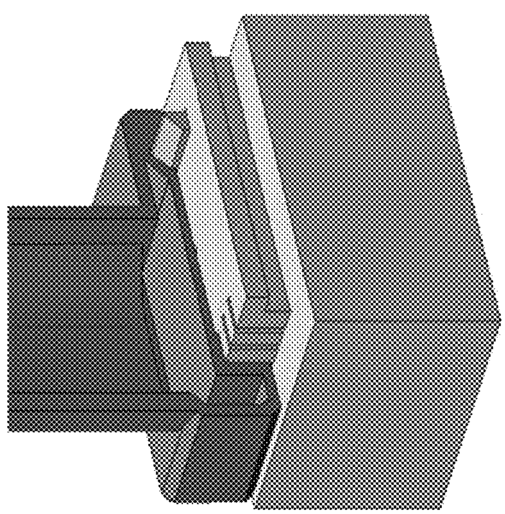
Figure 52B:
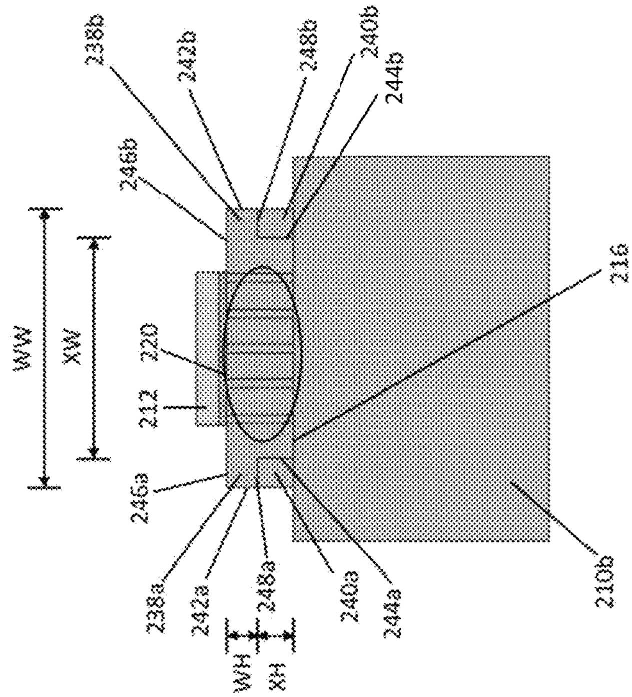
FIGS. 52*a*-52*d* illustrate a ninth example embodiment of a battery pack of the power tool system of FIG. 1 including a primary interface element and a secondary interface element.
Figure 52A:
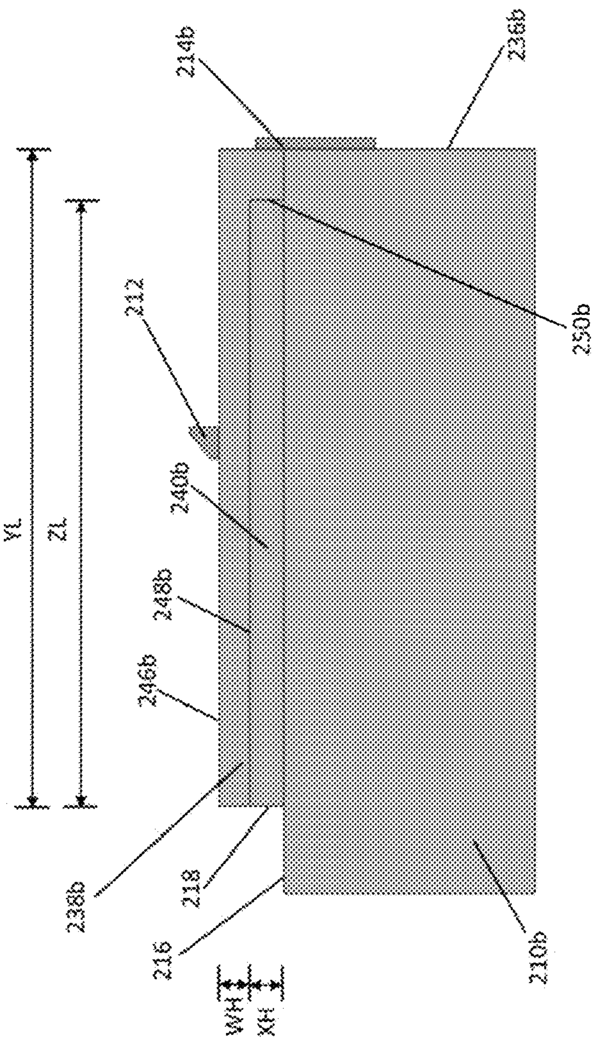
Figure 52D:
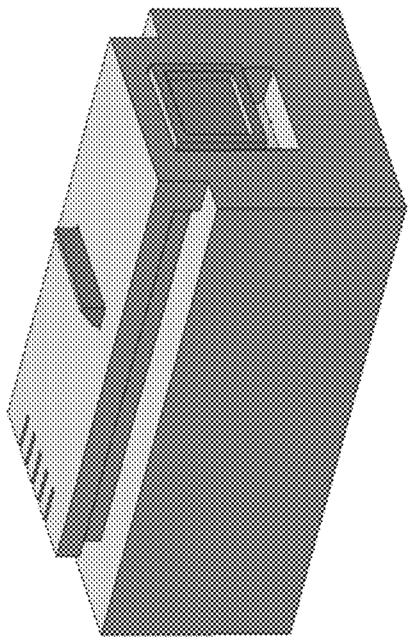
Figure 52C:
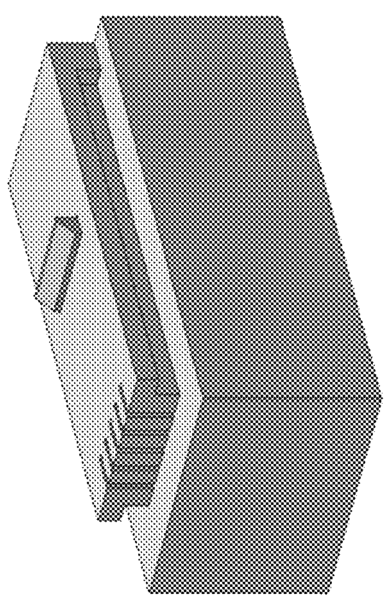

Referring to FIGS. 51*a*-51*d*, there is illustrated the example battery pack 200*a*9 having the single length battery pack interface coupled with the example power tool 300*a*9 having the single length power tool interface. FIG. 51*a* illustrates a side view and FIG. 51*b* illustrates a cross-section front view taken along the line AA-AA of FIG. 51*a* of the combination. FIG. 51*c* illustrates a partial, cut-away isometric view and FIG. 51*d* illustrates an isometric view of the combination. The pack rails 222*a*, 222*b* and pack grooves 224*a*, 224*b* align with, slide along and engage the tool rails 324*a*, 324*b* and tool grooves 322*a*, 322*b*, respectively. The lengths XL and WL for each of the embodiments 200*a*9 and 300*a*9 are the same.

Referring to FIGS. 52*a*-52*d*, there is illustrated an example embodiment of a battery pack 200*b*9 having an advanced rail interface. In this example, the length ZL of the battery pack rails 238*a*, 238*b* and the corresponding pack grooves 240*a*, 240*b* is approximately twice the length XL of the battery pack rails 222*a*, 222*b* and the corresponding battery pack grooves 224*a*, 224*b* of the battery pack 200*a*9 having a single length battery pack interface. This advanced battery pack interface may be referred to as a double length battery pack interface and a battery pack including this advance battery pack interface may be referred to as a double length interface battery pack.

Figure 53B:
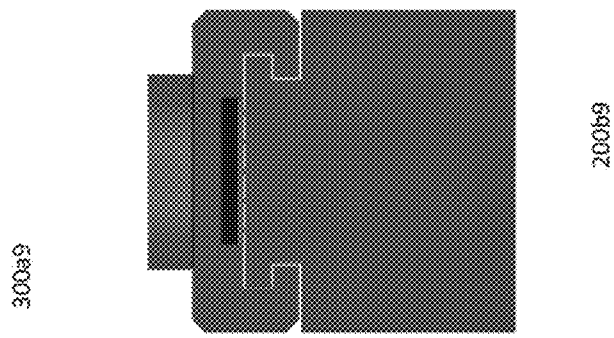
FIGS. 53*a*-53*d* illustrate a combination of the battery pack of FIGS. 52*a*-52*d* and the power tool of FIGS. 50*a*-50*d*.
Figure 53A:
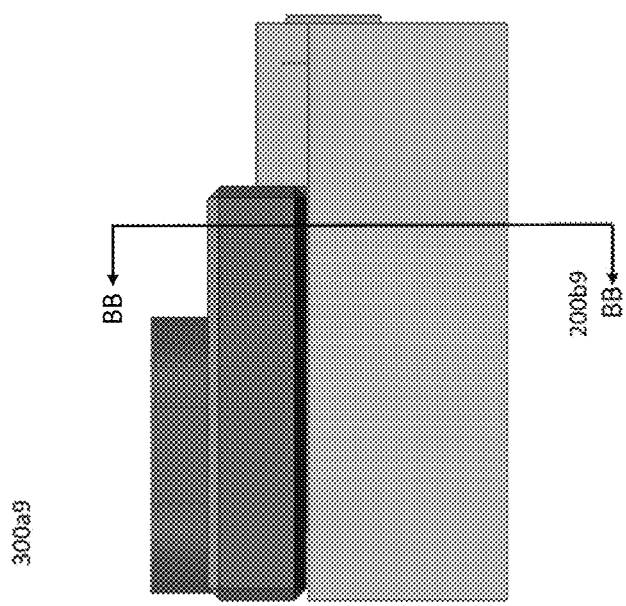
Figure 53C:
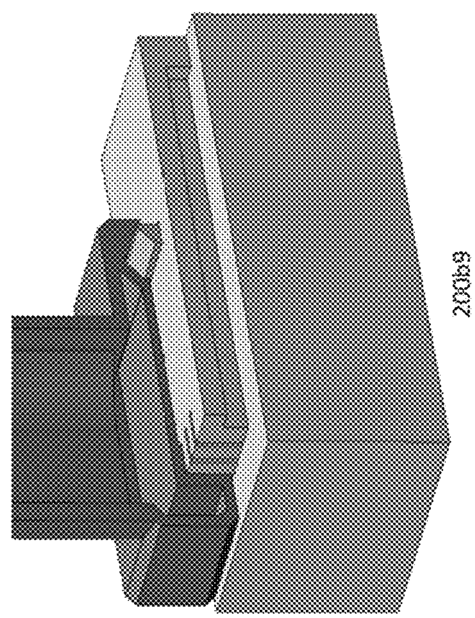
Figure 53D:
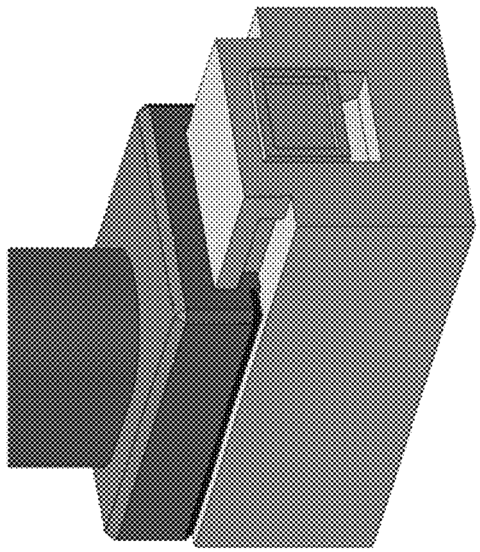
Figure 54B:
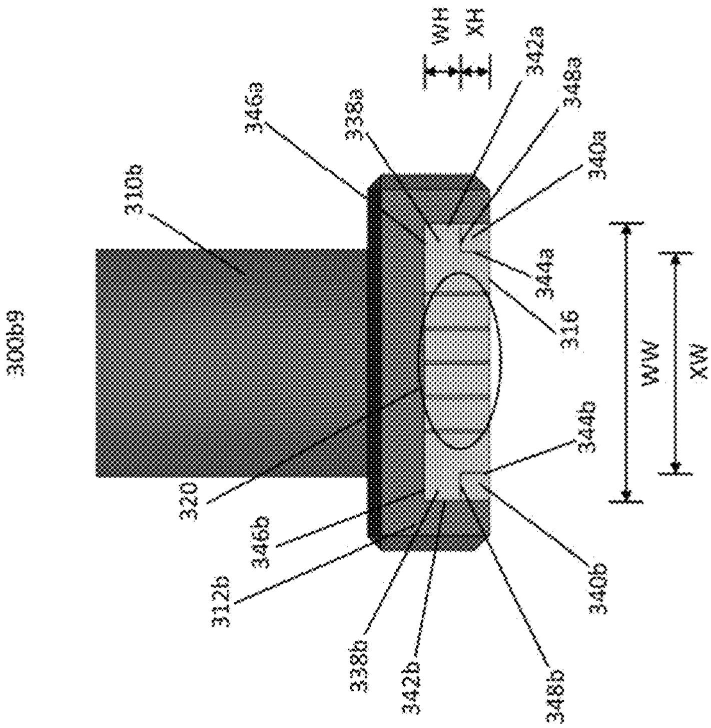
FIGS. 54*a*-54*d* illustrate a ninth example embodiment of a power tool of the power tool system of FIG. 1 including a primary interface element and a secondary interface element.
Figure 54A:
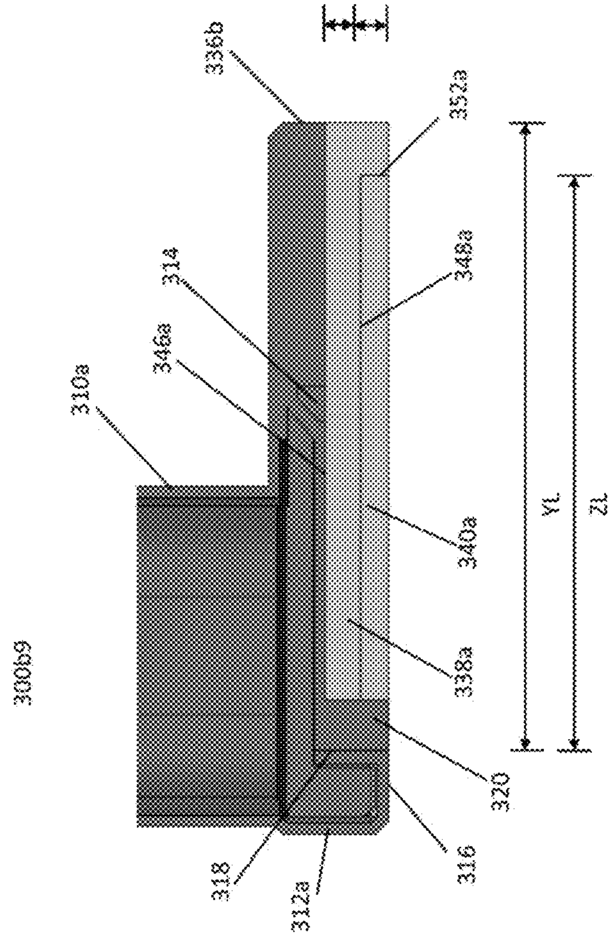
Figure 54D:
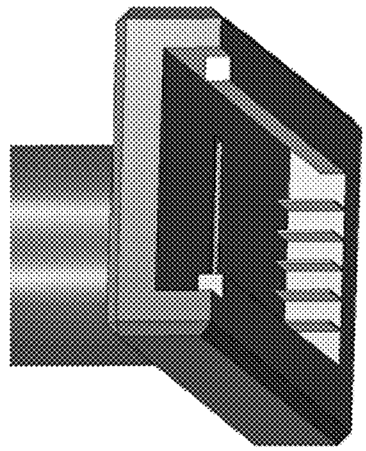
Figure 54C:
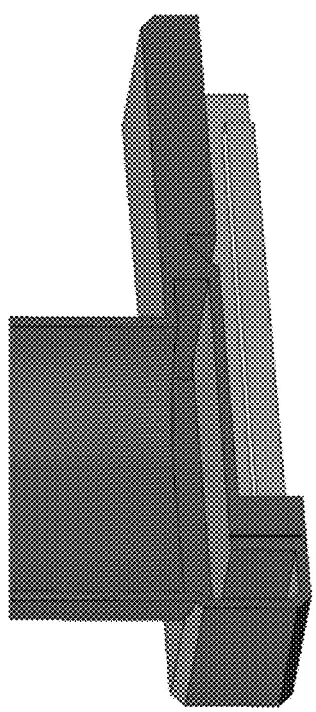

Referring also to FIGS. 53*a*-53*d*, there is illustrated an example power tool 300*a*9 having a single length power tool interface mated with an example battery pack 200*b*9 having a double length battery pack interface. FIG. 53*a* illustrates a side view and FIG. 53*b* illustrates a cross-section front view taken along the line BB-BB of FIG. 53*a* of the combination. FIG. 53*c* illustrates a partial, cut-away isometric view and FIG. 53*d* illustrates an isometric view of the combination.

Referring to FIGS. 54*a*-54*d*, there is illustrated a ninth example embodiment of a power tool 300*b*9 having an advanced rail interface. In this example power tool 330*b*9, the advanced rail interface differs from the advanced rail interface of the example embodiment power tool 300*b*1 in that the length ZL of the power tool rails 340*a*, 340*b* and the corresponding pack grooves 338*a*, 338*b* is approximately twice the length XL of the power tool rails 324*a*, 324*b* and the corresponding power tool grooves 322*a*, 322*b* of the basic interface power tool 300*a*9. This advanced power tool interface may be referred to as a double length power tool interface and a power tool including this advanced power tool interface may be referred to as a double length interface power tool.

Figure 55B:
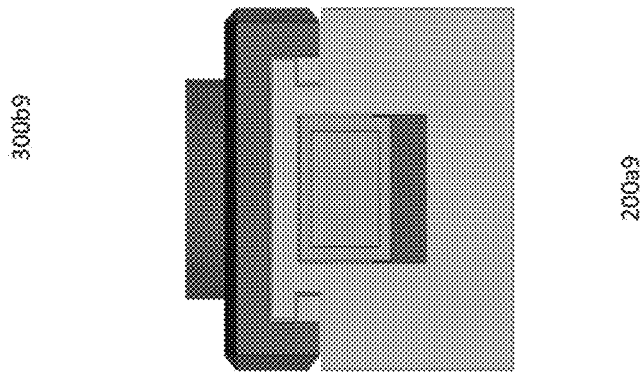
FIGS. 55*a*-55*d* illustrate a combination of the battery pack of FIGS. 49*a*-49*d* and the power tool of FIGS. 54*a*-54*d*.
Figure 55A:
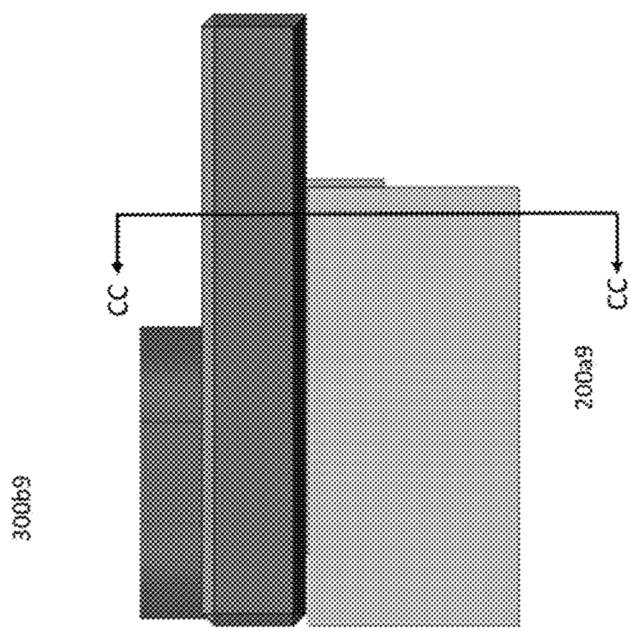
Figure 55D:
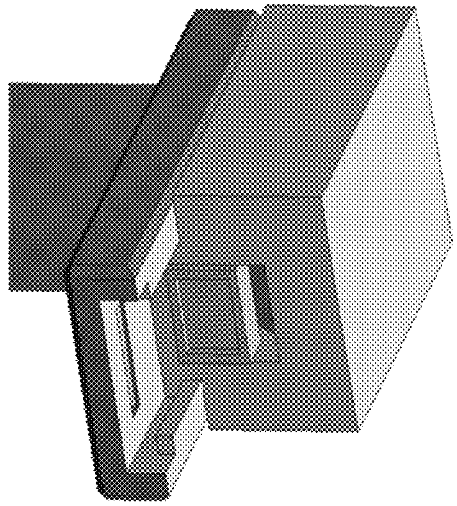
Figure 55C:
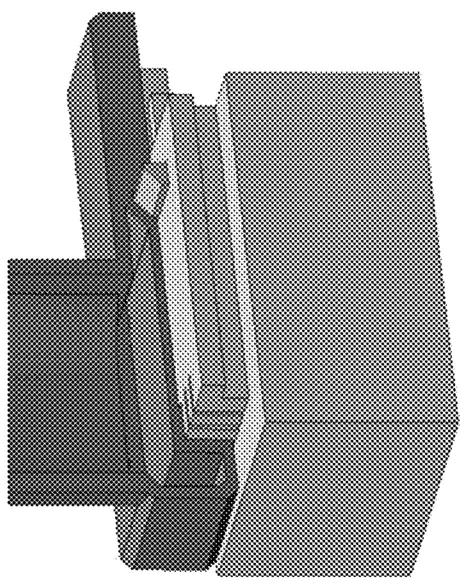

FIGS. 55*a*-55*d* illustrate the combination of the double length interface power tool 300*b*9 with a single length interface battery pack 200*a*9. FIG. 55*a* illustrates a side view and FIG. 55*b* illustrates a cross-section front view taken along the line CC-CC of FIG. 55*a* of the combination. FIG. 55*c* illustrates a partial, cut-away isometric view and FIG. 55*d* illustrates an isometric view of the combination.

Figure 56B:
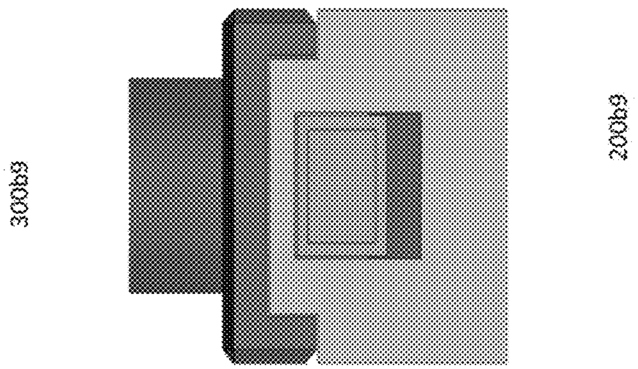
FIGS. 56*a*-56*d* illustrate a combination of the battery pack of FIGS. 52*a*-52*d* and the power tool of FIGS. 54*a*-54*d*.
Figure 56A:
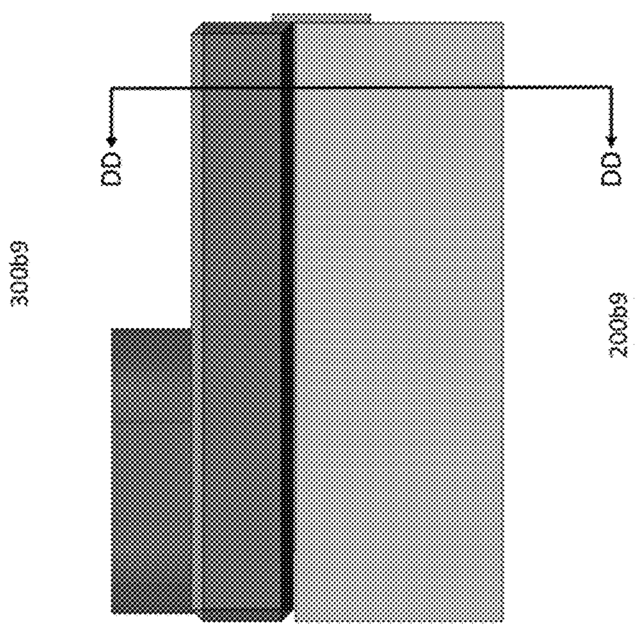
Figure 56D:
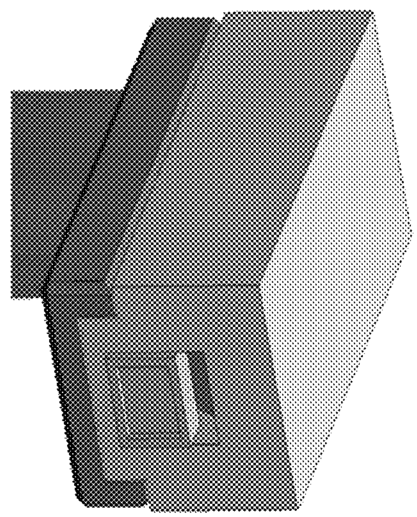
Figure 56C:
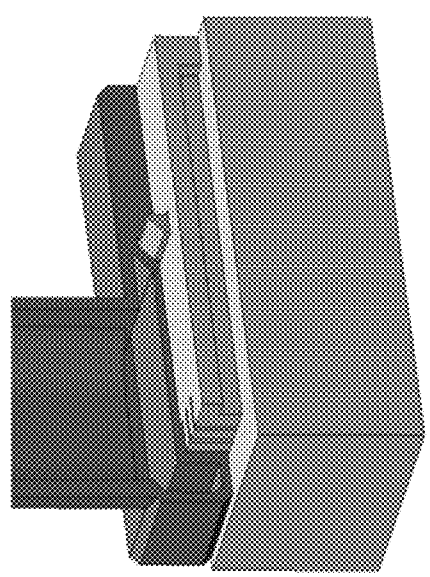

FIGS. 56*a*-56*d* illustrate the combination of the double length interface power tool 300*b*9 with the double length interface battery pack 200*b*9. FIG. 56*a* illustrates a side view and FIG. 56*b* illustrates a cross-section front view taken along the line DD-DD of FIG. 56*a* of the combination. FIG. 56*c* illustrates a partial, cut-away isometric view and FIG. 56*d* illustrates an isometric view of the combination.

Figure 57:
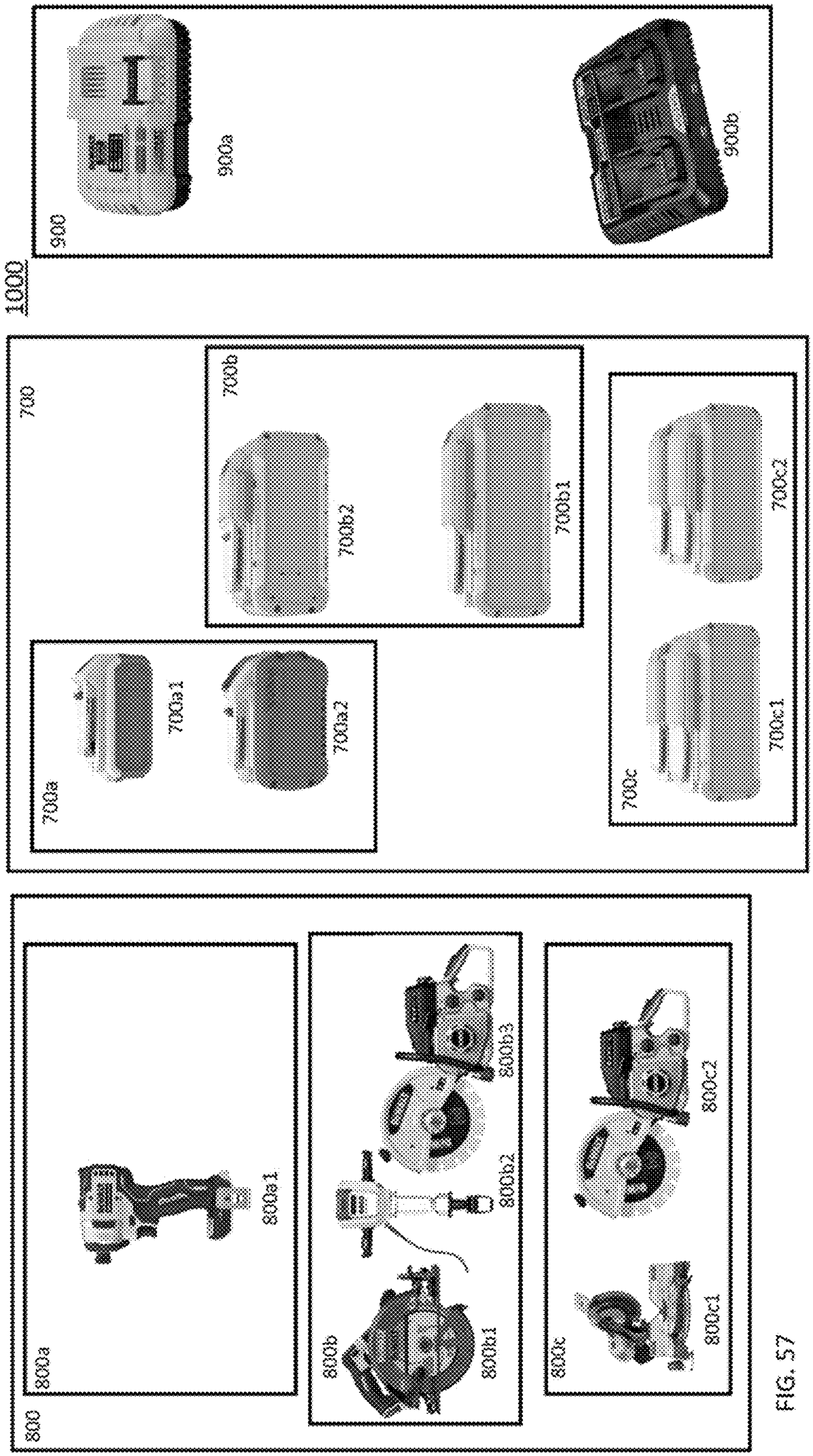
FIG. 57 illustrates is diagram of a second example embodiment of a power tool system.
Figure 58A:
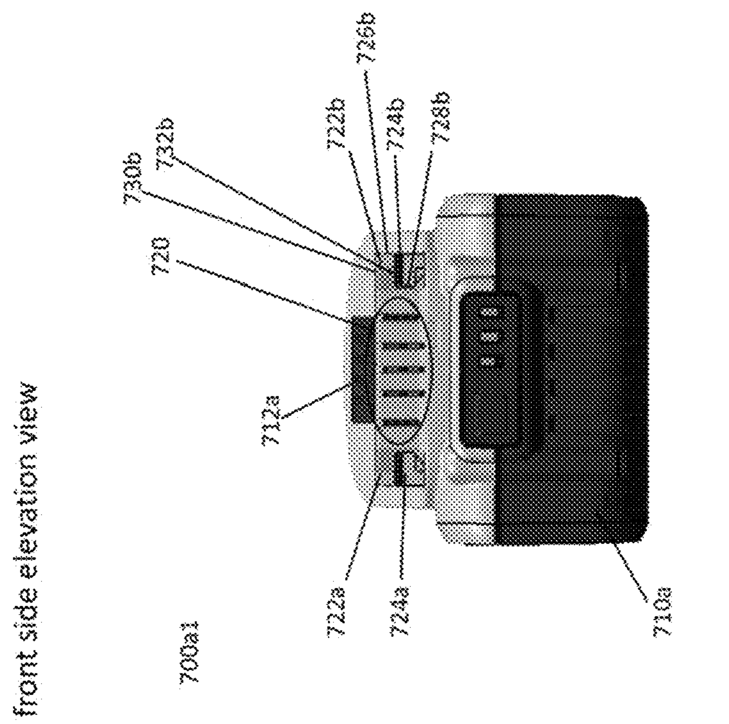
FIGS. 58*a*-58*i* illustrate another example embodiment of a battery pack of the power tool system of FIG. 57 including only a primary interface element.
Figure 58B:
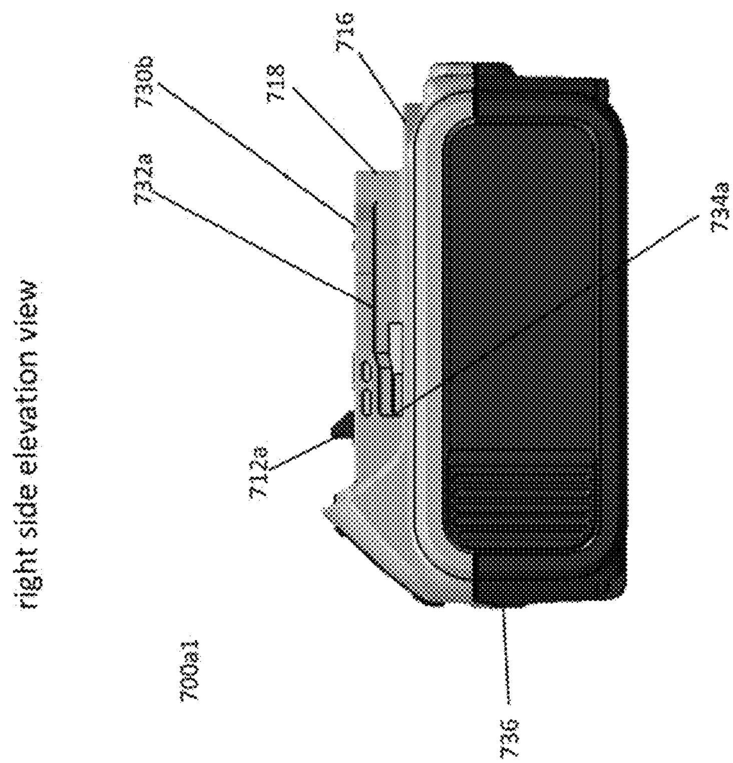
Figure 58C:
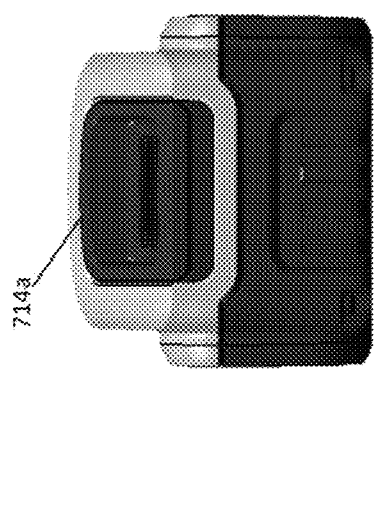
Figure 58D:
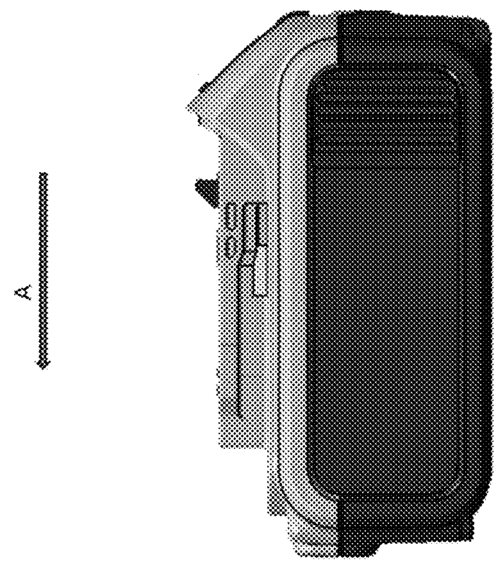
Figure 58E:
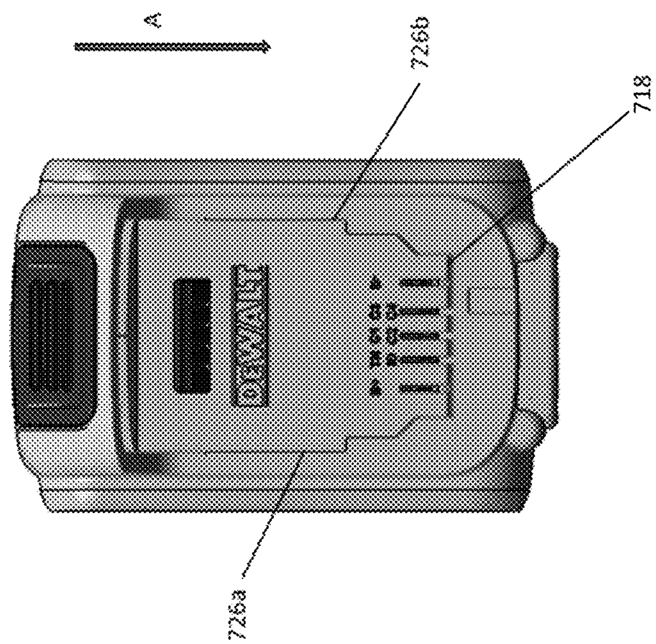
Figure 58F:
Figure 58H:
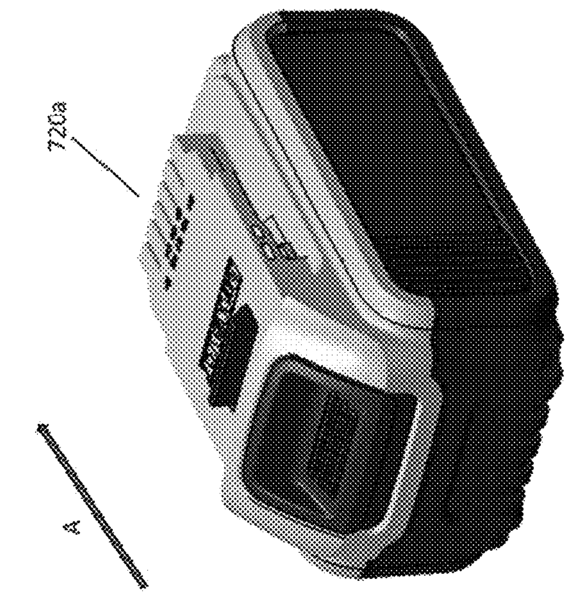
Figure 58G:
Figure 58I:
Figure 59A:
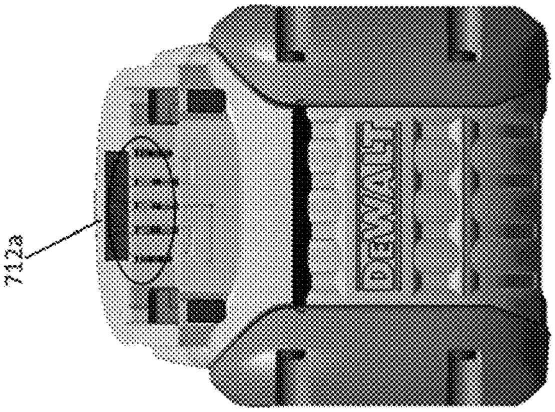
FIGS. 59*a*-59*h* illustrate another example embodiment of a battery pack of the power tool system of FIG. 57 including only a primary interface element.
Figure 59C:
Figure 59B:
Figure 59D:
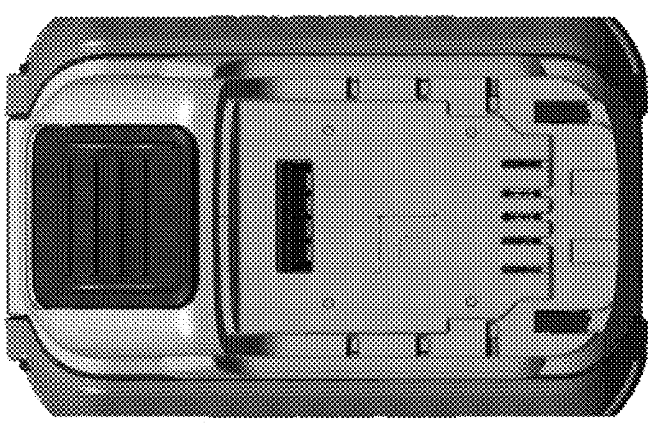
Figure 59E:
Figure 59G:
Figure 59F:
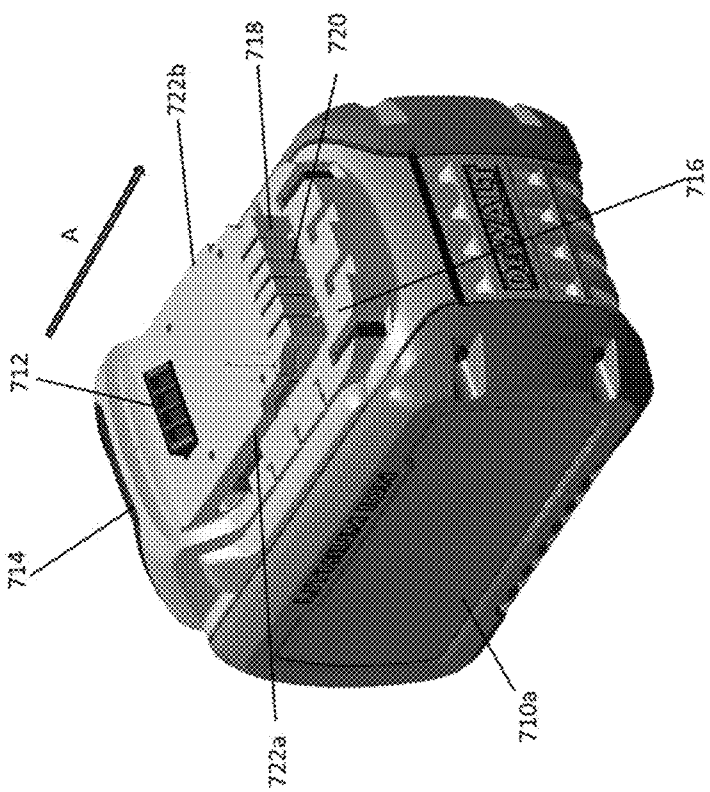
Figure 59H:
Figure 60A:
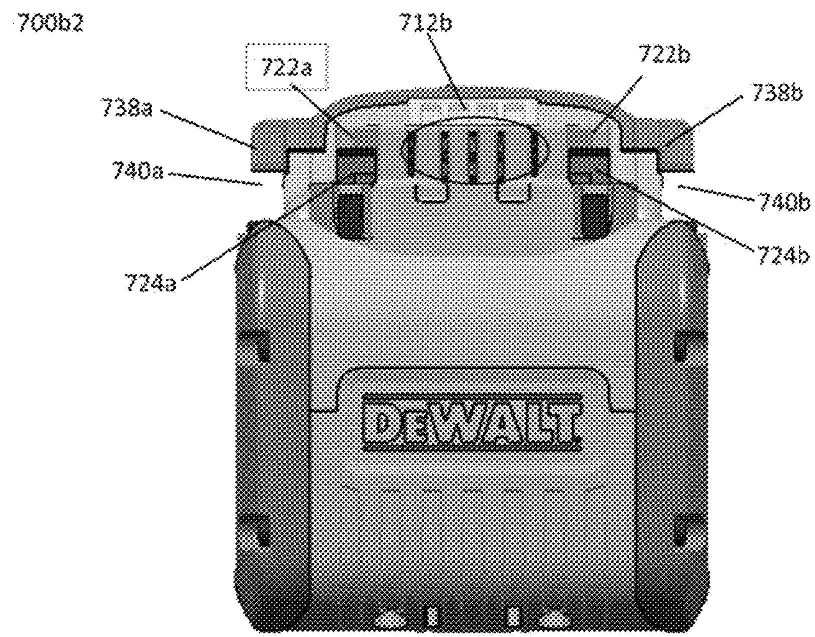
FIGS. 60*a*-60*i* illustrate another example embodiment of a battery pack of the power tool system of FIG. 57 including a primary interface element and a secondary interface element.
Figure 60C:
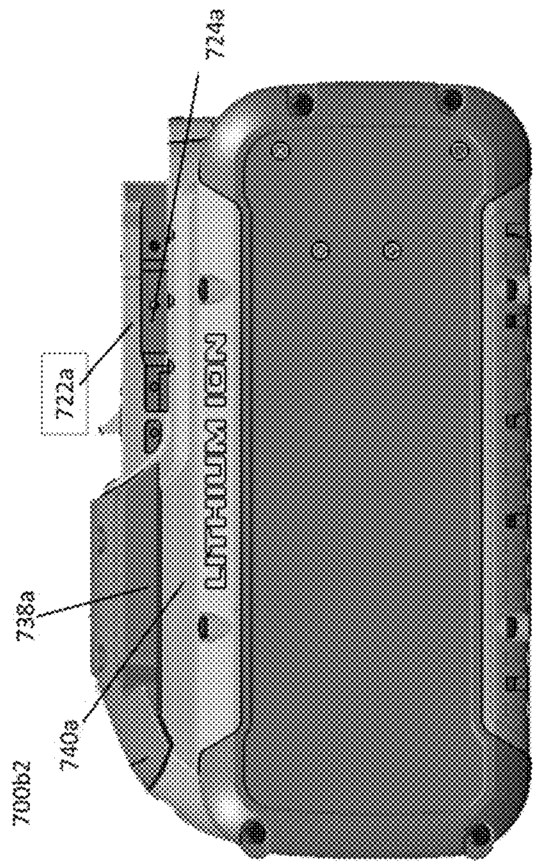
Figure 60B:
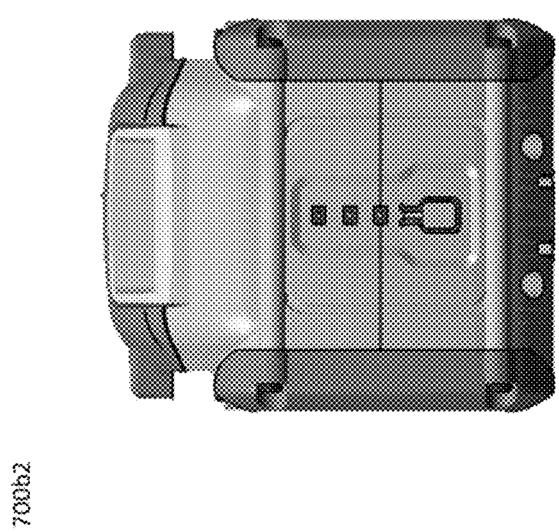
Figure 60E:
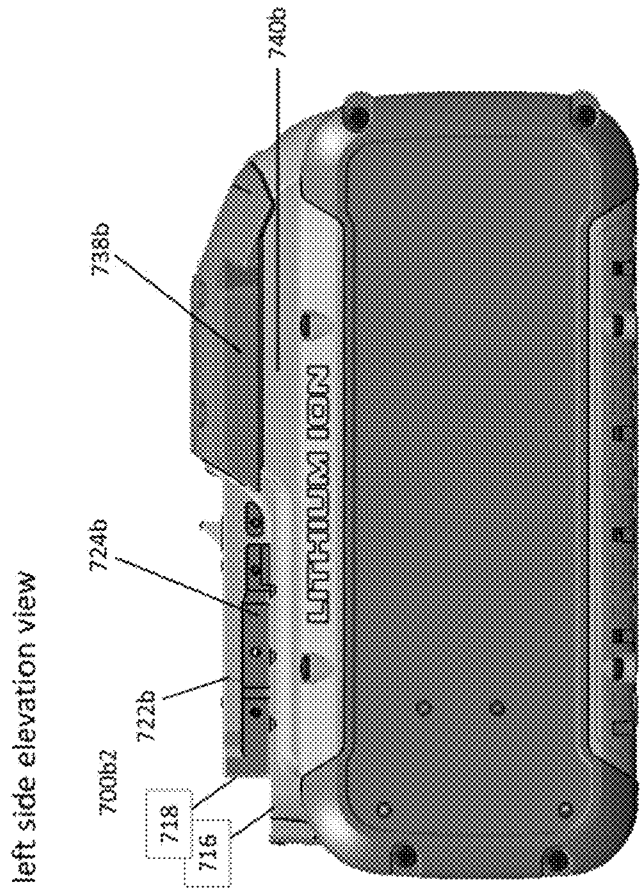
Figure 60D:
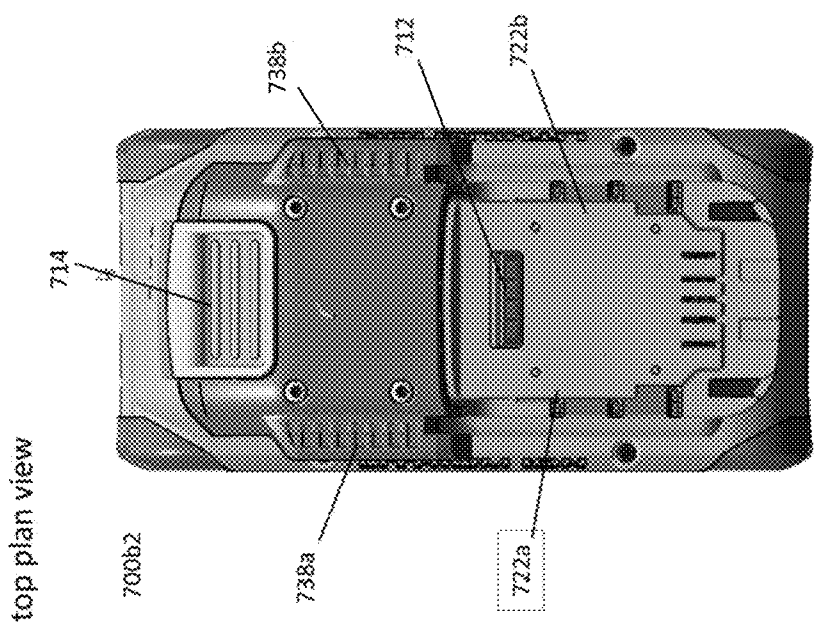
Figure 60F:
Figure 60G:
Figure 60H:
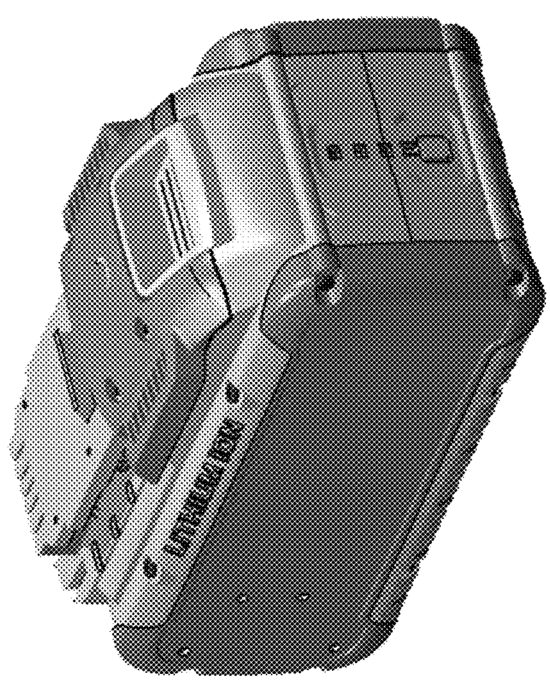
Figure 60I:
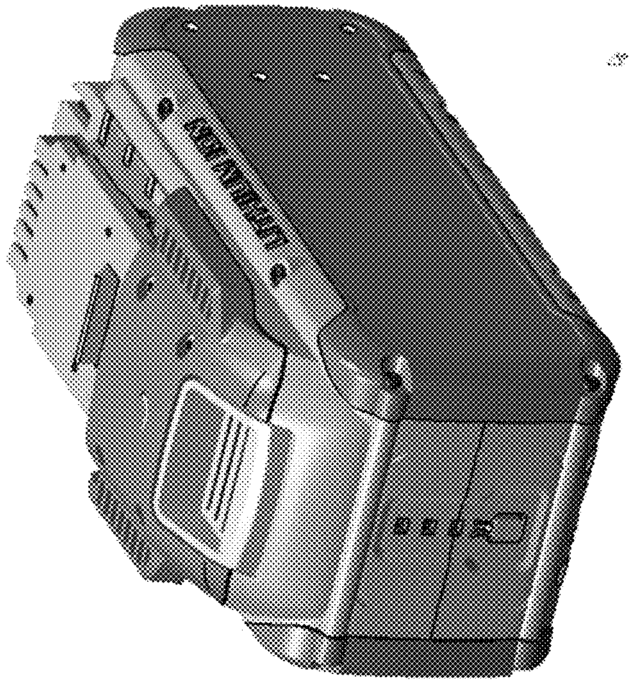

Similar to FIG. 1, FIG. 57 illustrates an example embodiment of a cordless, electric power tool system 1000. The power tool system 1000 includes a set of removable, rechargeable battery packs 700, a set of cordless electric power tools 800 and a set of battery pack chargers 900.

The set of removable, rechargeable battery packs 700 may include a subset of battery packs 700*a* having a basic interface. These battery packs may be referred to as basic interface battery packs and their interface may be referred to as a battery pack basic interface. The basic interface battery packs 700*a* may be similar to and include the same features and characteristics of the single rail interface battery packs 200*a* of FIG. 1. The basic interface battery packs 700*a* may include single voltage battery packs 700*a*1 (e.g., 18V, 20V, 40V, 60V etc.) and multi-voltage capable battery packs 700*a*2 (e.g., 18V/36V, 20V/40V, 20V/60V, etc.).

The set of battery packs 700 may include a subset of battery packs 700*b* having an advanced interface. These battery packs may be referred to as advanced interface battery packs and their interface may be referred to as a battery pack advanced interface. The advanced interface battery packs 700*b* may be similar to and include the same features and characteristics of the dual rail interface battery packs 200*b* of FIG. 1. The advanced interface battery packs 700*b* may include single voltage battery packs 700*b*1 (e.g., 18V, 20V, 40V, 60V etc.) and multi-voltage capable battery packs 700*b*2 (e.g., 18V/36V, 20V/40V, 20V/60V, etc.).

Additionally, the rechargeable battery packs 700 may include a subset of battery packs 700*c* having multiple (two) advanced interfaces. These battery packs may be referred to as multi-advanced interface battery packs and their interface may be referred to as a battery pack multi-advanced interface. The multi-advanced interface battery packs 700*c* may be similar to and include the same features and characteristics of the advanced interface battery packs 700*b* and 200*b* of FIG. 1 with the additional feature that there are two advanced interfaces combined together in one battery pack. The multi-advanced interface battery packs 700*c* may include single voltage battery packs 700*c*1 (e.g., 36V, 40V, 60V, 120V, etc.) and multi-voltage capable battery packs 700*c*2 (e.g., 36V/72V, 40V/80V, 60V/120V, etc.).

The set of cordless electric power tools 800 may include power tools that operate at different voltages. For example, the set of power tools 800 may include a subset of low voltage power tools 800*a* (e.g., 18V, 20V, etc.), a subset of medium voltage power tools 800*b* (e.g., 36V, 40V, 60V, etc.), and a set of high voltage power tools 800*c* (e.g., 72V, 80V, 120V, etc.).

The subset of low voltage power tools 800*a* may include tools having a basic interface 800*a*1, for example a drill driver. These power tools may be referred to as basic interface power tools and their interface may be referred to as a power tool basic interface The basic interface tools 800*a*1 may be similar to and include the same features and characteristics of the single rail interface tools 300*a* of FIG. 1.

The subset of medium voltage power tools 800*b* may include power tools having a basic interface 800*b*1, power tools having an advanced interface 800*b*2 and power tools having multiple (two) advanced interfaces. The power tools having an advanced interface may be referred to as advanced interface power tools and their interface may be referred to as a power tool advanced interface. The advanced interface power tools 800*b* may be similar to and include the same features and characteristics of the dual rail interface tools 300*b* of FIG. 1. The power tools having multiple advanced interfaces may be referred to as multi-advanced interface power tools and their interface may be referred to as a power tool multi-advanced interface.

The subset of high voltage power tools 800*c* may include power tools having a multiple basic interfaces 800*c*1 and power tools having multiple (two) advanced interfaces 800*c*2. The power tools having multiple basic interfaces may be referred to as multi-basic interface power tools and their interface may be referred to as a power tool multi-basic interface. The multi-basic interface power tools 800*c*1 may be similar to and include the same features and characteristics of the single rail interface tools 300*a* of FIG. 1.

The battery packs 700 and the power tools 800 illustrated in FIG. 57 may be compatible as noted below. For example, assuming that the rated voltage of the battery pack matches the operating voltage of the power tool, the basic interface battery packs 700*a* may be compatible with the low voltage power tools 800*a*, the medium voltage power tools 800*b* and the high voltage power tools 800*c*. In addition, for example, assuming that the rated voltage of the battery pack matches the operating voltage of the power tool, the advanced interface battery packs 700*b* may be compatible with the low voltage power tools 800*a*, the medium voltage power tools 800*b* and the high voltage power tools 800*c*. In addition, for example, assuming that the rated voltage of the battery pack matches the operating voltage of the power tool, the multi-advanced interface battery packs 700*c* may be compatible with the medium voltage power tools 800*b*3 and the high voltage power tools 800*c*.

The set of battery pack chargers 900 may include a subset of single port chargers 900*a* capable of charging to (a) a single voltage set point, e.g., a low voltage set point, a medium voltage set point or a high voltage set point or (b) to multiple set points, depending upon the coupled battery pack, e.g., low voltage/medium voltage set points, medium voltage/high voltage set points and a subset of dual port chargers 900*b* capable of charging to (a) a single set point, e.g., a low voltage set point, a medium voltage set point or a high voltage set point or (b) to multiple set points, depending upon the coupled battery pack, e.g., low voltage/medium voltage set points, medium voltage/high voltage set points. The battery packs 700 and the battery chargers 900 illustrated in FIG. 57 may be compatible as noted below. For example, assuming that the rated voltage of the battery pack matches the charging voltage set point of the battery charger, the basic interface battery packs 700*a* may be compatible with the single port battery chargers 900*a* and the dual port battery chargers 900*b*. In addition, for example, assuming that the rated voltage of the battery pack matches the charging voltage set point of the battery charger, the advanced interface battery packs 700*b* may be compatible with the single port battery chargers 900*a* and the dual port battery chargers 900*b*. In addition, for example, assuming that the rated voltage of the battery pack matches the charging voltage set point of the battery charger, the multi-advanced interface battery packs 700*c* may be compatible with the dual port battery chargers 900*b*.

FIGS. 58*a*-58*i* illustrate another example embodiment of a basic interface battery pack 700*a*1 of the power tool system of FIG. 57 including a primary interface element. The basic interface battery pack 700*a*1 includes the features and characteristics of the single rail interface battery pack 200*a*1 of FIGS. 2*a*-2*d*. The reference numbers used in FIGS. 58*a*-58*i* refer to the same components and description above with respect to the reference numbers used in FIGS. 2*a*-2*d* with the exception that 700 series reference numbers are used in FIGS. 58*a*-58*i* instead of the 200 series reference numbers used in FIGS. 2*a*-2*d*.

FIGS. 59*a*-59*h* illustrate another example embodiment of a basic interface battery pack 700*a*2 of the power tool system of FIG. 57 including a primary interface element. The basic interface battery pack 700*a*2 includes the features and characteristics of the single rail interface battery pack 200*a*1 of FIGS. 2*a*-2*d*. The reference numbers used in FIGS. 59*a*-59*h* refer to the same components and description above with respect to the reference numbers used in FIGS. 2*a*-2*d* with the exception that 700 series reference numbers are used in FIGS. 59*a*-59*h* instead of the 200 series reference numbers used in FIGS. 2*a*-2*d*.

FIGS. 60*a*-60*i* illustrate another example embodiment of an advanced interface battery pack 700*b*2 of the power tool system of FIG. 57 including a primary interface element and a secondary interface element. The advanced interface battery pack 700*b*2 includes the features and characteristics of the dual rail interface battery pack 200*b*1 of FIGS. 5*a*-5*d*. The reference numbers used in FIGS. 60*a*-60*i* refer to the same components and description above with respect to the reference numbers used in FIGS. 5*a*-5*d* with the exception that 700 series reference numbers are used in FIGS. 60*a*-60*i* instead of the 200 series reference numbers used in FIGS. 5*a*-5*d*.

Figure 61B:
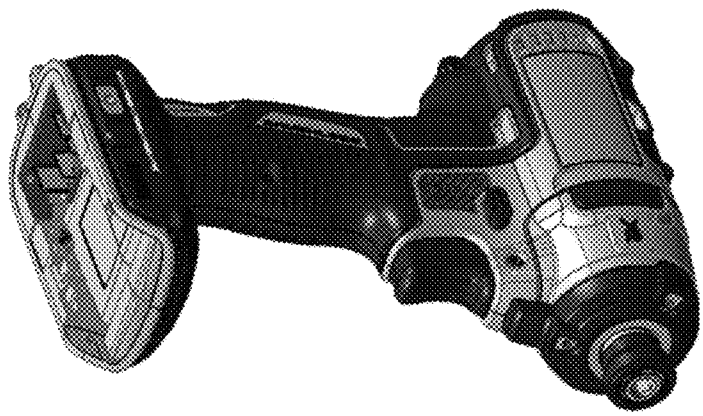
FIG. 61*a*-61*b* illustrates an example embodiment of a power tool of the power tool system of FIG. 57 including only a primary interface element.
Figure 61A:
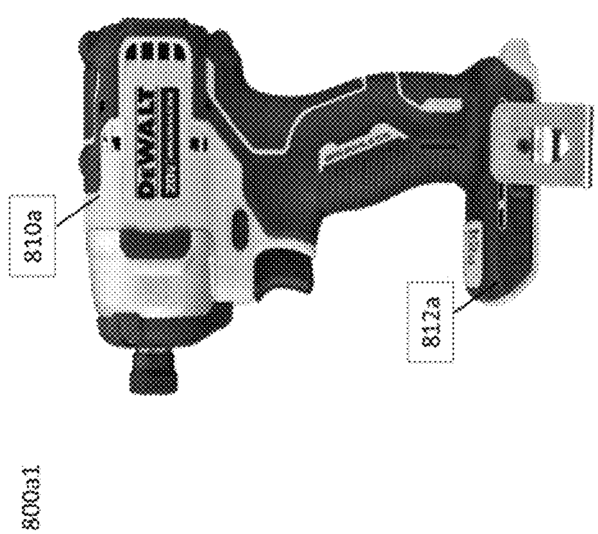

FIGS. 61*a*-1*b* illustrate an example embodiment of a basic interface power tool 800*a*1 of the power tool system of FIG. 57 including a primary interface element. The basic interface power tool 800*a*1 includes the features and characteristics of the single rail interface power tool 300*a*1 of FIGS. 3*a*-3*d*. The reference numbers used in FIG. 61 refer to the same components and description above with respect to the reference numbers used in FIGS. 3*a*-3*d* with the exception that 800 series reference number are used in FIG. 61 instead of the 300 series reference numbers used in FIGS. 3*a*-3*d*.

Figure 62B:
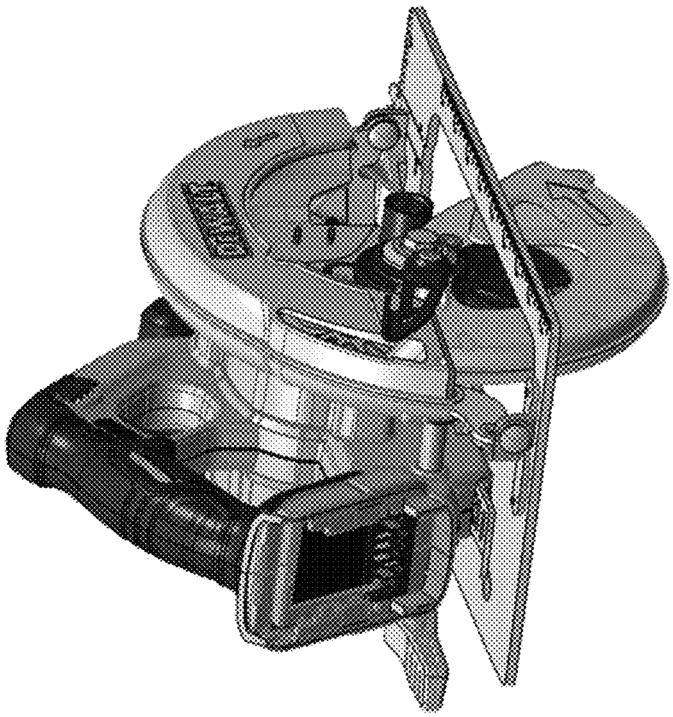
FIG. 62*a*-62*b* illustrates another example embodiment of a power tool of the power tool system of FIG. 57 including only a primary interface element.
Figure 62A:
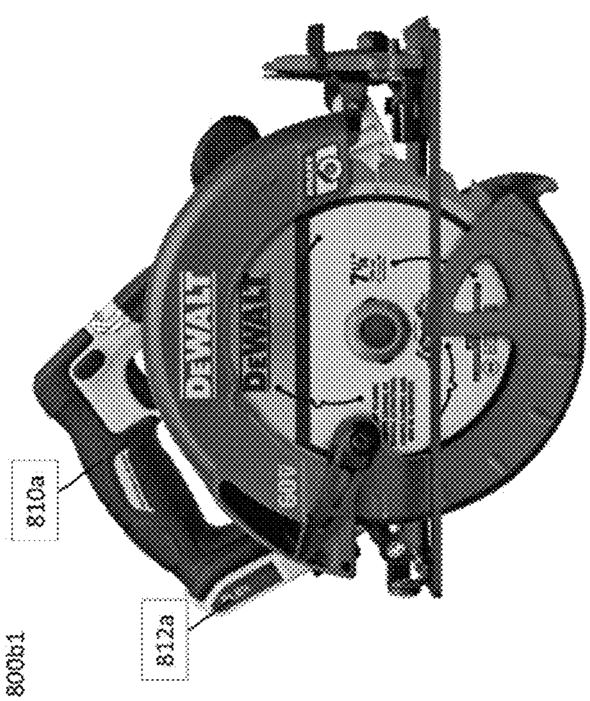
Figure 63A:
FIGS. 63*a*-63*d* illustrate an example embodiment of a power tool of the power tool system of FIG. 57 including a primary interface element and a secondary interface element.
Figure 63B:
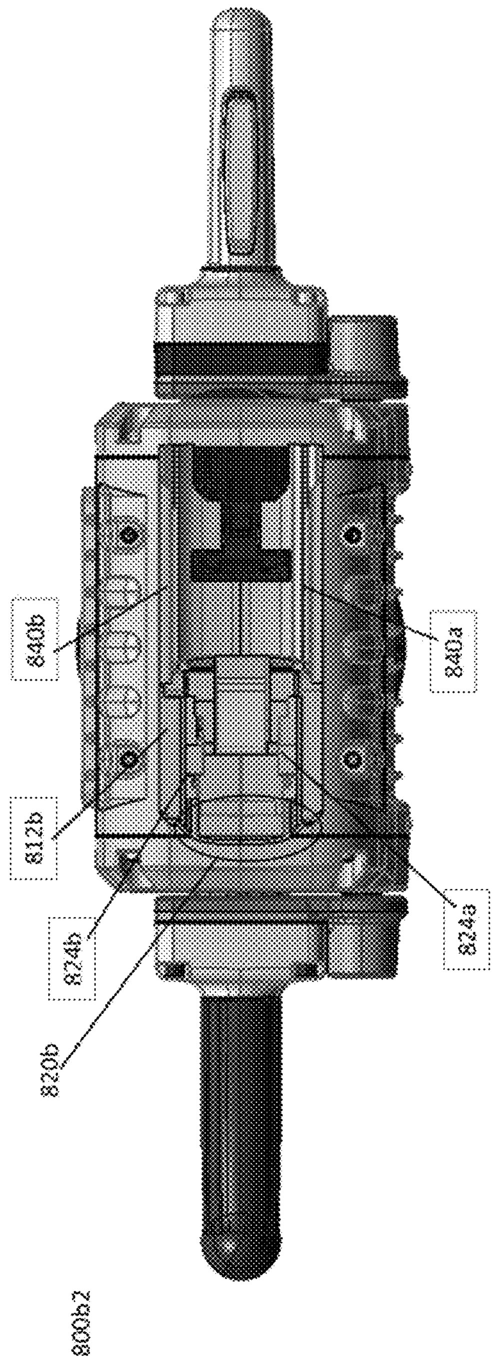
Figure 63C:
Figure 63D:

FIGS. 62*a*-62*b* illustrate another example embodiment of a basic interface power tool 800*b*1 of the power tool system of FIG. 57 including a primary interface element. The basic interface power tool 800*b*1 includes the features and characteristics of the single rail interface power tool 300*a*1 of FIGS. 3*a*-3*d*. The reference numbers used in FIG. 62 refer to the same components and description above with respect to the reference numbers used in FIGS. 3*a*-3*d* with the exception that 800 series reference number are used in FIG. 61 instead of the 300 series reference numbers used in FIGS. 3*a*-3*d*.

FIGS. 63*a*-63*d* illustrate an example embodiment of an advanced interface power tool 800*b*2 of the power tool system of FIG. 57 including a primary interface element and a secondary interface element. The advanced interface power tool 800*b*21 includes the features and characteristics of the dual rail interface power tool 300*b*1 of FIGS. 7*a*-7*d*. The reference numbers used in FIGS. 63*a*-63*d* refer to the same components and description above with respect to the reference numbers used in FIGS. 7*a*-7*d* with the exception that 800 series reference number are used in FIGS. 63*a*-63*d* instead of the 300 series reference numbers used in FIGS. 7*a*-7*d*.

Figure 64:
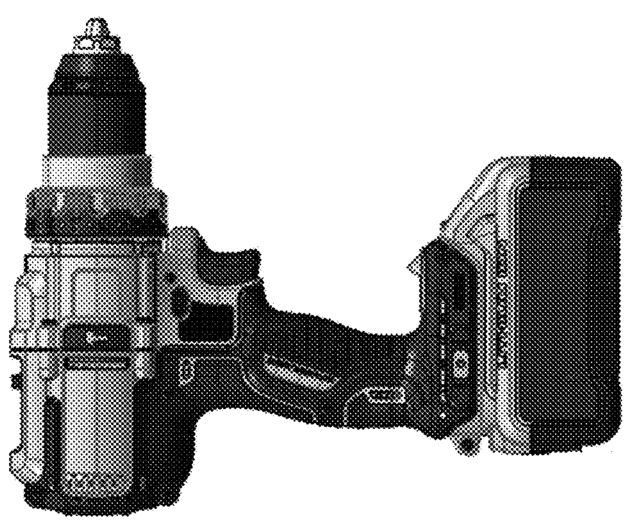
FIG. 64 illustrates a combination of an example battery pack including only a primary interface element and an example power tool including only a primary interface element of the power tool system of FIG. 57.

FIG. 64 illustrates a combination of an example basic interface battery pack 700*a*1 including a primary interface element and an example basic interface power tool 800*a*1 including a primary interface element of the power tool system of FIG. 57.

Figure 65:
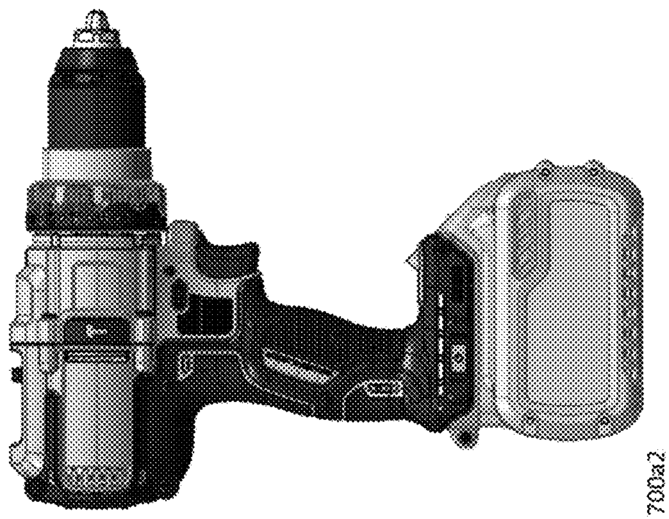
FIG. 65 illustrates a combination of an example battery pack including only a primary interface element and an example power tool including only a primary interface element of the power tool system of FIG. 57.

FIG. 65 illustrates a combination of an example basic interface battery pack 700*a*2 including a primary interface element and an example basic interface power tool 800*a*1 including a primary interface element of the power tool system of FIG. 57.

Figure 66:
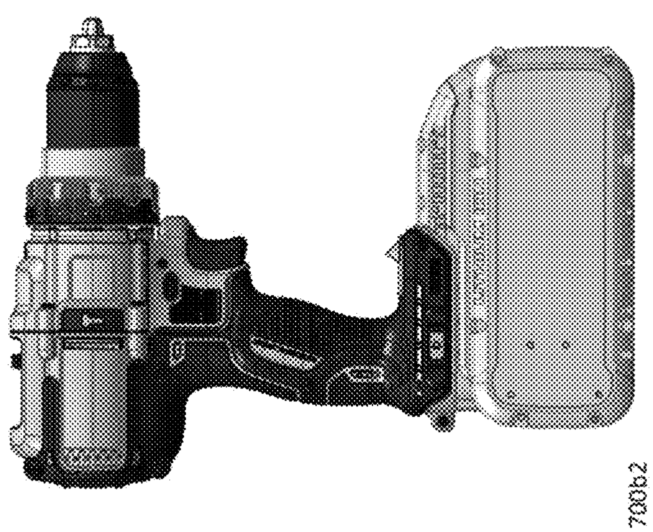
FIG. 66 illustrates a combination of an example battery pack including a primary interface element and a secondary interface element and an example power tool including only a primary interface element of the power tool system of FIG. 57.

FIG. 66 illustrates a combination of an example advanced interface battery pack 700*b*2 including a primary interface element and a secondary interface element and an example basic interface power tool 800*a*1 including a primary interface element of the power tool system of FIG. 57.

Figure 67:
FIG. 67 illustrates a combination of an example battery pack including only a primary interface element and an example power tool including only a primary interface element of the power tool system of FIG. 57.

FIG. 67 illustrates a combination of an example basic interface battery pack 700*a*2 including a primary interface element and an example basic interface power tool 800*b*1 including a primary interface element of the power tool system of FIG. 57.

Figure 68:
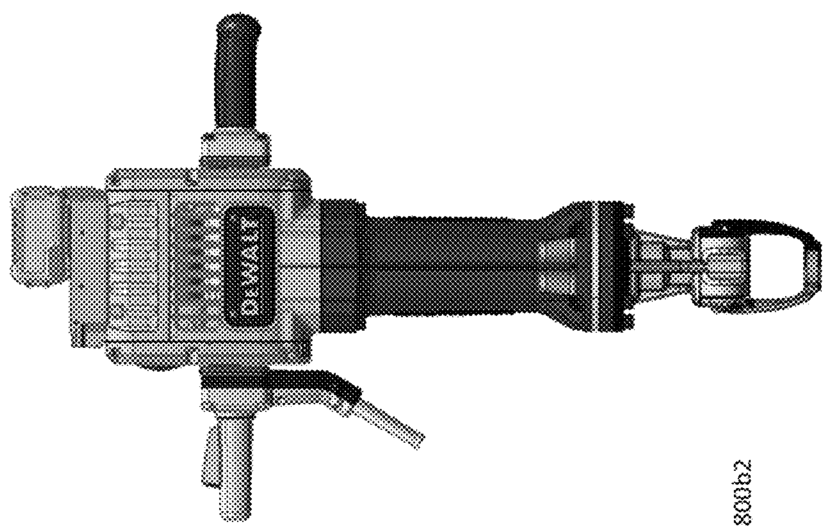
FIG. 68 illustrates a combination of an example battery pack including only a primary interface element and an example power tool including a primary interface element and a secondary interface element of the power tool system of FIG. 57.

FIG. 68 illustrates a combination of an example basic interface battery pack 700*a*2 including a primary interface element and an example advanced interface power tool

800b2 including a primary interface element and a secondary interface element of the power tool system of FIG. 57.

Figure 69:
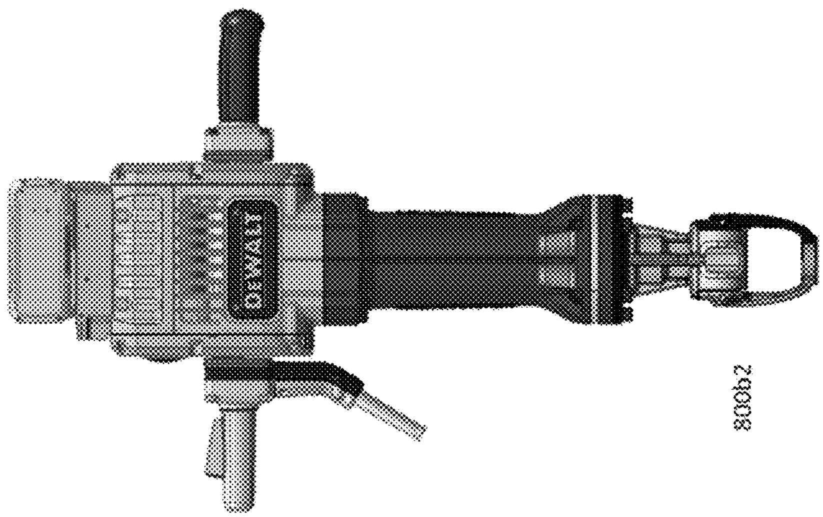
FIG. 69 illustrates a combination of an example battery pack including a primary interface element and a secondary interface element and an example power tool including a primary interface element and a secondary interface element of the power tool system of FIG. 57.

FIG. 69 illustrates a combination of an example advanced interface battery pack 700b2 including a primary interface element and a secondary interface element and an example advanced interface power tool 800b2 including a primary interface element and a secondary interface element of the power tool system of FIG. 57.

Figure 70:
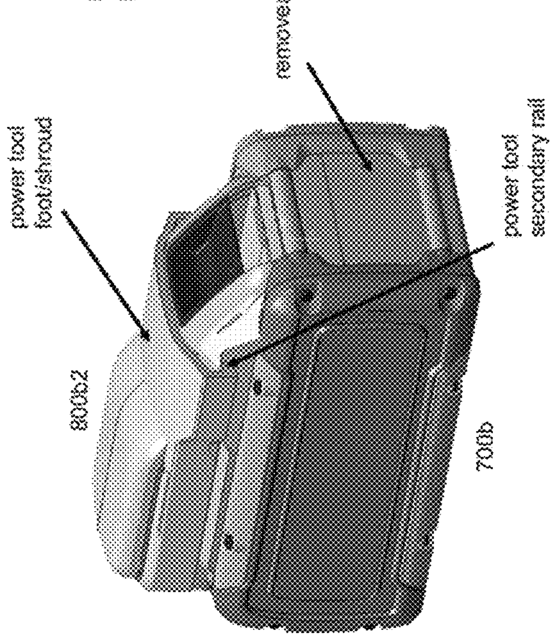
FIG. 70 illustrates another example combination of an example battery pack including a primary interface element and a secondary interface element and an example power tool (foot/shroud) including a primary interface element and a secondary interface element after mating.
Figure 71:
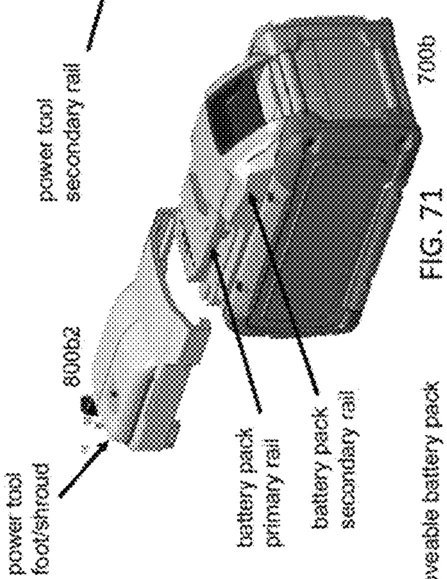
FIG. 71 illustrates the example combination of FIG. 70 prior to mating.
Figure 72:
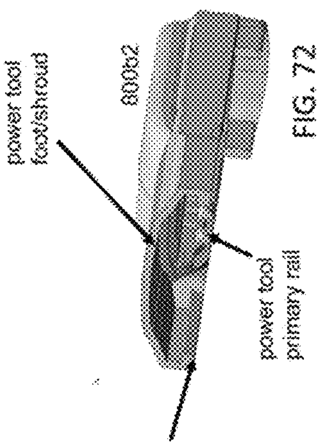
FIG. 72 illustrates the example power tool (foot/shroud) of FIGS. 70 and 71.
Figure 73:
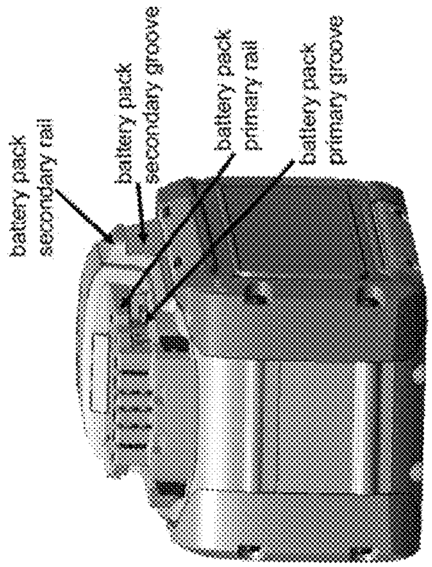
FIG. 73 illustrates the example battery pack of FIGS. 70 and 71.
Figure 75:
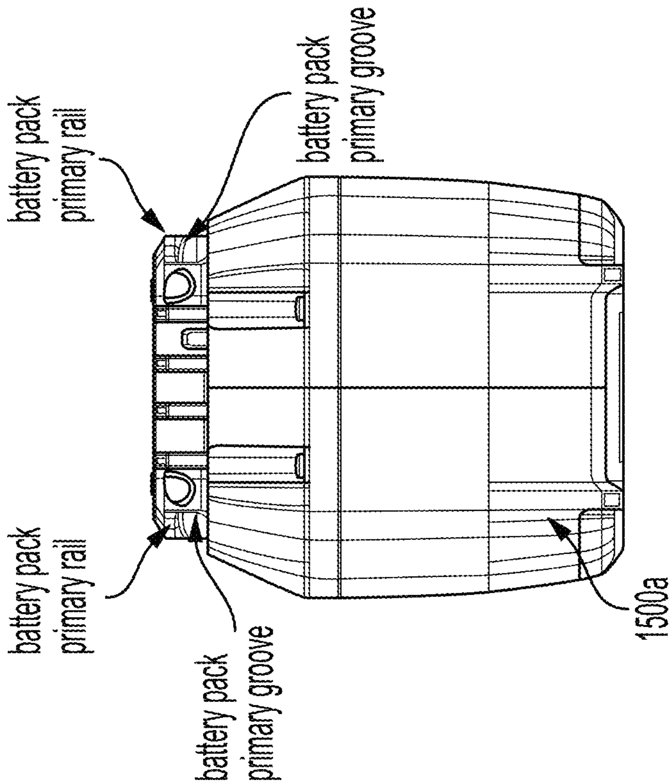
FIGS. 74-77 illustrate another example embodiment of a battery pack including only a primary interface element.
Figure 74:
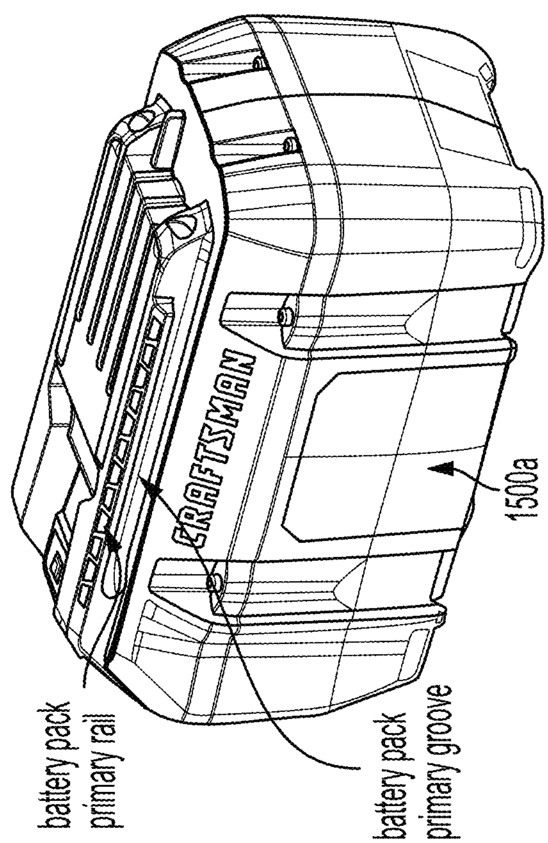
Figure 77:
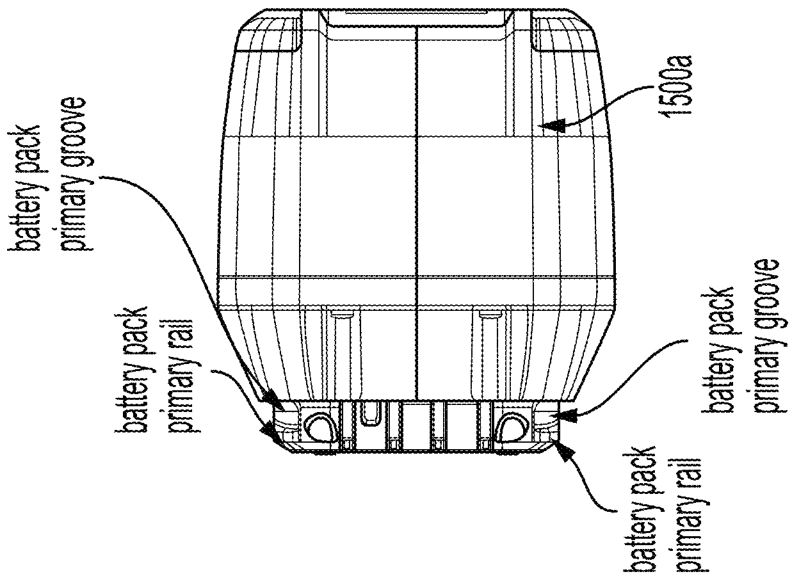
Figure 76:
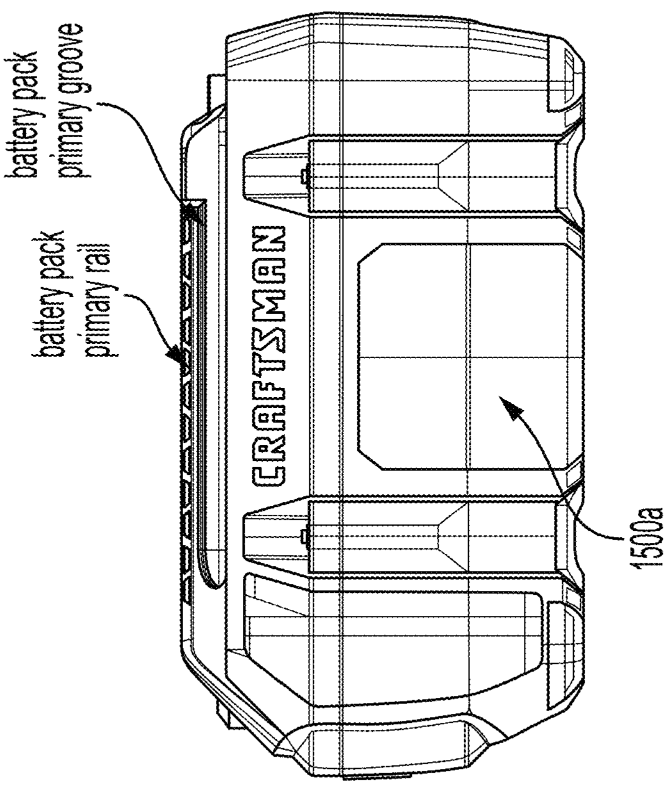

FIG. 70 illustrates another example combination of an example advanced interface battery pack 700b including a primary interface element and a secondary interface element and an example advanced interface power tool 800b2 (foot/shroud) including a primary interface element and a secondary interface element after mating. FIG. 71 illustrates the example combination of FIG. 70 prior to mating. FIG. 72 illustrates the example power tool 800b2 (foot/shroud) of FIGS. 70 and 71. FIG. 73 illustrates the example battery pack 700b of FIGS. 70 and 71.

FIGS. 74-77 illustrate another example embodiment of a basic interface battery pack 1500a including a primary interface element.

Figure 79:
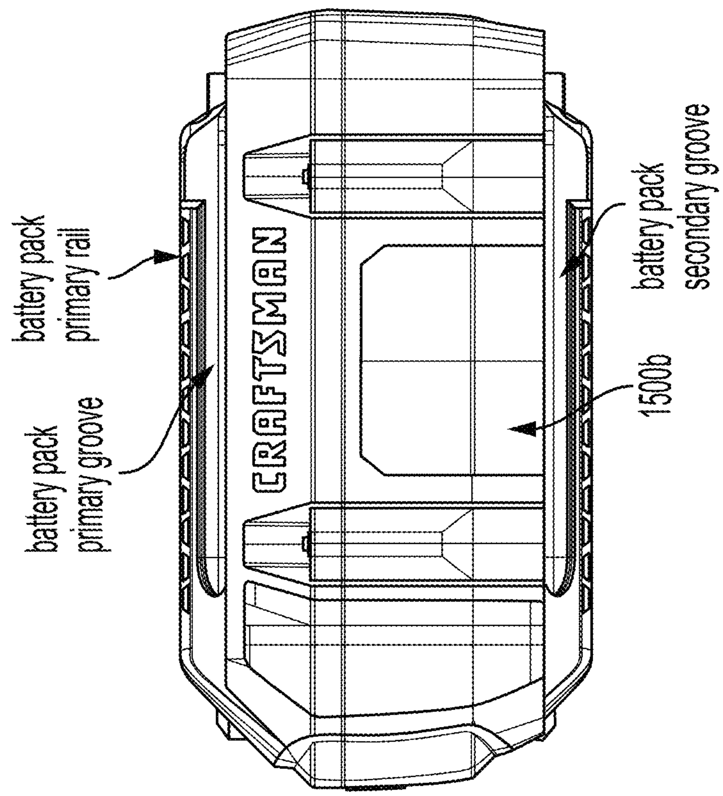
FIGS. 78 and 79 illustrate another example embodiment of a battery pack including a primary interface element and a secondary interface element.
Figure 78:
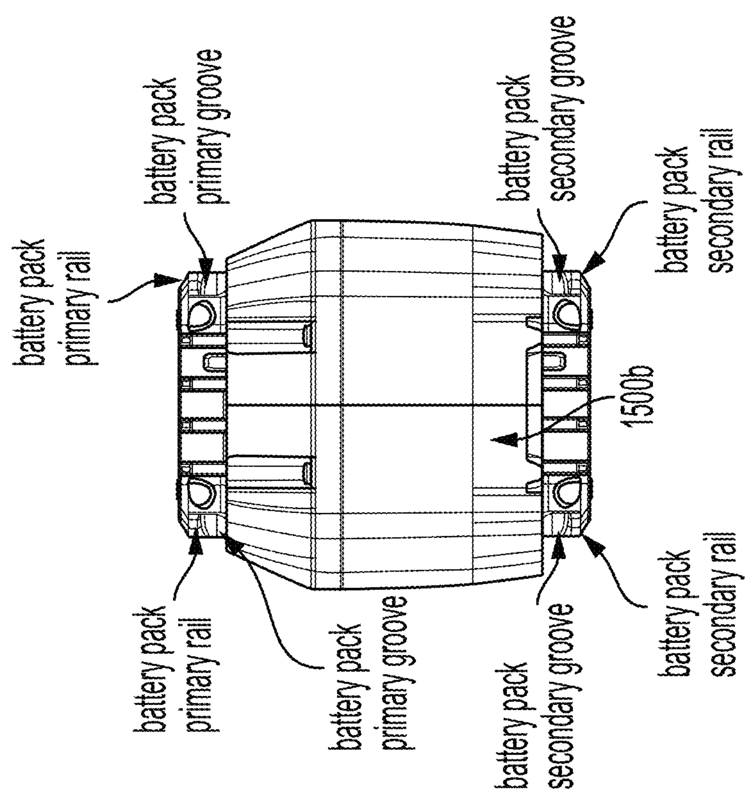

FIGS. 78 and 79 illustrate another example embodiment of an advanced interface battery pack 1500b including a primary interface element and a secondary interface element.

Figure 81:
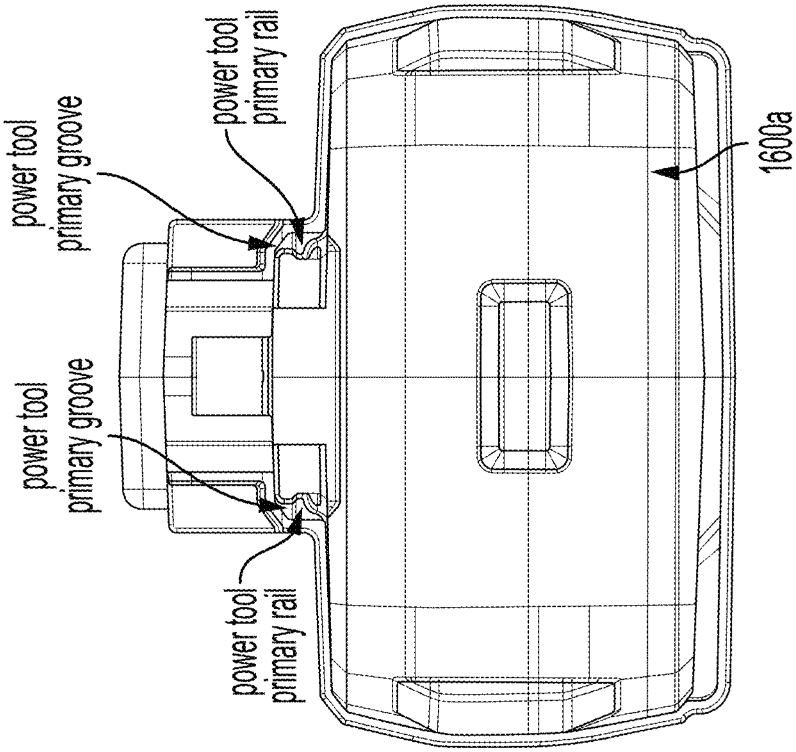
FIGS. 80-82 illustrate another example embodiment of a power tool (foot/shroud) including only a primary interface element.
Figure 80:
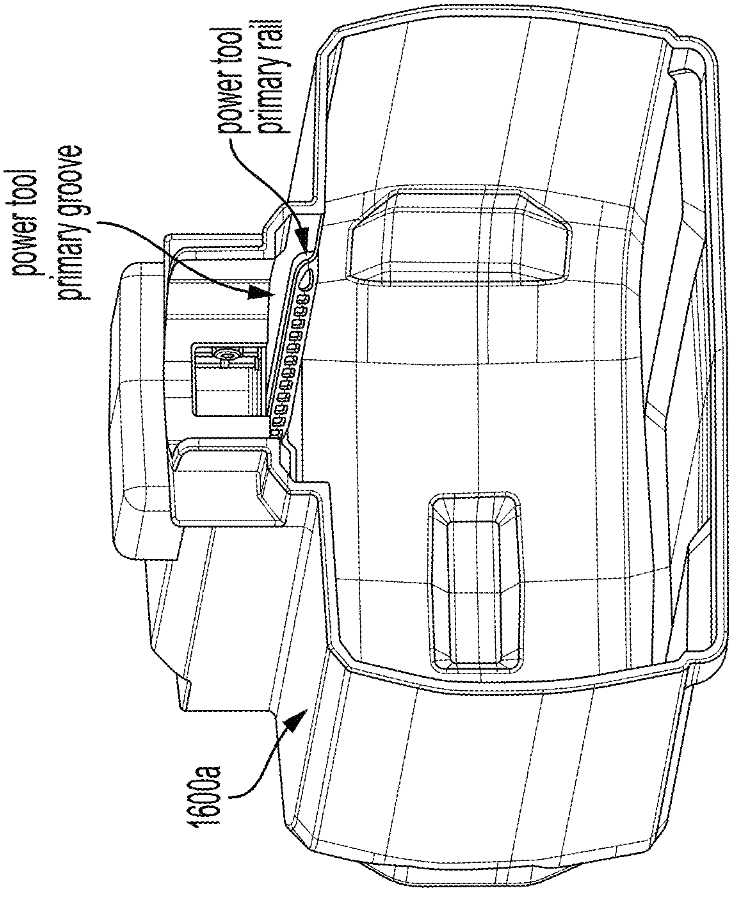
Figure 82:
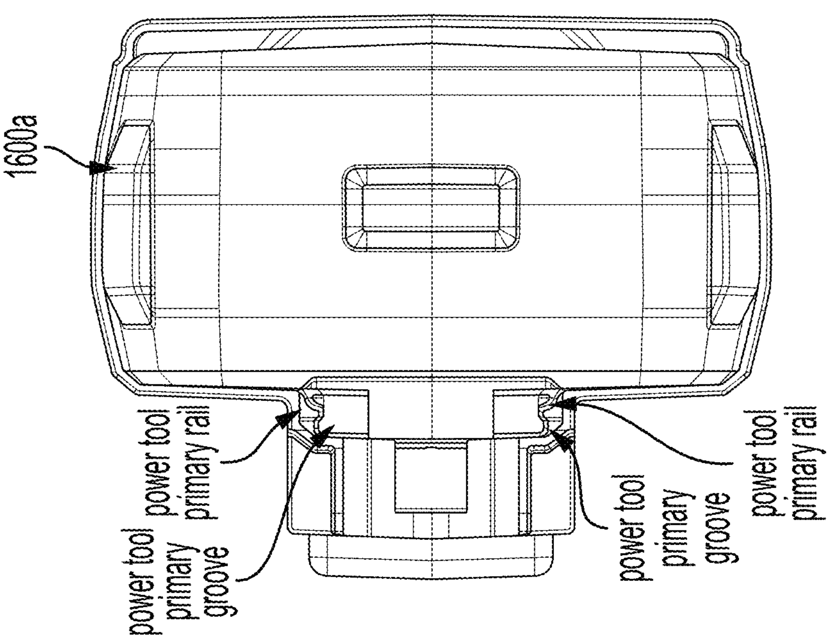

FIGS. 80-82 illustrate another example embodiment of a basic interface power tool (foot/shroud) 1600a including a primary interface element.

Figure 83:
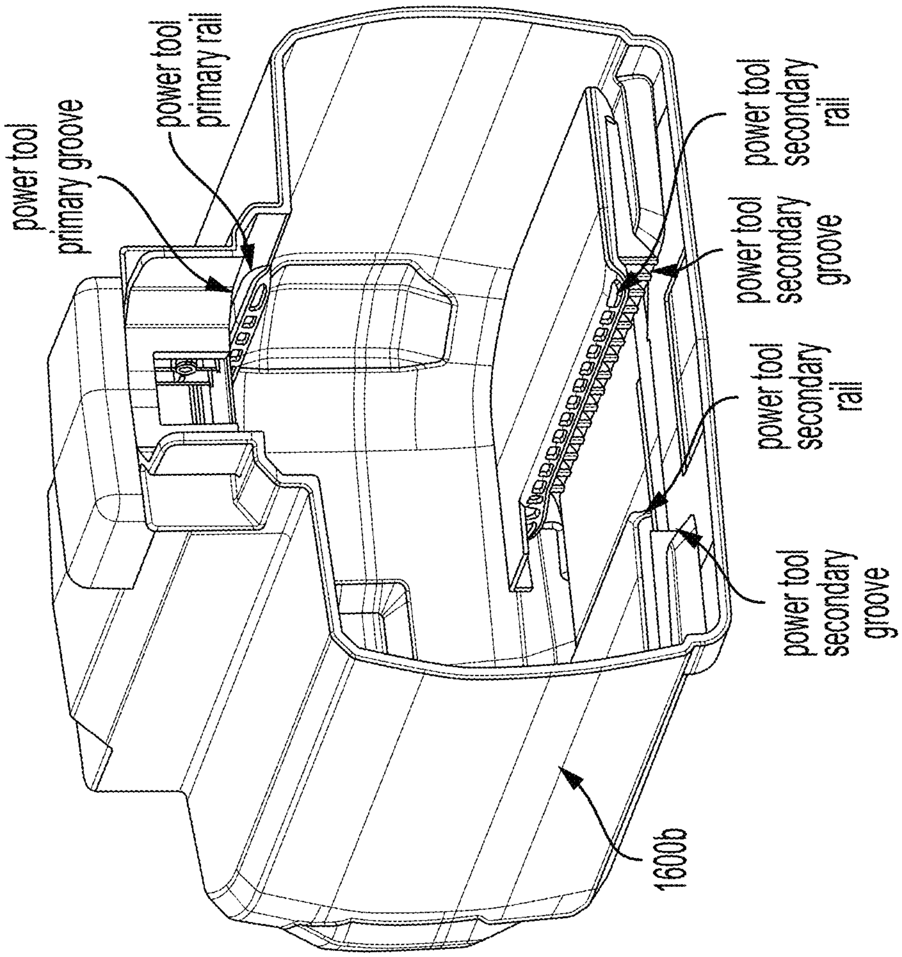
FIGS. 83 and 84 illustrate another example embodiment of a power tool (foot/shroud) including a primary interface element and secondary interface element.
Figure 84:
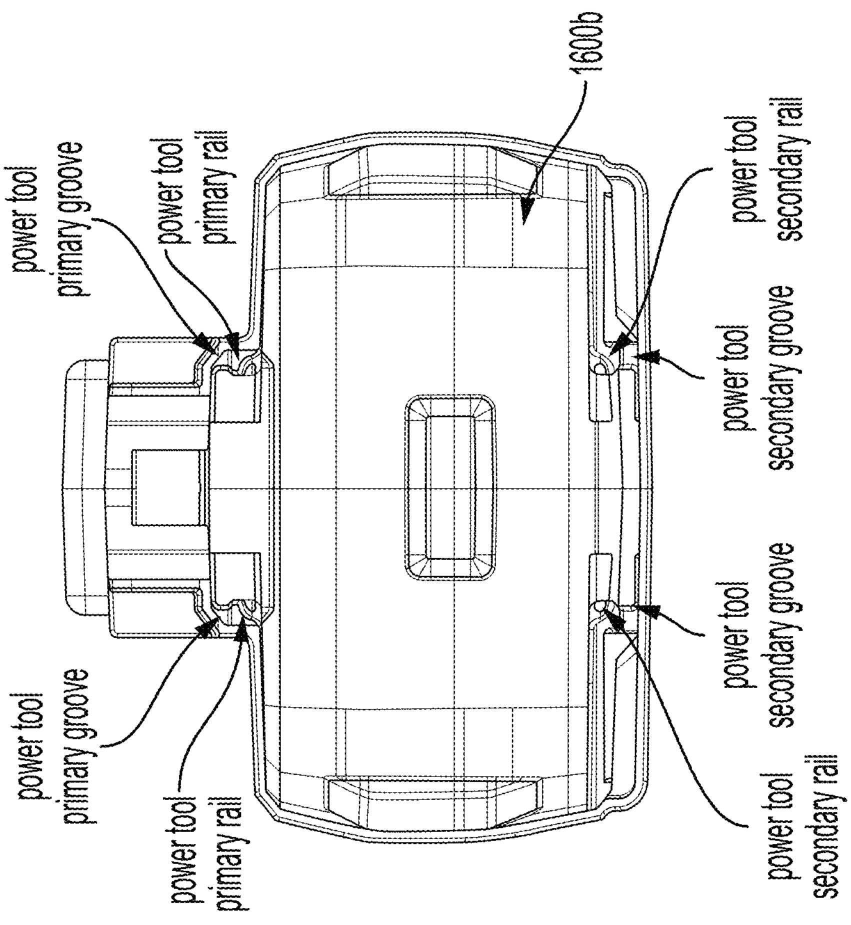

FIGS. 83 and 84 illustrate another example embodiment of an advanced interface power tool (foot/shroud) 1600b including a primary interface element and secondary interface element.

Figure 85:
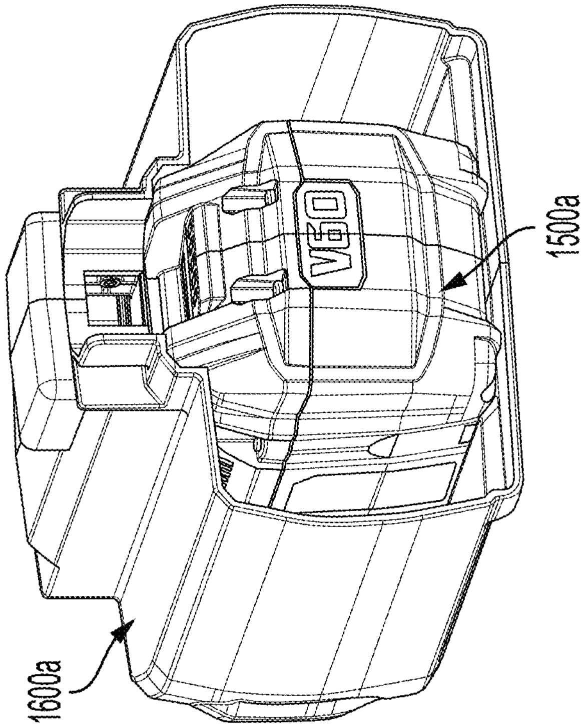
FIGS. 85-87 illustrate a combination of the battery pack of FIGS. 74-77 and the power tool (foot/shroud) of FIGS. 80-82.
Figure 86:
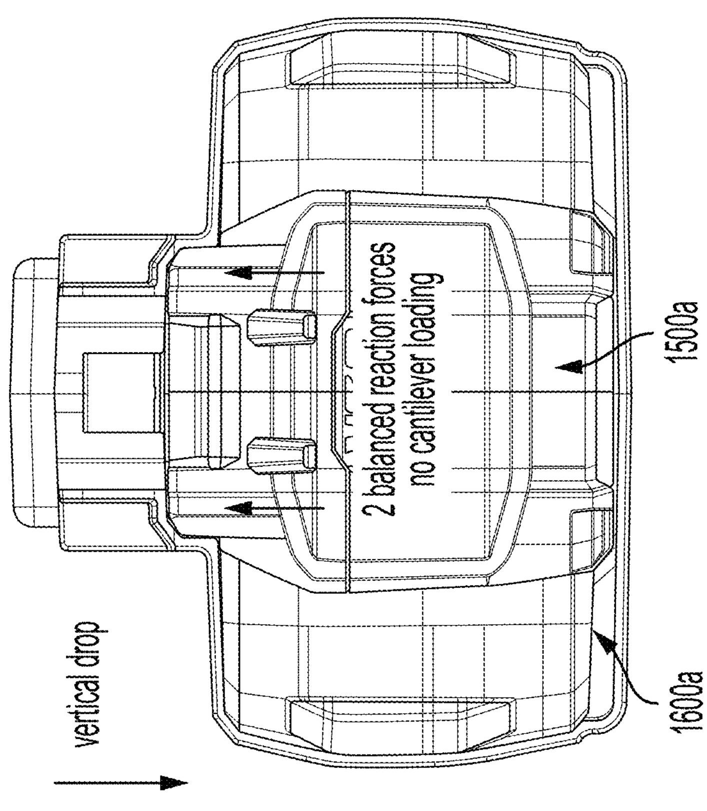
Figure 87:
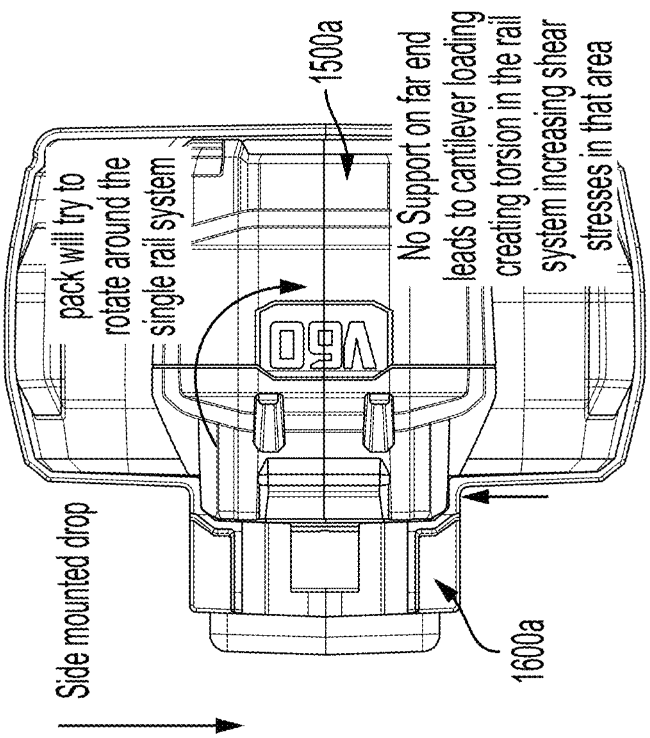

FIGS. 85-87 illustrate a combination of the basic interface battery pack 1500a of FIGS. 74-77 and the basic interface power tool (foot/shroud) 1600a of FIGS. 80-82.

Figure 89:
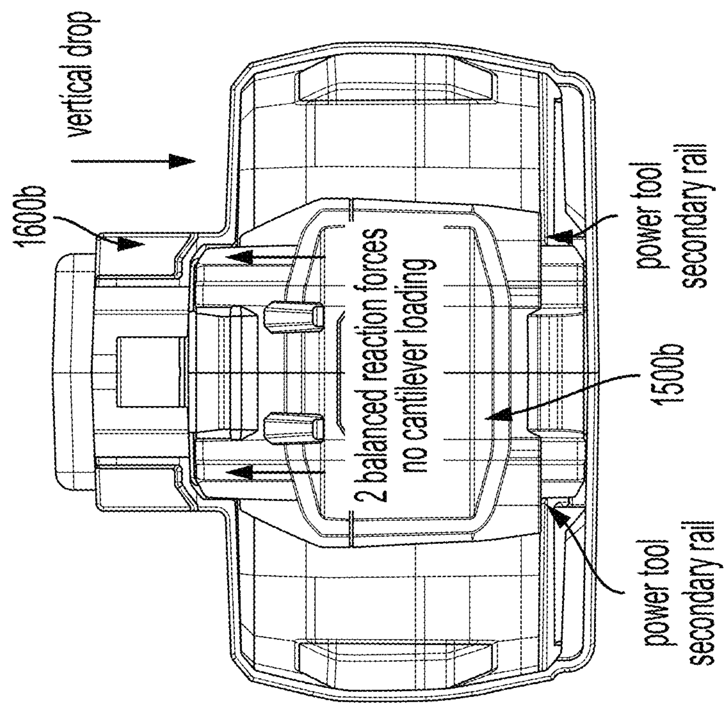
FIGS. 88-90 illustrate a combination of the battery pack of FIGS. 78 and 79 and the power tool (foot/shroud) of FIGS. 83 and 84.
Figure 88:
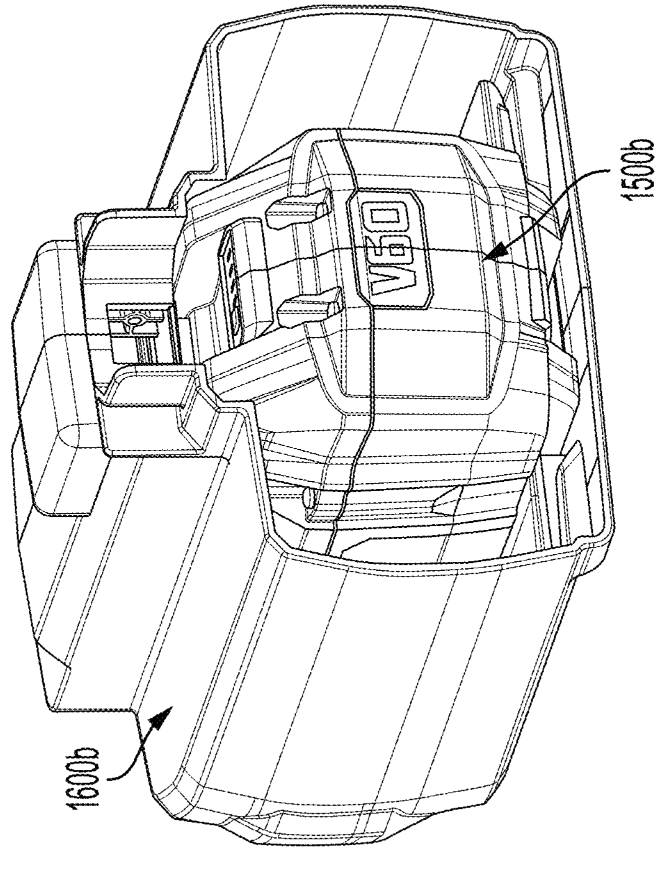
Figure 90:
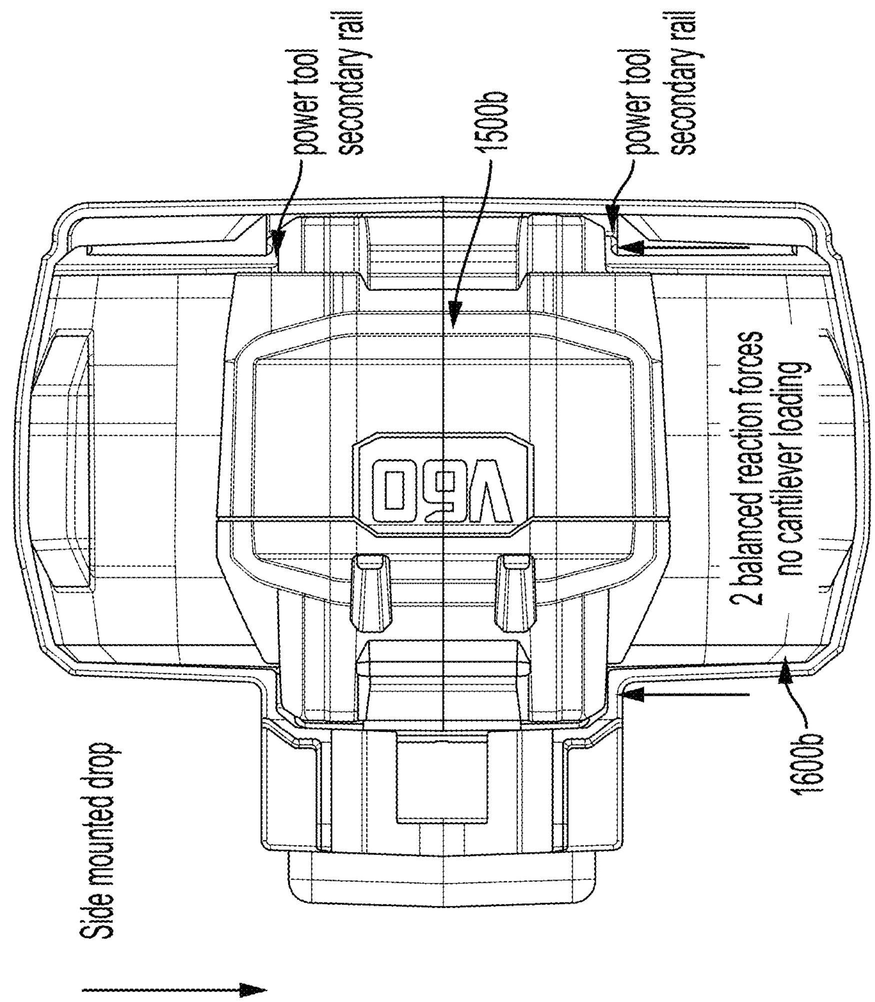

FIGS. 88-90 illustrate a combination of the advanced interface battery pack 1500b of FIGS. 78 and 79 and the advanced interface power tool (foot/shroud) 1600b of FIGS. 83 and 84.

A battery pack may include an interface for mating with an interface of an electrical device, e.g., a cordless electric power tool or battery pack charger. The battery pack interface may include an interface element. The interface element may include a set of rails. The interface element may also include a set of grooves. The interface may also include a latch and a user actuation button for actuating the latch.

The use of the terms primary and secondary is not intended to indicate or infer that primary is of greater importance or significance than secondary. The same is true with the use of principal and supplemental or main and auxiliary or basic and additional, in any combination.

Numerous modifications may be made to the exemplary implementations described above. These and other implementations are within the scope of this application.

What is claimed is:

1. A removable battery pack for providing electrical energy to a cordless electric tool, the removable battery pack comprising: a housing having a forward side and a rearward side, the forward side including a plurality of terminal slots; and an interface including a first set of rails and a second set of rails, the second set of rails having a set of front walls, the first set of rails positioned closer to the forward side than the second set of rails, and the first set of rails starting forward of the set of front walls of the second set of rails such that the first set of rails do not overlap with the second set of rails, wherein the first set of rails includes two rails in a first plane and the second set of rails includes two rails in a second plane, each of the two rails of the first set of rails includes aside wall, the side walls of the two rails of the first set of rails being parallel to each other and separated by a first distance and each of the two rails of the second set of rails includes a side wall, the side walls of the two rails of the second set of rails being parallel to each other and separated by a second distance, the first distance being less than the second distance.

2. The removable battery pack, as recited in claim 1, wherein the first set of rails are in a same horizontal plane as the second set of rails.

3. The removable battery pack, as recited in claim 1, wherein the first set of rails are not in a same horizontal plane as the second set of rails.

4. The removable battery pack, as recited in claim 1, wherein the battery pack housing includes a datum plane and the first set of rails are offset from the datum plane by a first distance and the second set of rails are offset from the datum plane by a second distance.

5. The removable battery pack, as recited in claim 4, wherein the battery pack housing is configured to mate with the cordless electric tool in a mating direction and wherein the datum plane is parallel to the mating direction and wherein the first distance is offset from the datum plane in a direction perpendicular to the datum plane and wherein the second distance is offset from the datum plane in a direction perpendicular to the datum plane.

6. The removable battery pack, as recited in claim 1, further comprising a first set of grooves associated with the first set of rails and a second set of grooves associated with the second set of rails.

7. The removable battery pack, as recited in claim 6, wherein the first set of grooves defines a first groove height dimension and the second set of grooves defines a second groove height dimension, the first groove height dimension being a same groove height dimension as the second groove height dimension.

8. The removable battery pack, as recited in claim 6, wherein the first set of grooves does not overlap with the second set of grooves.

9. The removable battery pack, as recited in claim 1, wherein the removable battery pack is compatible with both a single rail interface power tool and a dual rail interface power tool.

10. The removable battery pack, as recited in claim 1, wherein the first set of rails defines a first rail height dimension and the second set of rails defines a second rail height dimension, the first rail height dimension being a same rail height dimension as the second rail height dimension.

11. A cordless electric power tool for receiving electrical energy from a removable battery pack, the cordless electric power tool comprising: a housing having a forward side and a rearward side, the forward side including a plurality of terminal slots; and an interface including a first set of power tool rails and a second set of power tool rails, the second set of power tool rails having a set of front walls, the first set of power tool rails positioned closer to the forward side than the second set of power tool rails, and the first set of power tool rails starting forward of the set of front walls of the second set of power tool rails such that the first set of power tool rails do not overlap with the second set of power tool rails, wherein the first set of power tool rails includes two rails in a first plane and the second set of power tool rails includes two rails in a second plane, each of the two rails of the first set of power tool rails includes a side wall, the side walls of the two rails of the first set of power tool rails being parallel to each other and separated by a first distance and each of the two rails of the second set of power tool rails includes a side wall, the side walls of the two rails of the second set of power tool rails being parallel to each other and separated by a second distance, the first distance being less than the second distance.

12. The cordless electric power tool, as recited in claim 11, wherein the first set of power tool rails are in a same horizontal plane as the second set of power tool rails.

13. The cordless electric power tool, as recited in claim 11, wherein the first set of power tool rails are not in a same plane as the second set of power tool rails.

14. The cordless electric power tool, as recited in claim 11, wherein the power tool housing includes a datum plane and the first set of power tool rails are offset from the datum plane by a first distance and the second set of power tool rails are offset from the datum plane by a second distance.

15. The cordless electric power tool, as recited in claim 14, wherein the power tool housing is configured to mate with the battery pack in a mating direction and wherein the datum plane is parallel to the mating direction and wherein the first distance is offset from the datum plane in a direction perpendicular to the datum plane and wherein the second distance is offset from the datum plane in a direction perpendicular to the datum plane.

16. The cordless electric power tool, as recited in claim 11, further comprising a first set of power tool grooves associated with the first set of power tool rails and a second set of power tool grooves associated with the second set of power tool rails.

17. The cordless electric power tool, as recited in claim 16, wherein the first set of power tool grooves defines a first power tool groove height dimension and the second set of power tool grooves defines a second power tool groove height dimension, the first power tool groove height dimension being a same power tool groove height dimension as the second power tool groove height dimension.

18. The cordless electric power tool, as recited in claim 16, wherein the first set of power tool grooves does not overlap with the second set of power tool grooves.

19. The cordless electric power tool, as recited in claim 11, wherein the first set of power tool rails defines a first power tool rail height dimension and the second set of power tool rails defines a second power tool rail height dimension, the first power tool rail height dimension being a same power tool rail height dimension as the second power tool rail height dimension.

20. A cordless power tool system, comprising:

a removable battery pack configured to mate with a cordless power tool and to provide electrical energy to the cordless power tool, the removable battery pack comprising:

a battery pack housing having a forward side and a rearward side, the forward side including a plurality of terminal slots that provide access to a plurality of battery terminals; and an interface including a first set of battery pack rails and a first set of battery pack grooves associated with the first set of battery pack rails and a second set of battery pack rails and a second set of battery pack grooves associated with the second set of battery pack rails, the second set of battery pack rails having a set of front walls, the first set of battery pack rails and the first set of battery pack grooves positioned closer to the forward side than the second set of battery pack rails and the second set of battery pack grooves, and the first set of battery pack rails starting forward of the set of front walls of the second set of battery pack rails such that the first set of battery pack rails do not overlap with the second set of battery pack rails, wherein the first set of battery pack rails includes two rails in a first plane and the second set of battery pack rails includes two rails in a second plane, each of the two rails of the first set of battery packs rails includes a side wall, the side walls of the two rails of the first set of battery pack rails being parallel to each other and separated by a first distance and each of the two rails of the second set of battery pack rails includes aside wall, the side walls of the two rails of the second set of battery pack rails being parallel to each other and separated by a second distance, the first distance being less than the second distance; and a cordless power tool configured to mate with the removable battery pack and to receive electrical energy from the removable battery pack, the cordless power tool comprising:

a power tool housing having a forward side and a rearward side, the rearward side including a plurality of tool terminals configured to mate with the plurality of battery terminals upon mating with the removable battery pack; and an interface including a first set of power tool rails and a first set of power tool grooves associated with the first set of power tool rails and a second set of power tool rails and a second set of power tool grooves associated with the second set of power tool rails, the second set of power tool rails having a set of front walls, the first set of power tool rails and the first set of power tool grooves positioned closer to the rearward side than the second set of power tool rails and the second set of power tool grooves, and the first set of power tool rails starting forward of the set of front walls of the second set of power tool rails such that the first set of power tool rails do not overlap with the second set of power tool rail, wherein the first set of power tool rails includes two rails in a first plane and the second set of power tool rails includes two rails in a second plane, each of the two rails of the first set of power tool rails includes a side wall, the side walls of the two rails of the first set of power tool rails being parallel to each other and separated by a first distance and each of the two rails of the second set of power tool rails includes a side wall, the side walls of the two rails of the second set of power tool rails being parallel to each other and separated by a second distance, the first distance being less than the second distance; and the first set of battery pack rails and the first set of battery pack grooves and the second set of battery pack rails and the second set of battery pack grooves and the first set of power tool rails and the first set of power tool grooves and the second set of power tool rails and the second set of power tool grooves shaped, dimensioned and configured such that when the battery pack is mated with the power tool the first set of battery pack rails is received in the first set of power tool grooves and the second set of battery pack rails is received in the second set of power tool grooves and the first set of power tool rails is received in the first set of battery pack grooves and the second set of power tool rails is received in the second set of battery pack grooves.

21. The cordless power tool system, as recited in claim 20, wherein the first set of battery pack rails defines a first battery pack rail height dimension and the second set of battery pack rails defines a second battery pack rail height dimension, the first battery pack rail height dimension being a same battery pack rail height dimension as the second battery pack rail height dimension.

22. The cordless power tool system, as recited in claim 20, wherein the first set of battery pack grooves defines a first battery pack groove height dimension and the second set of battery pack grooves defines a second battery pack groove height dimension, the first battery pack groove height dimension being a same battery pack groove height dimension as the second battery pack groove height dimension.

23. The cordless power tool system, as recited in claim 20, wherein the first set of power tool rails defines a first power tool rail height dimension and the second set of power tool rails defines a second power tool rail height dimension, the first power tool rail height dimension being a same power tool rail height dimension as the second power tool rail height dimension.

24. The cordless power tool system, as recited in claim 20, wherein the first set of power tool grooves defines a first power tool groove height dimension and the second set of power tool grooves defines a second power tool groove height dimension, the first power tool groove height dimension being a same power tool groove height dimension as the second power tool groove height dimension.

25. The cordless power tool system, as recited in claim 20, wherein:

the first set of battery pack grooves does not overlap with the second set of battery pack grooves; and the first set of power tool grooves does not overlap with the second set of power tool grooves.

* * * * *